(12) United States Patent
Hansen et al.

(10) Patent No.: US 12,415,394 B2
(45) Date of Patent: Sep. 16, 2025

(54) VEHICLE

(71) Applicant: Polaris Industries Inc., Medina, MN (US)

(72) Inventors: Donald S. Hansen, Big Lake, MN (US); Timothy J. Giese, White Bear Lake, MN (US); Matthew S. Taylor, Riverside, CA (US)

(73) Assignee: POLARIS INDUSTRIES, INC., Medina, MN (US)

( * ) Notice: Subject to any disclaimer, the term of this patent is extended or adjusted under 35 U.S.C. 154(b) by 21 days.

(21) Appl. No.: 17/518,733

(22) Filed: Nov. 4, 2021

(65) Prior Publication Data

US 2022/0055434 A1 Feb. 24, 2022

Related U.S. Application Data

(63) Continuation-in-part of application No. 16/861,859, filed on Apr. 29, 2020, now Pat. No. 11,628,722.
(Continued)

(51) Int. Cl.
B60G 7/00 (2006.01)

(52) U.S. Cl.
CPC ............. B60G 7/001 (2013.01); B60G 7/005 (2013.01); *B60G 2204/14* (2013.01); *B60G 2204/416* (2013.01); *B60G 2204/418* (2013.01)

(58) Field of Classification Search
CPC .... B60G 7/001; B60G 7/005; B60G 2204/14; B60G 2204/416; B60G 2204/418; B60G 2200/144; B60G 2200/1442; B60G 2200/182; B60G 2200/422; B60G 2200/4622; B60G 2202/312; B60G 2204/129; B60G 2204/61; B60G 2206/11; B60G 2206/124; B60G 2206/14; B60G 2206/162; B60G 2206/50; B60G 2206/722; B60G 2206/8102; B60G 2206/8201; B60G 2300/07
See application file for complete search history.

(56) References Cited

U.S. PATENT DOCUMENTS

| 4,284,158 A | 8/1981 | Schield |
| 4,294,073 A | 10/1981 | Neff |

(Continued)

FOREIGN PATENT DOCUMENTS

| CN | 1654239 A | 8/2005 |
| CN | 202879243 U | 4/2013 |

(Continued)

OTHER PUBLICATIONS

Translation of JP-2000211329-A.*
(Continued)

Primary Examiner — Jason D Shanske
Assistant Examiner — Shams Dhanani
(74) Attorney, Agent, or Firm — SCHWEGMAN LUNDBERG & WOESSNER, P.A.

(57) ABSTRACT

A suspension assembly for a vehicle includes a lower alignment arm, an upper alignment arm, and a linear force element. The lower alignment arm includes a first portion, second portion, a third portion, and a linear force element mount. The linear force element mount includes a bearing for pivotably coupling the linear force element to the lower alignment arm.

26 Claims, 127 Drawing Sheets

Related U.S. Application Data

(60) Provisional application No. 62/840,654, filed on Apr. 30, 2019.

(56) References Cited

U.S. PATENT DOCUMENTS

| | | | |
|---|---|---|---|
| 4,890,510 A | 1/1990 | Inui | |
| 5,271,473 A | 12/1993 | Ikeda et al. | |
| 5,992,926 A | 11/1999 | Christofaro et al. | |
| 7,086,673 B2 | 8/2006 | Connett et al. | |
| D555,036 S | 11/2007 | Eck | |
| 7,387,307 B2* | 6/2008 | Tanaka | B60G 3/202 |
| | | | 280/124.179 |
| 7,645,452 B2 | 1/2010 | Thompson et al. | |
| 7,677,343 B2 | 3/2010 | Kitai et al. | |
| D622,631 S | 8/2010 | Lai et al. | |
| 7,845,452 B2 | 12/2010 | Bennett et al. | |
| D631,395 S | 1/2011 | Tandrup et al. | |
| D631,792 S | 2/2011 | Sanschagrin | |
| D633,006 S | 2/2011 | Sanschagrin et al. | |
| D636,295 S | 4/2011 | Eck et al. | |
| 7,950,486 B2 | 5/2011 | Van et al. | |
| D640,171 S | 6/2011 | Danisi | |
| 8,002,061 B2 | 8/2011 | Yamamura et al. | |
| D650,311 S | 12/2011 | Bracy | |
| D660,746 S | 5/2012 | Bracy | |
| D662,855 S | 7/2012 | Wang | |
| D670,198 S | 11/2012 | Li et al. | |
| 8,376,441 B2 | 2/2013 | Nakamura et al. | |
| D679,627 S | 4/2013 | Li et al. | |
| D682,737 S | 5/2013 | Li et al. | |
| D689,396 S | 9/2013 | Wang | |
| D694,668 S | 12/2013 | Li et al. | |
| D699,627 S | 2/2014 | Tang | |
| D700,869 S | 3/2014 | Sato et al. | |
| D701,469 S | 3/2014 | Lai et al. | |
| D703,102 S | 4/2014 | Eck et al. | |
| D712,311 S | 9/2014 | Morgan et al. | |
| D717,695 S | 11/2014 | Matsumura | |
| 8,899,602 B2* | 12/2014 | Takanashi | B60G 99/00 |
| | | | 280/124.135 |
| 8,973,693 B2 | 3/2015 | Kinsman et al. | |
| D727,794 S | 4/2015 | Tandrup et al. | |
| D730,239 S | 5/2015 | Gonzalez | |
| D735,077 S | 7/2015 | Sato et al. | |
| 9,102,205 B2 | 8/2015 | Kvien et al. | |
| D737,724 S | 9/2015 | Schroeder et al. | |
| D756,845 S | 5/2016 | Flores | |
| 9,393,894 B2 | 7/2016 | Steinmetz et al. | |
| D762,522 S | 8/2016 | Kinoshita | |
| D763,732 S | 8/2016 | Okuyama et al. | |
| 9,566,858 B2 | 2/2017 | Hicke et al. | |
| D784,199 S | 4/2017 | Dunshee et al. | |
| 9,623,912 B2 | 4/2017 | Schlangen | |
| D785,502 S | 5/2017 | Dunshee et al. | |
| 9,718,351 B2 | 8/2017 | Ripley et al. | |
| 9,776,481 B2 | 10/2017 | Deckard et al. | |
| 9,789,909 B2 | 10/2017 | Erspamer et al. | |
| D804,993 S | 12/2017 | Eck et al. | |
| D835,545 S | 12/2018 | Hanten et al. | |
| 10,160,497 B2 | 12/2018 | Wimpfheimer et al. | |
| 10,202,149 B1 | 2/2019 | Johnson et al. | |
| 10,246,153 B2 | 4/2019 | Deckard et al. | |
| 10,259,507 B1 | 4/2019 | Johnson et al. | |
| 10,300,786 B2 | 5/2019 | Nugteren et al. | |
| 10,369,861 B2 | 8/2019 | Deckard et al. | |
| 10,428,705 B2 | 10/2019 | Bluhm et al. | |
| 10,550,754 B2 | 2/2020 | Nugteren et al. | |
| 10,639,985 B2 | 5/2020 | Battaglini et al. | |
| D896,125 S | 9/2020 | Hashimoto et al. | |
| D896,702 S | 9/2020 | Dunshee et al. | |
| D896,703 S | 9/2020 | Dunshee et al. | |
| D904,227 S | 12/2020 | Bracy | |
| D913,847 S | 3/2021 | Hashimoto et al. | |
| 10,960,941 B2 | 3/2021 | Endrizzi et al. | |
| 11,370,266 B2 | 6/2022 | Borud et al. | |
| 2003/0034625 A1* | 2/2003 | Runte | B60G 7/001 |
| | | | 280/124.134 |
| 2007/0181358 A1 | 8/2007 | Nakagaki et al. | |
| 2008/0179305 A1* | 7/2008 | Cai | B23K 9/126 |
| | | | 219/137.2 |
| 2008/0284205 A1* | 11/2008 | Rossi | B60G 7/001 |
| | | | 29/897.3 |
| 2009/0295113 A1* | 12/2009 | Inoue | B60G 7/001 |
| | | | 280/124.134 |
| 2009/0302590 A1 | 12/2009 | Van et al. | |
| 2010/0032920 A1* | 2/2010 | Hong | B60G 21/0551 |
| | | | 280/124.109 |
| 2010/0078256 A1 | 4/2010 | Kuwabara et al. | |
| 2010/0084834 A1* | 4/2010 | Ersoy | B60G 7/001 |
| | | | 280/124.1 |
| 2011/0012334 A1 | 1/2011 | Malmberg | |
| 2011/0155497 A1 | 6/2011 | Kobayashi et al. | |
| 2011/0298189 A1 | 12/2011 | Schneider et al. | |
| 2012/0193163 A1 | 8/2012 | Wimpfheimer et al. | |
| 2014/0065936 A1 | 3/2014 | Smith et al. | |
| 2014/0090935 A1 | 4/2014 | Pongo et al. | |
| 2014/0124279 A1 | 5/2014 | Schlangen et al. | |
| 2014/0224561 A1 | 8/2014 | Shinbori et al. | |
| 2015/0041237 A1 | 2/2015 | Nadeau et al. | |
| 2015/0061275 A1 | 3/2015 | Deckard et al. | |
| 2015/0165886 A1 | 6/2015 | Bennett et al. | |
| 2016/0167715 A1 | 6/2016 | Kosuge et al. | |
| 2016/0176284 A1 | 6/2016 | Nugteren et al. | |
| 2016/0339960 A1 | 11/2016 | Leonard et al. | |
| 2017/0029036 A1 | 2/2017 | Proulx | |
| 2017/0106747 A1 | 4/2017 | Safranski et al. | |
| 2017/0166255 A1 | 6/2017 | Peterson et al. | |
| 2017/0233022 A1 | 8/2017 | Marko | |
| 2018/0065465 A1 | 3/2018 | Ward et al. | |
| 2018/0118053 A1 | 5/2018 | Sunsdahl et al. | |
| 2018/0178677 A1 | 6/2018 | Swain et al. | |
| 2018/0281764 A1 | 10/2018 | Pongo et al. | |
| 2018/0312025 A1 | 11/2018 | Danielson et al. | |
| 2018/0326843 A1 | 11/2018 | Danielson et al. | |
| 2019/0210457 A1 | 7/2019 | Galsworthy et al. | |
| 2019/0285159 A1 | 9/2019 | Nelson et al. | |
| 2019/0285160 A1 | 9/2019 | Nelson et al. | |
| 2019/0299737 A1 | 10/2019 | Sellars et al. | |
| 2019/0375463 A1 | 12/2019 | Upah et al. | |
| 2020/0010120 A1 | 1/2020 | Kinsman et al. | |
| 2020/0108681 A1* | 4/2020 | Matsumoto | B60G 7/008 |
| 2020/0346542 A1 | 11/2020 | Rasa et al. | |
| 2021/0023936 A1 | 1/2021 | Marietta | |
| 2021/0094627 A1 | 4/2021 | Clark et al. | |
| 2021/0206219 A1* | 7/2021 | Stieglitz | B29C 66/5244 |
| 2021/0331543 A1* | 10/2021 | Zock | B60G 7/001 |
| 2021/0370737 A1* | 12/2021 | Zock | B60G 13/005 |
| 2022/0266645 A1* | 8/2022 | Badino | B62D 7/20 |
| 2022/0339984 A1* | 10/2022 | Starik | B60G 3/20 |

FOREIGN PATENT DOCUMENTS

| | | |
|---|---|---|
| CN | 103370221 A | 10/2013 |
| CN | 104608825 A | 5/2015 |
| CN | 105555558 A | 5/2016 |
| CN | 106515851 A | 3/2017 |
| CN | 106740079 A | 5/2017 |
| EP | 0908373 A1 | 4/1999 |
| EP | 0908375 A1 | 4/1999 |
| JP | H10280968 | 10/1998 |
| JP | 2000211329 A * | 8/2000 |
| JP | 2001-097255 A | 4/2001 |
| WO | 2016/038591 A1 | 3/2016 |
| WO | 2016/099770 A2 | 6/2016 |
| WO | 2019/183051 A1 | 9/2019 |

OTHER PUBLICATIONS

Can-Am Maverick Sport 60" (front deflector panel for hot radiator air, 2019.

(56) References Cited

OTHER PUBLICATIONS

International Preliminary Report on Patentability issued by the International Searching Authority, dated May 6, 2021, for International Patent Application No. PCT/US2020/030518; 27 pages.
International Search Report and Written Opinion received for PCT Patent Application No. PCT/US2020/030518, mailed on Sep. 11, 2020, 14 pages.
RZR Pro XP Sport, Published date unavailable [online], [retrieved on Jul. 25, 2021], Retrieved from the Internet: https://rzr.polaris.com/en-us/rzr-pro-xp-sport-rockford fosgate-le/build-color/ (Year: 2021), 1 page.
International Preliminary Report on Patentability issued by the International Searching Authority, dated Nov. 15, 2022, for International Patent Application No. PCT/US2021/031782; 9 pages.
Lijun, P., "Differential steering six A review of the current status of wheel vehicle suspension systems.", A Mechanical Engineer, Issue No. 04, 10, Apr. 2016, pp. 1-70.
2017 Can-Am Maverick X3 Walk Around https://youtu.be/510slScF-y4?si=xBV9LzjGUNORi9A9 (Year: 2016).
Office Action issued by the Canadian Intellectual Property Office, dated May 2, 2023, for Canadian Patent Application No. 3, 152,773; 5 pages.
Invitation to Pay Additional Fees received for PCT Patent Application No. PCT/US2020/030518, mailed on Jul. 14, 2020, 3 pages.

\* cited by examiner

VEHICLE

The present application is a continuation-in-part of U.S. patent application Ser. No. 16/861,859, filed Apr. 29, 2020, and entitled "VEHICLE," which claims priority to U.S. Provisional Patent Application Ser. No. 62/840,654, filed Apr. 30, 2019, and entitled "VEHICLE," the complete disclosures of which are expressly incorporated by reference herein.

FIELD OF THE DISCLOSURE

The present invention relates to side-by-side vehicles and all-terrain vehicles.

BACKGROUND OF THE DISCLOSURE

Generally, all-terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint.

SUMMARY OF THE DISCLOSURE

In one embodiment of the present disclosure, a suspension arm for a vehicle comprises a first portion and a second portion coupled to the first portion. The first portion and the second portion together define an upper surface of the suspension arm.

In a further embodiment of the present disclosure, a suspension assembly for a vehicle comprising an alignment arm comprising a mounting assembly having a bearing plate and a bearing member. The bearing member is removably coupled within a portion of the bearing plate. The suspension assembly further comprising a linear force element movably coupled to the alignment arm at the bearing member.

In another embodiment of the present disclosure, a suspension arm for a vehicle comprising an upper portion and a lower portion. An upper extent of the lower portion overlaps a lower extent of the upper portion to define overlapping sides of the upper and lower portions. The upper portion is coupled to the lower portion at the overlapping sides.

In yet another embodiment of the present disclosure, a method of assembling a suspension arm for a vehicle, the method comprising providing a first portion, providing a second portion, providing a third portion, permanently coupling the first portion to the second portion along an upper surface of the first portion, and permanently coupling the first portion to the third portion along a lower extent of the first portion.

BRIEF DESCRIPTION OF THE DRAWINGS

FIG. 114 is a perspective view of an underside of a mounting member of the lightbar assembly of FIG. 112;

FIG. 115 is a rear perspective view of the lower suspension arm of FIG. 12;

FIG. 116 is a front perspective view of the lower suspension arm of FIG. 115;

FIG. 117A is an exploded view of the lower suspension arm of FIG. 116;

FIG. 117B is a further exploded view of the lower suspension arm of FIG. 117A;

FIG. 118 is a perspective view of a ball joint housing of the lower suspension arm of FIG. 115;

FIG. 119 is a cross-sectional view of the lower suspension arm of FIG. 116, taken along line 119-119 of FIG. 116;

FIG. 120 is a cross-sectional view of the lower suspension arm of FIG. 116, taken along line 120-120 of FIG. 116;

FIG. 121 is a front perspective view of the lower suspension arm of FIG. 116 coupled to the clevis for the linear force element of the suspension assembly of FIG.

FIG. 122 is an exploded view of the lower suspension arm and clevis of FIG. 121;

FIG. 123 is a perspective view of the clevis is FIG. 122;

FIG. 124 is a front view of the lower suspension arm of FIG. 116 and a cross-sectional view of the clevis of FIG. 123, showing the clevis relative to the axle or half shaft during operation of the vehicle at ride height;

Figure 12:
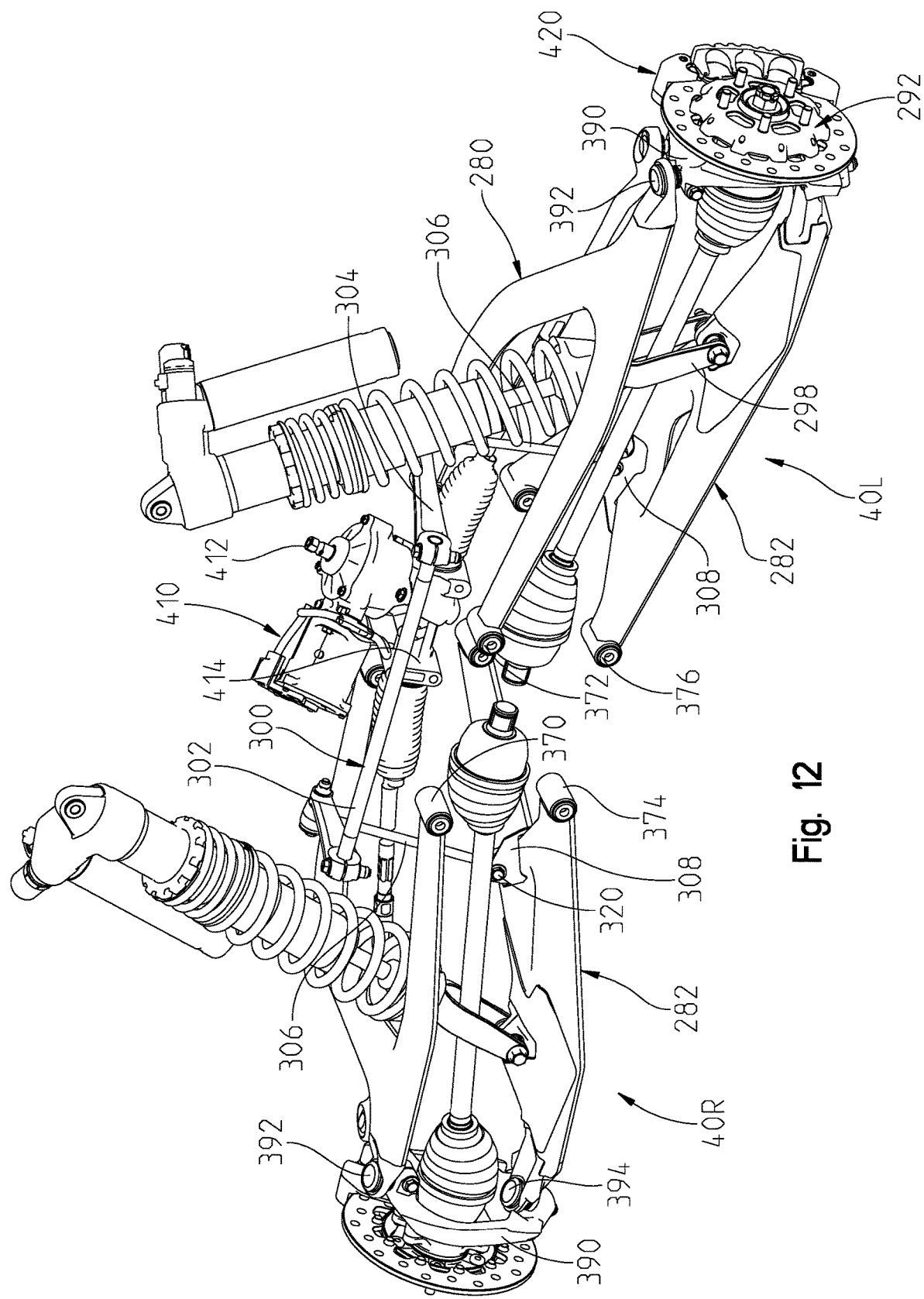
FIG. 12 is a view similar to that of FIG. 10, having removed the frame.
Figure 116:
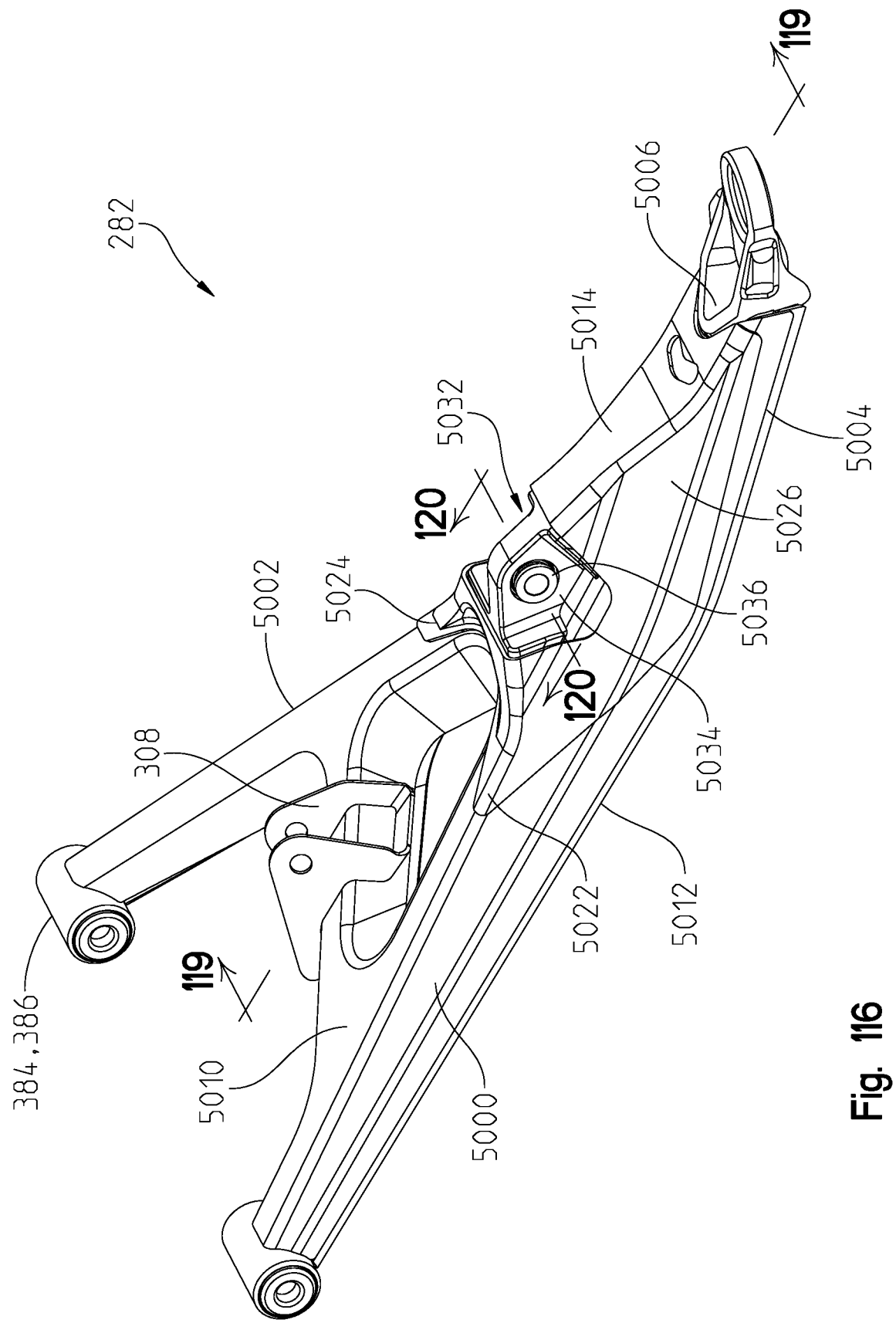
Figure 117A:
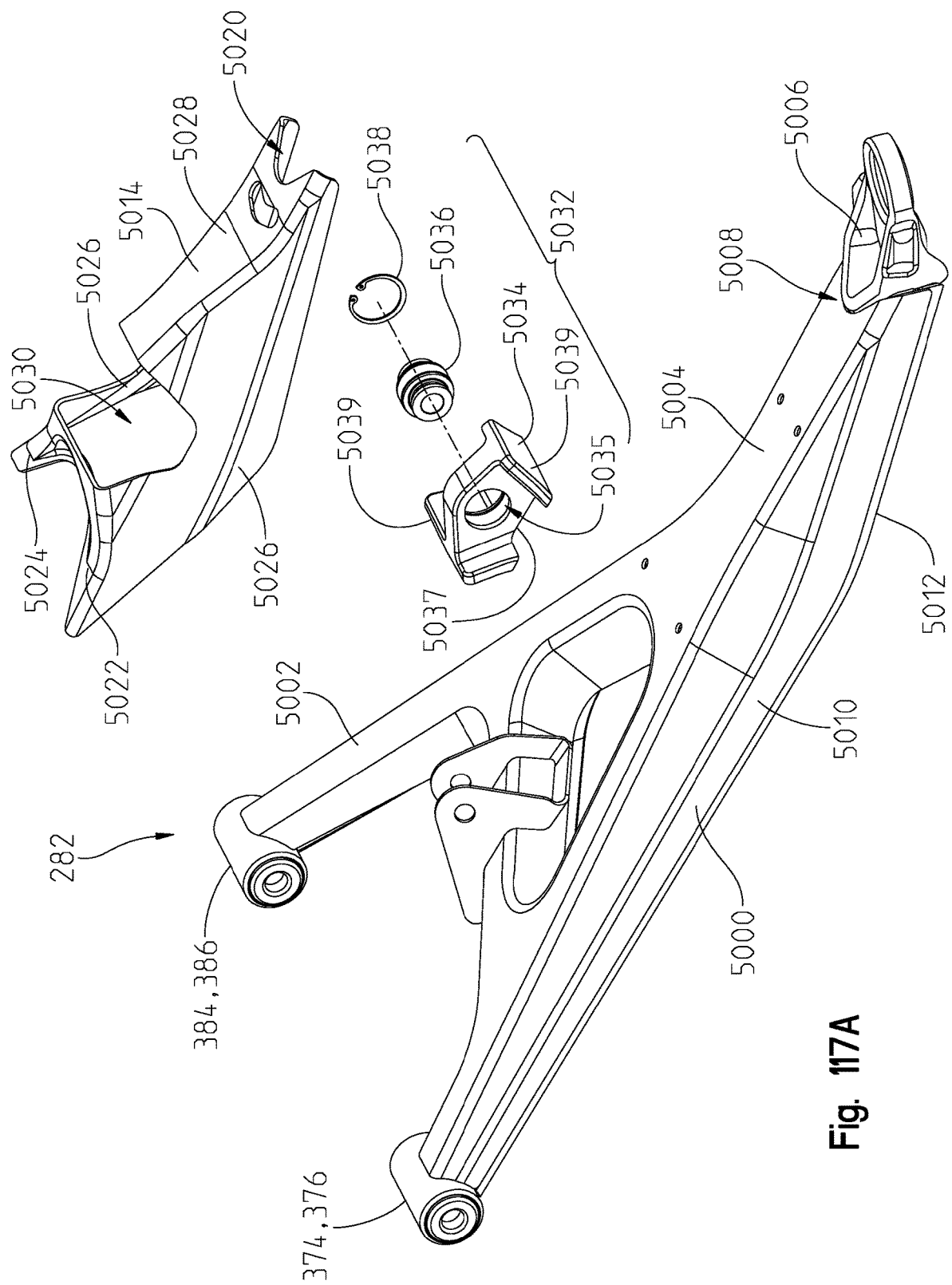
Figure 117B:
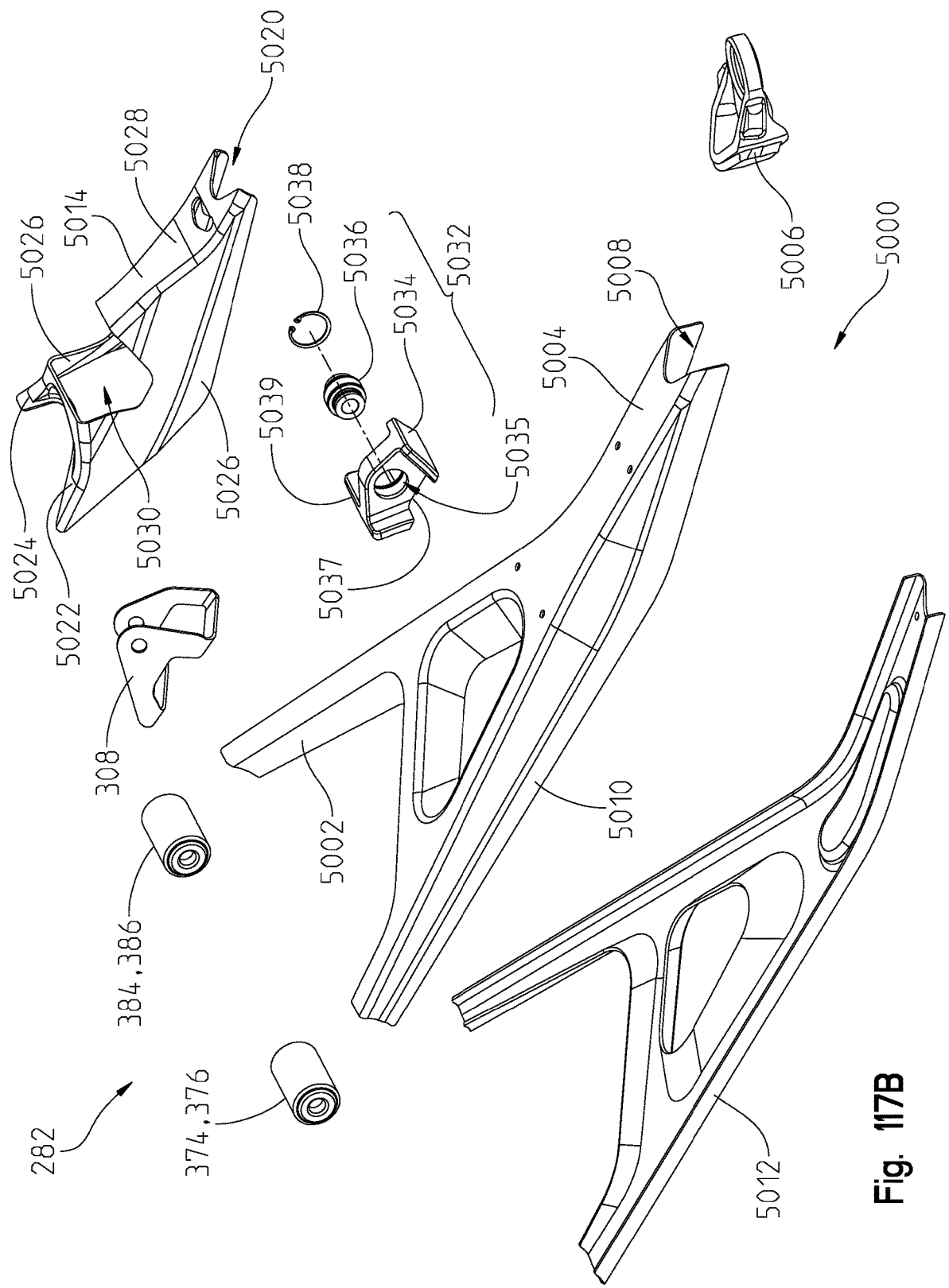
Figure 118:
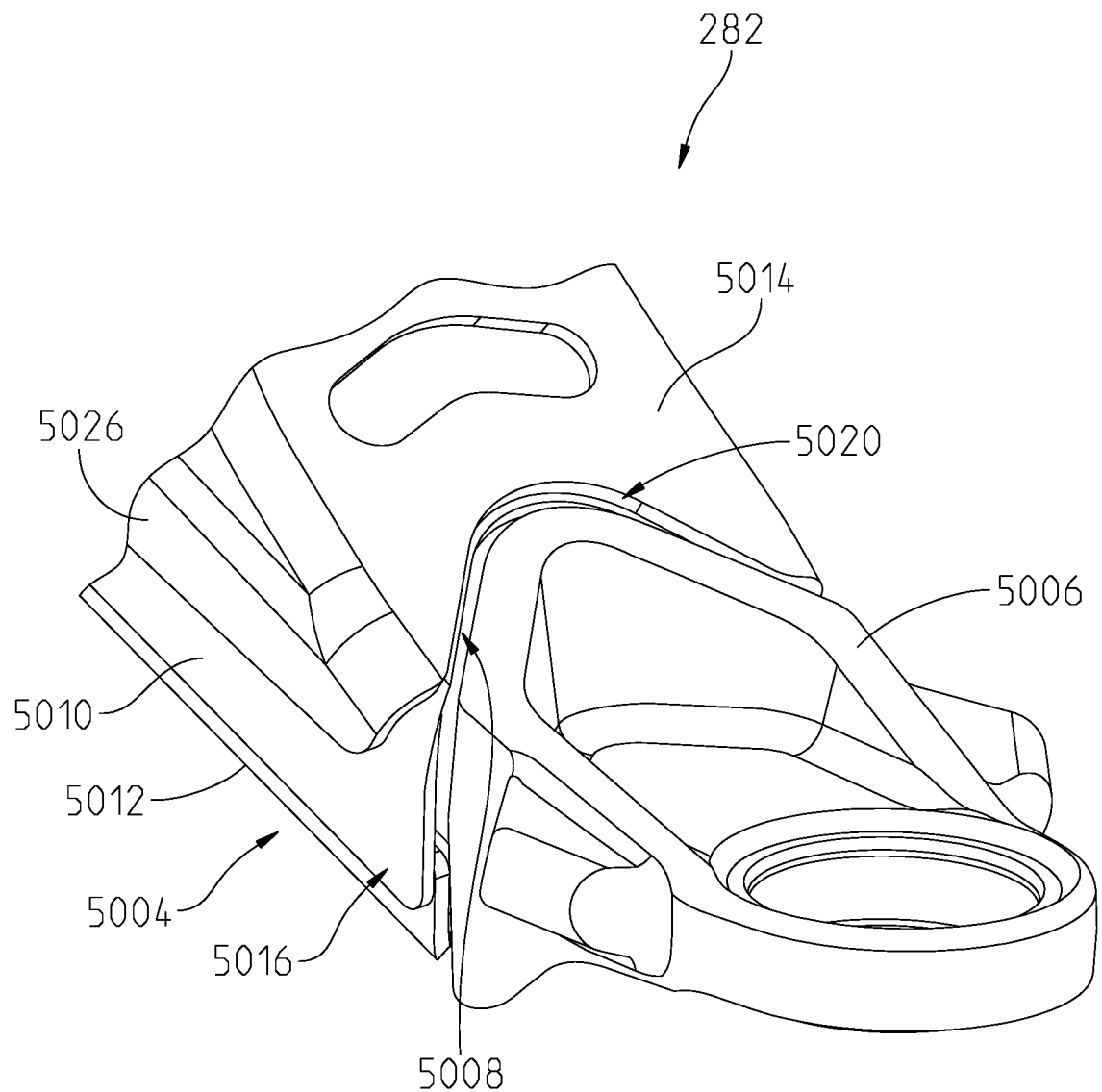
Figure 119:
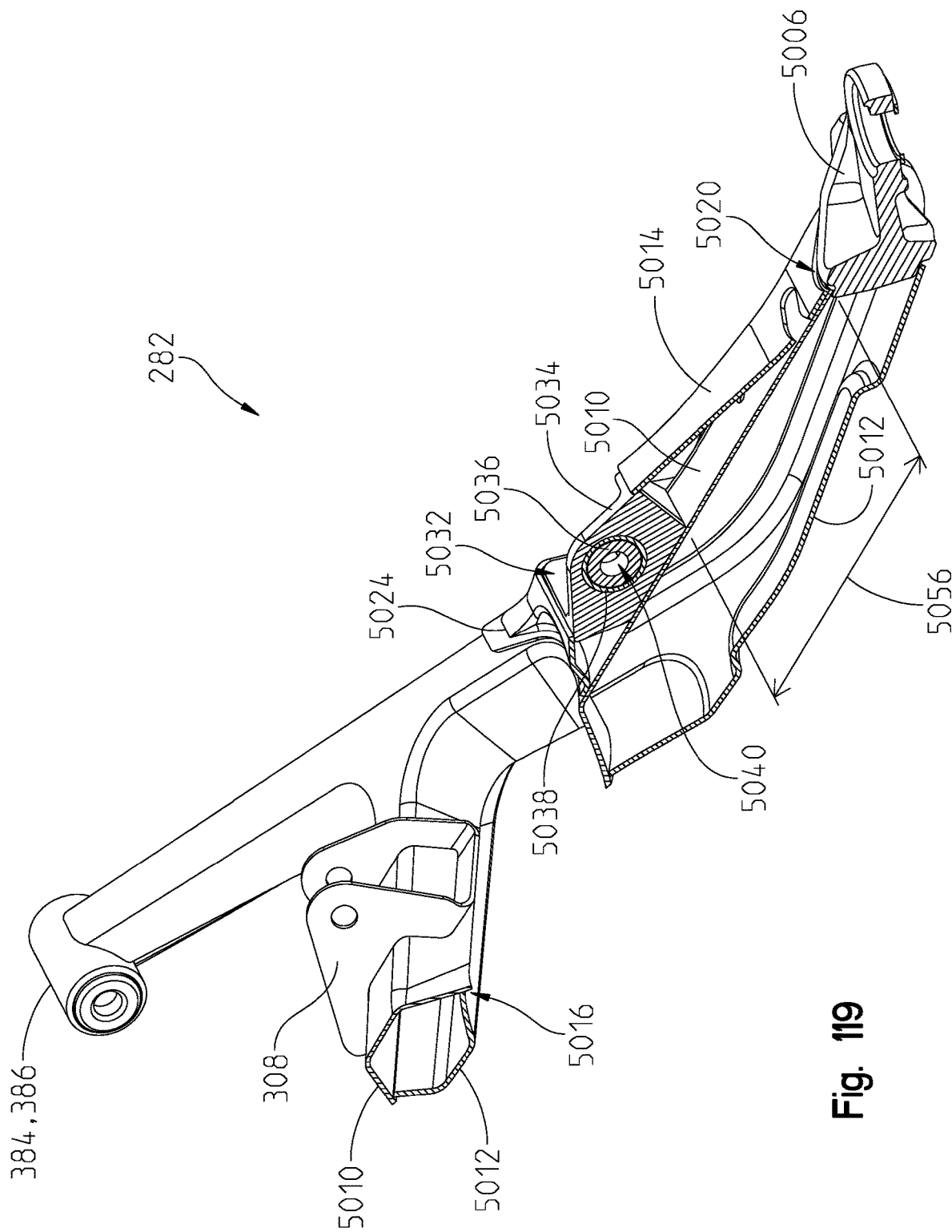
Figure 120:
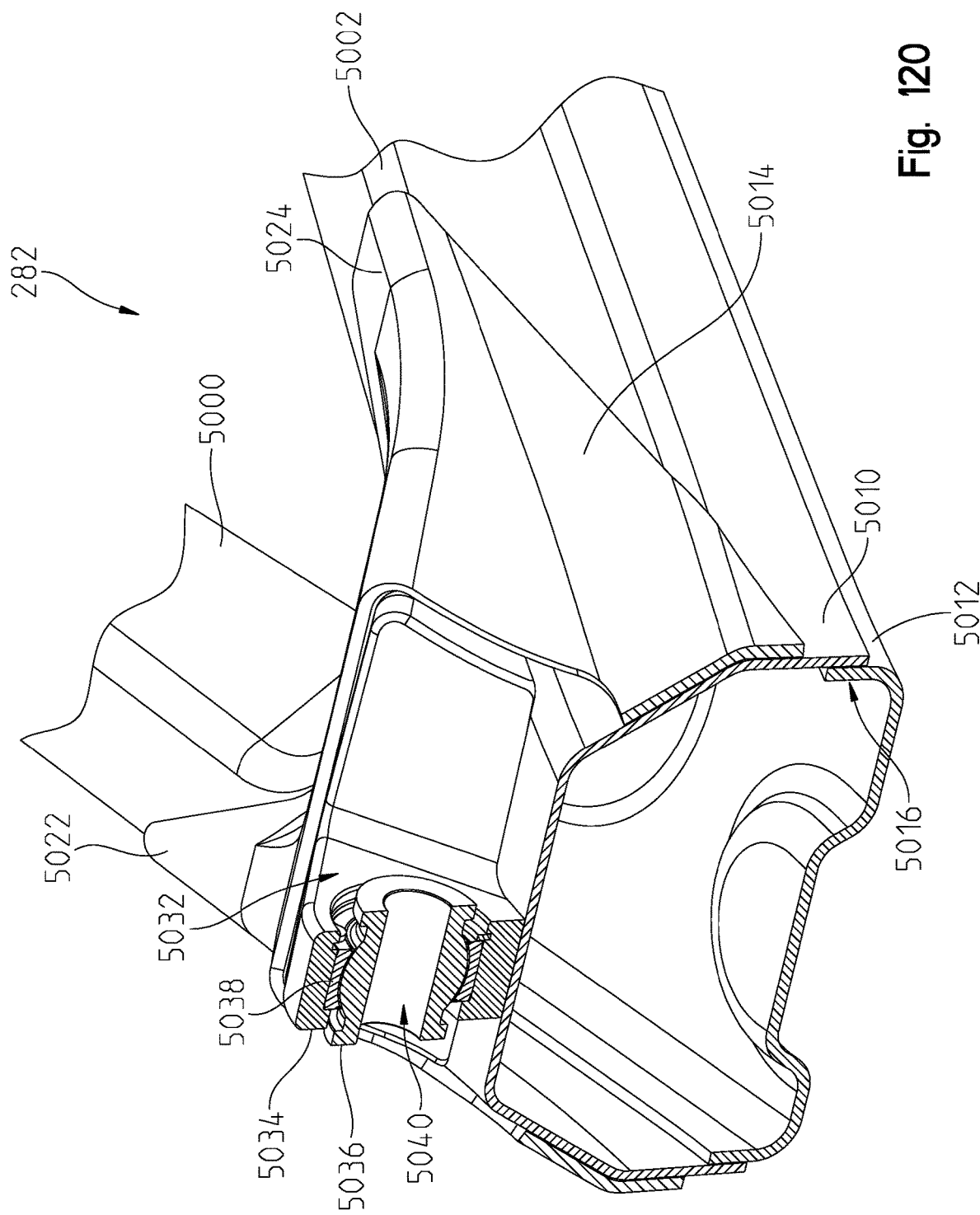
Figure 123:
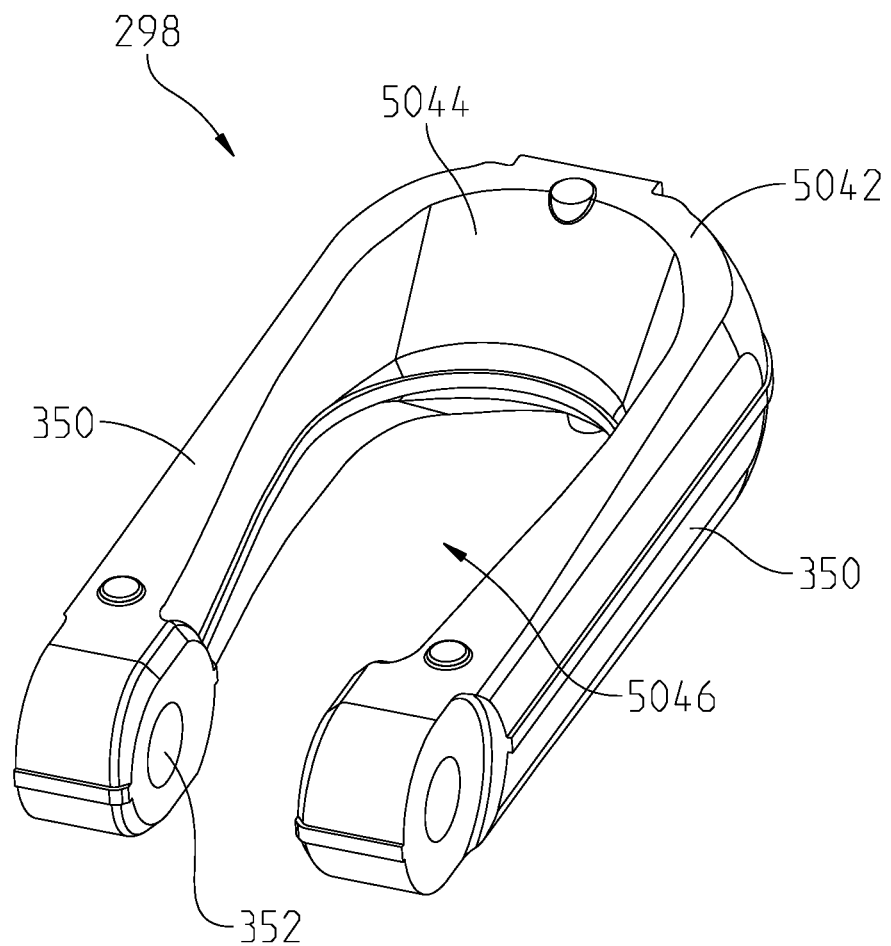
Figure 125:
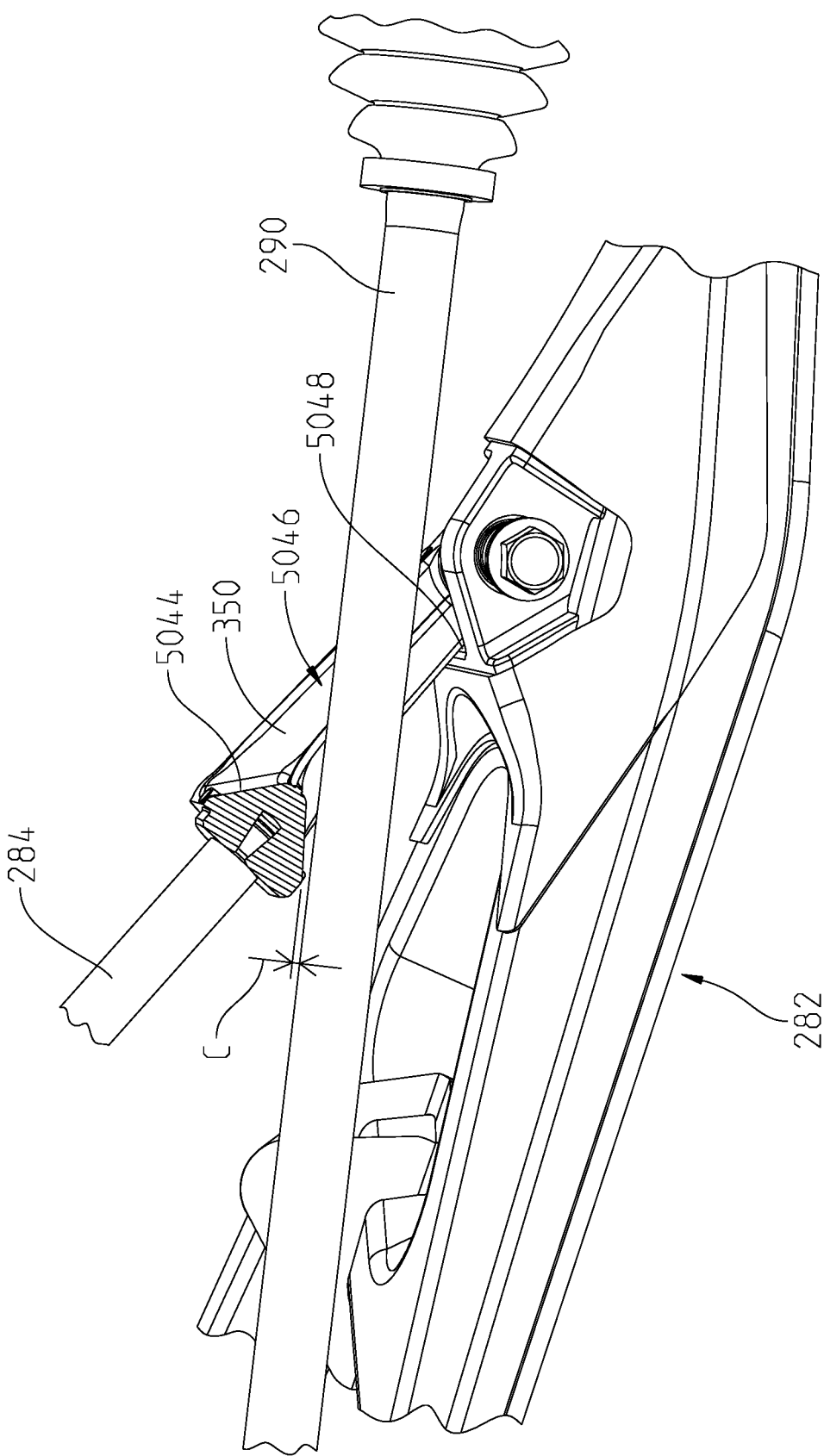
Figure 126:
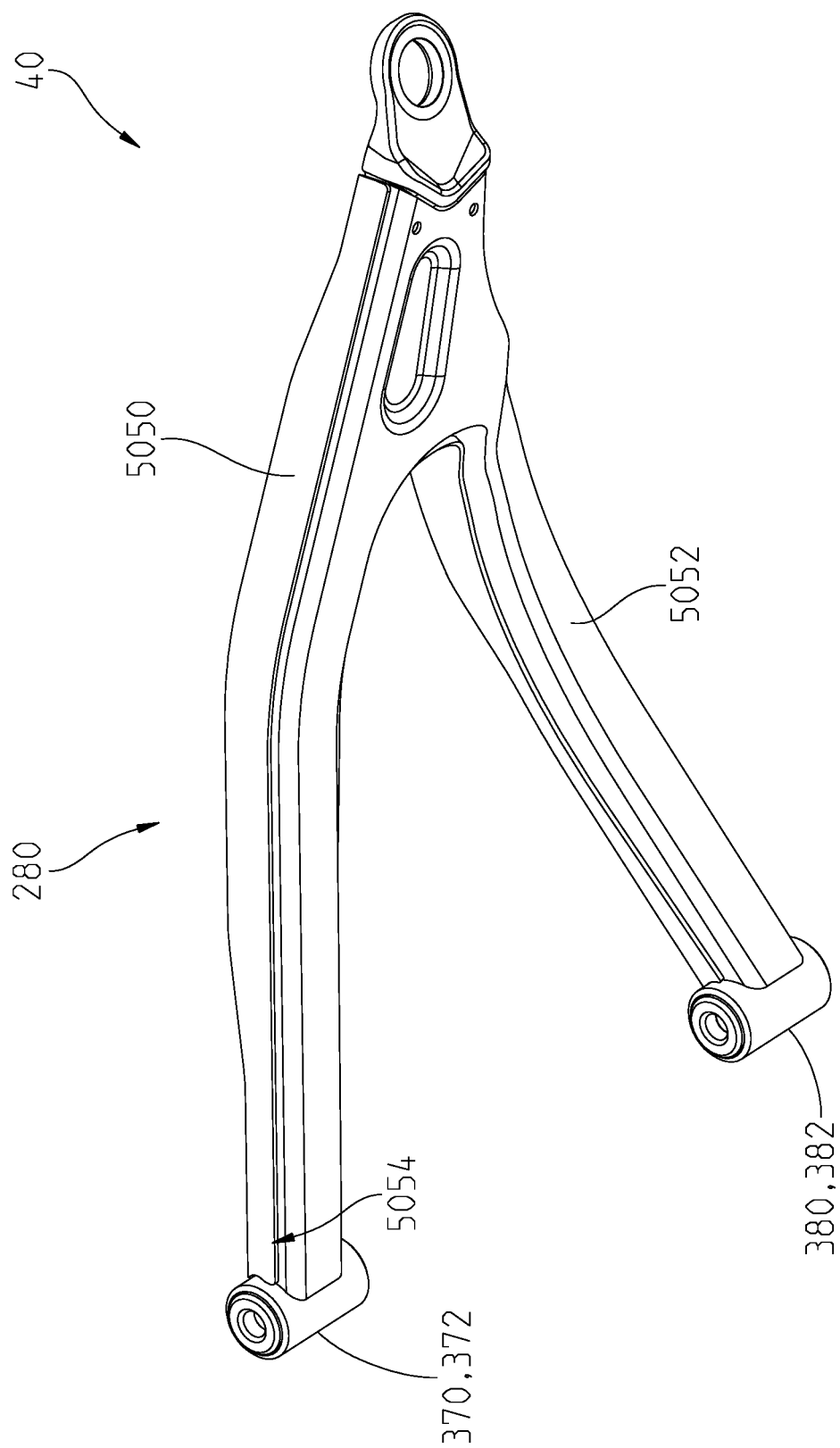

FIG. 125 is a front view of the lower suspension arm of FIG. 116 and a cross-sectional view of the clevis of FIG. 123, showing the clevis relative to an axle or half shaft during operation of the vehicle at full rebound of the suspension assembly; and FIG. 126 is a perspective view of the upper suspension arm of the suspension assembly of FIG. 12.

DETAILED DESCRIPTION OF THE DRAWINGS

Figure 1:
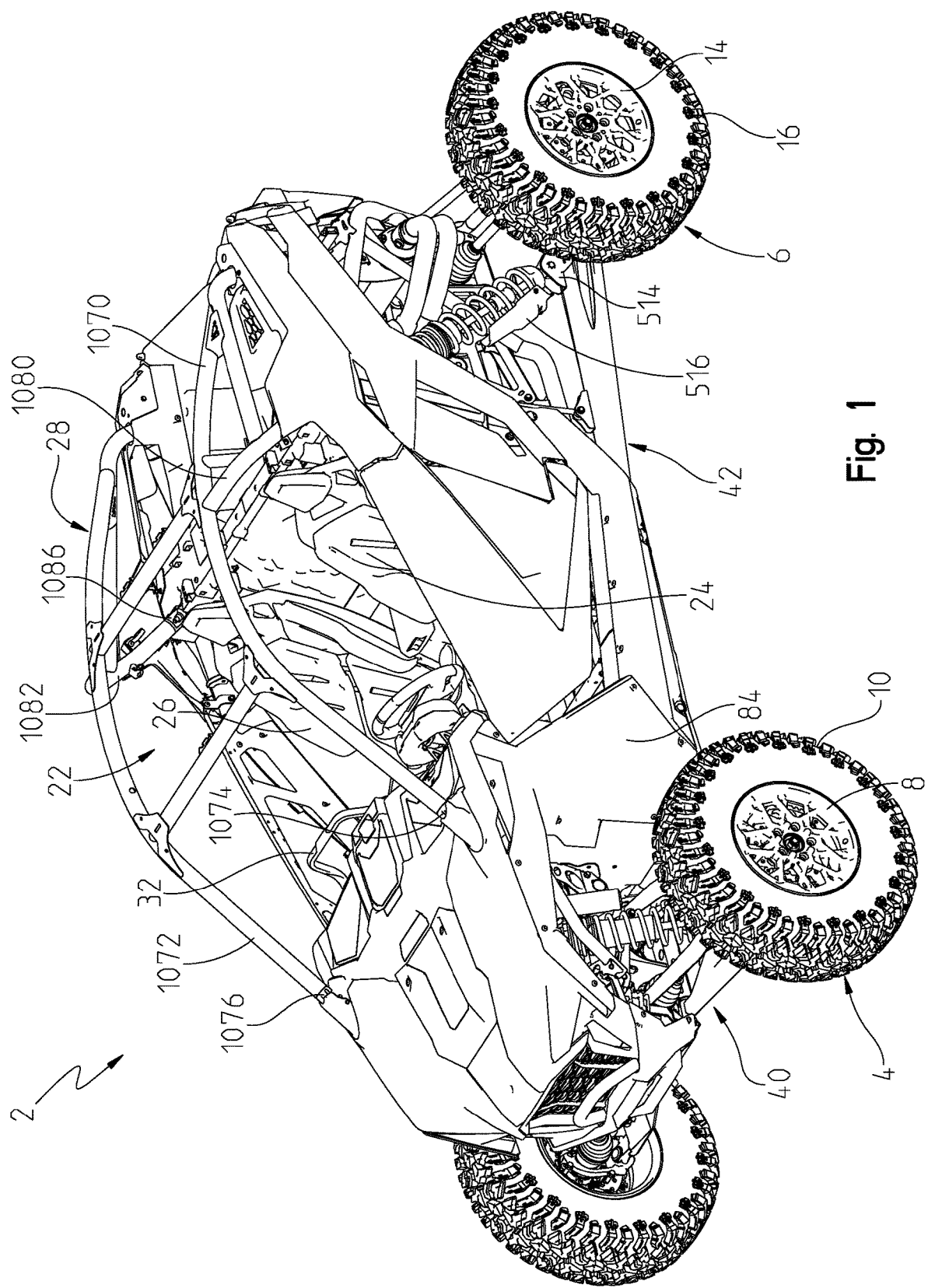
FIG. 1 is a front left perspective view of the vehicle of the present invention without the body panels.
Figure 2:
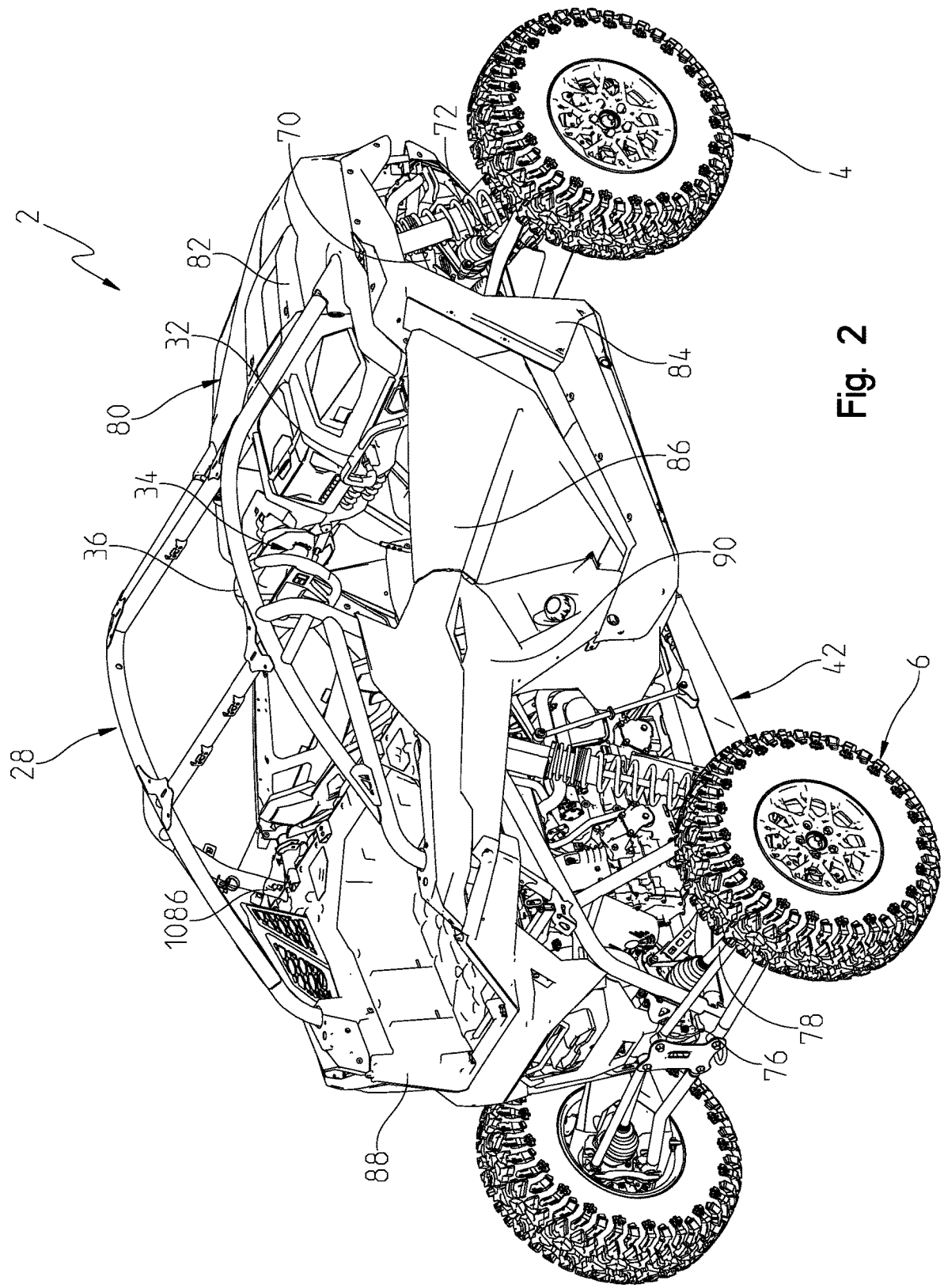
FIG. 2 is a right rear perspective view of the vehicle of FIG. 1.
Figure 3:
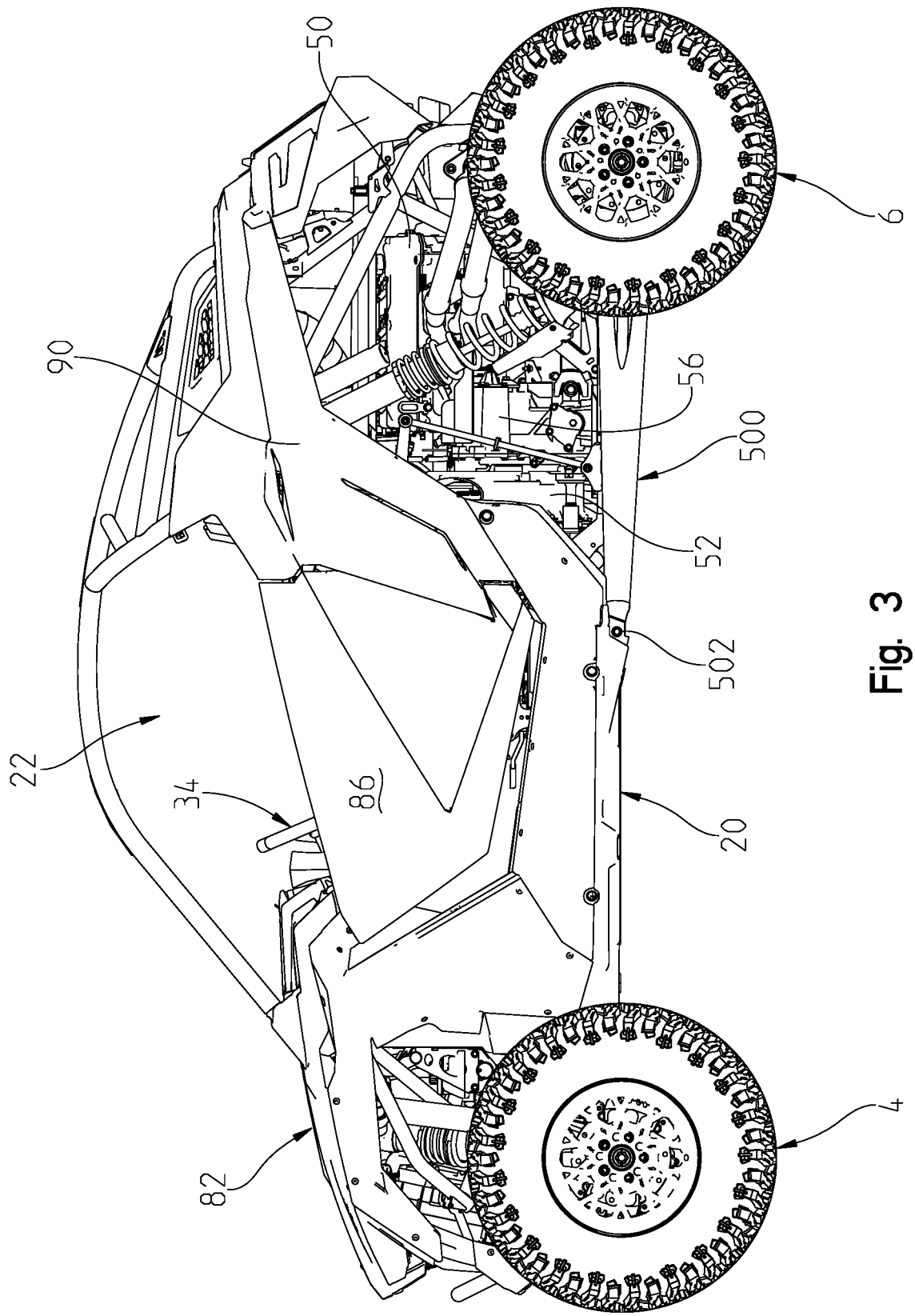
FIG. 3 is a left side view of the vehicle of FIG. 1.
Figure 4:
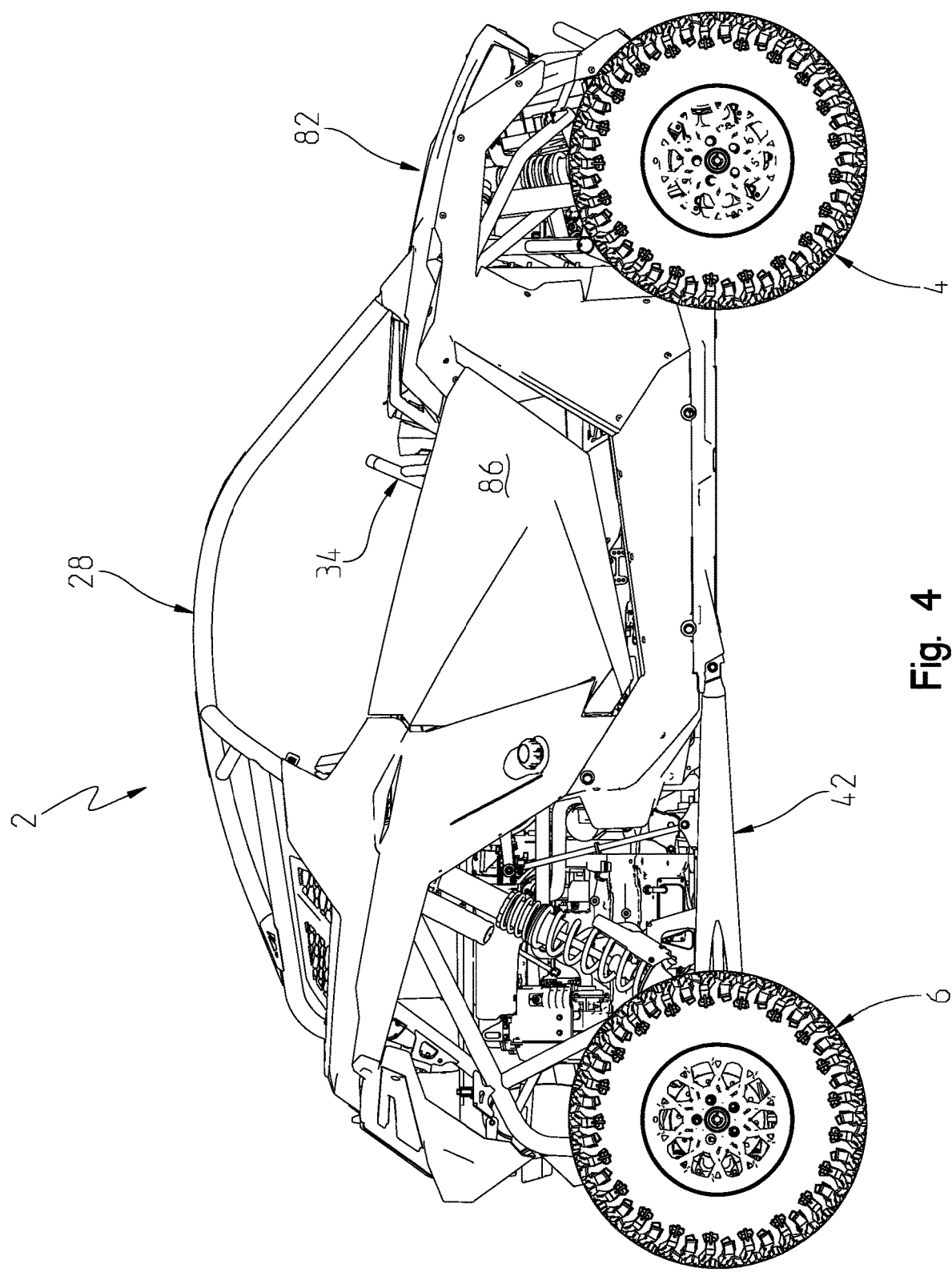
FIG. 4 is a right side view of the vehicle of FIG. 1.

With reference first to FIGS. 1-7, the vehicle of the present invention will be described. As shown, the vehicle is generally depicted as reference number 2 which includes front wheels 4 and rear wheels 6. Front wheels 4 are comprised of rims 8 and tires 10, whereas wheels 6 are comprised of rims 14 and tires 16. Wheels 4 and 6 support a vehicle frame which is shown generally at 20 (FIG. 3) and which supports a seating area 22 comprised of a driver's seat 24 and a passenger seat 26. A cab frame is shown at 28 and generally extends over the seating area 22 to protect the passengers from such objects as tree branches, etc. A passenger grab bar 32 is provided for the passenger in seat 26. As best shown in FIG. 2, vehicle 2 further includes a steering assembly at 34 for steering front wheels 4 whereby the steering assembly 34 includes a steering wheel 36 which could be both tiltable and longitudinally movable as described in U.S. Provisional Patent Application Ser. No. 62/615,684 filed Jan. 10, 2018, the subject matter of which is disclosed herein in its entirety.

Figure 5:
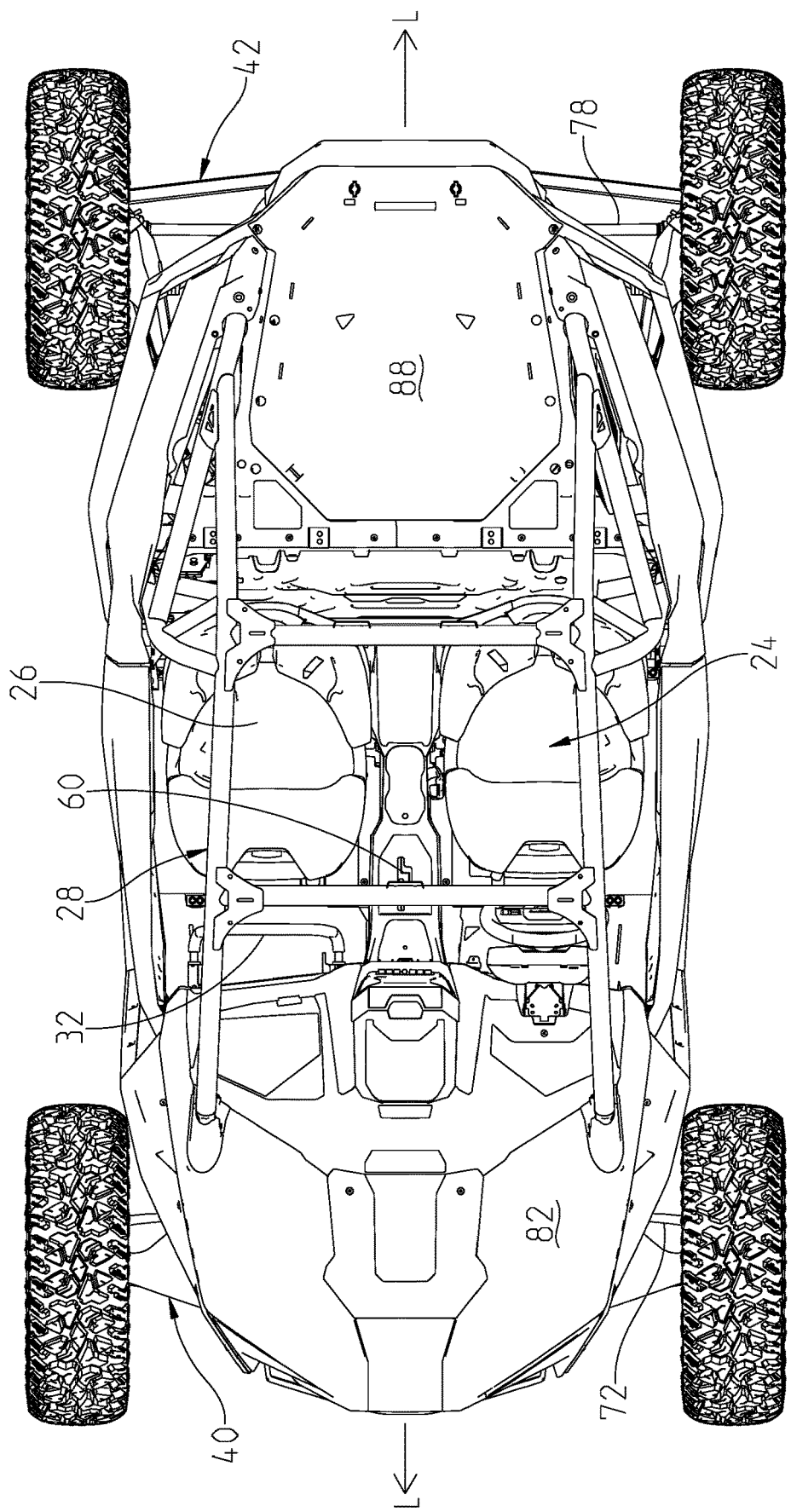
FIG. 5 is a top view of the vehicle of FIG. 1.
Figure 6:
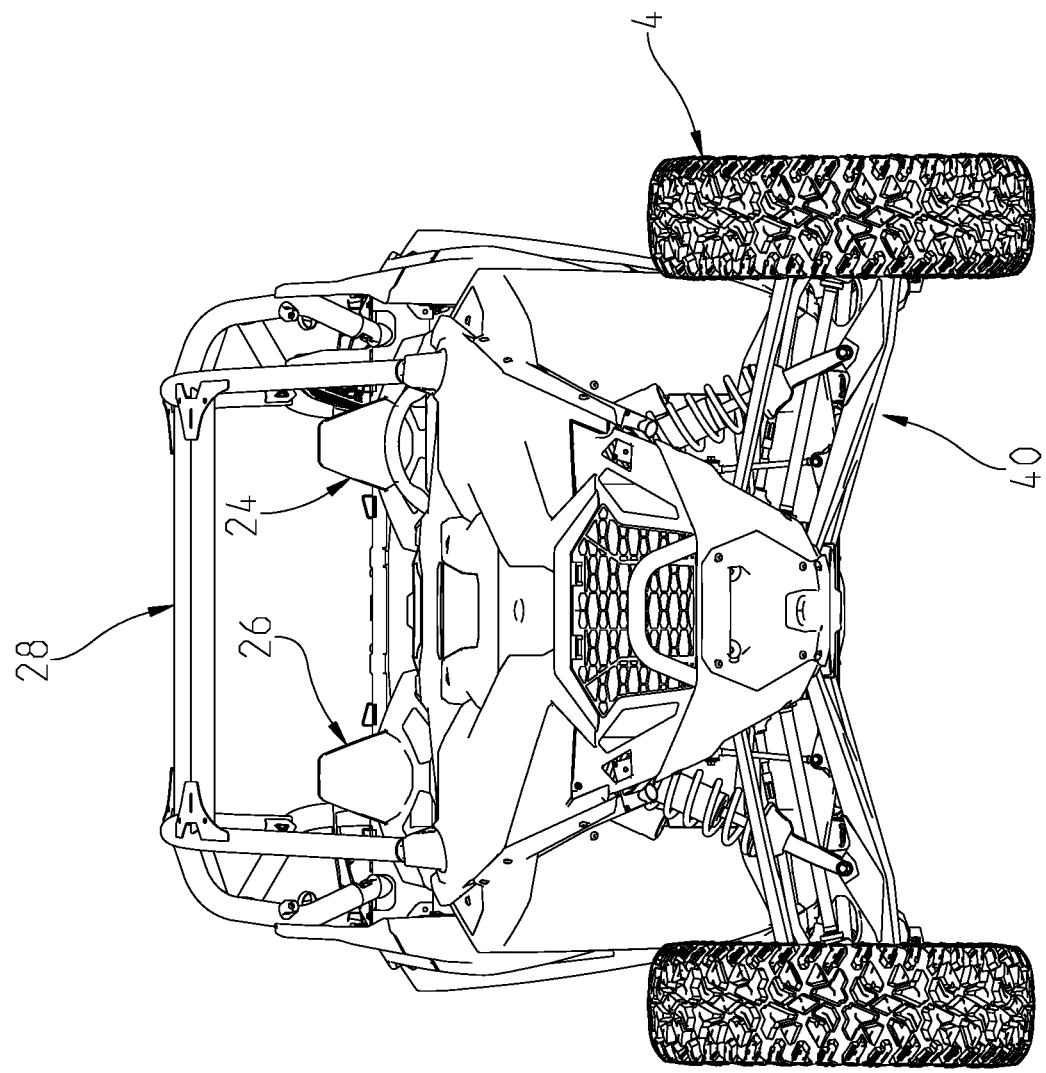
FIG. 6 is a front view of the vehicle of FIG. 1.
Figure 7:
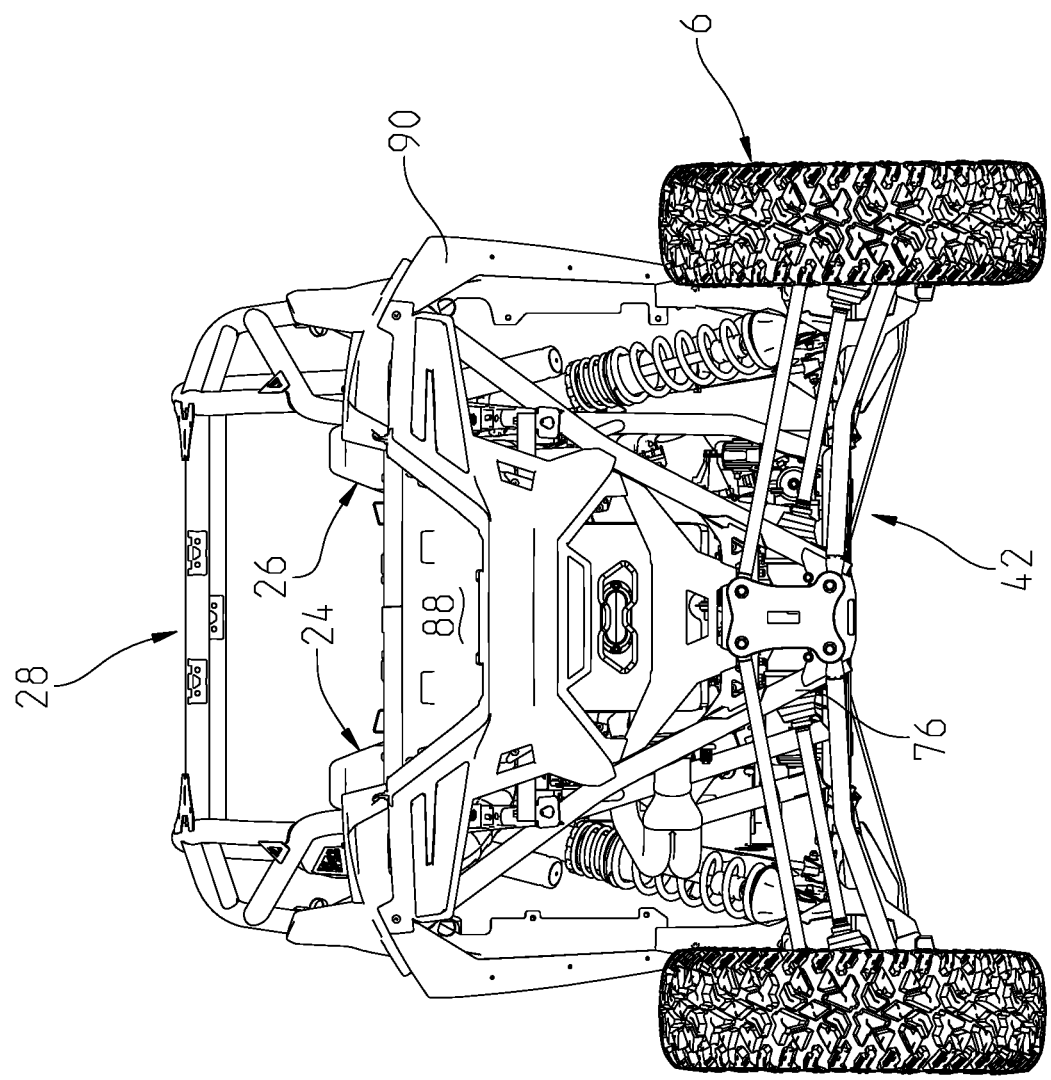
FIG. 7 is a rear view of the vehicle of FIG. 1.

Vehicle 2 further includes a front suspension at 40, which in the present disclosure is a double A-arm suspension and further includes a rear suspension 42, which as shown in the present disclosure is a trailing arm-type suspension. As shown best in FIGS. 2-4 (see also FIG. 22), powertrain is comprised of engine 50 (FIG. 3), a continuously variable transmission (CVT) 52 (FIG. 3) and a shiftable transmission 56 (FIG. 3) which is operated by a shifter assembly 60 (FIG. 5). In a preferred version of the present invention, the vehicle is a four-wheel drive vehicle including a front final drive 70 (FIG. 2) having front stub shafts 72 coupled to the front final drive 70 for driving the front wheels 4. A rear final drive 76 (FIGS. 2, 7) is provided to drive half shafts 78 which drives rear wheels 6. As shown vehicle 2 may also include an outer body 80 including a hood 82, side panels 84, doors 86, a utility bed 88 and rear panels 90. The vehicle described herein may be further configured as shown in U.S. Pat. No. 8,827,028 and/or U.S. Patent application Ser. No. 62/615,684, the subject matter of which is incorporated herein by reference.

Figure 8:
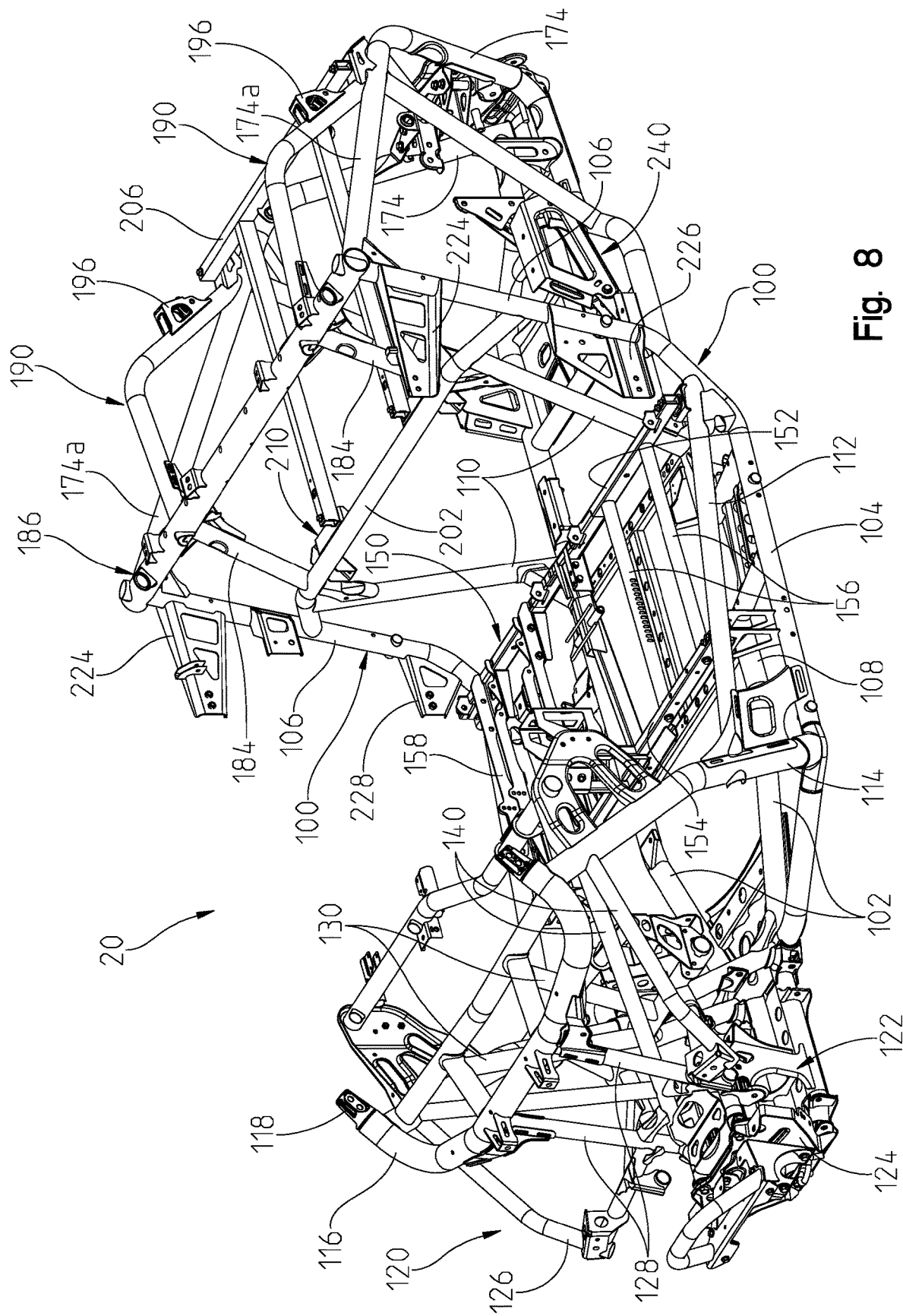
FIG. 8 is a front left perspective view of the frame of the vehicle of FIG. 1.
Figure 9:
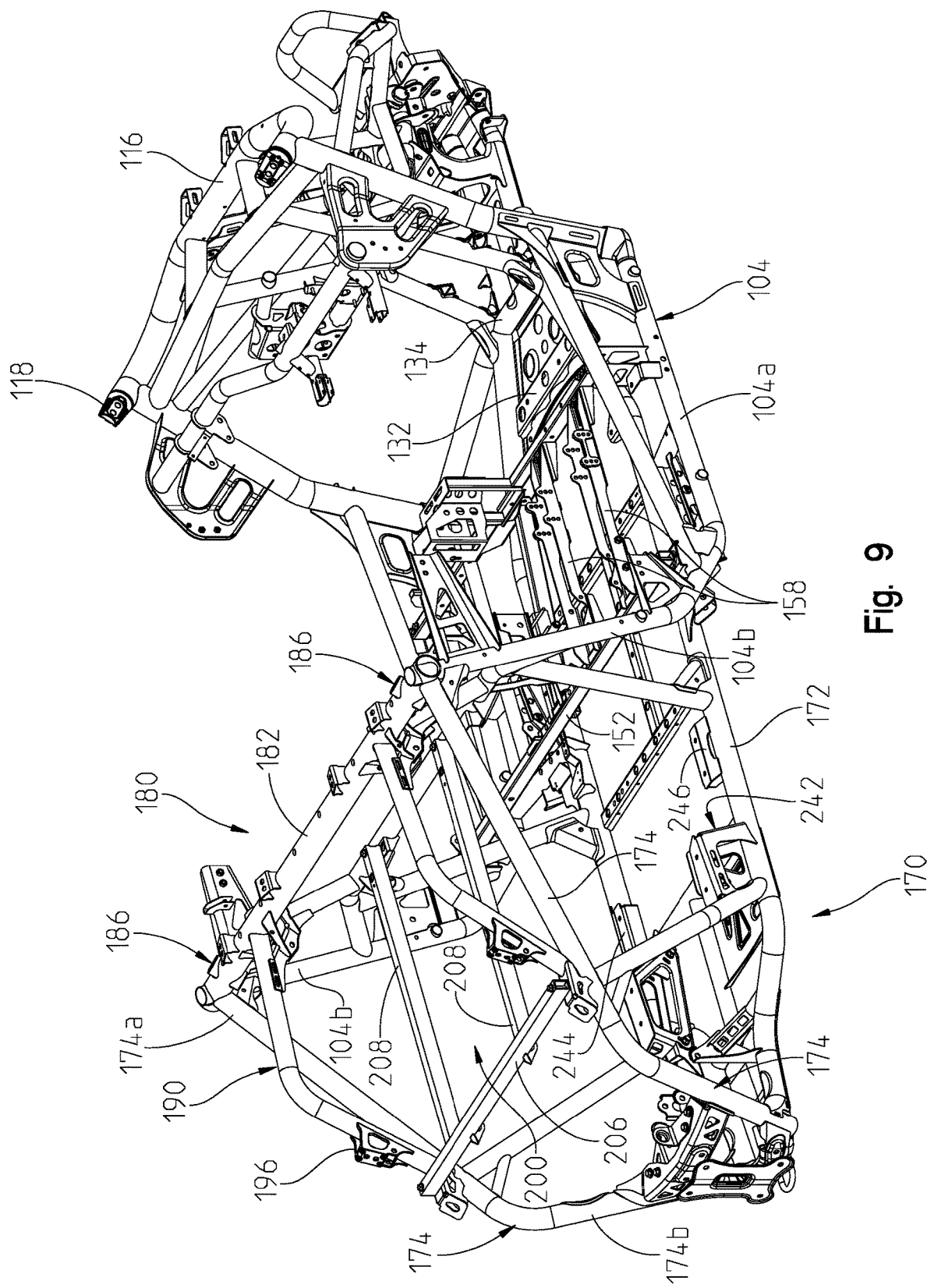
FIG. 9 is a rear right perspective view of the frame shown in FIG. 8.

With reference now to FIGS. 8-9, frame 20 will be described in greater detail. With reference first to FIG. 8, frame 20 is comprised of outer frame tubes 100 and inner frame tubes 102. Outer tubes 100 include a longitudinally extending portion 104 and vertically extending portions 106. Frame tubes 102 include longitudinally extending portions 108 and vertically upstanding frame tubes 110. Outer frame tubes 112 extend forwardly and generally parallel with frame tubes 104 and couple to upright frame tubes 114. Frame tubes 114 support a U-shaped frame tube 116 having couplers 118 to which cab frame 28 is attached. U-shaped tube 116 is supported by a front frame portion 120 comprised of a fixed front frame portion 122 and a removable front frame portion 124. Fixed front frame portion 122 is comprised of three sets of upwardly extending frame tubes, namely frame tubes 126, frame tubes 128 and frame tubes 130. Fixed frame portion also includes transverse frame members 132 and 134 (FIG. 9). Finally, fixed front frame portion 122 is comprised of longitudinal tube portions 140.

With reference still to FIG. 8, a seating support is generally shown at 150 including transverse frame tubes 152 and 154 and a longitudinal frame tube pair 156 which support the seat 24 and a frame rail 158 to support seat 26. With reference now to FIG. 9, a rear of the frame 20 will be described.

With reference to FIG. 9, a powertrain support area 170 is provided including rearwardly extending frame tubes 172 and upwardly extending frame tubes 174. Frame tubes 174 extend upwardly and include forwardly projecting tube portions 174a and vertically extending portions 174b.

With reference now to FIG. 9, a cab frame support area 180 is provided having a transverse tube at 182, which couples to forwardly projecting tube portions 174a of frame tubes 174. Transverse tube 182 is also coupled to frame tubes 106, 184. Taper joint brackets 186 couple to frame tube 182 as more described herein. Frame tubes 190 extends upwardly from tubes 174a and include brackets 196, to which a rear portion of cab frame 28 is coupled, as further described herein.

With reference now to FIGS. 8 and 9, a utility bed support area 200 will be described in greater detail. Support area 200 includes transverse tube 202 extending between tubes 106 and supported by upright frame tubes 110. A rear transverse tube 206 extends transversely of and is coupled to frame tubes 174. Support area 200 further includes longitudinally extending tubes 208 which couple at the rear to tube 206 and to brackets 210 at the front end thereof.

With respect still to FIGS. 8 and 9, door support brackets are provided on both the driver and passenger side, whereby a bracket 224 and 226 extend forwardly from tube 106 on the driver's side and a bracket 224 and 228 extend forwardly on the passenger side.

Finally and with respect still to FIGS. 8 and 9, engine mount brackets will be described. As shown in FIG. 8, a left hand side mount assembly is shown at 240 and a right hand side mount assembly is shown at 242 in FIG. 9. Left and right hand side brackets are also shown in FIG. 9 at 244 and 246.

Figure 10:
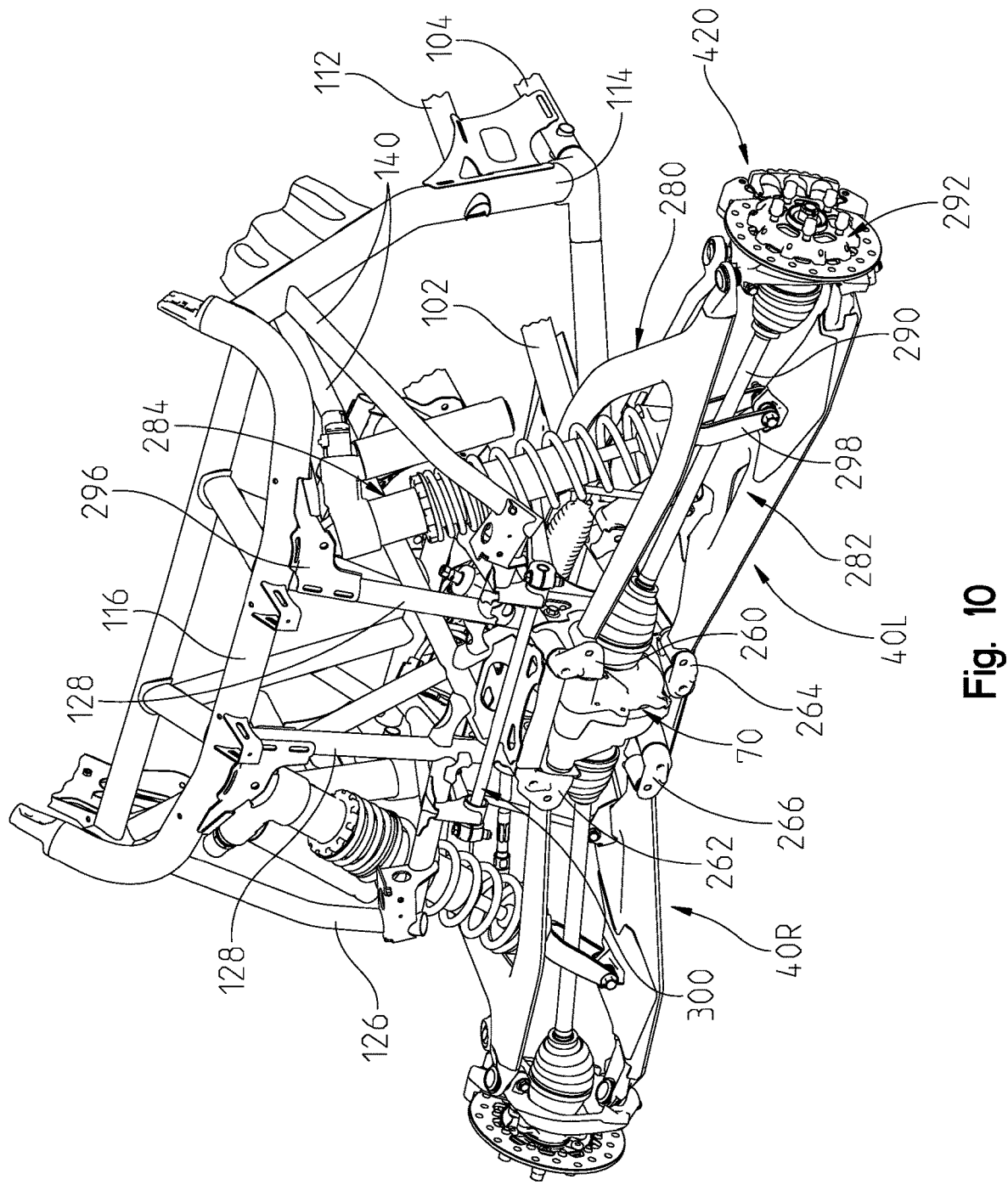
FIG. 10 is a front left perspective view of the front suspension of the vehicle.
Figure 11:
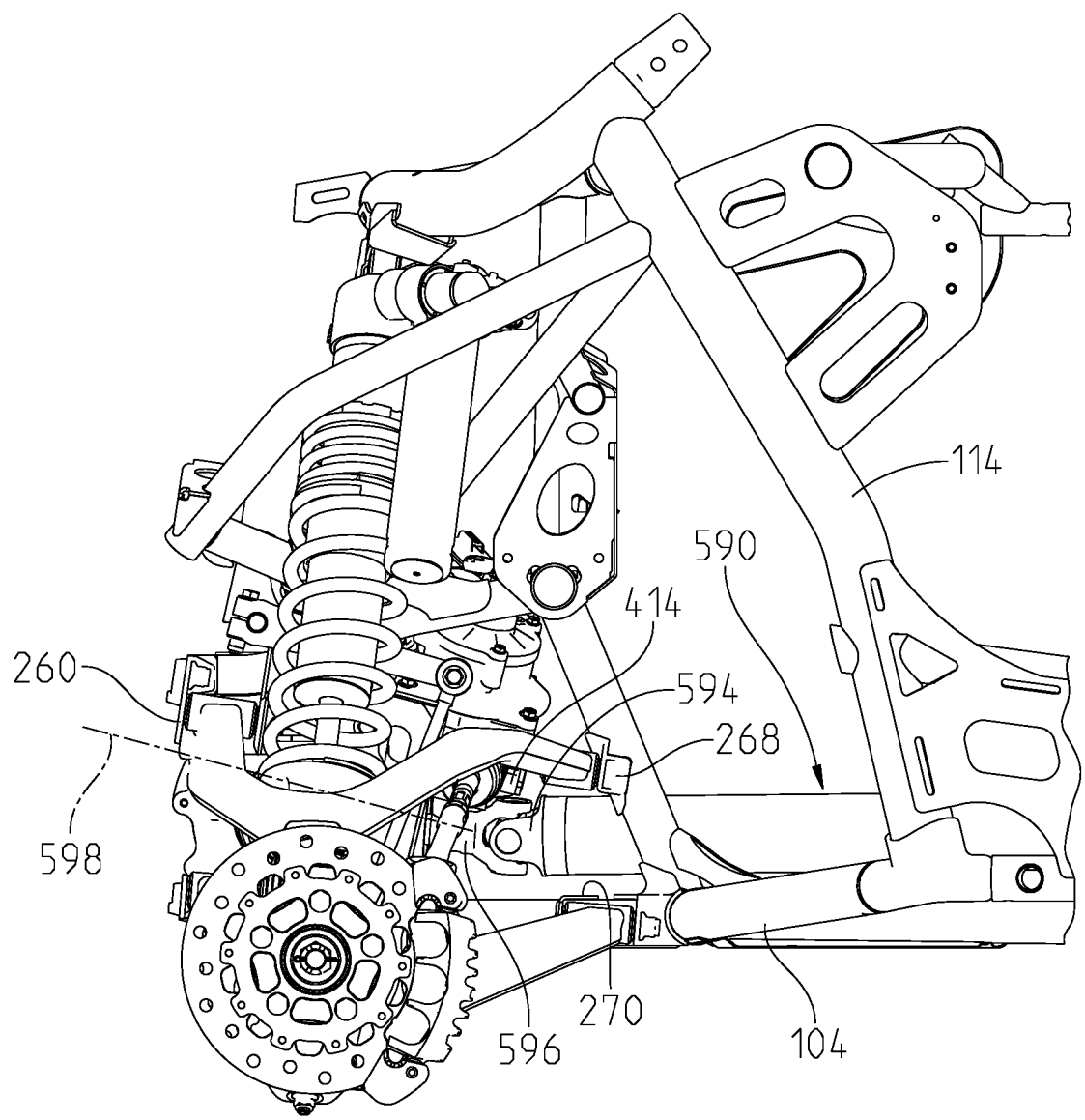
FIG. 11 is a left side view of the front suspension of the vehicle.

With reference now to FIGS. 10-15, front suspension will be described in greater detail. As shown in FIG. 10, frame 20 includes upper couplings 260, 262 and lower couplings 264 and 266. Rear couplings 268 and 270 (FIG. 11) are also provided for the left-hand side front suspension 40 and mirror image couplings are provided for the right-hand side suspension 40. Suspension 40 includes an upper A-arm 280, lower A-arm 282 and a linear force element (LFE) 284 which is shown as a spring over shock. Front final drive 70 is shown positioned intermediate the front couplings 260-266 where half shafts 290 extend from the front final drive 70 to drive the wheel hub 292. Shock absorber 284 is coupled to the frame at an upper bracket 296 and is coupled to the lower A-arm 282 by way of a clevis 298 which flanks the half shaft 290 as described in greater detail herein.

Figure 13:
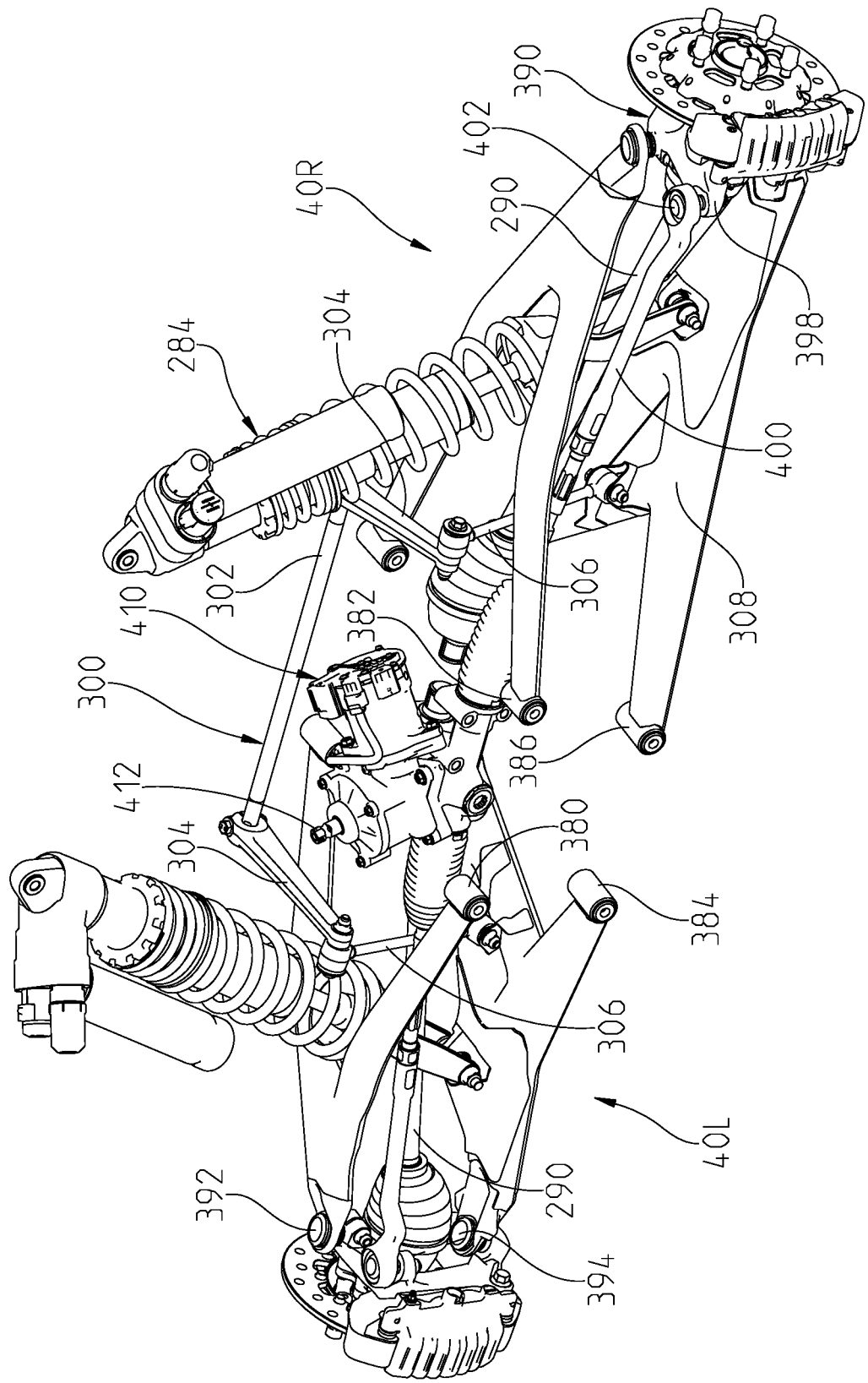
FIG. 13 is a rear perspective view of the suspension as shown in FIG. 12.
Figure 14:
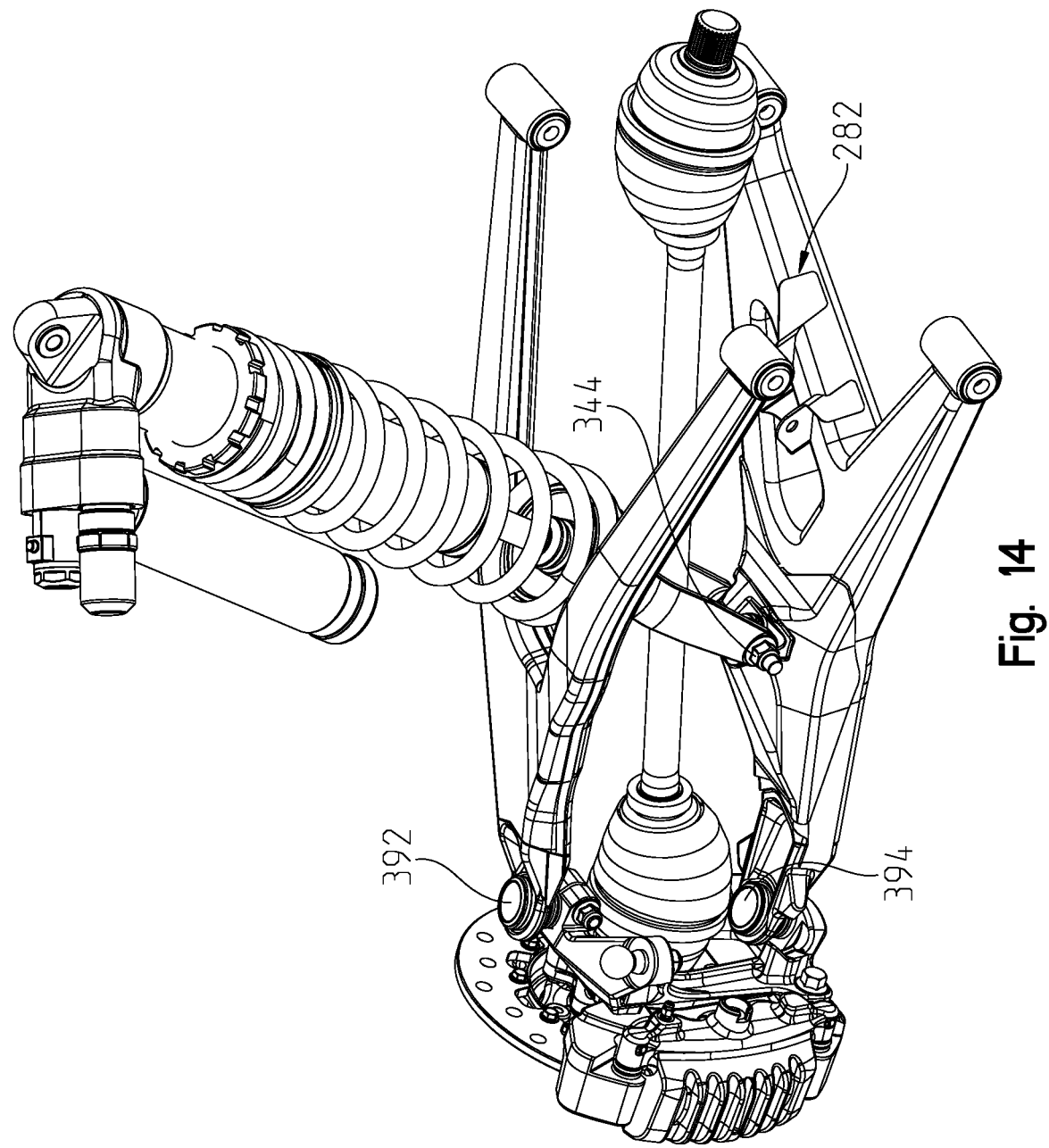
FIG. 14 is an enlarged view of the front right side suspension.
Figure 15:
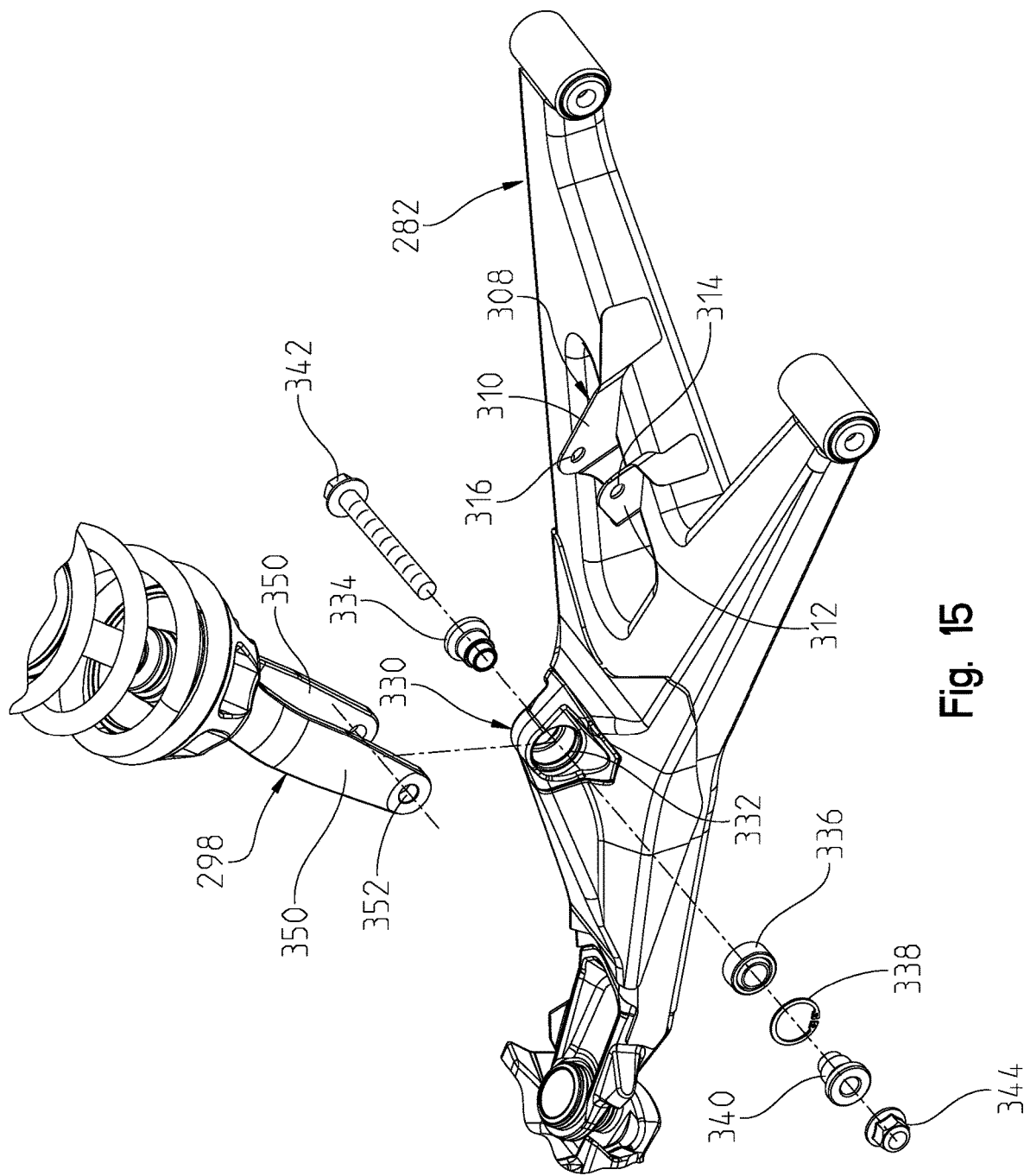
FIG. 15 is a partially exploded view of the suspension of FIG. 14.

Front suspension 40 further comprises a stabilizer or torsion bar 300 coupled to frame tubes 128 and coupled to lower A-arms 282 as further described herein. As shown in FIGS. 12 and 13, torsion bar 300 includes a transverse rod 302 coupled to link arms 304 which in turn are coupled to rods 306. Rods 306 are coupled to brackets 308 positioned on the lower A-arms 282. As shown in FIGS. 14 and 15, bracket 282 is comprised of plate portions 310, 312 having apertures 314, 316 therethrough to receive fasteners 320 therethrough (FIG. 12). As shown best in FIG. 15, lower A-arm 282 includes a shock mount 330 having an aperture at 332. A sleeve 334 is received into aperture 332 from one side thereof and a bearing 336 is received on the opposite side thereof and held in place with aperture 332 by way of snap ring 338. A second sleeve 340 is positioned within aperture 332 whereupon fastener 342 may be received through sleeves 334, bearing 336 and sleeve 340 whereupon a fastener 344 couples to fastener 342 to retain clevis 298. As shown best in FIG. 15, clevis 298 includes clevis legs 350 having apertures at 352 to receive fastener 342 therethrough. The legs 350 of the clevis 298 are elongated in the vertical direction to allow the free movement of the half shafts 290 within the clevis 298 during the operating movement of the suspension. An axis 354 that runs down the axial center of the shock member intersects the half shaft 290.

With reference now to FIGS. 12-15, each of the control arms 280, 282 are coupled to the frame by way of couplers 370, 372, 374, 376 and outer couplers 380, 382, 384 and 386. It should be appreciated that A-arms 280 and 282 are coupled to the frame by way of couplings 260-270 on the frame as described above and as shown in FIGS. 10-11. Outer ends of A-arms 280, 282 retain a steering spindle 390 by way of upper and lower ball joints 392, 394. As shown best in FIG. 13, steering spindle 390 includes a steering link 398 to which steering arm 400 is attached by ball joint 402. Steering arms 400 are coupled at their inner ends to steering motor 410 having an input at 412 which couples through to steering system 34 so as to turn the left and right front wheels 4 through steering rack 414. Steering spindles 390 rotate about an axis through ball joints 392, 394 and at the same time retain wheel hub 292 and front braking system 420 thereto, as described in greater detail herein.

Figure 16:
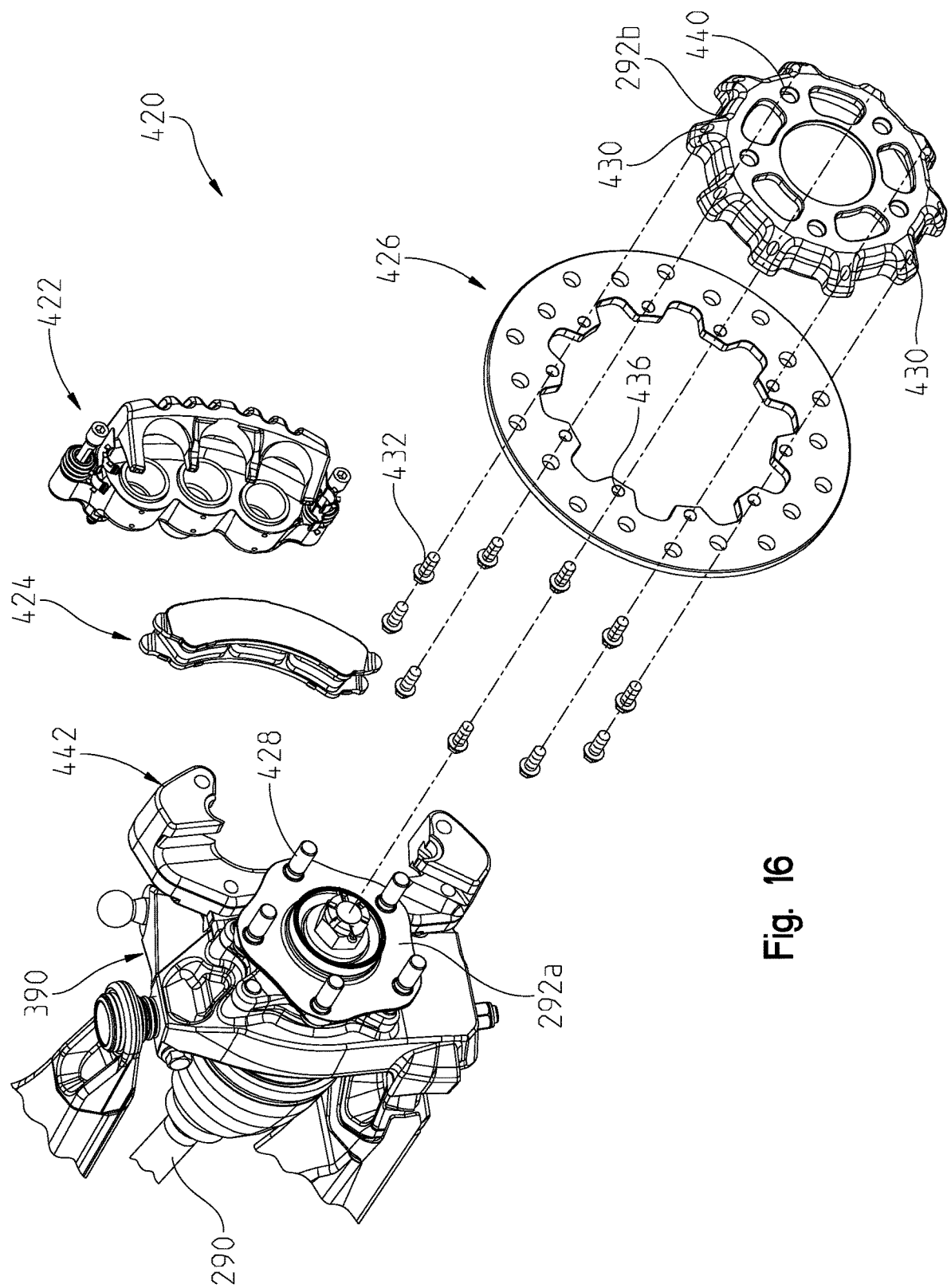
FIG. 16 shows a floating rotor design for the vehicle.

With reference now to FIG. 16, front braking system 420 will be described in greater detail. As shown, braking system 420 is coupled to the steering spindle 390 and comprises brake caliper 422, disc pads 424 and brake disc 426. As shown, hub 292 includes an inner hub portion 292a and an outer hub portion 292b. Inner hub portion 292a is directly coupled to half shaft 290 so as to be driven, and hub portion 292a includes a plurality of fasteners 428. Hub portion 292b includes a plurality of apertures at 430 which receive fasteners 432 therethrough and disc 426 includes apertures 436. Hub portion 292b includes a plurality of apertures 440 which align with fasteners 428 so that hub portion 292b and disc 426 couple directly to the hub portion 292a. Caliper 422 and disc pads 424 couple to a brake mount at 442 such that disc pads 424 are held on opposite sides of the brake disc 426. Alternatively, the brake disc could be shown as a single component, comprising the disk 426, hub portion 292b and fasteners 432. Also, fasteners 432 may be rivets such as buck rivets.

Figure 17:
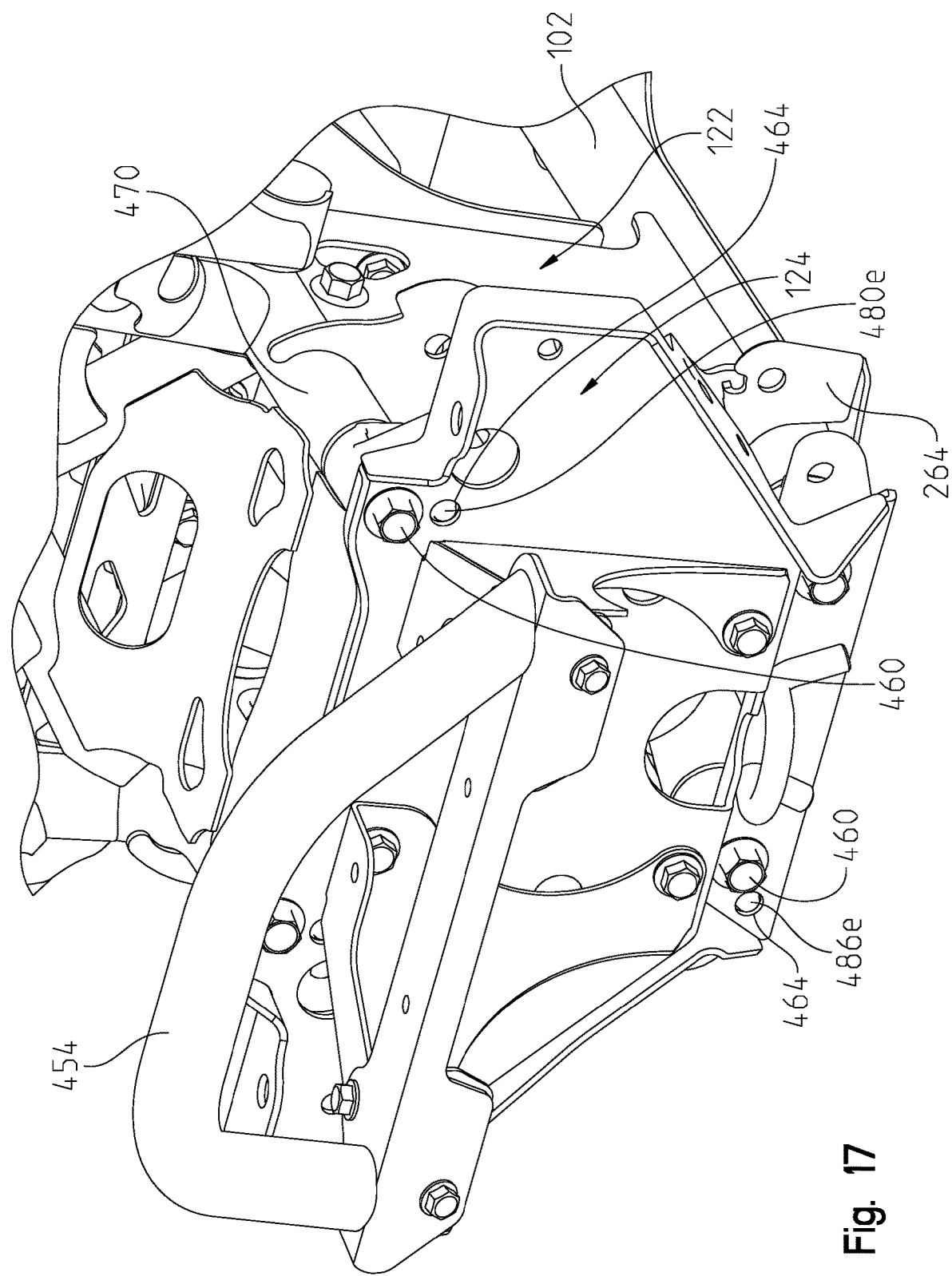
FIG. 17 is a left front perspective view of the front removable frame portion.
Figure 18:
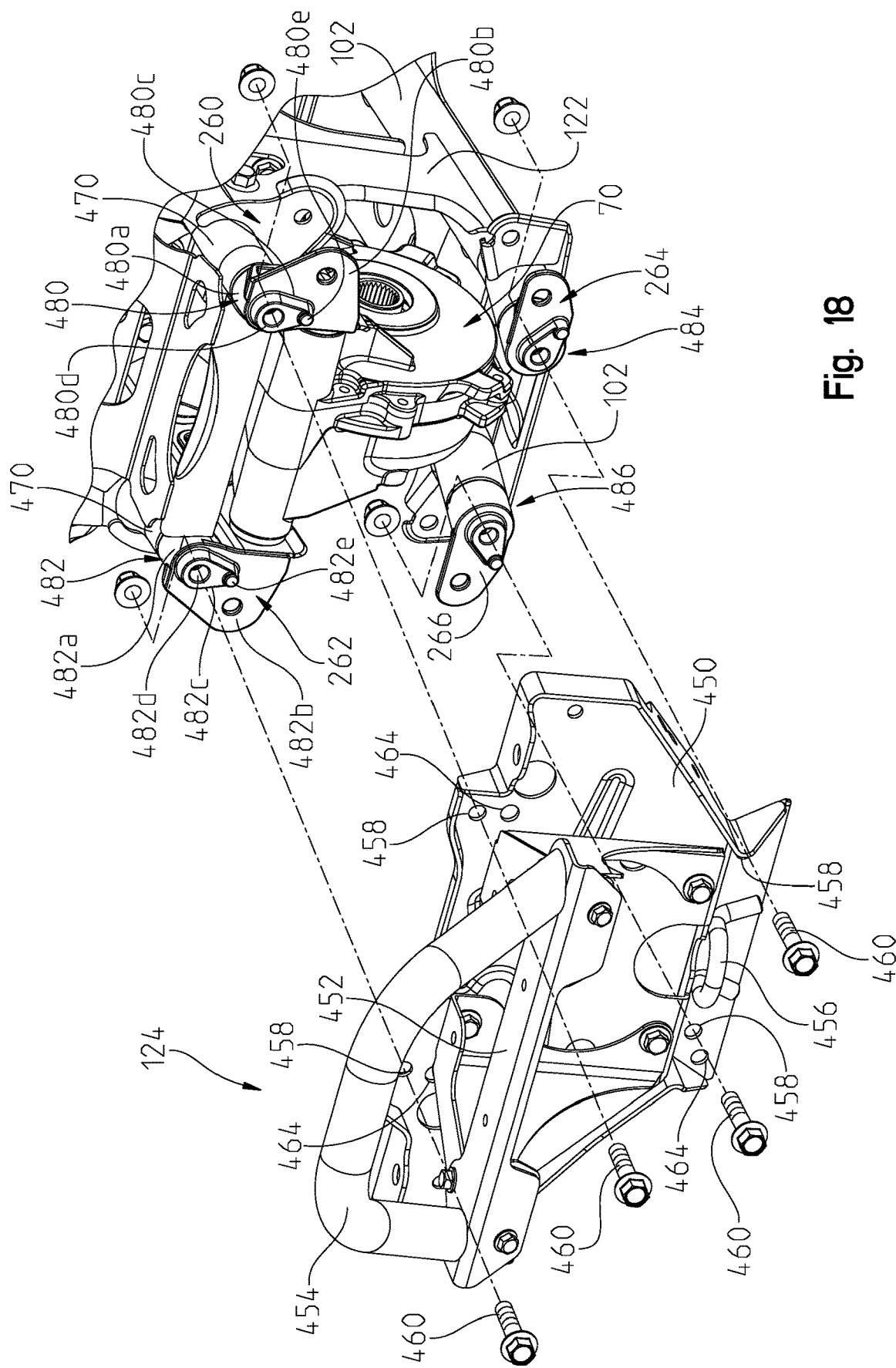
FIG. 18 is a partially exploded view of the front removable frame portion of FIG. 19.
Figure 19:
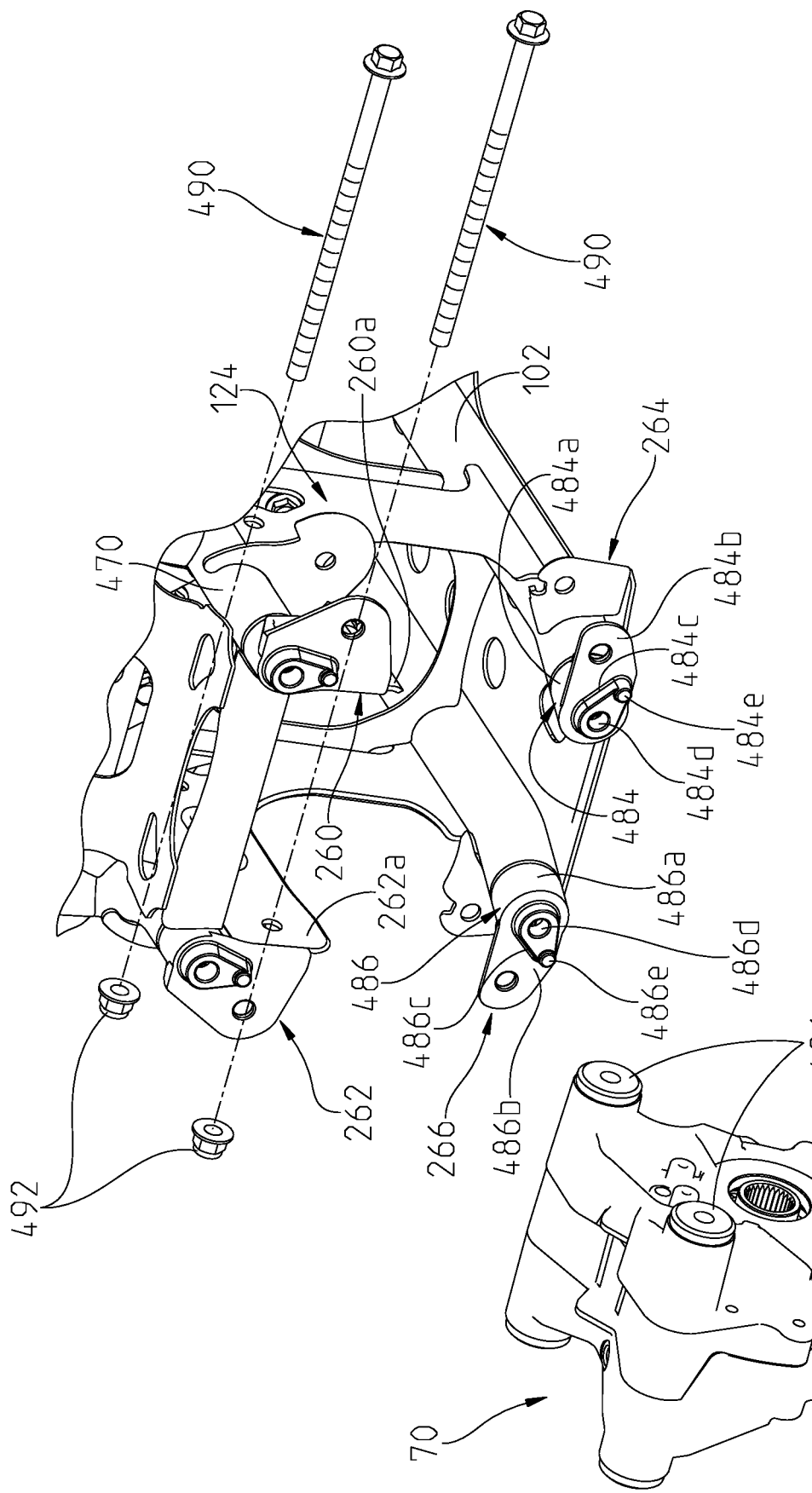
FIG. 19 is a front left perspective view of the final drive removed from the front frame of FIG. 18.

With reference now to FIGS. 17-19, the removable front frame portion 124 will be described in greater detail. As shown in FIGS. 17 and 18, the removable front frame portion 124 is coupled to the frame just adjacent to the suspension couplings 260, 262, 264 and 266. Removable front frame portion 124 includes a plate section 450 to which a bracket 452 is mounted which can provide a location for a winch mount. A tow bar 454 is mounted to the bracket 452 and a hook 456 is mounted at a lower portion of plate portion 450. Plate portion 450 includes four mounting holes at 458 which provide access to fasteners 460. Each of the apertures 458 further includes a locator aperture 464 as further described herein.

As shown, fixed frame portion 122 includes an upper frame tube portion 470 which is substantially parallel to lower frame tube 102 where each of the upper frame tubes 470 and lower frame tubes 102 include inserts 480, 482, 484 and 486. As shown, each of the couplings 480-486 perform two functions, first to define a portion of the suspension couplings 260-266 as well as provide a mounting location for the removable frame portion 124. More particularly, insert 480 includes a cylindrical portion 480a to which a bracket arm 480b is mounted having an aperture which defines a mounting location for upper A-arm 280. At the same time, insert 480 includes a raised land 480c, a tear-drop configuration and having a threaded aperture at 480d and a locating lug at 480e. In a like manner, insert 482 includes a cylindrical portion 482a, plate 482b, raised land 482c, threaded aperture 482d and locating lug 482e.

As shown in FIG. 19, insert 484 includes a cylindrical portion 484a, plate portion 484b, raised land 484c, threaded aperture 484d and locating lug 484e. In a like manner, insert 486 includes a cylindrical portion 486a, plate portion 486b, raised land 486c, threaded aperture 486d and locating lug 486e. It should be recognized that each of the cylindrical portions 480a, 482a, 484a and 486a include a reduced diameter portion extending rearwardly therefrom which is receivable into respective frame tubes 102 or 470 whereby the inserts 480-486 may held in place by way of industrial adhesives or other such bonding as welding.

It should be noted from FIGS. 18 and 19, that the lands 480c-486c provide the interface for coupling the removable frame portion 124 to the fixed frame portion 122. Namely, each of the apertures 458 and the movable frame portion 120 align with associated threaded portions 480d-486d and each of the alignment apertures 464 aligns with corresponding locating lugs 480e-486e. Thus, once aligned, fasteners 460 are receivable through corresponding apertures 458 and into their corresponding threaded apertures 480d-486d. Thus to remove the front final drive 76, the front removable frame portion 124 is simply removed by uncoupling the fasteners 460 whereby the removable front frame portion 124 moves to the location shown in FIG. 18, and whereby front final drive portion 76 may be removed by uncoupling fasteners 490 and 492 (FIG. 19).

It should be noted from FIG. 19 that the removal of the removable frame portion 124 and the front final drive 76 does not require the removal of the front suspensions 40 as the couplings 260-266 remain fixed to the fixed frame portion 124. It should also be noted that the front final drive 76 includes mounting inserts 496 which couple with the fasteners 490 in a manner substantially as shown in U.S. patent application Ser. No. 15/389,147, the subject matter of which is incorporated herein by reference.

In addition, the upper couplings 260, 262 serve two functions. First, each of the couplings 260, 262 provide the mounting structure for the front suspension as previously described but also include sidewalls 260a, 262a (FIG. 19) which include the apertures for receiving fasteners 490.

Figure 20:
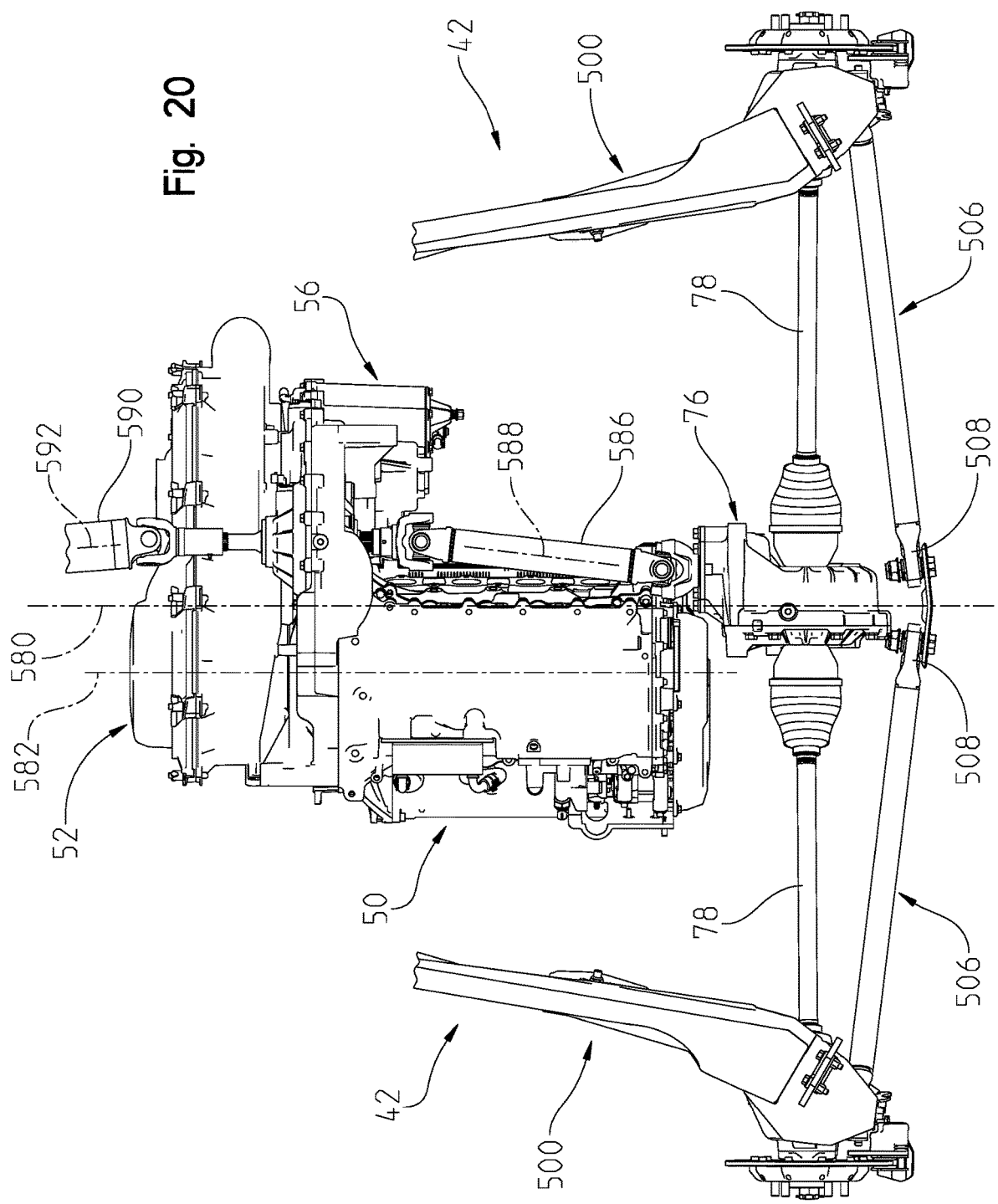
FIG. 20 is a bottom view of the vehicle showing the rear suspension.
Figure 21:
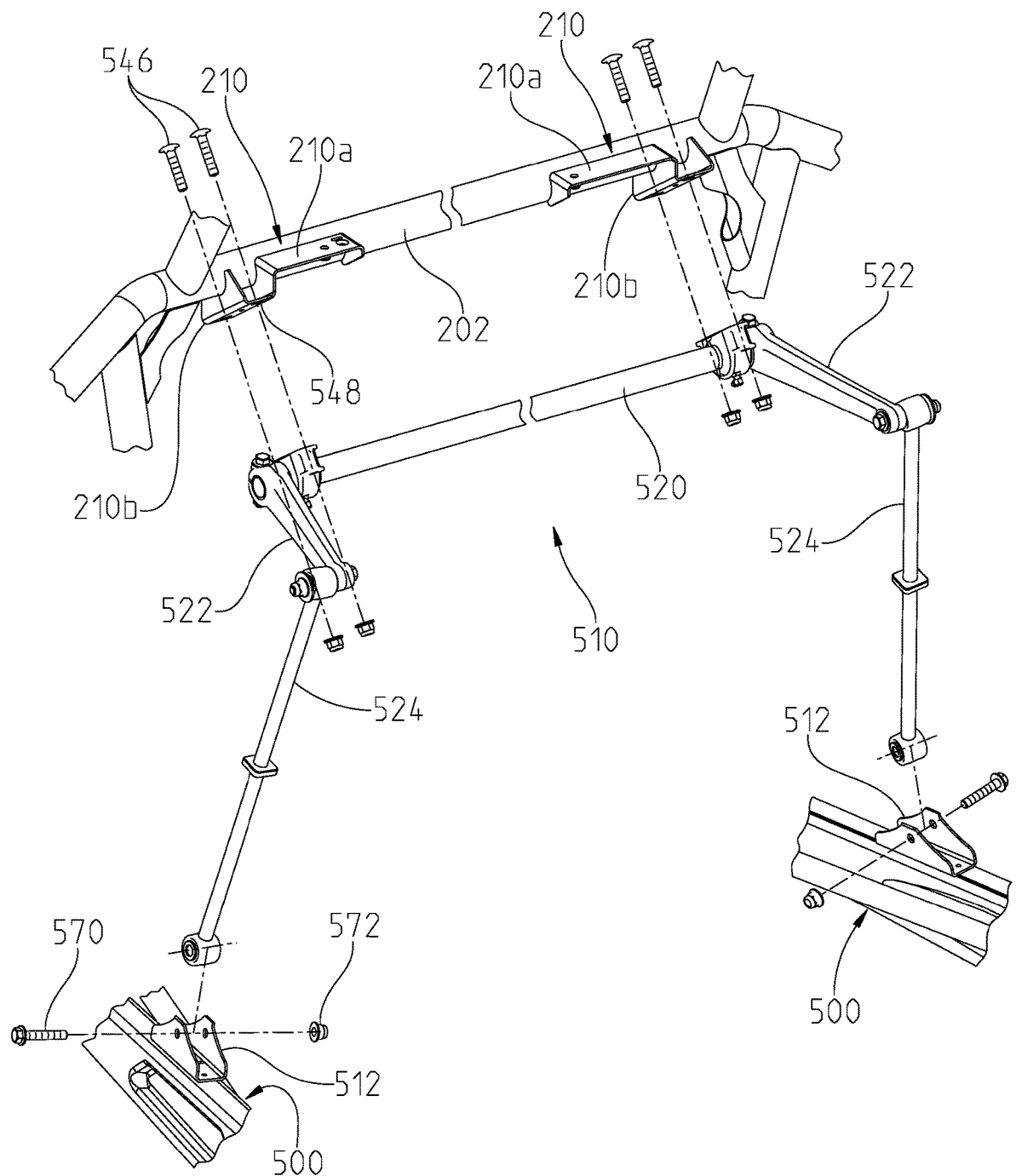
FIG. 21 is a right front perspective view of a portion of the rear suspension.
Figure 22:
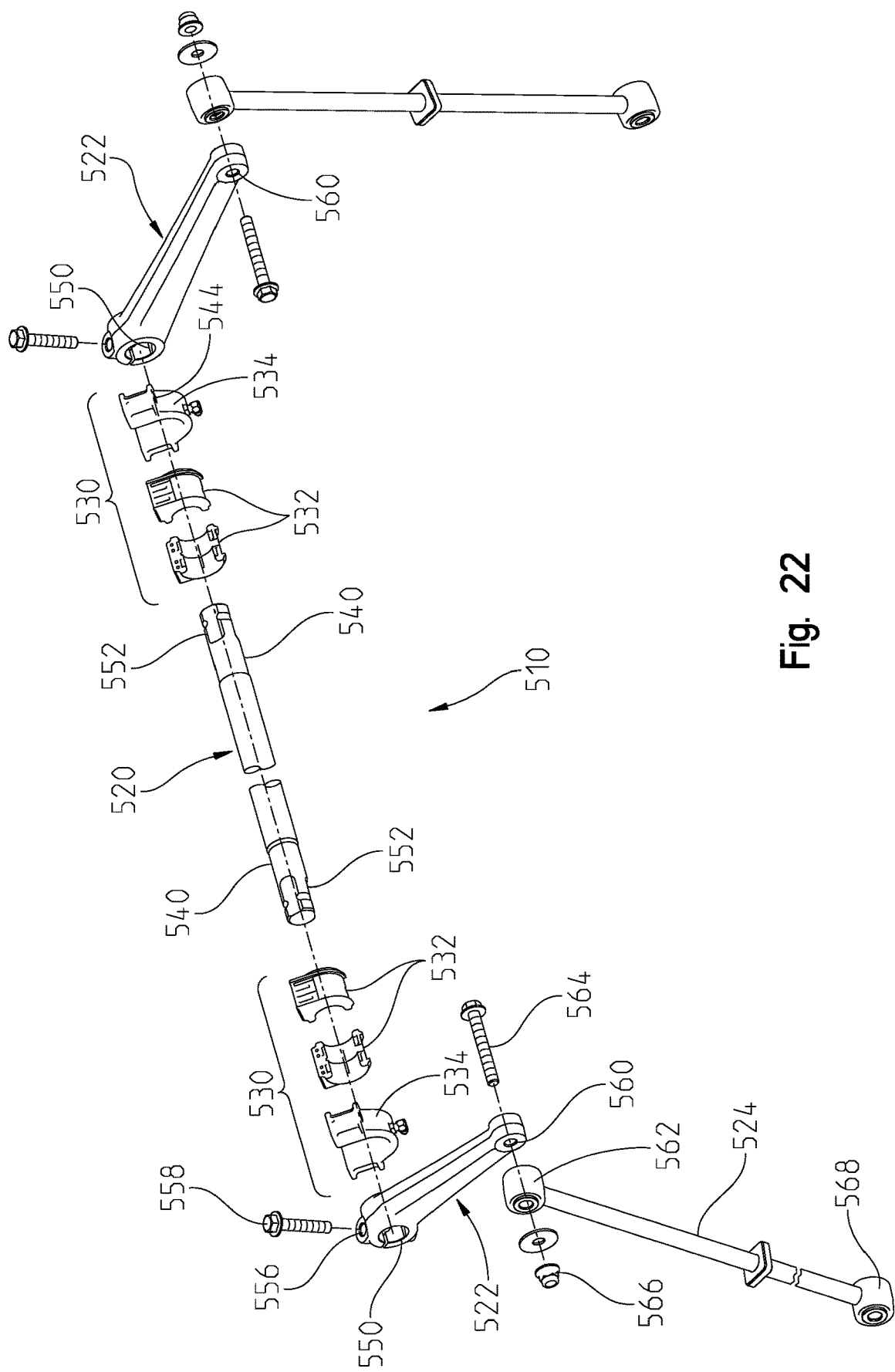
FIG. 22 shows an exploded view of the rear suspension of FIG. 21.

With reference now to FIGS. 20-22, rear suspension 42 will be described in greater detail. As shown best in FIG. 20, rear suspension 42 is shown from an underside thereof in association with the engine 50, CVT 52 and shiftable transmission 56. As shown, CVT 52 is positioned forward in the support area 200 and occupies a space normally taken up by a torsion bar. Rear suspension 42 includes a pair of trailing arms 500 coupled at a front end thereof to the frame (FIG. 3) whereby the trailing arms rotate about axis 502 (FIG. 3), radius arms 506 are coupled at an inner end 508 to frame 20 and at outer ends to the trailing arms 500.

With reference now to FIGS. 21 and 22, the torsion bar assembly will be described in greater detail. As shown, an upper side of the trailing arm includes a bracket 512 for mounting the torsion bar assembly 510 and a bracket 514 for mounting the rear linear force element 516 (FIG. 1). As shown, torsion bar assembly 510 couples to the same bracket 210 that mounts the frame tubes 208 (FIG. 9), which supports the utility bed 88 (FIG. 2). Bracket 210 includes a bracket portion 210a for mounting tubes 208 and a bracket portion 210b which faces rearwardly and downwardly for mounting the torsion bar assembly 510. Torsion bar assembly 510 includes a transverse bar portion 520 to which link arms 522 are fixedly mounted. Link arms 522 couple with link rods 524 which in turn couple to brackets 512. Torsion bar assembly 510 may be further configured as shown in U.S. Pat. No. 8,827,019, the subject matter of which is incorporated herein by reference.

With reference now to FIGS. 21 and 22, the torsion bar assembly 510 includes bearings 530 having bearing halves 532 and a bearing collar 534. Bearing halves 532 are split to receive a reduced diameter section 540 in a rotatable manner and are received within each of the collars 534. Each collar 534 includes an aperture at 544 which receives fasteners 546 therethrough. Fasteners 546 extend through apertures 548 of bracket portion 210b to couple the transverse portion 520 to the frame tube 210. Link arms 522 have a split opening at 550 which couples to ends 552 of transverse portion 520. Split portions 550 include an aperture at 556 which receives a fastener 558 so as to clamp the split opening 550 to the portions 552. Link arms 522 include a coupler 560 at the opposite end which corresponds with a coupling 562 of link rods 524. Fasteners 564 are receivable through the couplers 560, 562 and is retained by a counter fastener 566. Lower ends of link rods 524 also includes a lower coupler at 568 which receives a fastener 570 therethrough to couple the link arms 524 to the bracket 512 with a counter fastener 572.

With reference again to FIG. 20, it should be noted that the suspension, namely the radius rods 506, are centered about a longitudinal center line 580 of the vehicle whereas a center line of the engine is off-set from the longitudinal center line of the vehicle at a center line 582. Due to the off-set of the engine 50, the drive to the front final drive 70 and rear final drive 76 is slightly angled. More particularly, as shown in FIG. 20, a rear prop shaft 586 extends at a slightly skewed angle 588 whereas front prop shaft 590 extends at a slightly skewed angle 592. With reference again to FIG. 11, front prop shaft 590 includes a coupling at 594, which may be in the form of a universal joint. Universal joint includes a front coupling at 596 which is directed upwardly to the front final drive 70. Steering gear 414 is positioned as low as possible in the vehicle, and is positioned in the area defined by the inclusive angle between the front prop shaft 590 and the front coupling 596. This optimizes bump steer.

Figure 23:
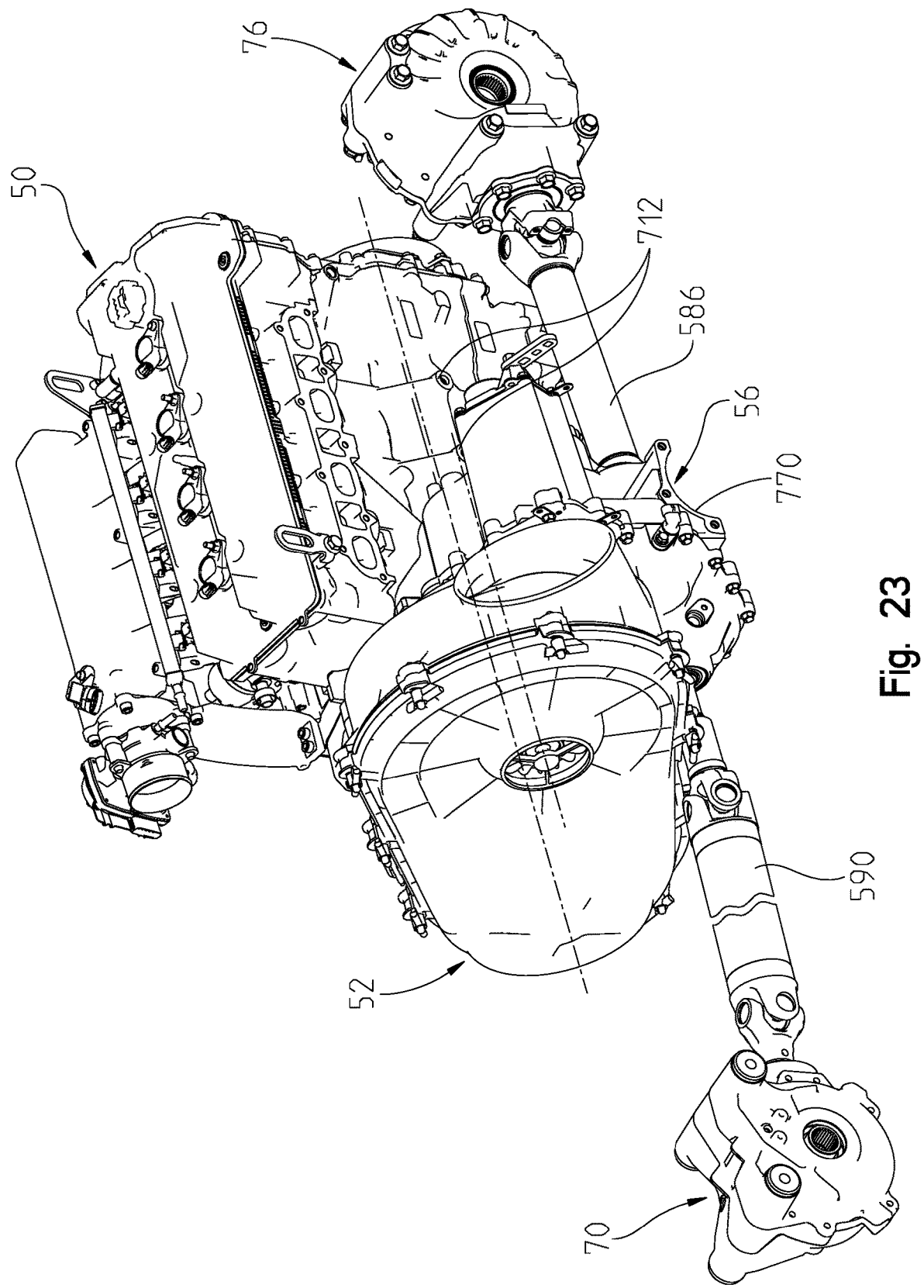
FIG. 23 is a front left perspective view of the powertrain of the vehicle.

With reference now to FIGS. 23-28, a front scavenge pump for engine 50 will be described in greater detail. As shown in FIG. 23, engine 50 drives CVT 52 which in turn drives shiftable transmission 56. Shiftable transmission 56 is coupled to prop shafts 586 and 590 to drive rear final drive 76 and front final drive 70 respectively. It should be appreciated that engine 50 is substantially as shown in U.S. patent application Ser. Nos. 15/595,224 and 15/595,209, the subject matter of which is incorporated herein by reference.

Figure 24:
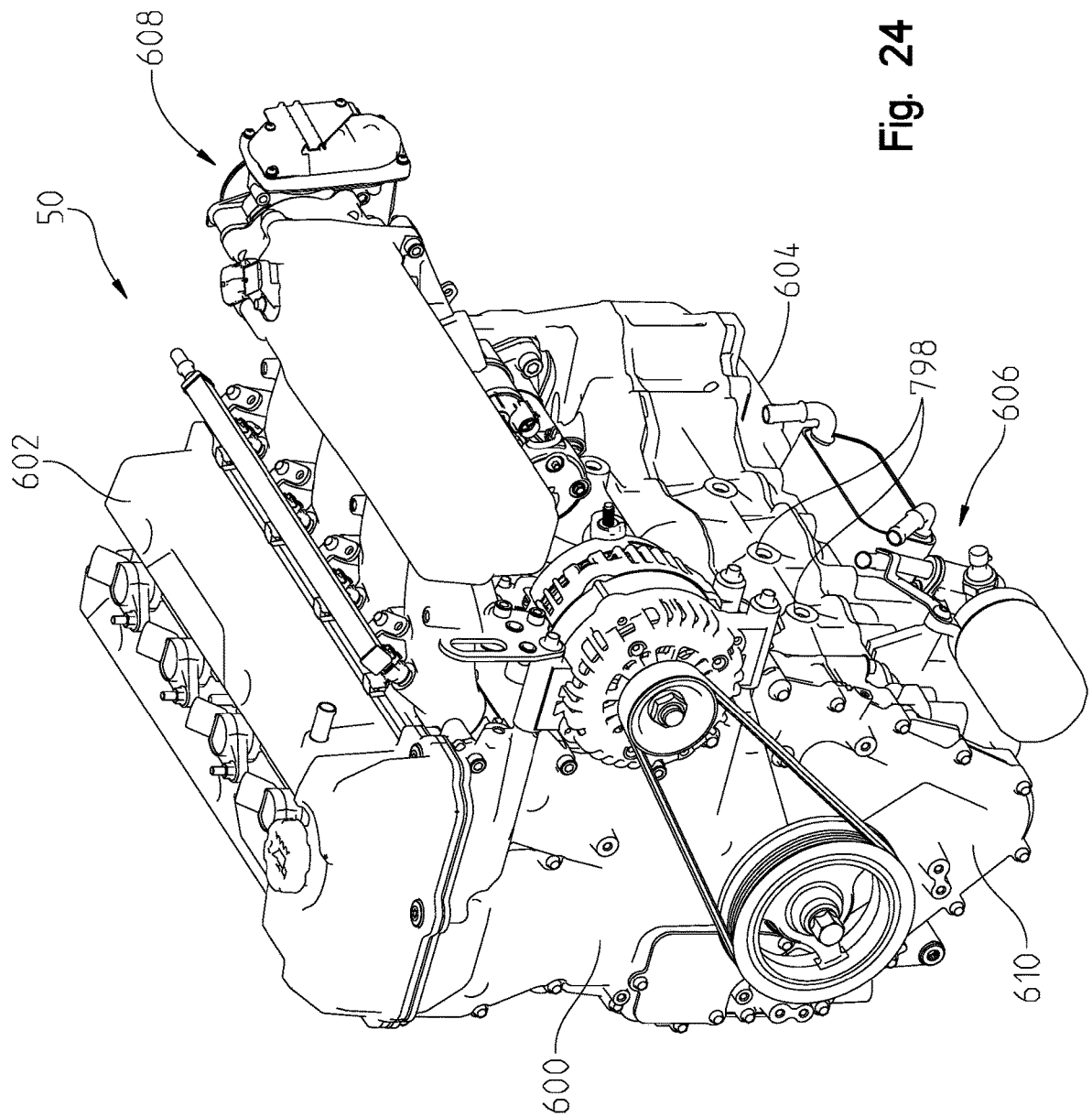
FIG. 24 is a right rear perspective view of the engine.
Figure 25:
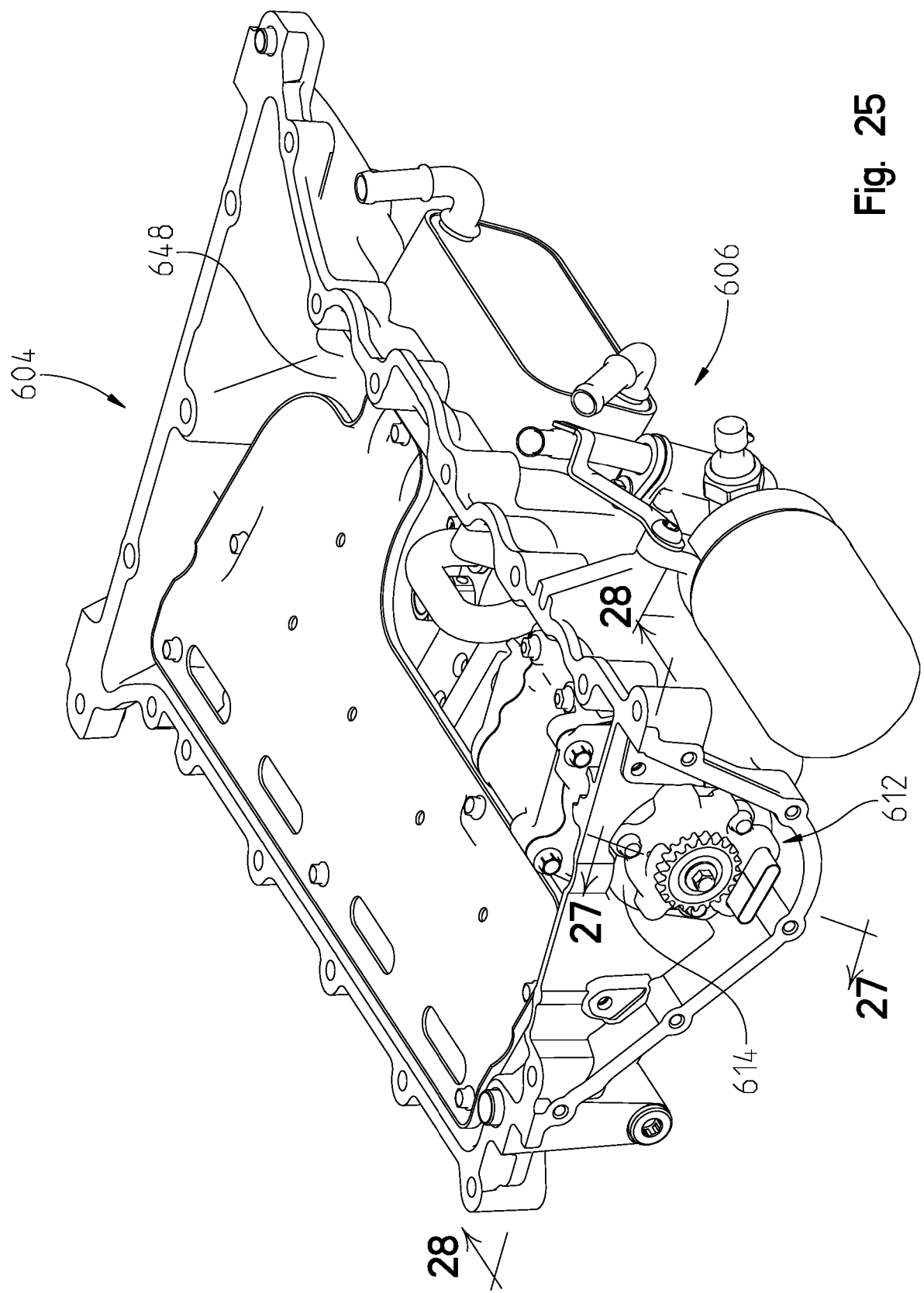
FIG. 25 is a right rear perspective view of the engine oil pan and lubrication system.
Figure 26:
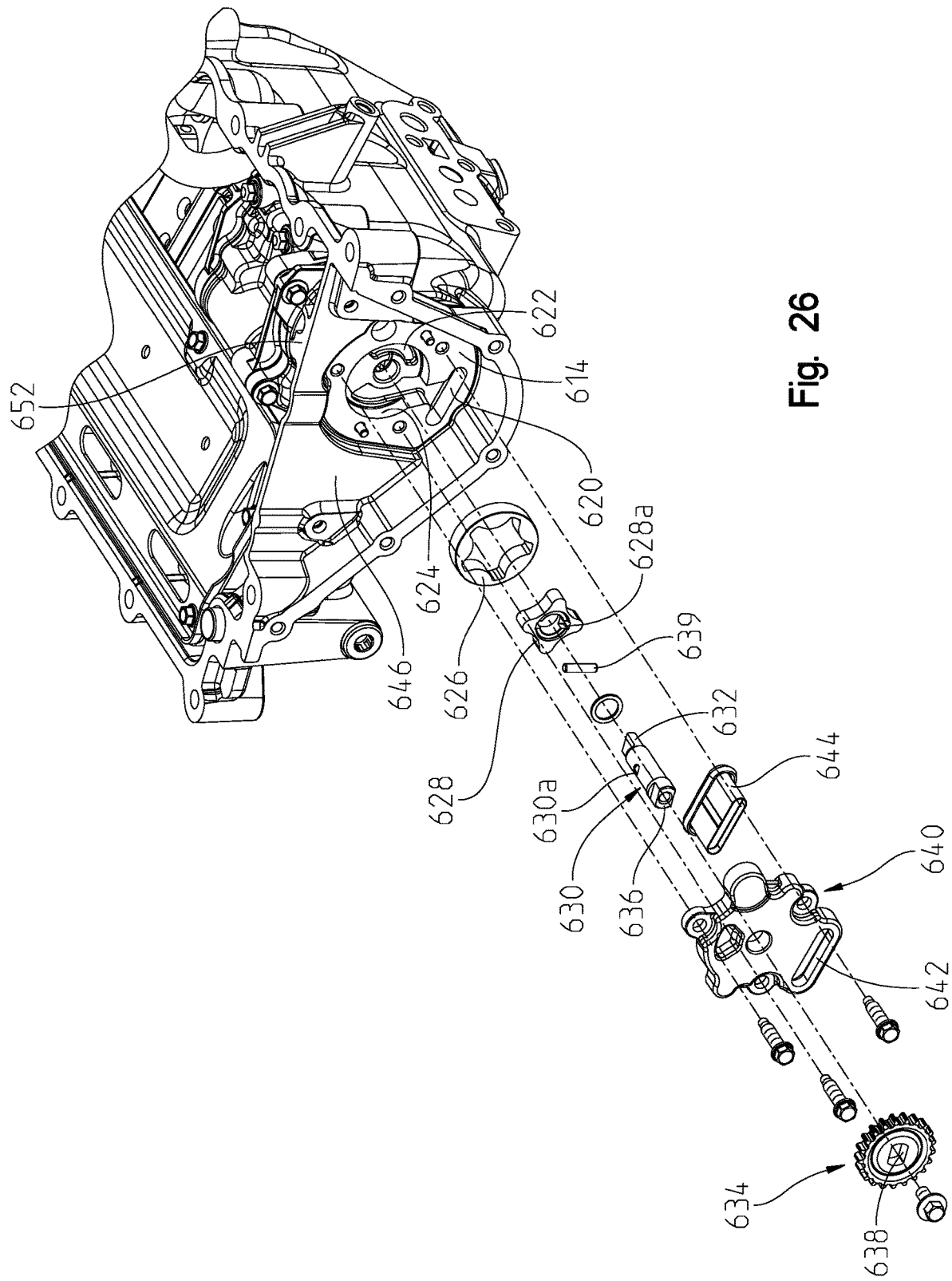
FIG. 26 is a view similar to that of FIG. 25 showing the front scavenge pump exploded away from the oil pan.

As shown in FIG. 24, engine 50 includes an engine block 600, valve cover 602, oil pan 604, oil filtration system 606 and air intake system 608. A timing chain cover 610 encloses the cam chain of the engine and also encloses an auxiliary scavenge pump 612 as shown in FIG. 25. As shown in FIGS. 25 and 26, pump 612 includes an integrated pump housing 614 within the oil pan 604, including an input area 620 and a discharge area 622. Housing portion 614 includes a circular opening at 624 to receive outer rotor 626 and an inner rotor 628 of the scavenge oil pump. A drive coupler 630 is provided which couples to the main oil pump 652 at one end by way of a rectangular drive 632 and couples to drive gear 634 at the opposite end by way of a truncated circular portion 636 which corresponds with a like opening at 638 of gear 634. Pin 639 is positioned in aperture 630*a* and is received in slot 628*a* to drive gerotor 628.

Figure 27:
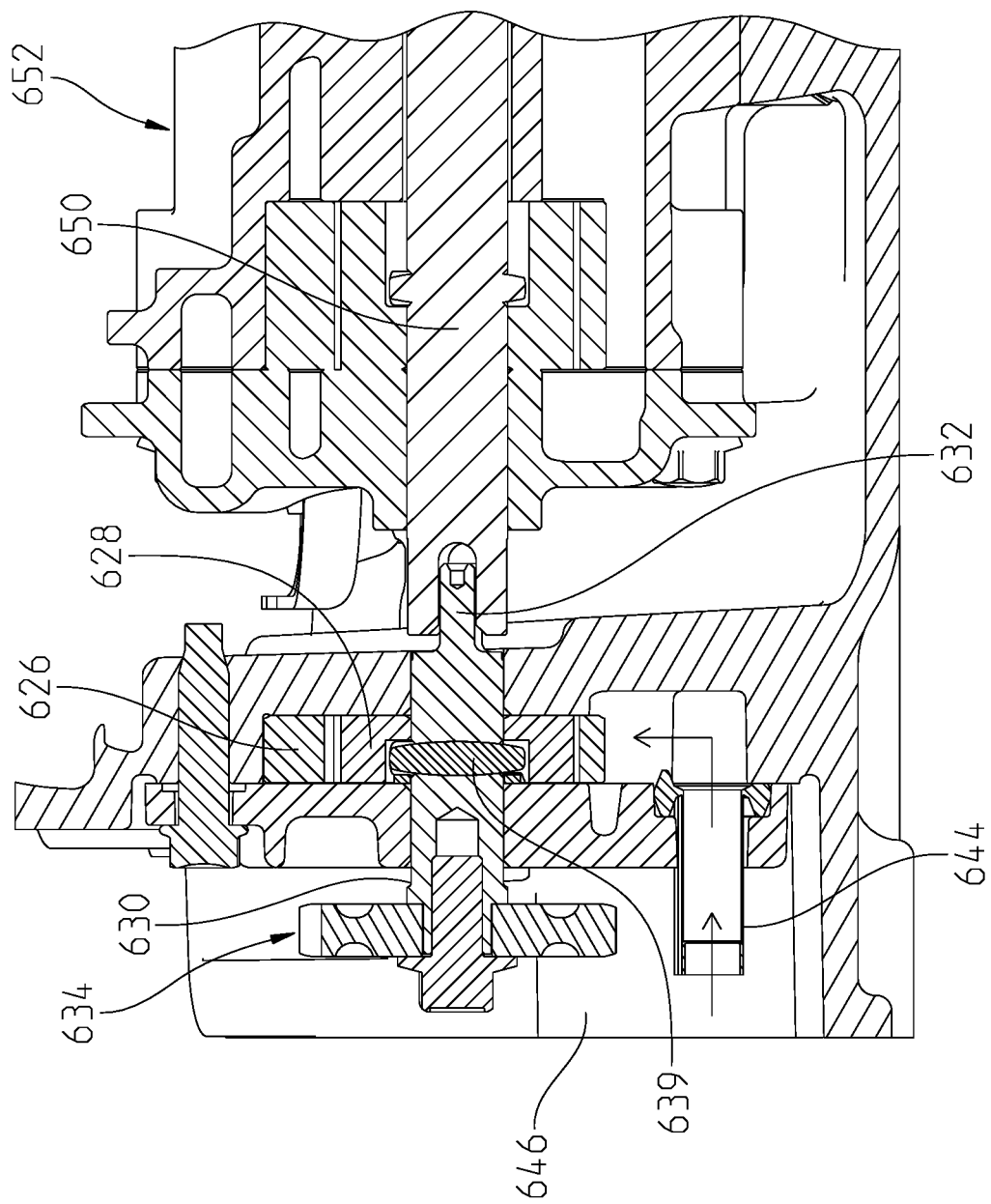
FIG. 27 is a cross-sectional view through lines 27-27 of FIG. 25.
Figure 28:
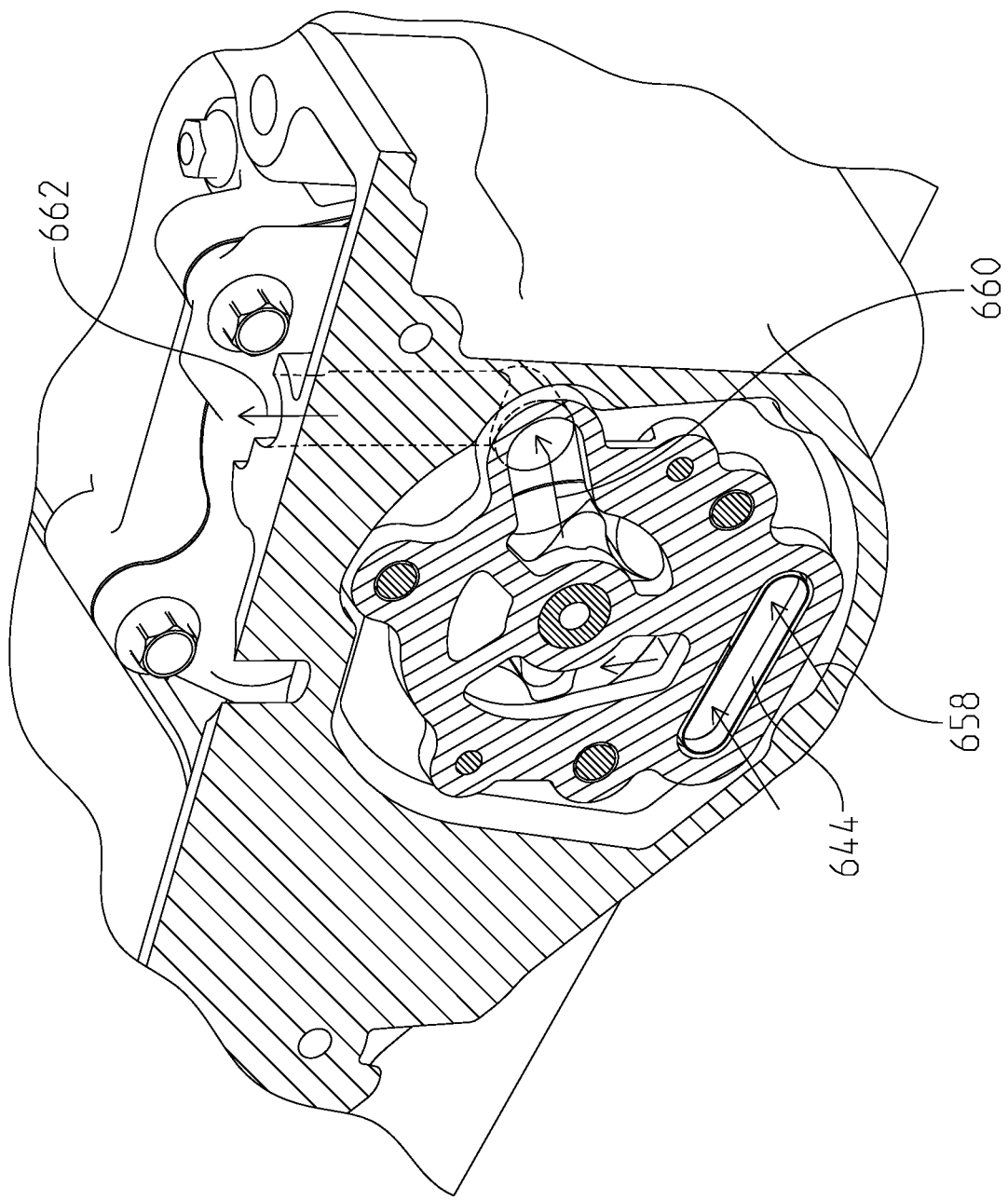
FIG. 28 is a cross-sectional view through lines 28-28 of FIG. 25.

A cover 640 is provided having an opening at 642 which receives a syphon screen at 644 which corresponds with opening at 620. It should be appreciated from the previous description of the powertrain that the cam chain oil pump 612 is positioned longitudinally at a rear of the vehicle, such that in extreme inclines of the vehicle, oil floods to the cam chain area 646 which takes oil away from the main oil sump 648 (FIG. 25). Thus as shown in FIG. 27, the drive chain couples to gear 634, drives gerotor 628 by way of pin 639 and drives pump shaft 650 of main oil pump 652 by way of rectangular end portion 632. As shown in FIG. 28, oil moves in a direction of arrows into the inlet 644 whereupon gerotor 628 moves the oil in the direction of arrows 660 and upward in the direction of arrows 662 and out of the cam chain arear 646 and returning to the main sump area 648.

With reference now to FIGS. 29-33, the mounting of engine 50 within frame 20 will be described in greater detail. As shown first in FIGS. 29-31, left-hand side mount assembly 240 is shown coupled to engine 50. As shown, mount assembly 240 includes a removable mount 670 (FIG. 31) and is defined by a channel-shaped member having parallel plate portions 672 defining an upper platform at 674. A front edge of the plate portions 672 includes apertures 676 and a rear edge defines apertures 678. Brackets 680 and 682 define apertures 684 and 686 respectively which align with apertures 676 and 678. Fastener 688 is receivable through apertures 676 and 684 while fastener 690 is receivable through apertures 678 and apertures 686. Counter fasteners 692 couple with fasteners 688 and 690 to retain left-hand side mount assembly 240 to frame 20.

Figure 29:
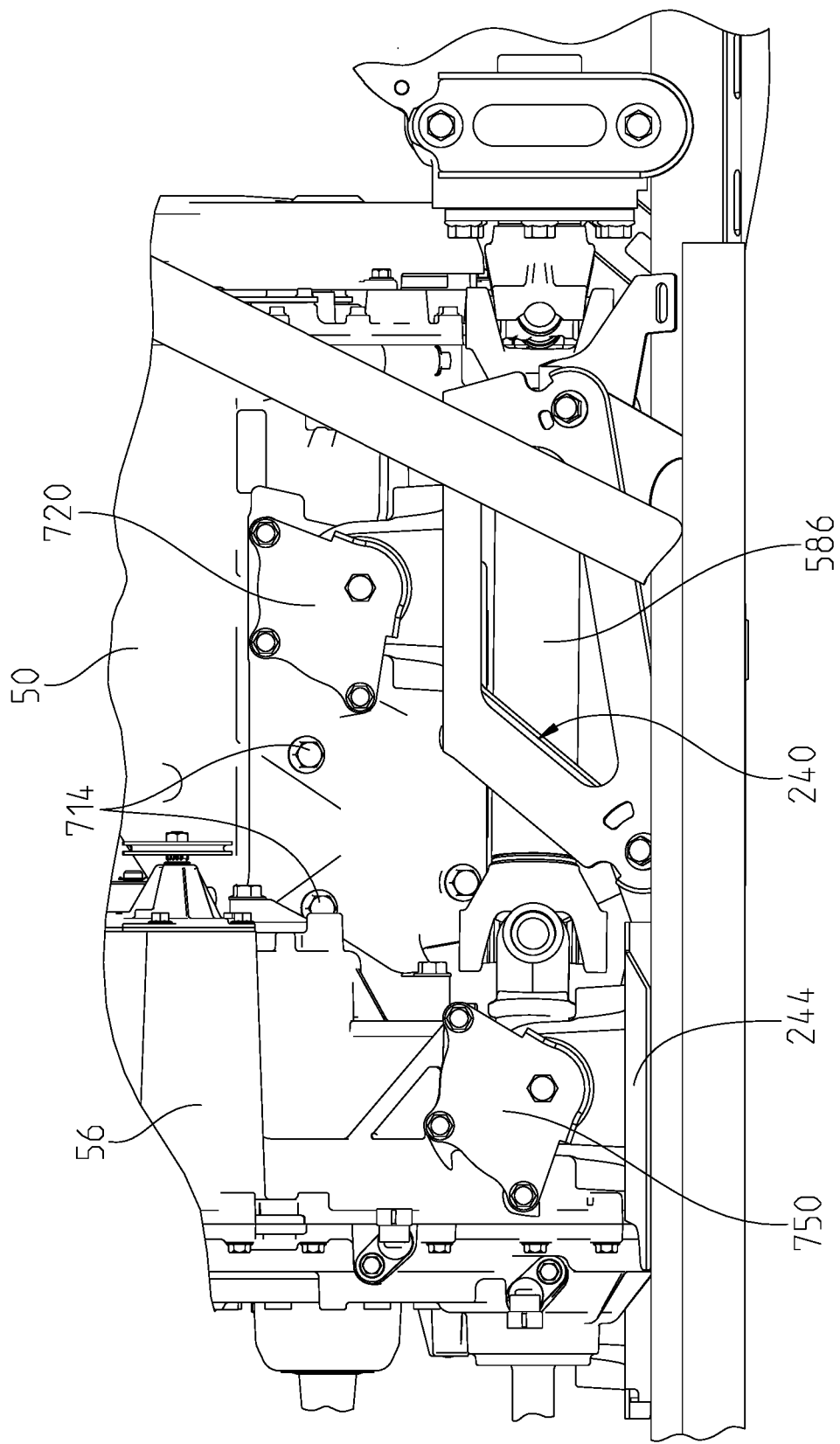
FIG. 29 is a left-hand side view of the engine mounts.
Figure 30:
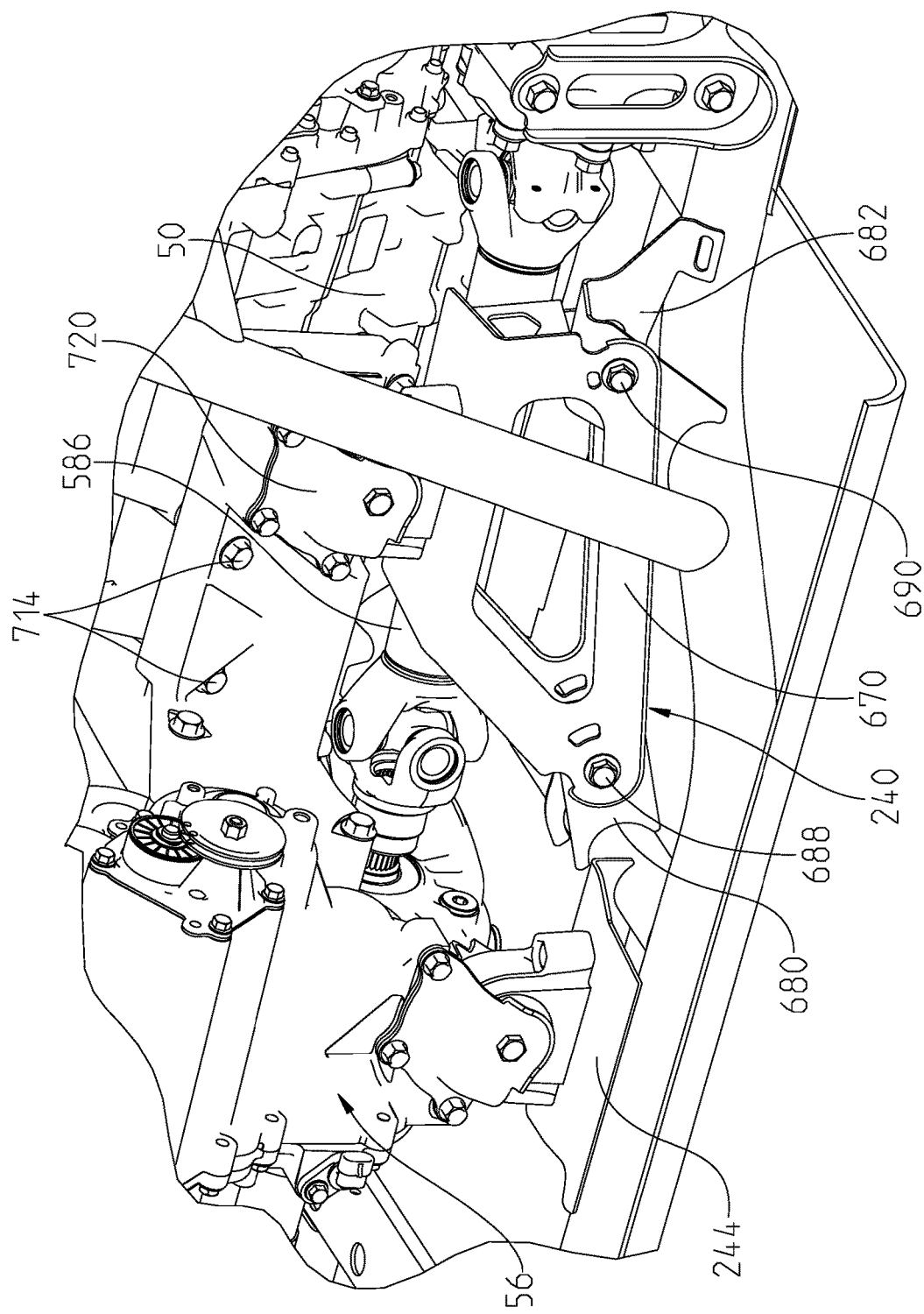
FIG. 30 is a left rear perspective view of the engine mounts.
Figure 31:
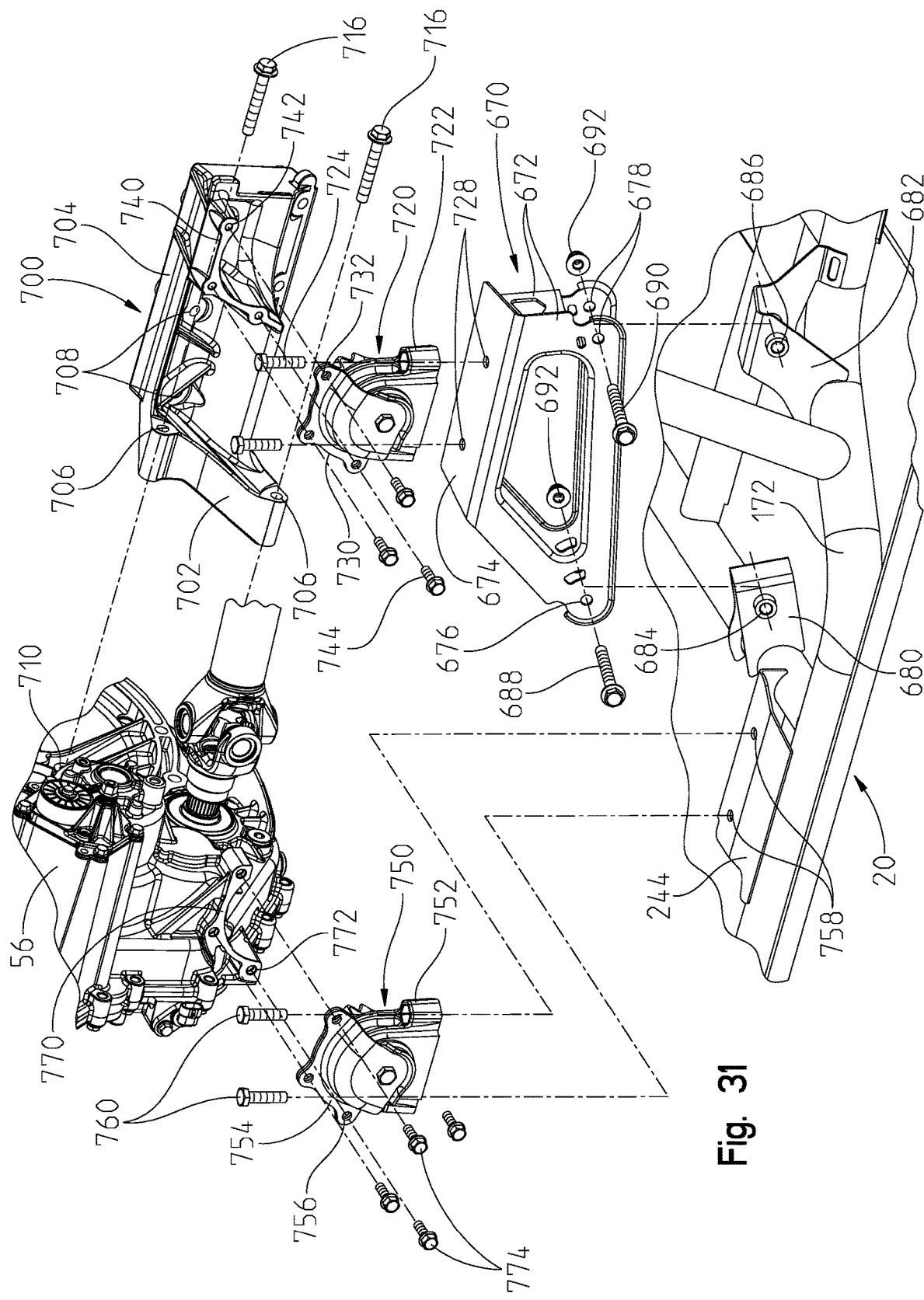
FIG. 31 is similar to that of FIG. 30, showing the engine and engine mounts in an exploded manner away from the frame.

As shown in FIG. 31, a mounting bracket is shown at 700 which couples to the backside of transmission 56 and to the left-hand side of engine 50 as shown in FIGS. 29 and 30. Bracket 700 is somewhat L-shaped having a transverse leg portion at 702 and a longitudinal leg portion at 704. Leg portion 702 includes apertures at 706 while leg portion 704 has apertures at 708. Apertures 706 align with apertures 710 at the back side of the transmission 56 and apertures 708 align with apertures 712 (see FIG. 23). Fasteners 714 (see FIG. 29) are receivable through apertures 708 and into threaded engagement with apertures 712 (see FIG. 23). Fasteners 716 are receivable through apertures 706 and into threaded engagement with apertures 710. An isolation mount 720 is provided to interface between brackets 670 and 700. Mount 720 includes a lower mount portion 722 which receives fasteners 724 therethrough and which are receivable with threaded apertures 728 of bracket 670. Mount 720 further includes an arcuate flange 730 having apertures at 732. A complimentary arcuate flange 740 is positioned on bracket 700 having threaded apertures at 742. Thus, fasteners 744 are receivable through apertures 732 and into threaded engagement with apertures 742.

With reference still to FIG. 31, an isolation mount 750 is shown which is substantially similar to mount 720 having a lower mount portion at 752 and an arcuate flange at 754 having apertures 756. The bracket 244 includes threaded apertures at 758 which receives fasteners 760 therethrough and through mounts 752 to retain mount 750 to bracket 244. Transmission 56 also includes an arcuate flange at 770 (see also FIG. 34) having threaded apertures at 772. Fasteners 774 are receivable through apertures 756 and into threaded engagement with apertures 772 of transmission 56. The location of arcuate flange 770 is further seen in FIG. 23. It should be noticed from FIG. 30, that bracket 670 is positioned adjacent to prop shaft 586 such that removal of bracket 670 and isolation mount 720 provides full access to prop shaft 586 for removal and/or replacement.

Figure 32:
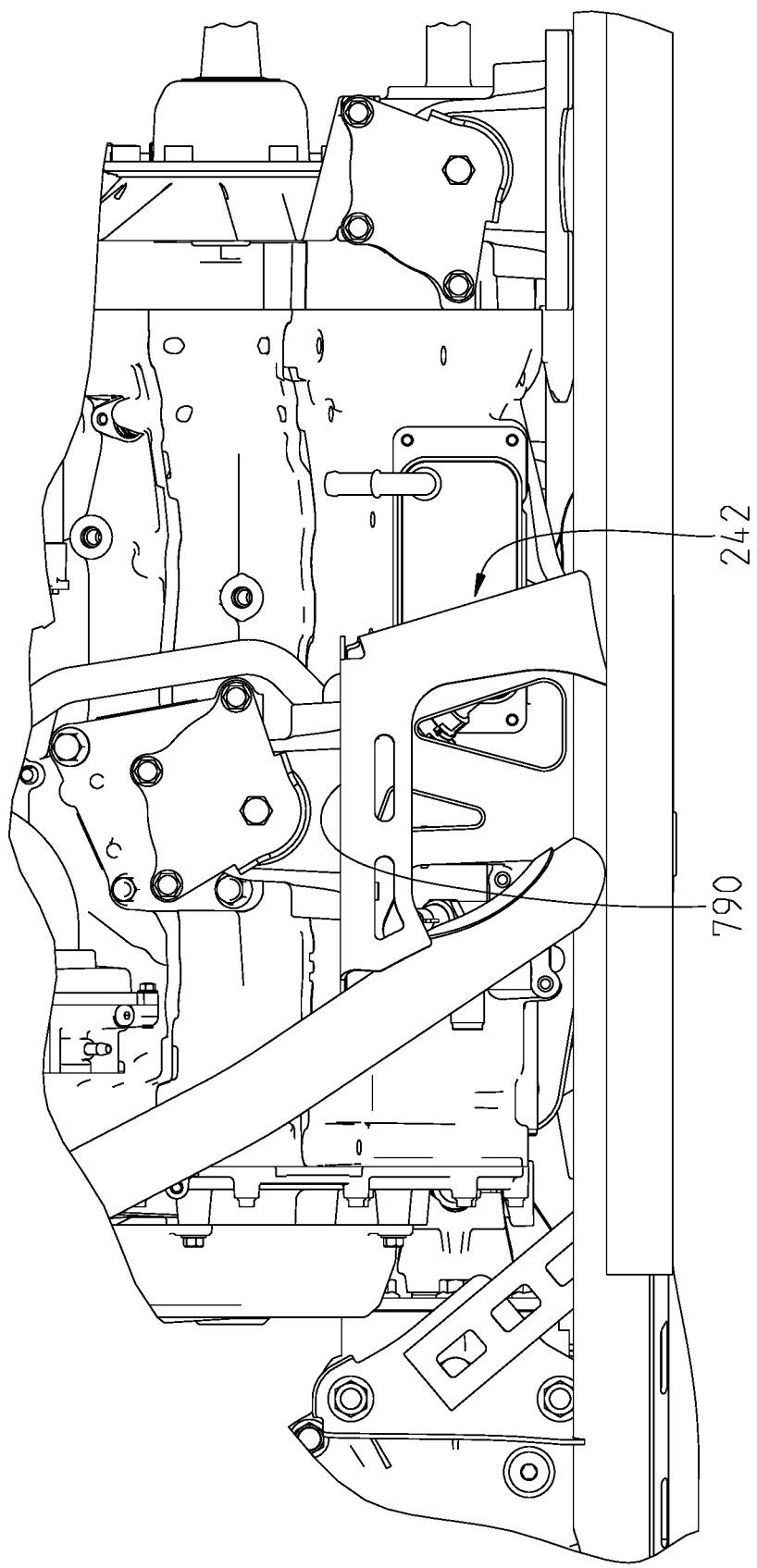
FIG. 32 is a right-hand side view of the engine mounts.
Figure 33:
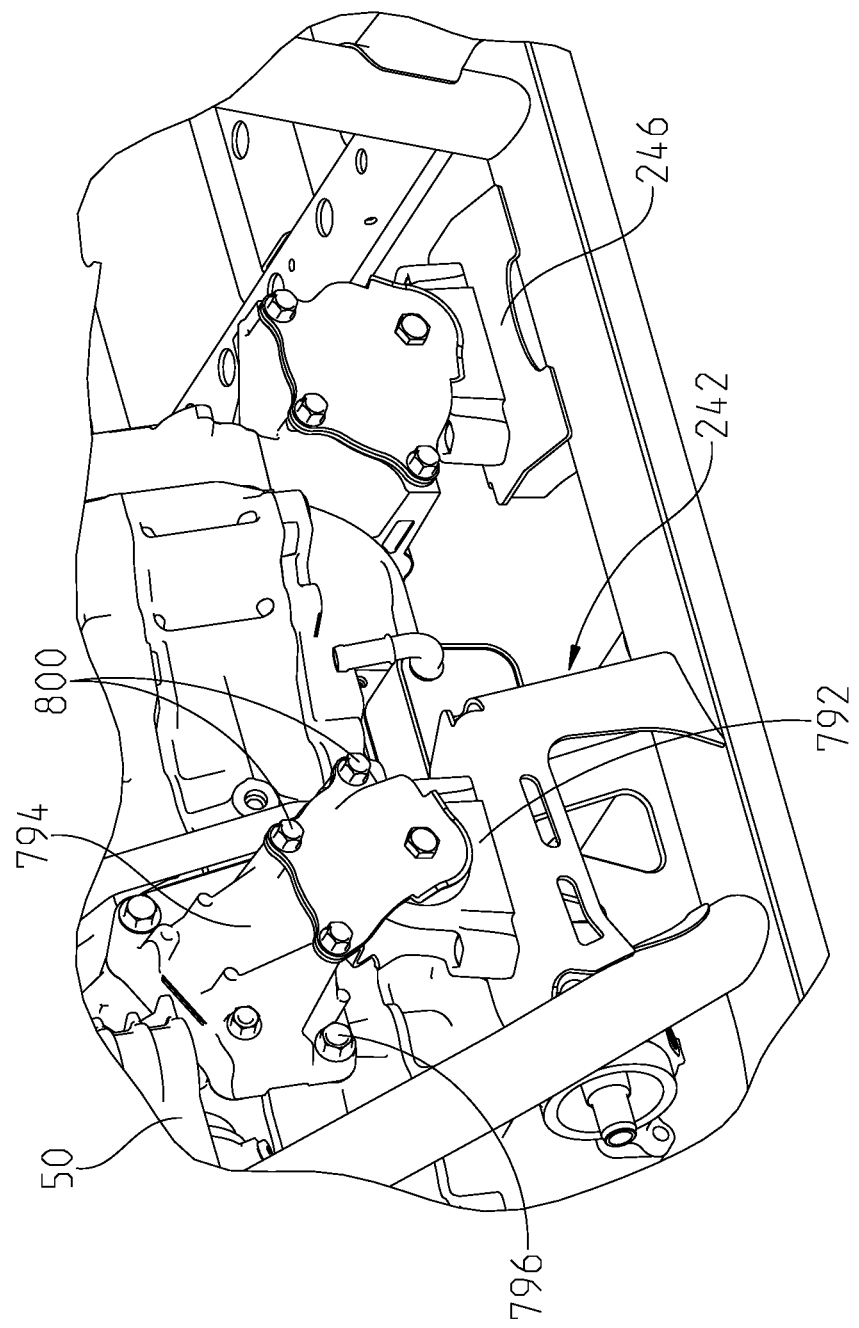
FIG. 33 is a right rear perspective view of the engine mounts.

With reference now to FIGS. 32 and 33, the right-hand side engine mount will be described in greater detail. As shown, right-hand side mount assembly 242 has an upper platform 790 which receives an isolation mount 792 in a similar fashion to mount 720. A bracket 794 is coupled to the right-hand side of the engine by way of fasteners 796 into apertures 798 (see FIG. 24). Fasteners 800 couple the isolation mount to bracket 794. Further details of isolation mounts may be seen in U.S. Pat. No. 9,873,316, the subject matter of which is incorporated herein by reference.

Figure 34:
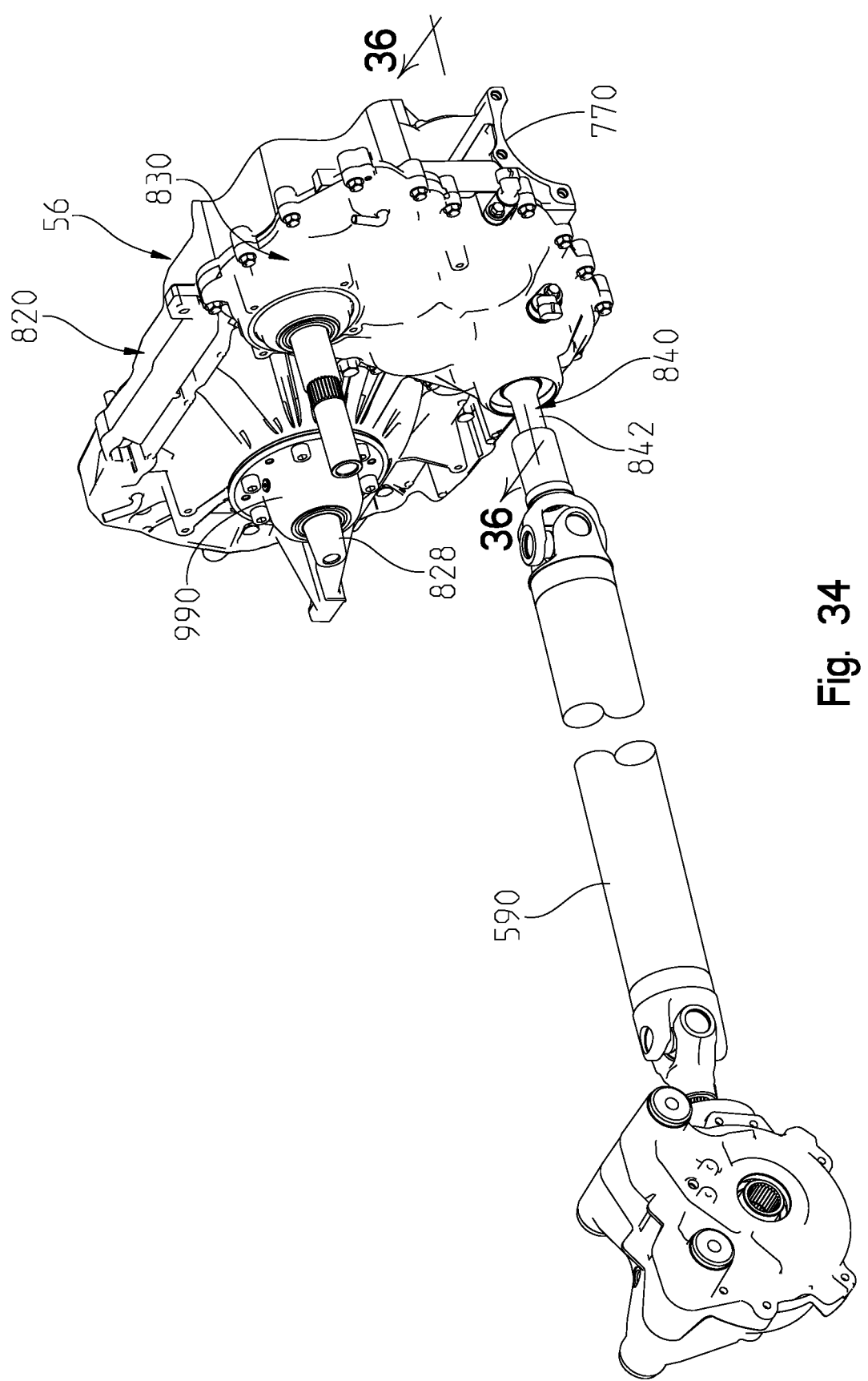
FIG. 34 is a left front perspective view of the transmission coupled to the front final drive.
Figure 35:
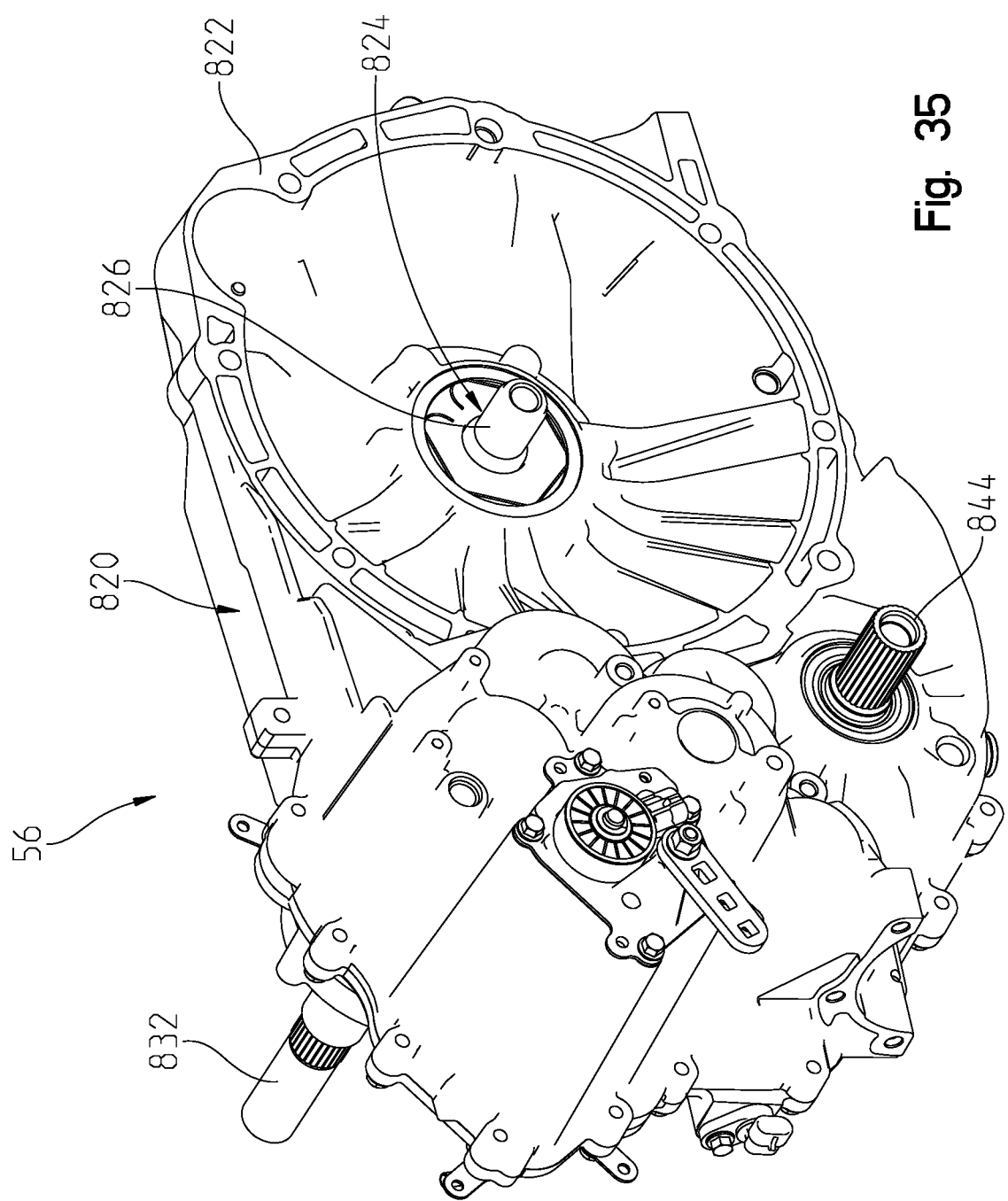
FIG. 35 is a rear perspective view of the transmission shown in FIG. 34.

With reference now to FIGS. 34-38, a torque control feature of the transmission will be described in greater detail. With reference first to FIG. 34, the transmission 56 is shown where the transmission includes a transmission housing at 820 having an engine interface at 822 (FIG. 35) which defines a flange for the mounting of engine 50. An intermediate shaft 824 is provided having an input at 826 and an output at 828. The gearing for transmission 56 is located within housing portion 830 and which is driven through input shaft 832. It should be appreciated that CVT 52 (FIG. 23) couples between shafts 828 and 832 such that the engine 50 drives intermediate shaft 824 and shaft portion 828 drives a drive pulley within CVT 52 and a driven pulley of CVT 52 drives input shaft 832 of transmission 56. As shown in FIG. 34, an output shaft of transmission 56 is also provided at 840 which has a shaft portion 842 coupled to the front prop shaft 590 and a rear output shaft 844 (FIG. 35) which couples to rear prop shaft 586 (FIG. 23).

Figure 36:
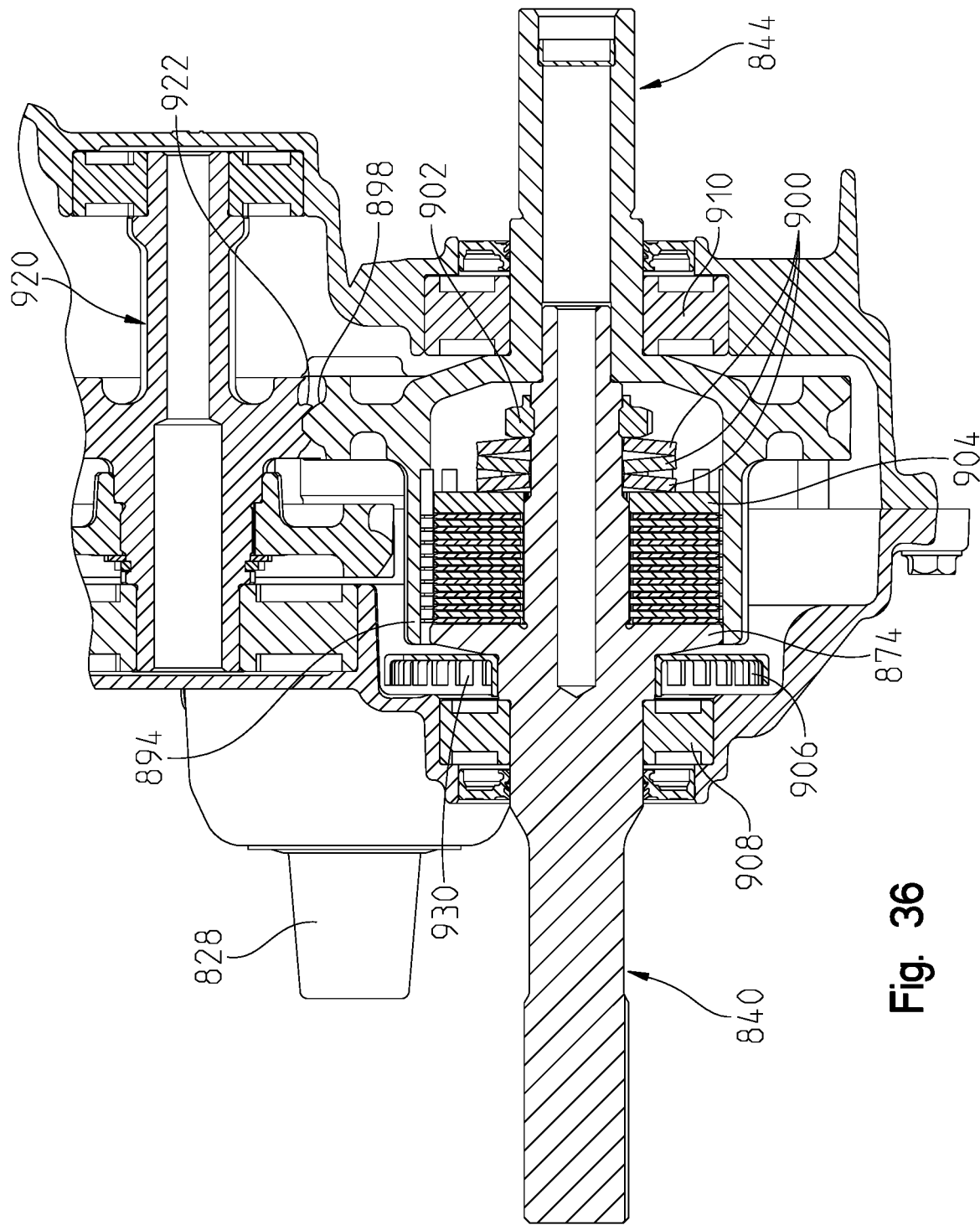
FIG. 36 is a cross-sectional view through lines 36-36 of FIG. 34.
Figure 37:
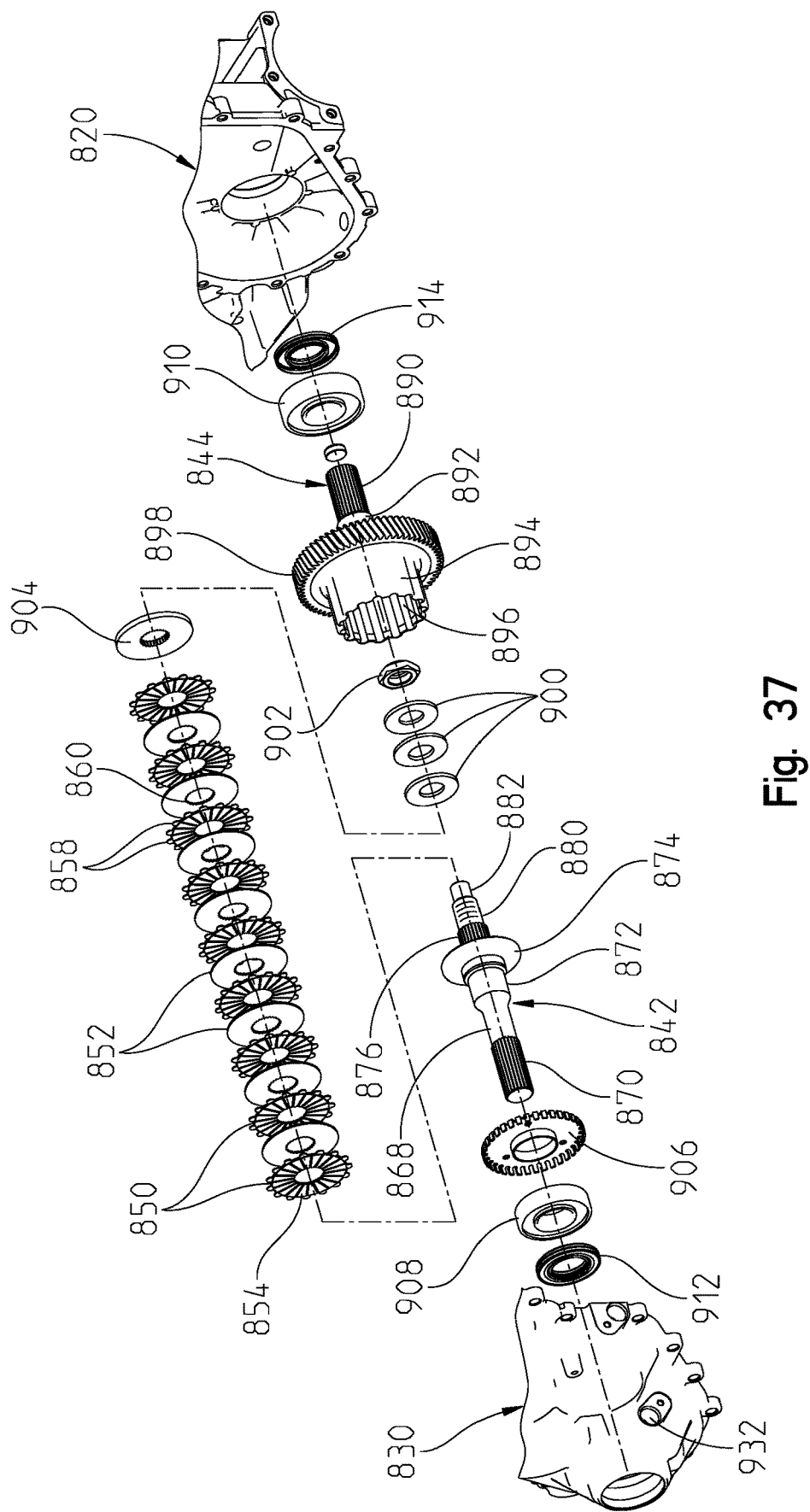
FIG. 37 is an exploded view of the slip clutch portion of the transmission.

With reference now to FIGS. 36 and 37, a slip clutch is defined between the shaft portions 842, 844 to limit torque through the front prop shaft 590. As shown, slip clutch is defined by a plurality of friction discs 850 interposed between a plurality of clutch discs 852. Friction discs 850 include a plurality of pads of friction surfaces 854 such as a carbon fiber material or graphite material to cause a frictional engagement between the friction discs 850 and the clutch discs 852. Each of the friction discs 850 include teeth at 858 while the clutch discs 852 include splines 860. Shaft portion 842 includes a reduced diameter portion 868 having a splined portion at 870, an enlarged diameter portion at 872, a fixed pressure plate at 874, and a splined section at 876. Shaft portion 842 further includes a threaded shaft portion 880 and a reduced diameter portion 882.

Shaft portion 844 includes a splined output shaft at 890, an enlarged diameter portion at 892, a disc basket 894 having a plurality of teeth 896 which match with teeth 858 of friction discs 850. Shaft portion 844 further includes a helical gear 898 which is the input to lower shaft 840 driven through shaft 832. Slip clutch further includes wave springs 900, pressure nut 902, movable pressure plate 904, timing disc 906, bearings 908, 910 and seals 912, 914.

The plurality of friction discs 850 and clutch discs 852 are slidably received over spline shaft portion 876 with the splines 860 of the clutch discs aligning with the splines of splined portion 876. This positions the plurality of stacked discs 850, 852 positioned against an inner surface of fixed pressure plate 874, as best shown in FIG. 36. Movable pressure plate 904 is thereafter received also on splined portion 876 to be positioned against the last of the friction discs 850. Wave springs 900 are thereafter positioned over shaft portion 880 to be positioned against pressure plate 904 and pressure nut 902 is threadably received on shaft portion 880 and torqued down to a preset torque where wave springs are pressing against pressure plate 904, as shown best in FIG. 36.

As shown in FIG. 36, an idler shaft 920 provides a helical gear 922 in engagement with helical gear 898. Shaft 920 is drivingly coupled to input shaft 832 such that input torque from the engine is transferred through CVT 52 to transmission 56 and to outputs 842 and 844. When the torque at 844 reaches a preset max torque, however, that is the torque where the friction discs 850 and clutch discs 852 begin to slip relative to each other, the torque through shaft 842 is limited by the slip clutch defined through discs 850, 852. It should be noticed that as the friction discs 850 are rotationally fixed relative to the shaft portion 844 and the clutch discs 852 are rotationally fixed relative to shaft portion 842. When the torque at output shaft 844 is below the threshold torque, the entire shaft 840 rotates as a single piece. However, when the torque exceeds the predetermined maximum torque, the discs 850, 852 slip relative to each other, allowing a different rotational speed between shaft portion 842 and shaft portion 844. With reference again to FIG. 36, the rotational speed of shaft portion 842 is measured through timing gear 906, where timing gear 906 includes a plurality of timing tines 930 and a timing sensor is positioned in aperture 932 (FIG. 37) to count the rotations of the tines to calculate a speed of shaft portion 842.

Figure 38:
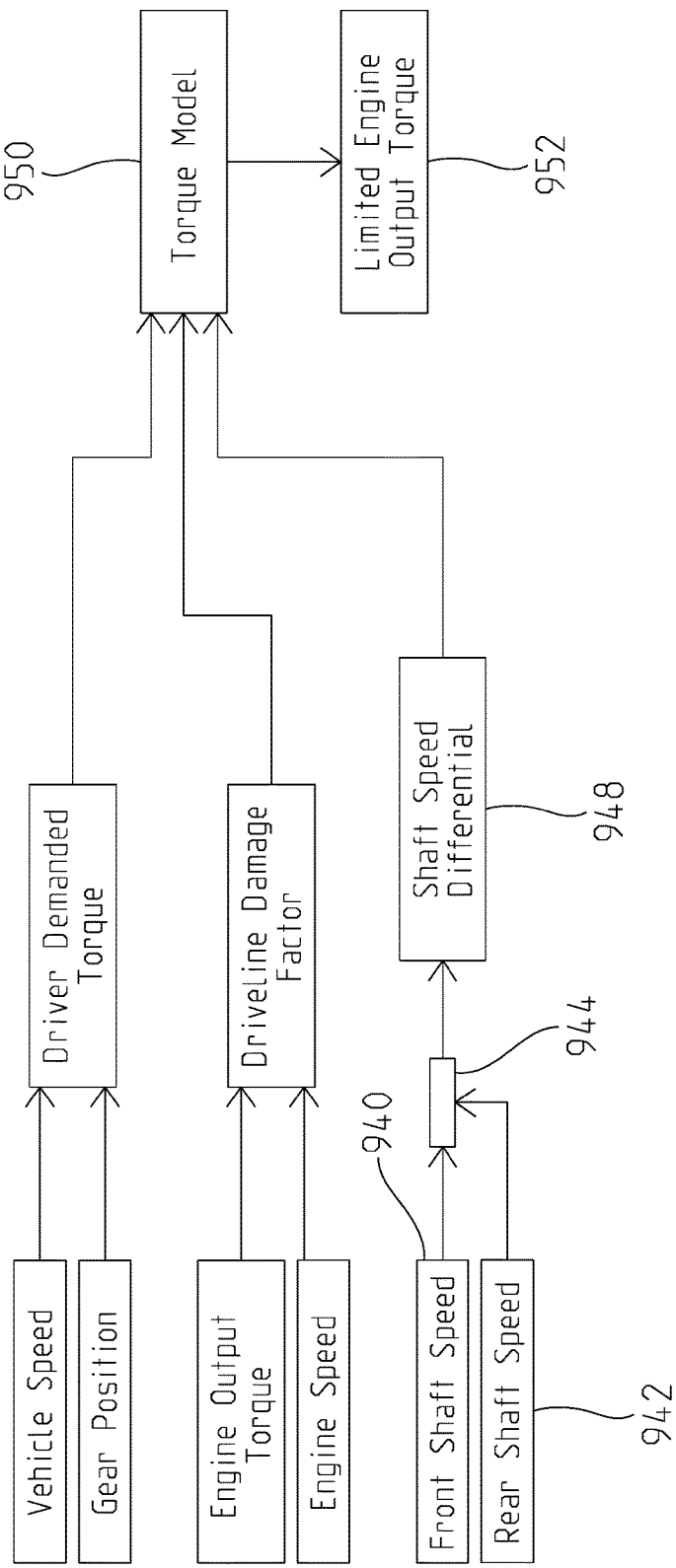
FIG. 38 shows a diagrammatical flow chart showing the torque control model.

Thus with reference to FIG. 38, a torque model can be provided through a plurality of sensed perimeters, calculated perimeters and output perimeters, where the shaft speed of the front shaft portion 842 is determined at 940, the shaft speed of rear shaft portion 844 is determined at block 942 and a differential between the two shaft portions 842, 844 is determined at block 944 so as to define a shaft speed deferential at 948. Thus, as mentioned above, if the torque at shaft portion 844 is below the predetermined maximum torque, the shaft speed differential at block 948 is 0. When the torque at shaft portion 844 exceeds the predetermined maximum torque, the discs 850, 852 begin to slip such that a shaft speed differential is calculated, is input to the torque model at block 950 and the engine output torque is limited by the engine control unit at block 952.

Figure 39:
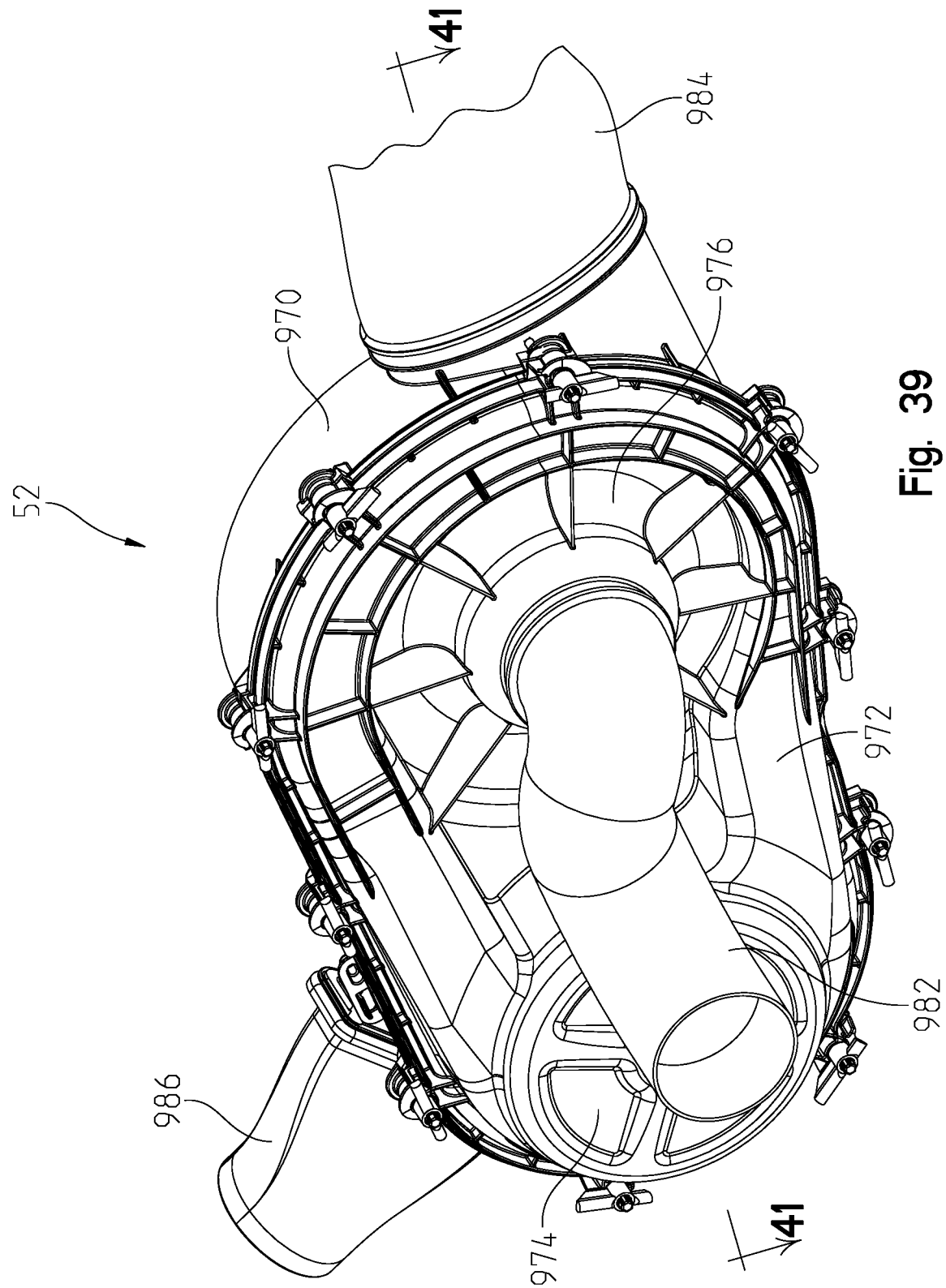
FIG. 39 is a front perspective view of the continuously variable transmission (CVT) of the powertrain shown in FIG. 23.
Figure 40:
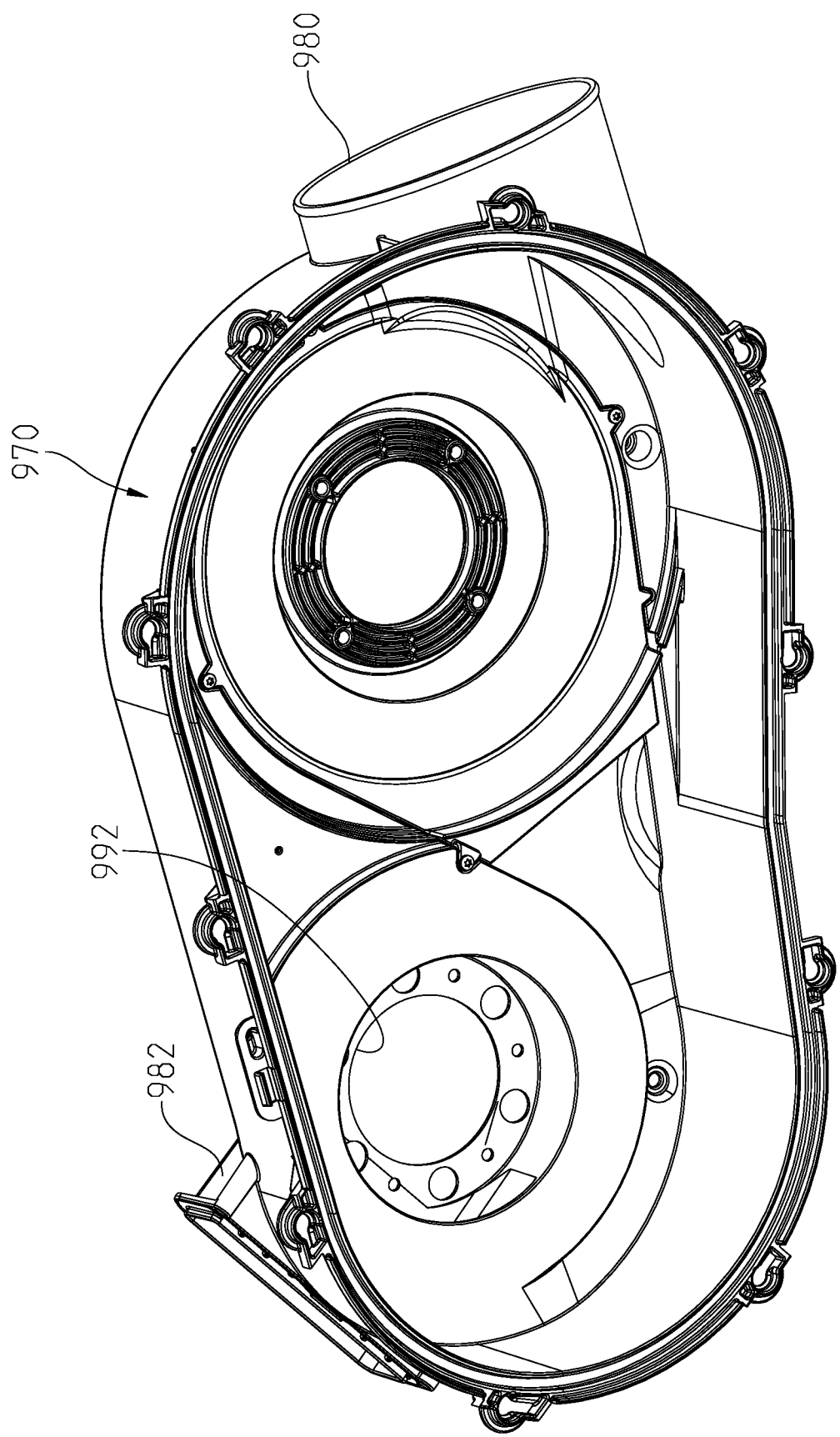
FIG. 40 is the inner housing of the CVT shown with the drive and driven clutches removed.
Figure 41:
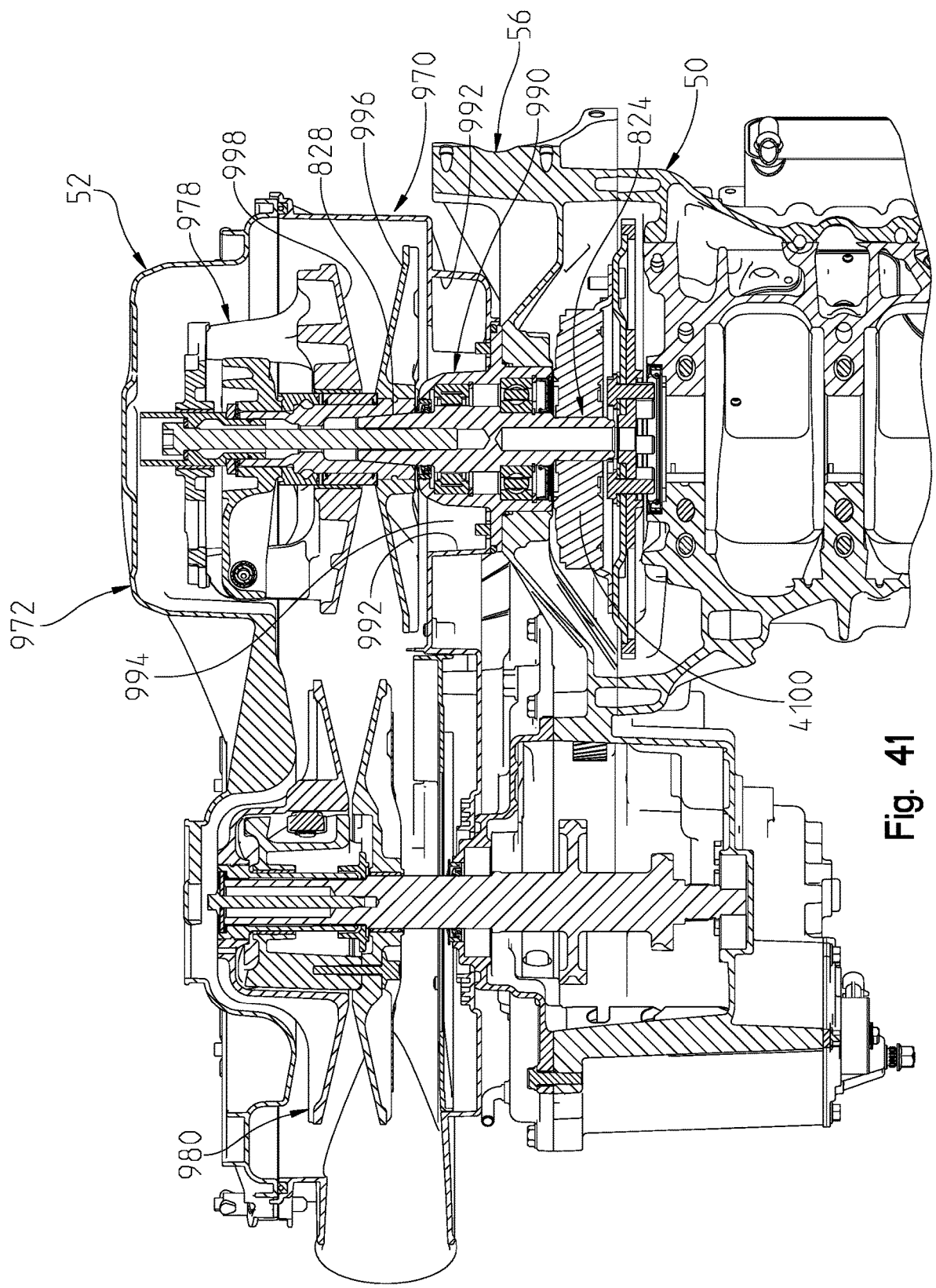
FIG. 41 is a cross-sectional view through lines 41-41 of FIG. 39.

With reference now to FIGS. 39-41, CVT 52 will be described in greater detail. As shown, CVT 52 includes an inner housing 970 (adjacent the engine 50 and transmission 56) and an outer housing 972. CVT 52 would also include a drive side 974 and a driven side 976, and including a drive clutch 978 and a driven clutch 980 (FIG. 41). CVT 52 has a forward intake 982, a rear intake 984 and an exhaust 986. CVT 52 may also be configured as shown in U.S. Patent application Ser. No. 62/644,717, filed Mar. 19, 2018, the subject matter of which is incorporated herein by reference.

As the engine 50 is not coupled directly to the CVT 52, but rather to the engine interface 822 (FIG. 35), the intermediate shaft 824 output 828 extends through a shaft housing 990 (FIG. 34) which has a small profile in the radial direction. The shaft housing 990 also protrudes through the opening 992 as best seen in FIGS. 40 and 41, providing a large space 994 around the inner sheave portion 996. The spacing 994 provides an air volume and allows a substantial amount of air flow around the inner sheave portion 996 and outer sheave portion 998 for cooling.

Figure 42:
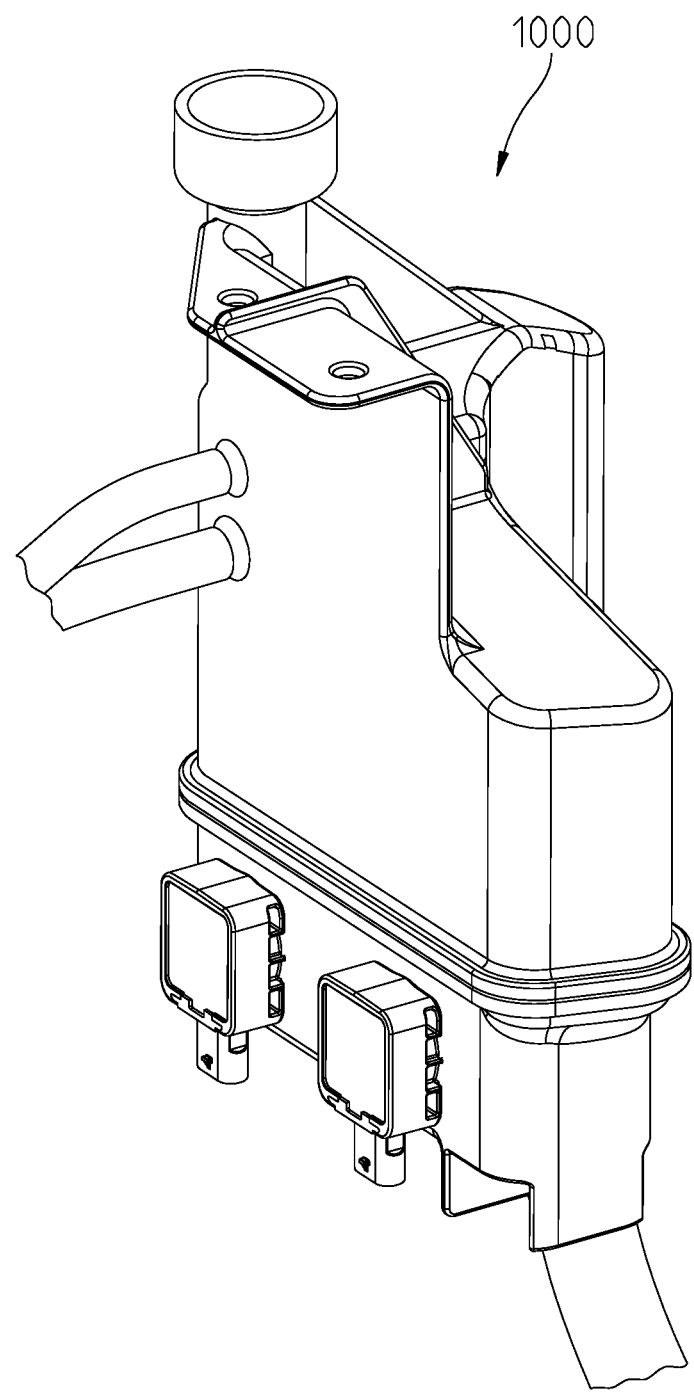
FIG. 42 shows a coolant level switch for the coolant bottle.

With reference now to FIG. 42, a coolant bottle is shown at 1000 having an integrated switch to determine coolant level.

Figure 43:
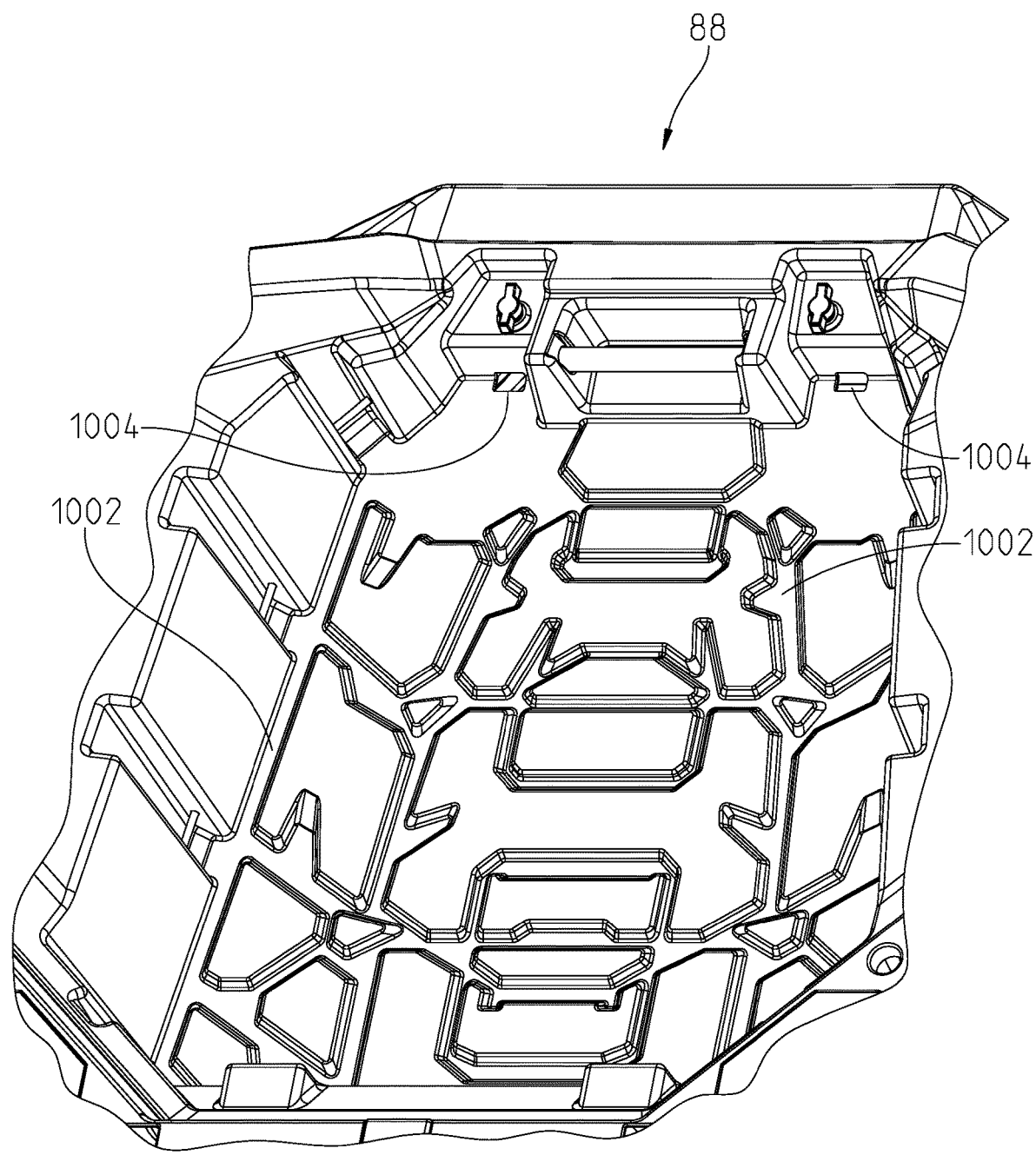
FIG. 43 is a front perspective view of the utility bed of the vehicle.

With reference now to FIG. 43, the utility bed 88 is shown to include channels 1002 and drains 1004 to remove contaminants so as to not drain on hot portions of the power train.

Figure 44:
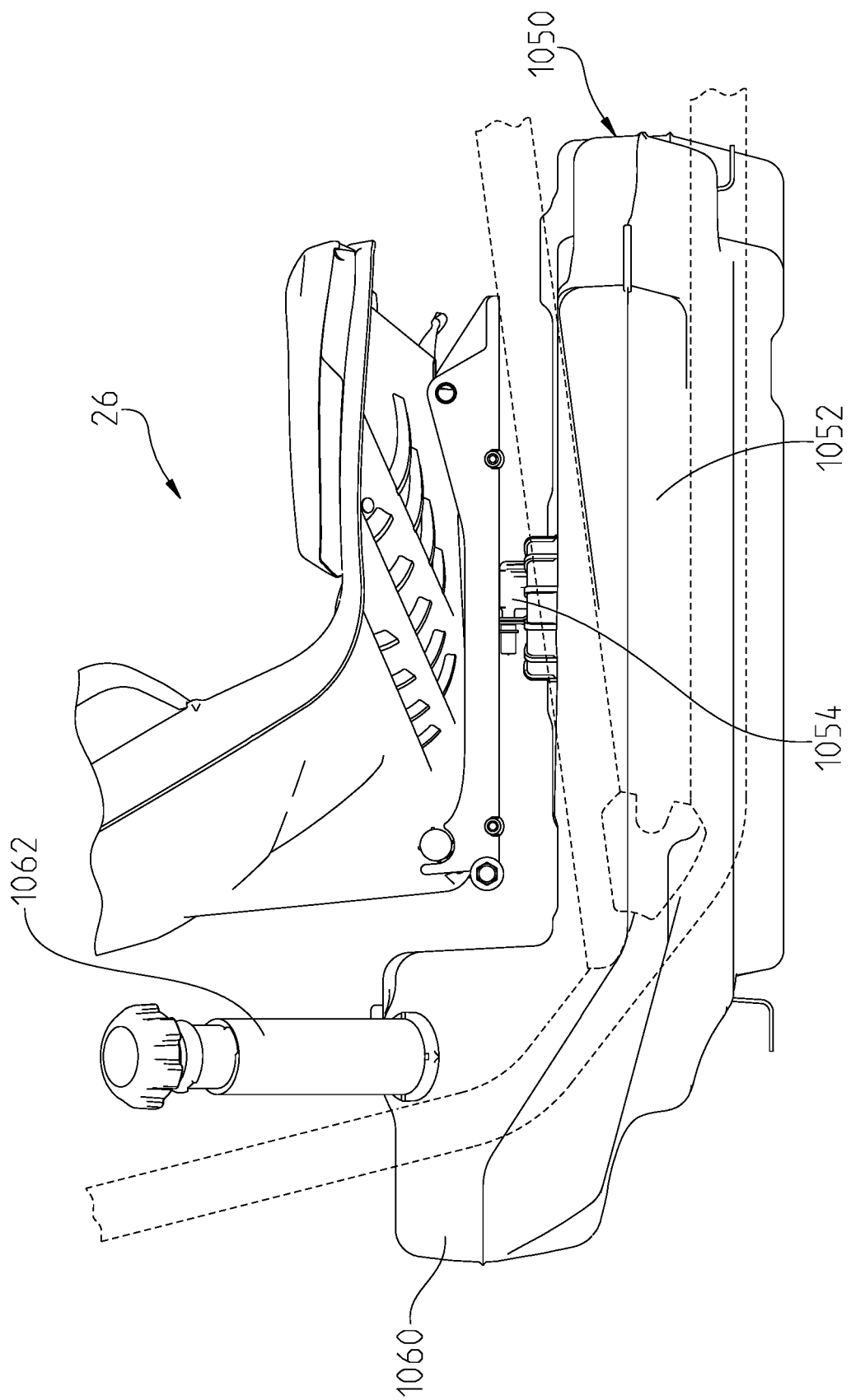
FIG. 44 shows a right-side view of the passenger seat and fuel tank configuration.
Figure 45:
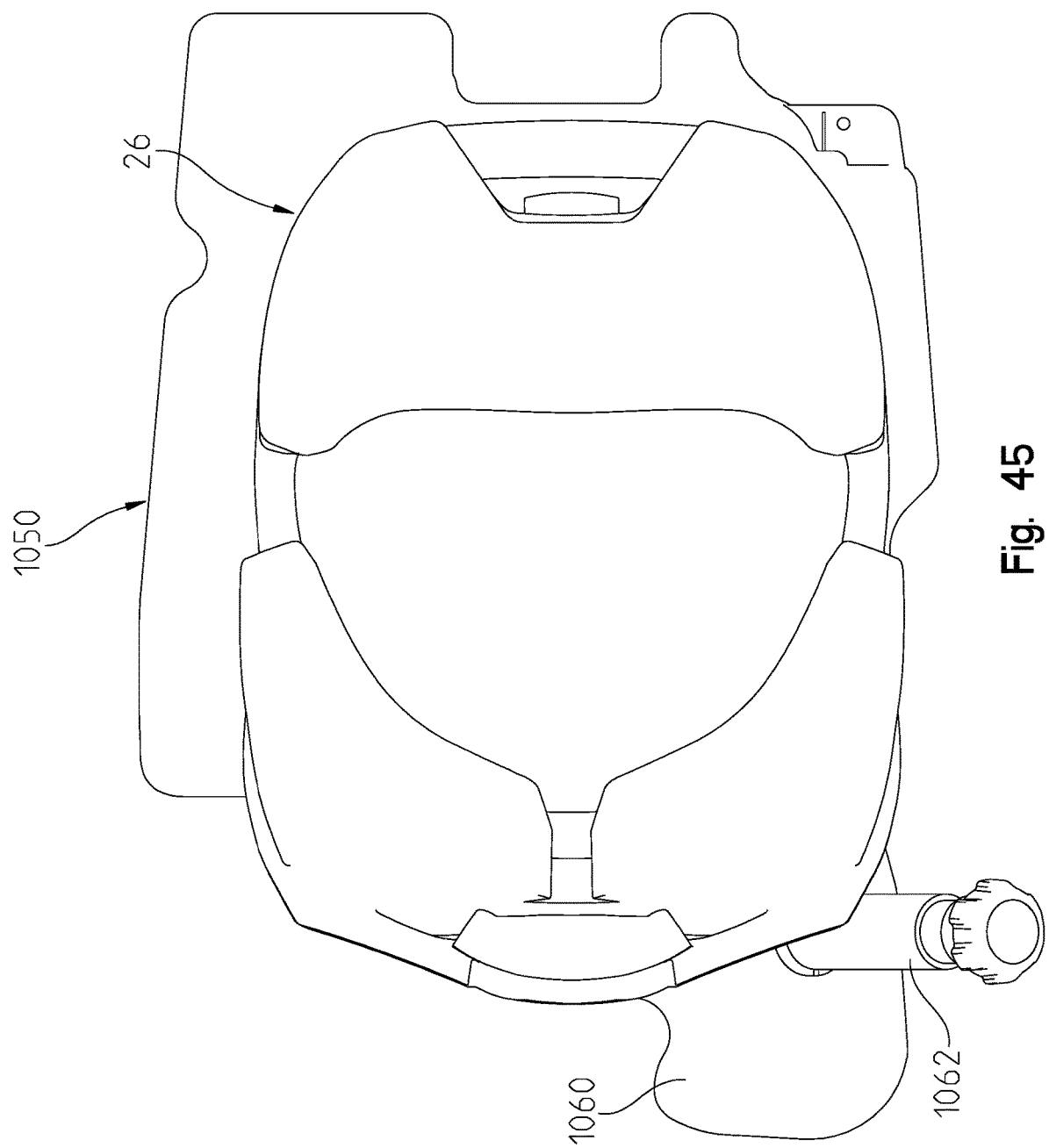
FIG. 45 shows a top view of the seat shown in FIG. 44.
Figure 46:
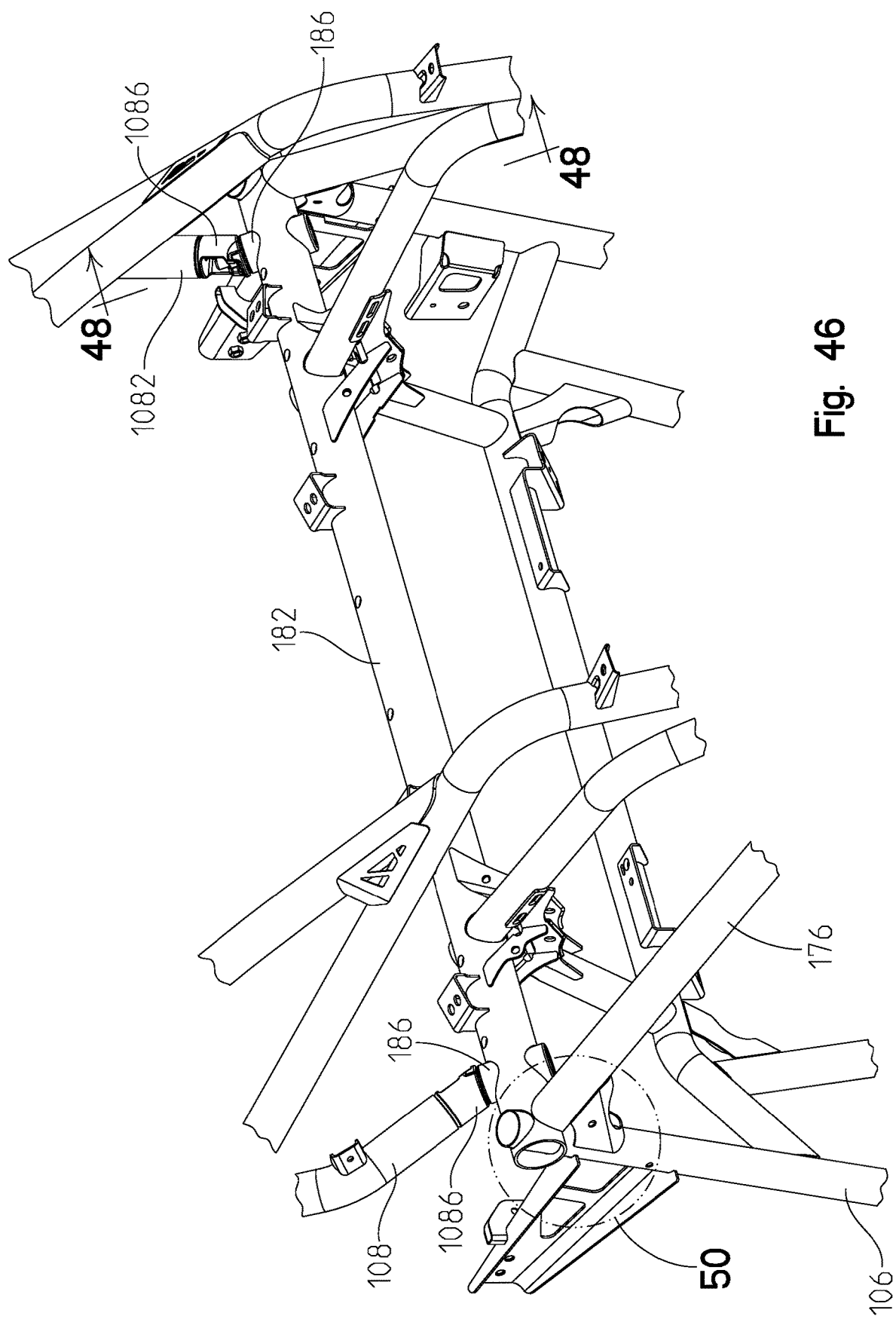
FIG. 46 shows an enlarged view of the rear cab frame support area.

With reference now to FIGS. 44 and 45, fuel tank 1050 is shown positioned beneath and rearward of passenger seat 26. As shown, fuel tank 1050 includes a longitudinally extending section at 1052 which is lower than and under seat 26. Longitudinal section 1052 includes fuel pump 1054 which draws fuel from the lowest portion of the fuel tank 1050. Fuel tank 1050 also includes a vertically extending section at 1060 which includes the filler tube at 1062. As shown, vertically extending section 1060 is rearward of passenger seat 26.

Figure 47:
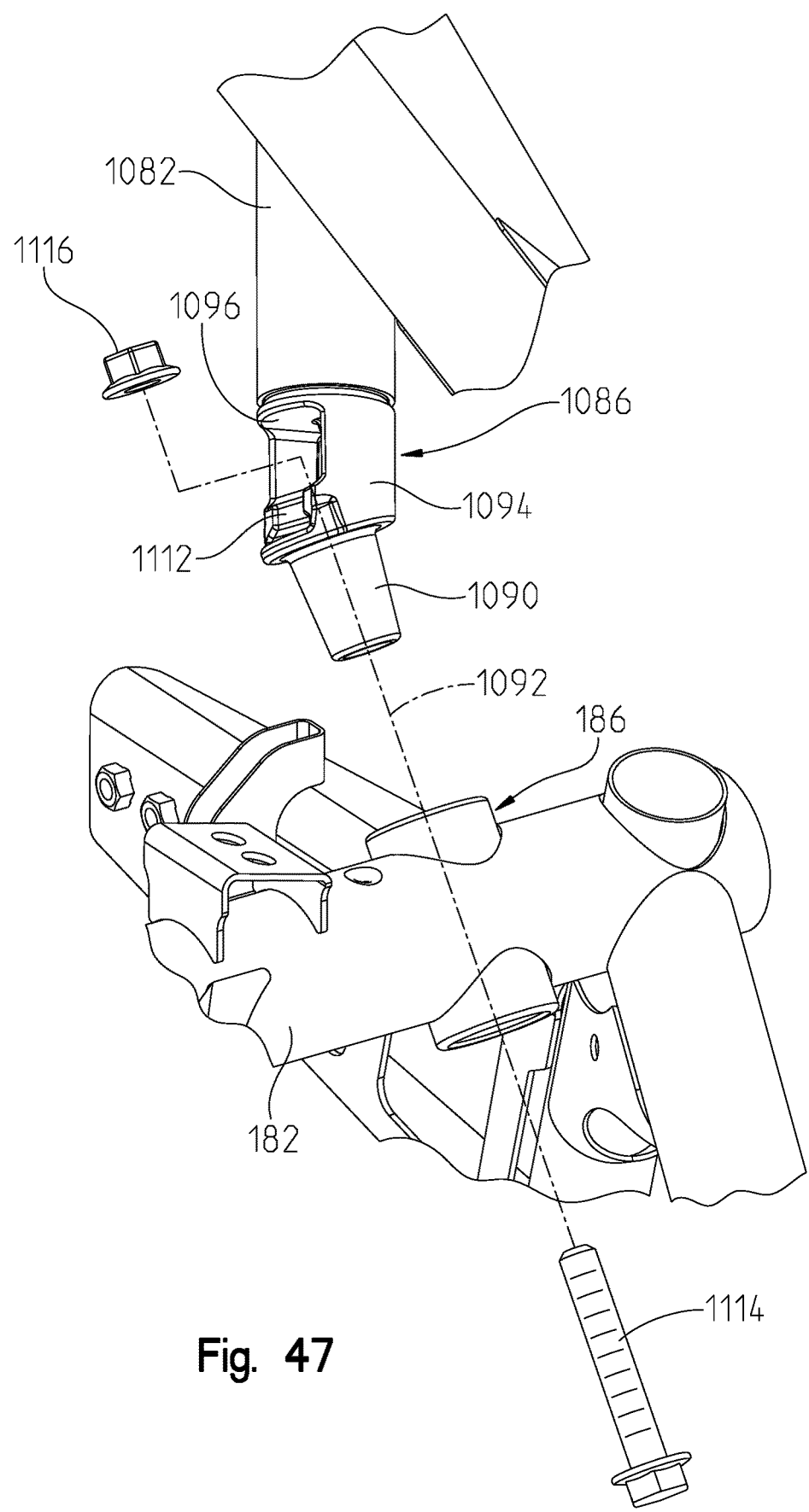
FIG. 47 is a fragmentary enlargement of the right rear portion of the cab frame support area shown in FIG. 46.
Figure 48:
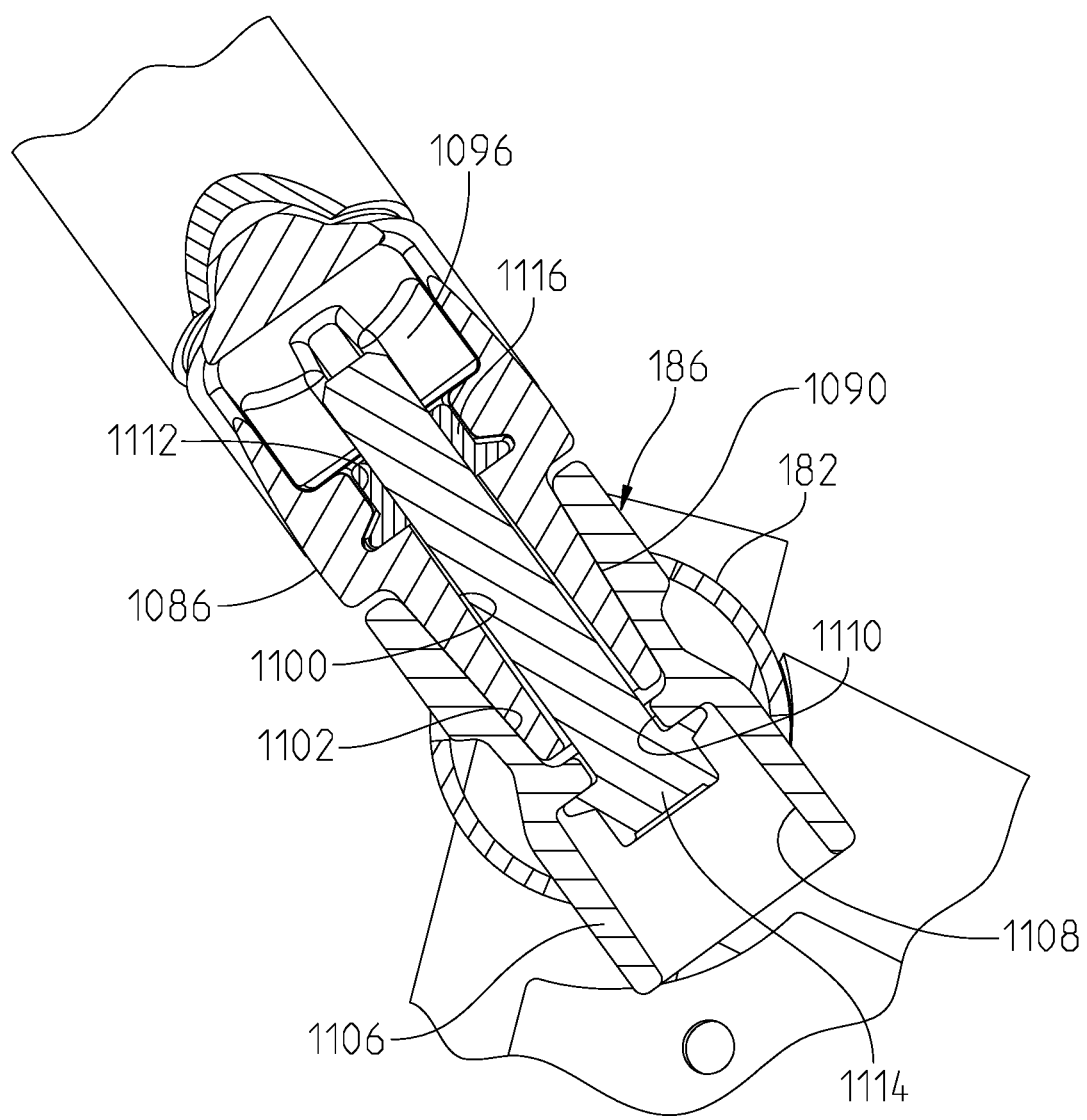
FIG. 48 is a cross-sectional view through lines 48-48 of FIG. 46.
Figure 49:
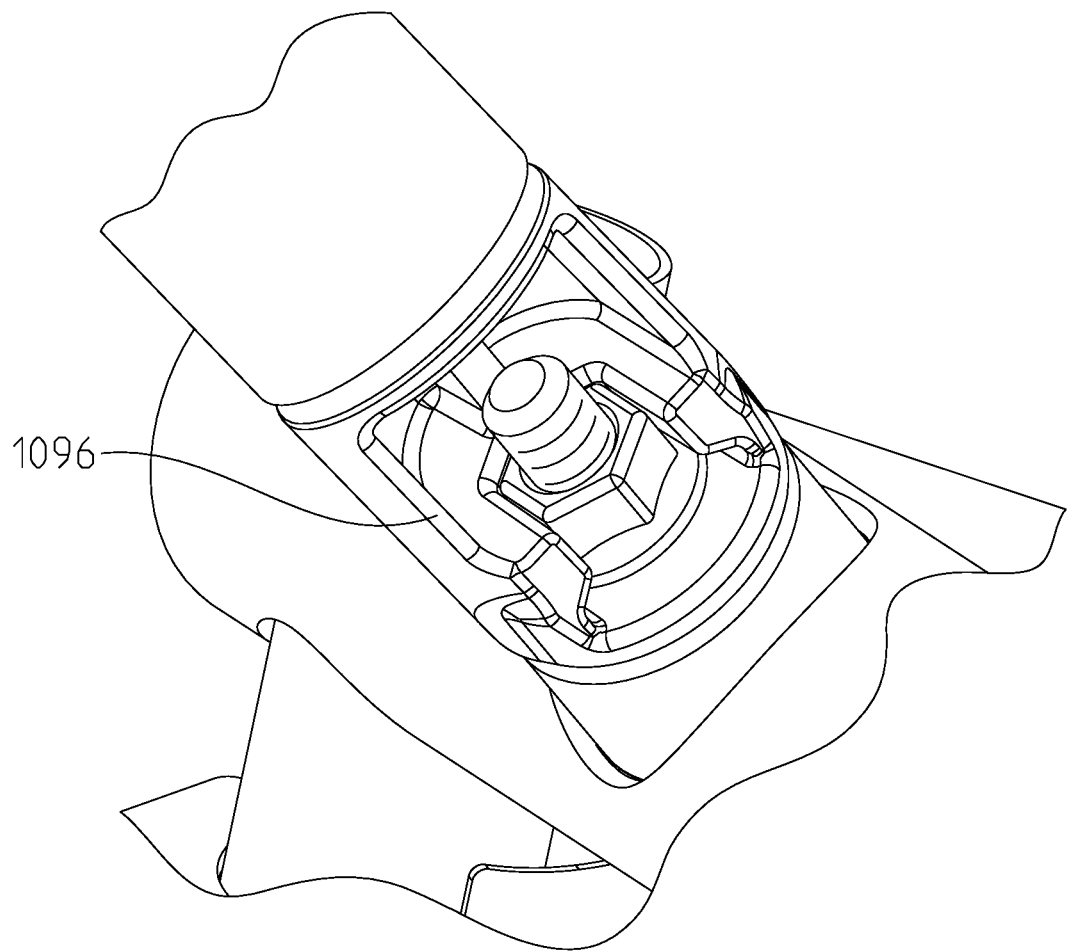
FIG. 49 is a view showing the fully assembled taper lock fitting.

With reference now to FIGS. 1-5 and 46-49, cab frame 28 will be described in greater detail. As shown first in FIGS. 1-5, cab frame 28 generally includes longitudinally extending frame members 1070 and 1072 which couple to couplers 1074 and 1076 at a front end thereof and to couplers (not shown) at the rear thereof. A mid frame portion 1080 and 1082 extends downwardly at a position adjacent to seats 24 and 26 and couple to couplers 1086. With reference now to FIGS. 46-49, couplers 1086 will be described in greater detail. As shown in FIG. 47, coupling 1086 includes a tapered lower portion at 1090 which extends along an axis 1092 which is common with the axis to coupling 186. An upper portion of coupling 1086 includes a collar 1094 which is skewed relative to axis 1092 and includes an opening at 1096 which allows access to an opening 1100 extending through tapered portion 1090 (see FIG. 48).

Coupling 186 includes a tapered portion 1102 conforming to the tapered portion 1090 and which has a lower portion 1106 having an opening at 1108. An aperture 1110 provides access between opening 1108 and tapered portion 1100 for receiving a fastener such as 1114. A counter fastener 1116 is positionable through a retaining portion 1112 in opening 1096 which retains fastener 116 and prevents rotation of fastener 116. Thus, coupling portion 1086 may be coupled to coupling 186 on tube 182 by positioning tapered portion 1090 within coupling 186. This positions the tapered portion 1090 within the tapered portion 1102 of coupling 186 as shown best in FIG. 48. Fastener 1114 is thereby positioned through opening 1110 which positions the threaded portion within the opening 1096 of coupling 1086. Fastener 1116 may then be threaded onto the threads of fastener 1114 to secure the tube 1082 to tube 182. Alternatively, brackets 196 (FIG. 9) can also be replaced with tapered couplings 186. Preferably, axes 1092 of all tapered couplings 186 would be parallel.

Figure 50:
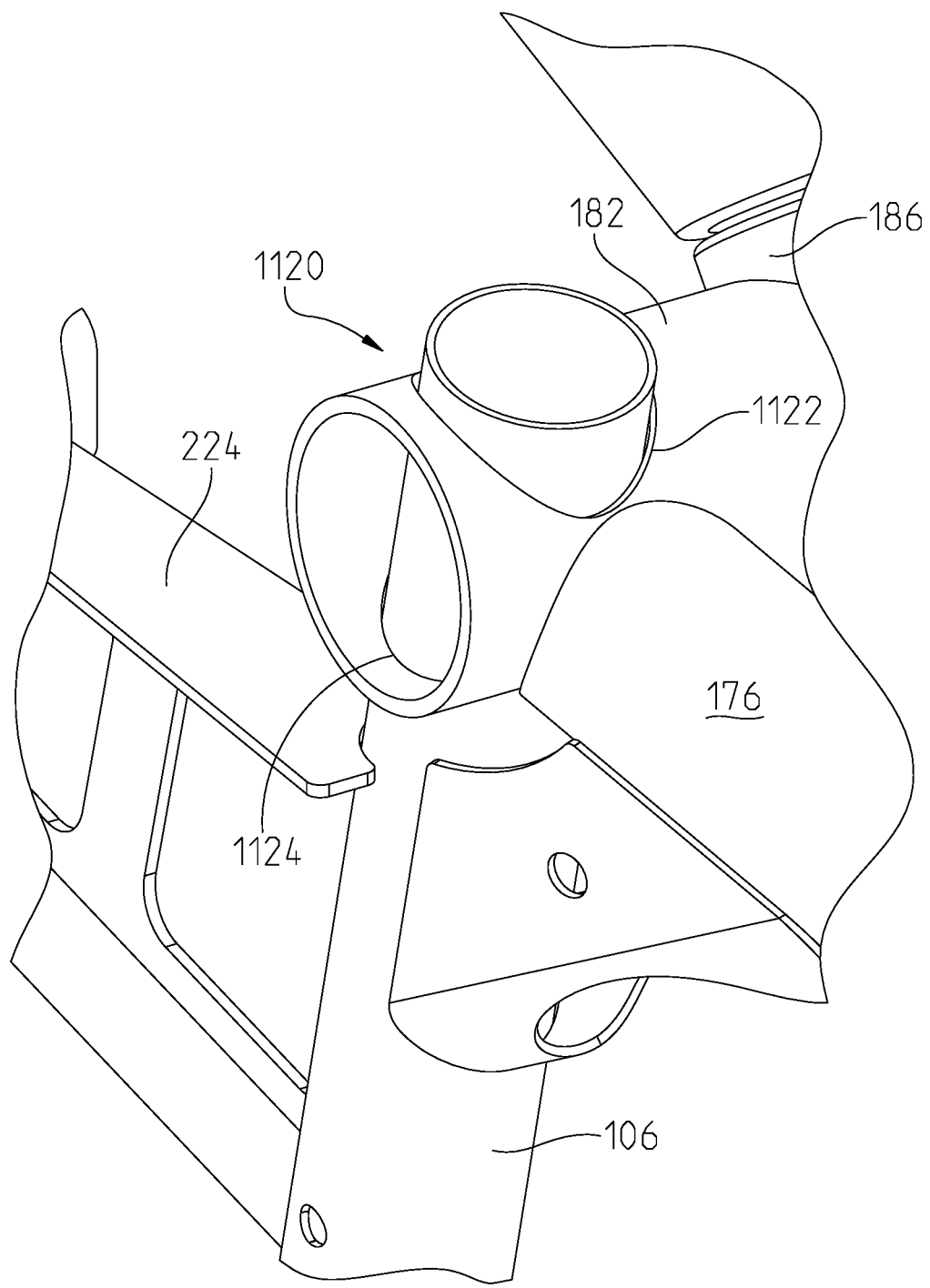
FIG. 50 shows an enlarged portion of the area denoted in FIG. 46.
Figure 51:
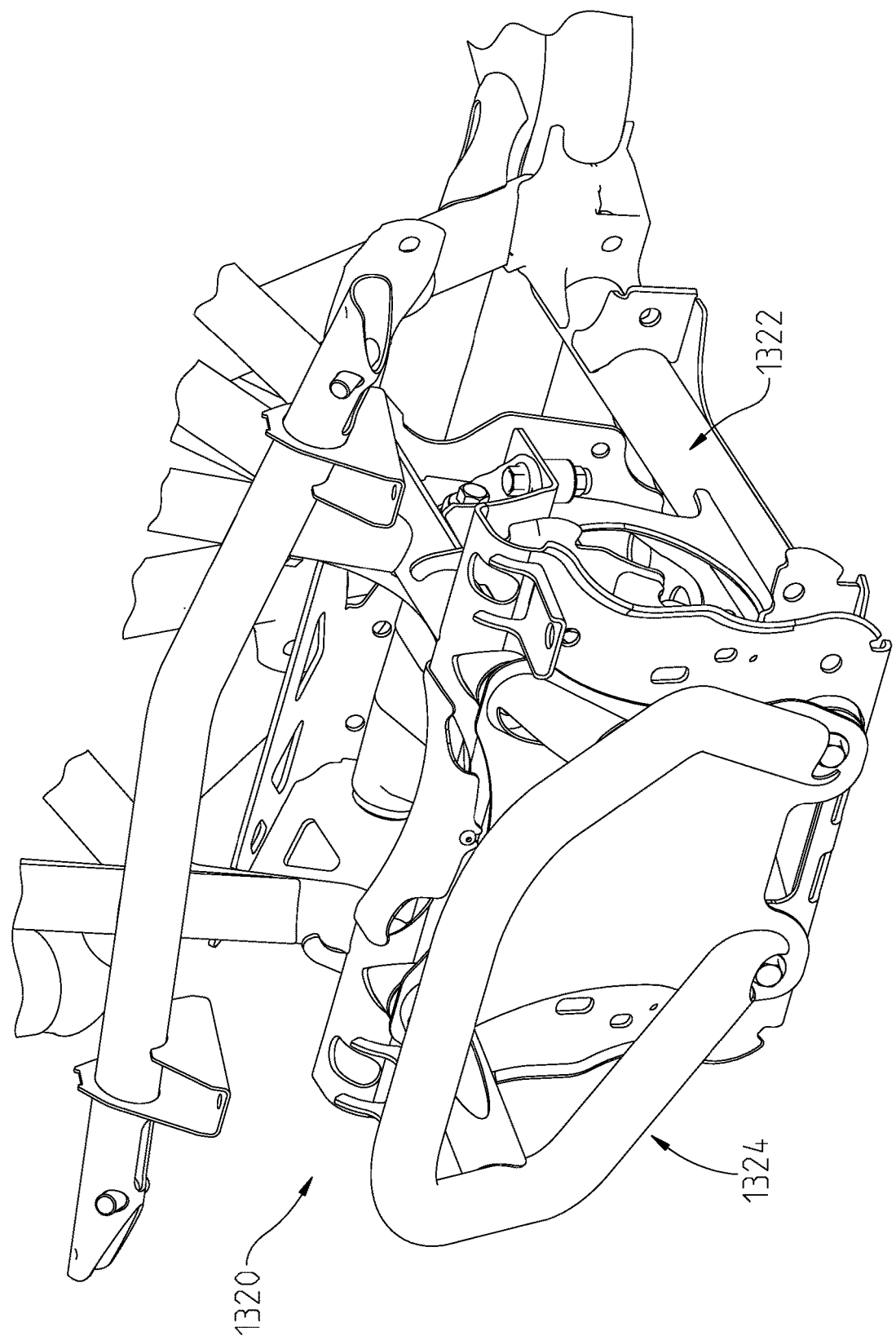
FIG. 51 shows a left front perspective view of an alternative front frame portion to that of the front removable frame portion of FIG. 17.

With reference now to FIG. 50, a joint 1120 is shown which provides a joinder of tubes 106 and 176 to the larger tube 182. In this case, the tube 106 (referred to as a poke yoke pass through tube) is inserted through both walls of larger diameter tube 182, that is, through openings 1122 and 1124. This is a very efficient way to transmit bending moments and load the section properly, particularly where multiple tubes share a common node in a space frame welded structure.

Instead of un-sharing multiple tube nodes to keep proper weld shelf, a poke yoke pass through tube profile may be added to the laser cut tube to obtain proper weld shelf, increase fatigue life, and eliminate weld fixture loading sequence issues. There is also a reduction in total weld length required as a small cost benefit. The plastics packaging required the tube to only have ~270 degrees of wrap. As also shown, the partially inserted tube 176 finds a natural stop against the poked through tube 106.

Figure 52:
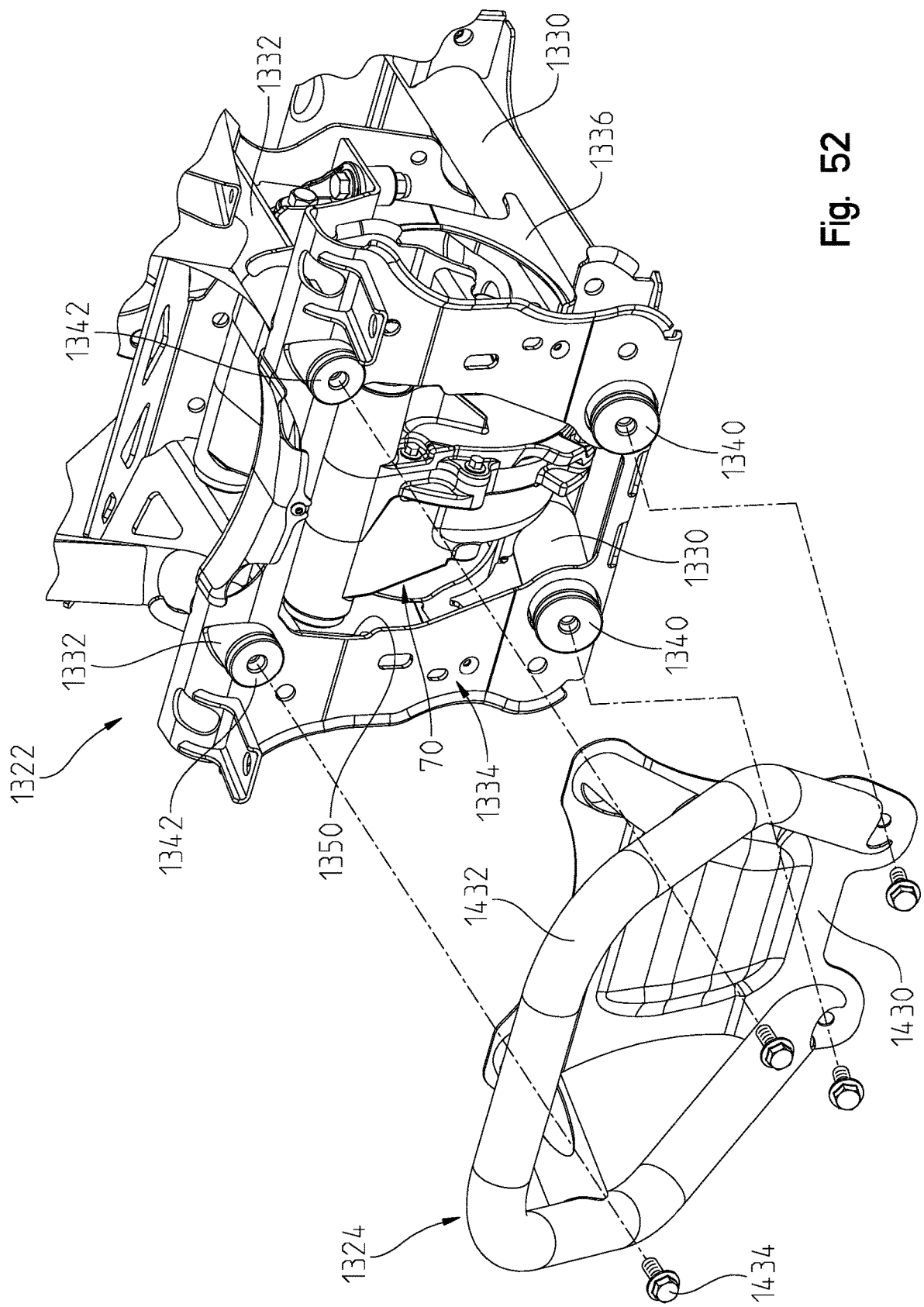
FIG. 52 is a partially exploded view of the front frame portion of FIG. 51.

With reference now to FIGS. 51-55, an alternate front frame will be described which could be used in place of the front frame as described in FIGS. 17-19. As shown, front frame 1320 includes a front frame portion 1322 and a removable front bumper portion 1324 (FIG. 52). As shown in FIG. 52, front frame 1322 is generally comprised of lower longitudinal tube portions 1330, upper longitudinal tube portions 1332, front diaphragm plate 1334, and left and right-side plates 1336 and 1338 (FIG. 53), respectively.

Figure 53:
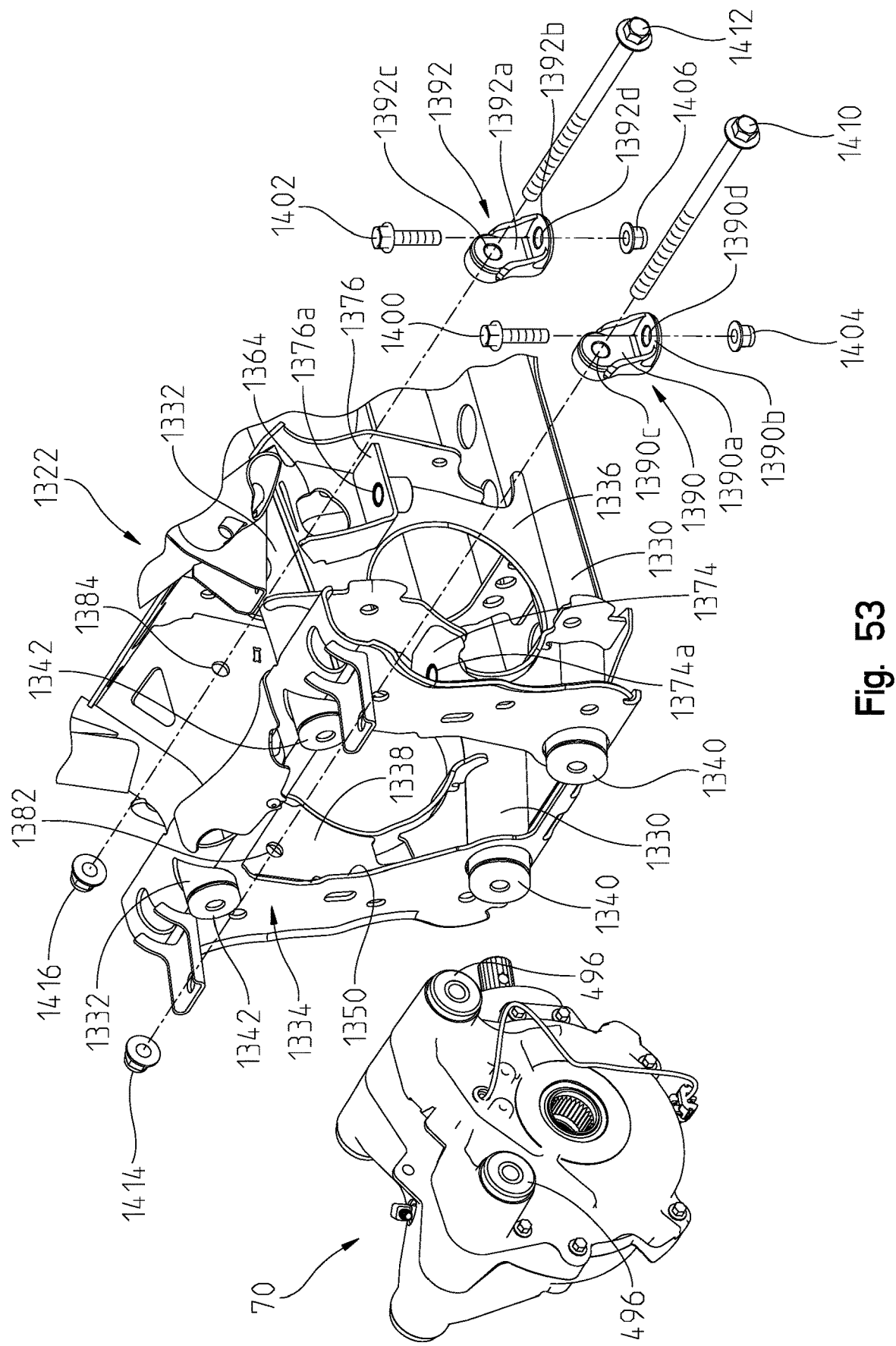
FIG. 53 is a front left perspective view of the final drive removed from the front frame portion of FIG. 51.
Figure 54:
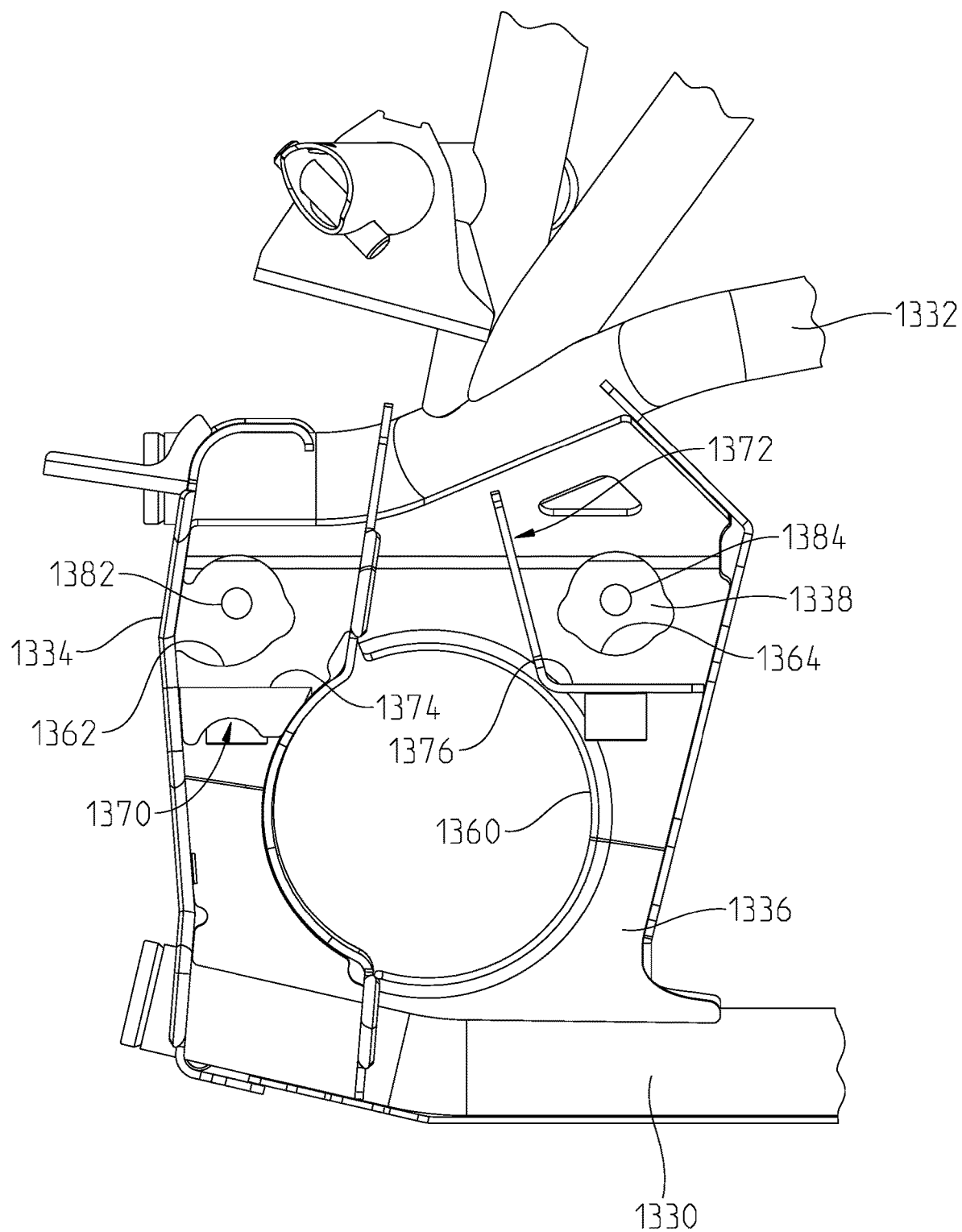
FIG. 54 is a left side view of front frame portion of FIG. 53.

As shown best in FIG. 53, lower longitudinal tube portions 1330 include threaded inserts 1340 whereas upper longitudinal tube portions 1332 include threaded inserts 1342. Front pedestal plate 1334 is coupled to the lower longitudinal tube portions 1340 and upper longitudinal tube portions 1342 and includes an opening 1350 generally conforming to allow the passage of front drive 70 therein, as will be described in greater detail herein. Side plate 1336 is generally coupled to the left-hand side lower longitudinal tube portion 1330 and upper longitudinal tube portion 1332, as best shown in FIG. 54. Left plate portion 1336 includes an opening at 1360 to allow access between front drive 70 and left front wheel. Left side plate 1336 further includes a front opening at 1362 and a rearward opening at 1364 which align with mounting inserts 496 (FIG. 53) as further described herein. A front pedestal 1370 is positioned below aperture 1362 and a rearward pedestal 1372 is positioned below opening 1364. Pedestal 1370 defines a mounting surface at 1374 while pedestal 1372 defines a mounting surface at 1376.

Figure 55:
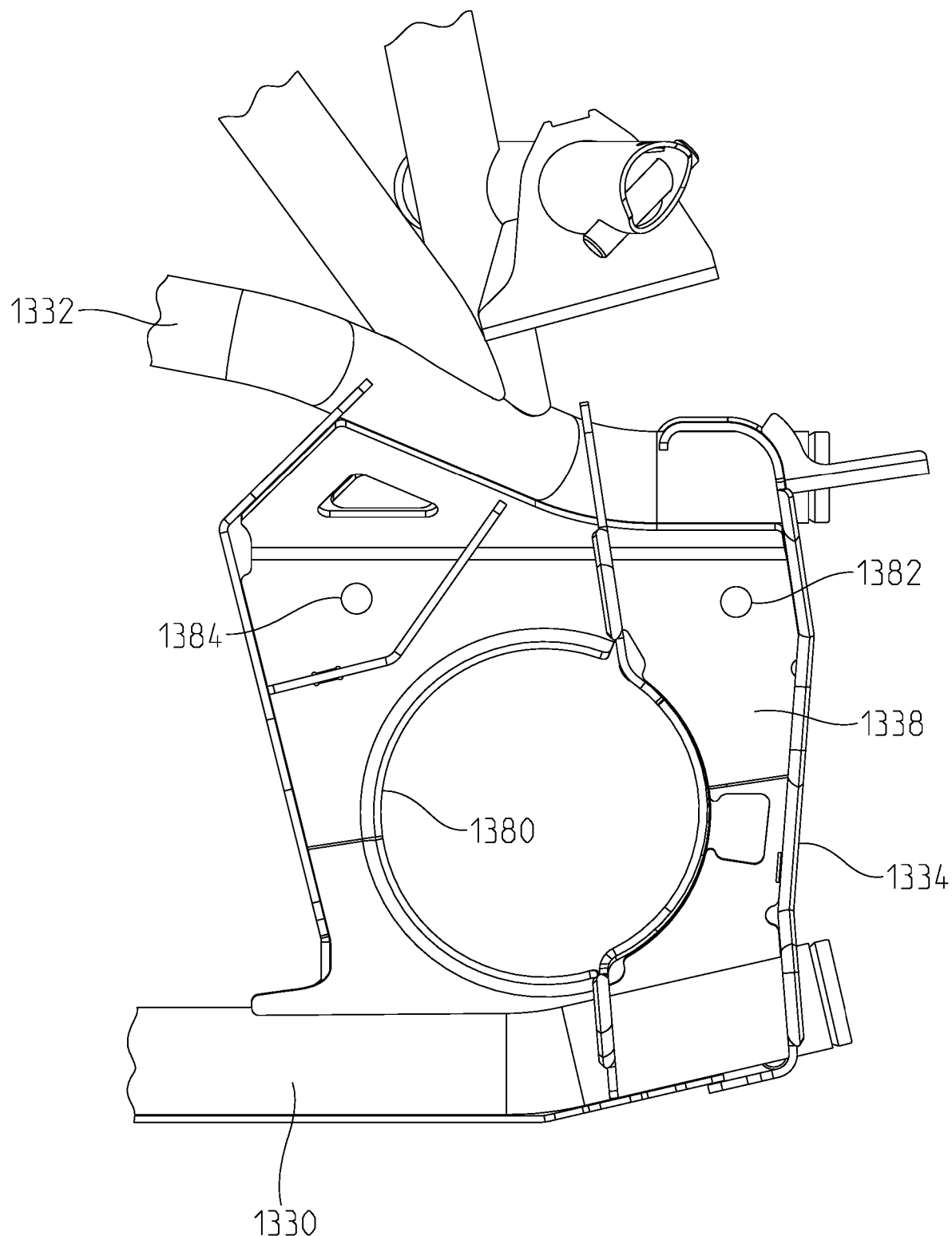
FIG. 55 is a right side view of front frame portion of FIG. 53.

With reference now to FIG. 55, right-hand side plate 1338 is coupled to lower longitudinal tube portions 1330, and upper longitudinal tube portions 1332. Plate 1338 includes an opening at 1380 and which is substantially identical to the opening 1370, and which allows access between right front wheel and final drive 70. Right plate 1338 also includes a forward aperture at 1382 and a rearward aperture at 1384. Note that apertures 1382 and 1384 align with, and may be viewed through, the left-hand side plate 1336 through openings 1362 and 1364, respectively, as viewed in FIG. 54.

With reference again to FIG. 53, front final drive 70 is insertable through opening 1350 through diaphragm plate 1334. The front final drive 70 is inserted until the mounting inserts 496 align with respective openings 1362 and 1364 (FIG. 54) of the left-hand side plate 1336. Mounting anchors 1390 and 1392 are provided, which are L-shaped in configuration having vertical portions 1390a, 1392a, horizontal portions 1390b and 1392b. Apertures 1390c, 1392c and 1390d and 1392d are provided for mounting as described herein. Anchors 1390 and 1392 align with mounting inserts 496 of front final drive 70 whereupon vertical portions 1390a and 1392a couple through openings 1362 and 1364 to contact mounting inserts 496. This positions the horizontal portions 1390b and 1392b upon pedestals 1374 and 1376, respectively. This also aligns apertures 1390d, 1392d with apertures 1374a and 1376a, respectively. Vertical fasteners 1400 and 1402 are receivable through apertures 1390d and 1392d, and apertures 1374a and 1376a to receive counter fasteners 1404 and 1406. At the same time, fastener 1410 is receivable through aperture 1390c, through the front mounting insert 496 and through aperture 1382 of right-hand side plate 1338 to receive a counter fastener 1414. In a like manner, fastener 1412 is receivable through aperture 1392c, rear mounting insert 496, through aperture 1384 to receive counter fastener 1416.

In the preferred method of installation, the horizontal fasteners 1410 and 1412 are inserted first while the vertical fasteners 1400, 1402 and anchors 1390, 1392 are loosely installed. The horizontal fasteners 1410 and 1412 are torqued to their nominal torque rating which provides no pre-load stress to the anchors 1390 and 1392. Rather, the anchors 1390 and 1392 remain resting upon their corresponding surfaces 1374 and 1376. Once the horizontal fasteners 1410 and 1412 are torqued, fasteners 1400 and 1402 may then be torqued to provide the final locating position of the front final drive 70.

With reference now to FIG. 52, removable bumper 1324 includes a plate 1430 to which bumper bar 1432 is attached. Fasteners 1434 are receivable through the plate portion 1430 and into threaded fasteners within couplers 1342. Thus, as should be appreciated, to remove front final drive 70, bumper 1324 is removed and front final drive 70 may be pulled through opening 1350 of 1334.

Figure 56:
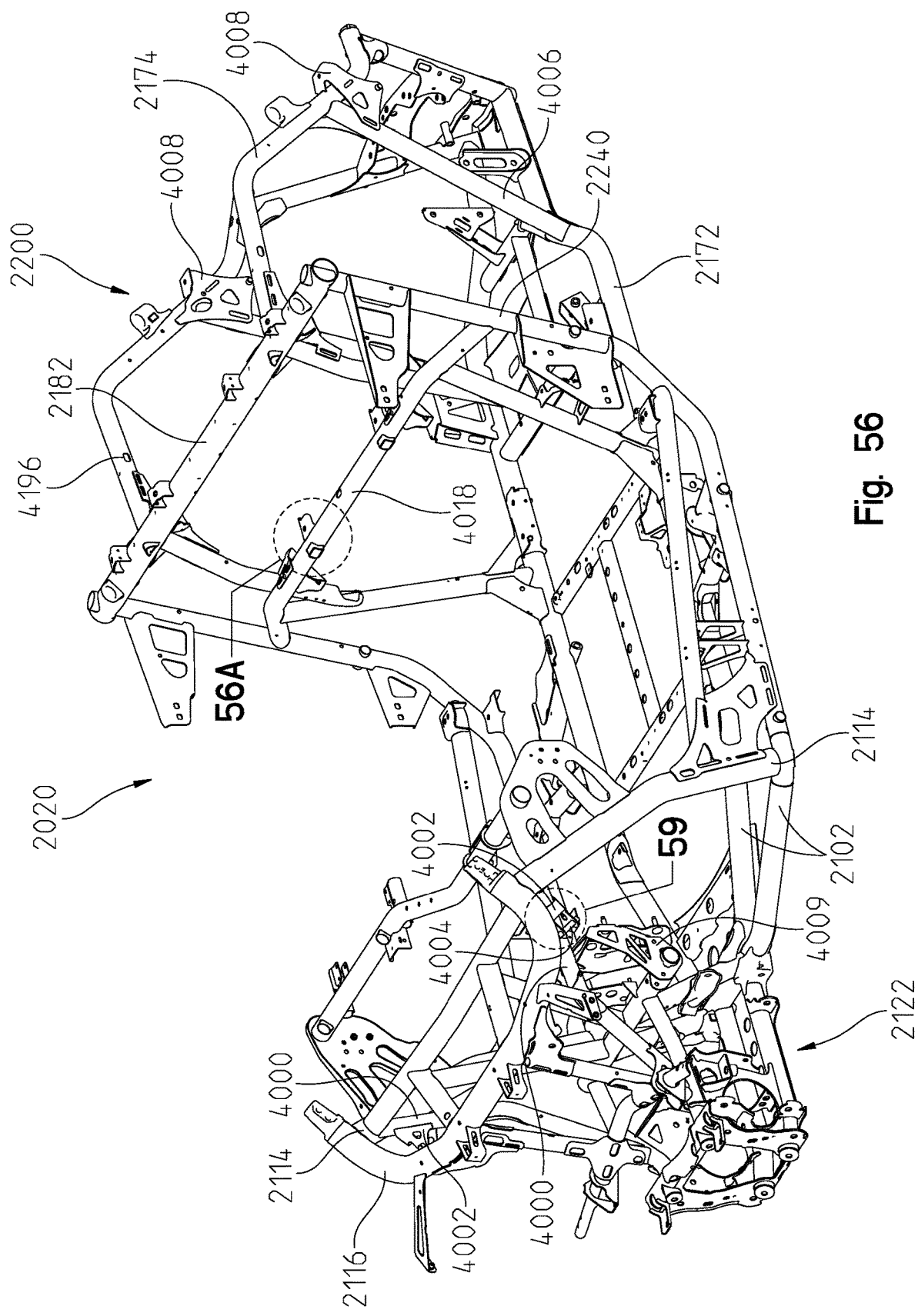
FIG. 56 is a left front perspective view of an alternative frame of the vehicle of FIG. 1.
Figure 114:
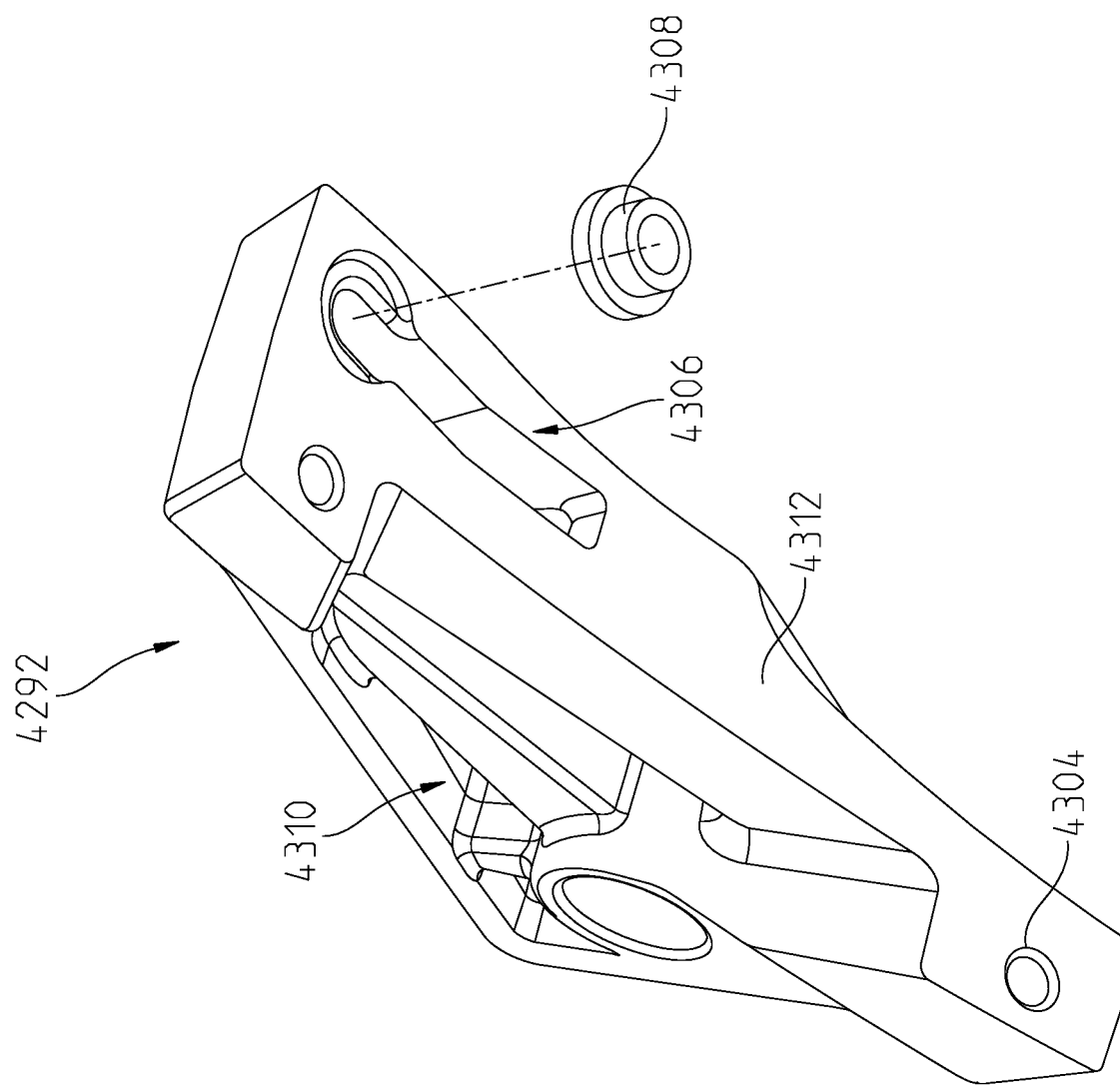
Figure 115:
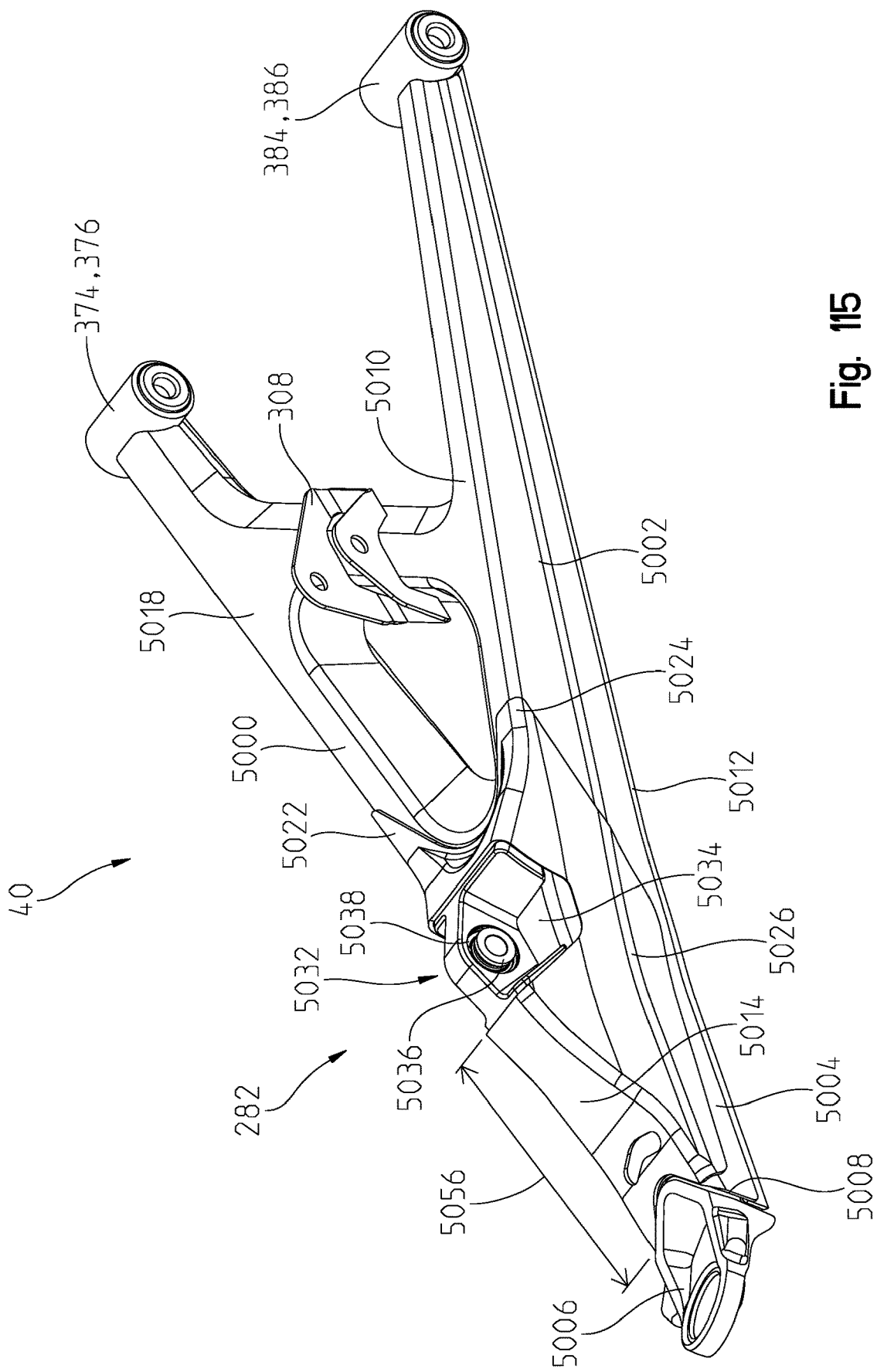

Referring to FIGS. 56-114, various alternative embodiments to those disclosed herein with respect to FIGS. 1-55 and/or additional features and systems of vehicle 2 are disclosed, with like components have the same or similar reference numbers. With respect to FIGS. 56-68, an alternative embodiment of frame 20 and cab frame 28 (FIGS. 1-9) are disclosed as frame 2020 and cab frame 2028. More particularly, as shown in FIGS. 56-60, frame 2020 includes frame tubes 2102 extending generally longitudinally and frame tubes 2114 extending generally vertically. Frame 2020 further includes frame members 4000 coupled to frame tubes 2114 and extending generally inward therefrom. Illustratively, frame 2020 includes at least two frame members 4000 and each includes a bracket 4002 coupled thereto. In various embodiments, bracket 4002 is integrally coupled with frame member 4000 and may be integrally formed with frame member 4000 (e.g., through welds, adhesive, or rivets). Bracket 4002 includes a tie-down member 4004 which, illustratively, defines a bar or other structure configured to support a load coupled thereto. In this way, bracket 4002 and tie-down member 4004 define an integrated tie-down assembly supported by frame 2020 such that a load at tie-down member 4004 and bracket 4002 also is supported by frame 2020 and may be distributed through at least a portion of frame 2020.

Referring still to FIGS. 56-60, frame 2020 may include additional brackets 4008 and tie-down members 4010. For example, bracket 4009 may include a tie-down member similar to tie-down member 4004 or, as disclosed further herein, similar to a tie-down member 4010. Additionally, a rear portion of frame 2020 includes frame tubes 2172 extending generally longitudinally and frame tubes 2240 and 4006 extending generally vertically and coupled with and/or positioned adjacent frame tubes 2172. Illustratively, frame tubes 4006 are positioned longitudinally rearward of frame tubes 2240 and are coupled directly with frame tubes 2172. In one embodiment, frame 2020 includes at least two frame tubes 4006 and each frame tube 4006 includes bracket 4008 integrally coupled thereto. Bracket 4008 also is integrally coupled with frame tube 2174, which is positioned above frame tubes 2240 and 4006 and extends generally longitudinally. As shown in at least FIG. 57, an upper portion 4012 of bracket 4008 is integrally coupled with frame tube 2174 and a lower portion 4014 of bracket 4008 is integrally coupled with frame tube 4006.

Bracket 4008 includes tie-down member 4010 which, illustratively, defines a bar or other structure configured to support a load coupled thereto. In one embodiment, tie-down member 4010 is coupled to lower portion 4014 of bracket 4008, however, tie-down member 4010 can be coupled to any portion of bracket 4008. In this way, bracket 4008 and tie-down member 4010 define an integrated tie-down assembly supported by frame 2020 such that a load at tie-down member 4010 and bracket 4008 also is supported by frame 2020 and may be distributed through at least a portion of frame 2020.

It may be appreciated that brackets 4002, 4008 and tie-down members 4004, 4010 may be positioned at any height along frame 2020. Additionally, brackets 4002, 4008 and tie-down members 4004, 4010 may be positioned within a predetermined lateral distance of a longitudinal centerline L (FIG. 5) of vehicle 2. For example, tie-down members 4004, 4010 may be positioned laterally outboard of centerline L by approximately 12-36 inches and, more particularly, may be positioned laterally outboard of centerline L by approximately 24 inches. Further, as shown, both the left and right sides of vehicle 2 include tie-down members 4004, 4010 such that there is at least one tie-down member 4004, 4010 on each lateral side of centerline L. Additionally, tie-down members 4004, 4010 may include a double-shear clevis attachment for loading the corresponding frame tubes and distributing the load to these sections or tubes or frame 2020.

Figure 61:
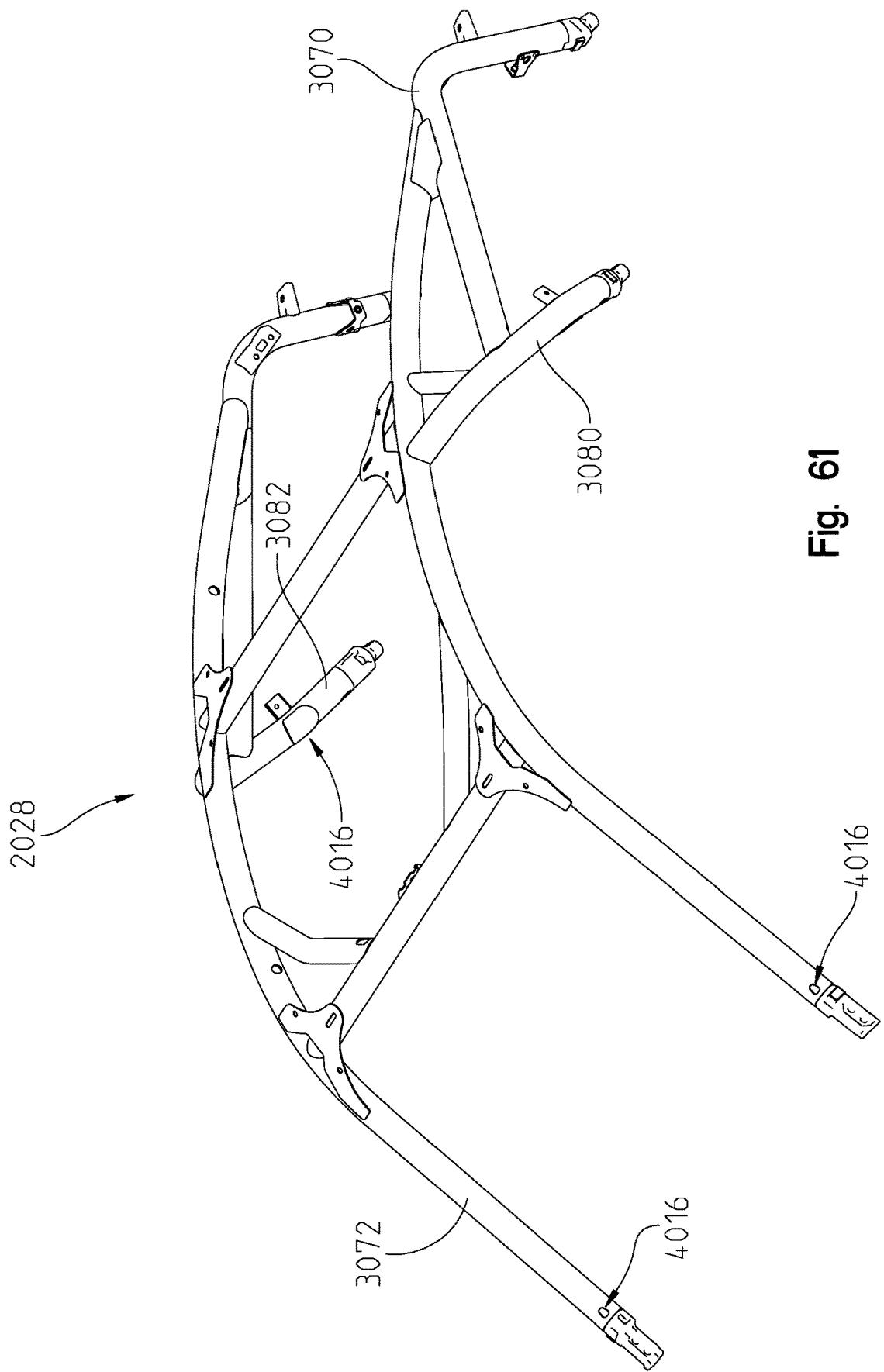
FIG. 61 is a left front perspective view of the cab frame of FIG. 58.
Figure 62:
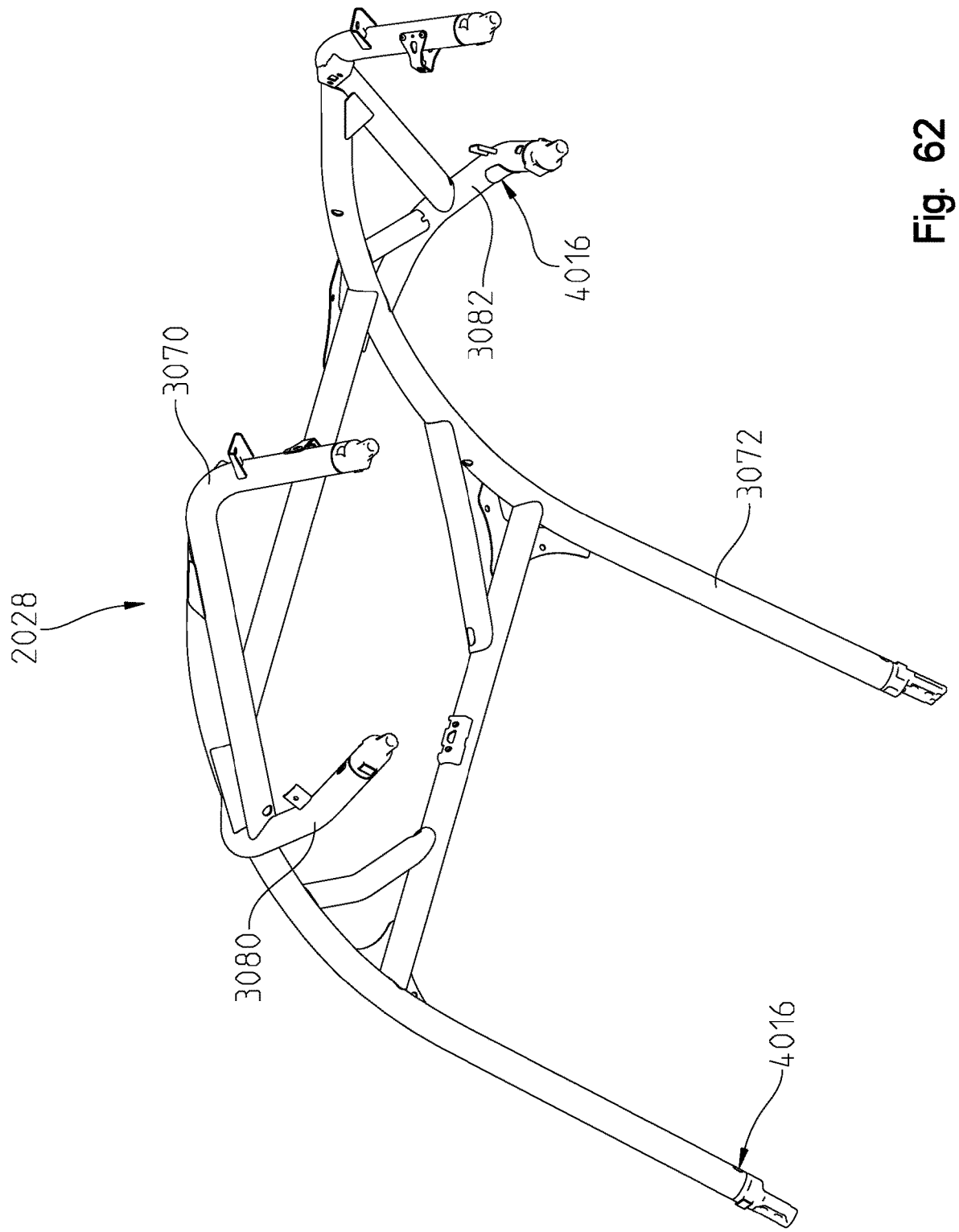
FIG. 62 is a left rear perspective view of an underside of the cab frame of FIG. 61.
Figure 63:
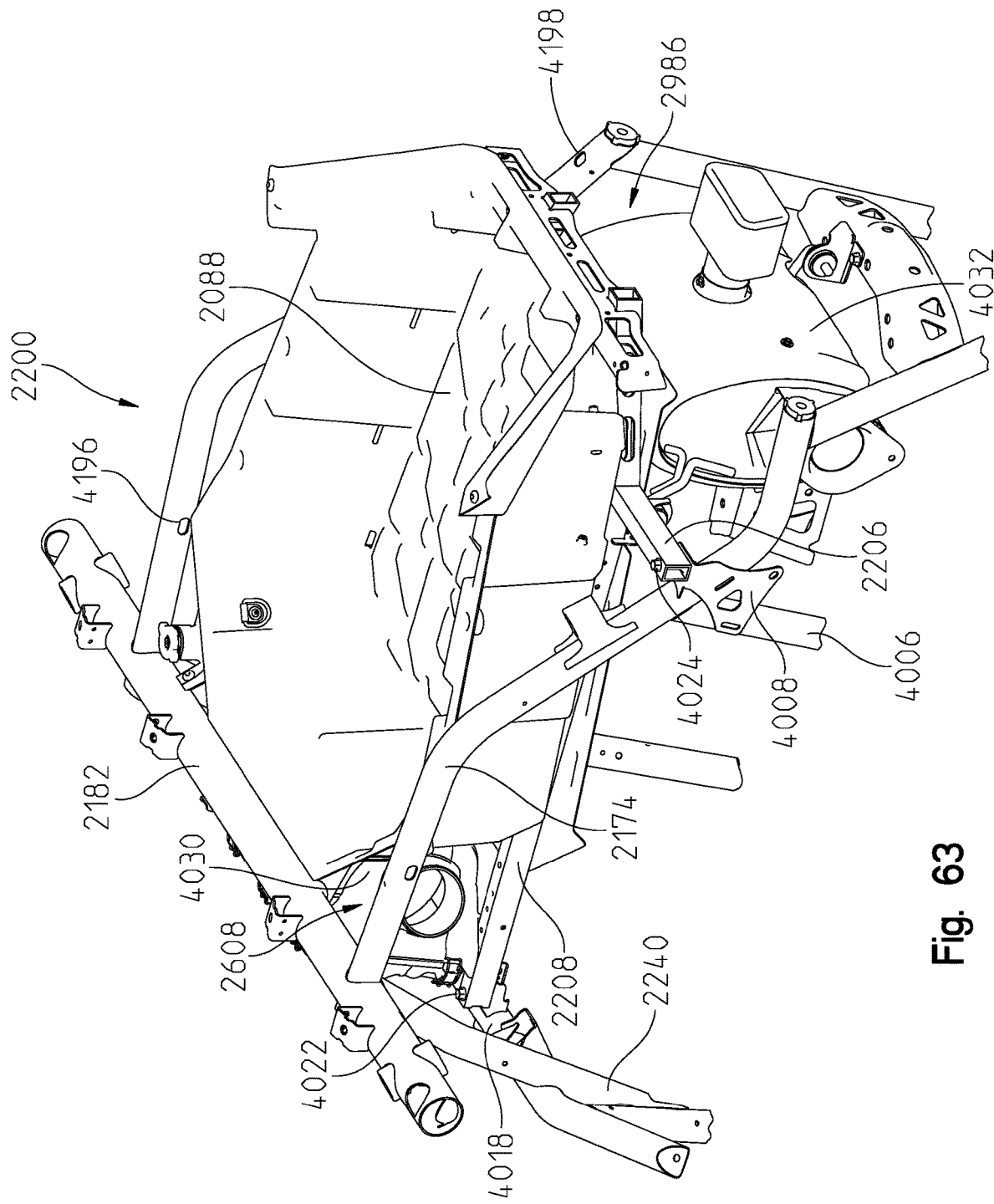
FIG. 63 is a left rear perspective view of a support area of a rear portion of the frame of FIG. 57 configured to support a utility bed, a portion of an air intake, a portion of an exhaust, and a portion of a cooling system.
Figure 64:
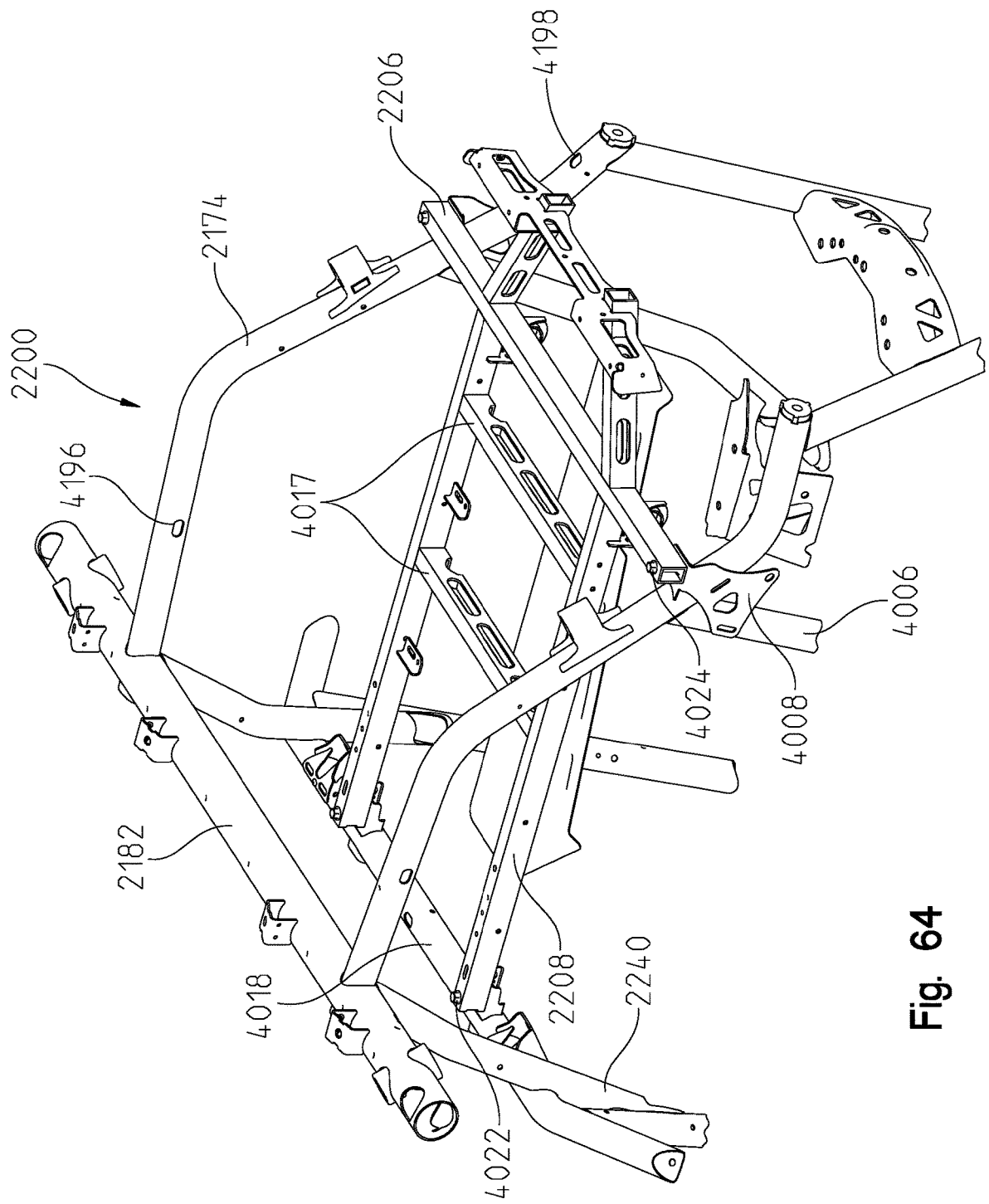
FIG. 64 is a left rear perspective view of the support area of FIG. 63.
Figure 65:
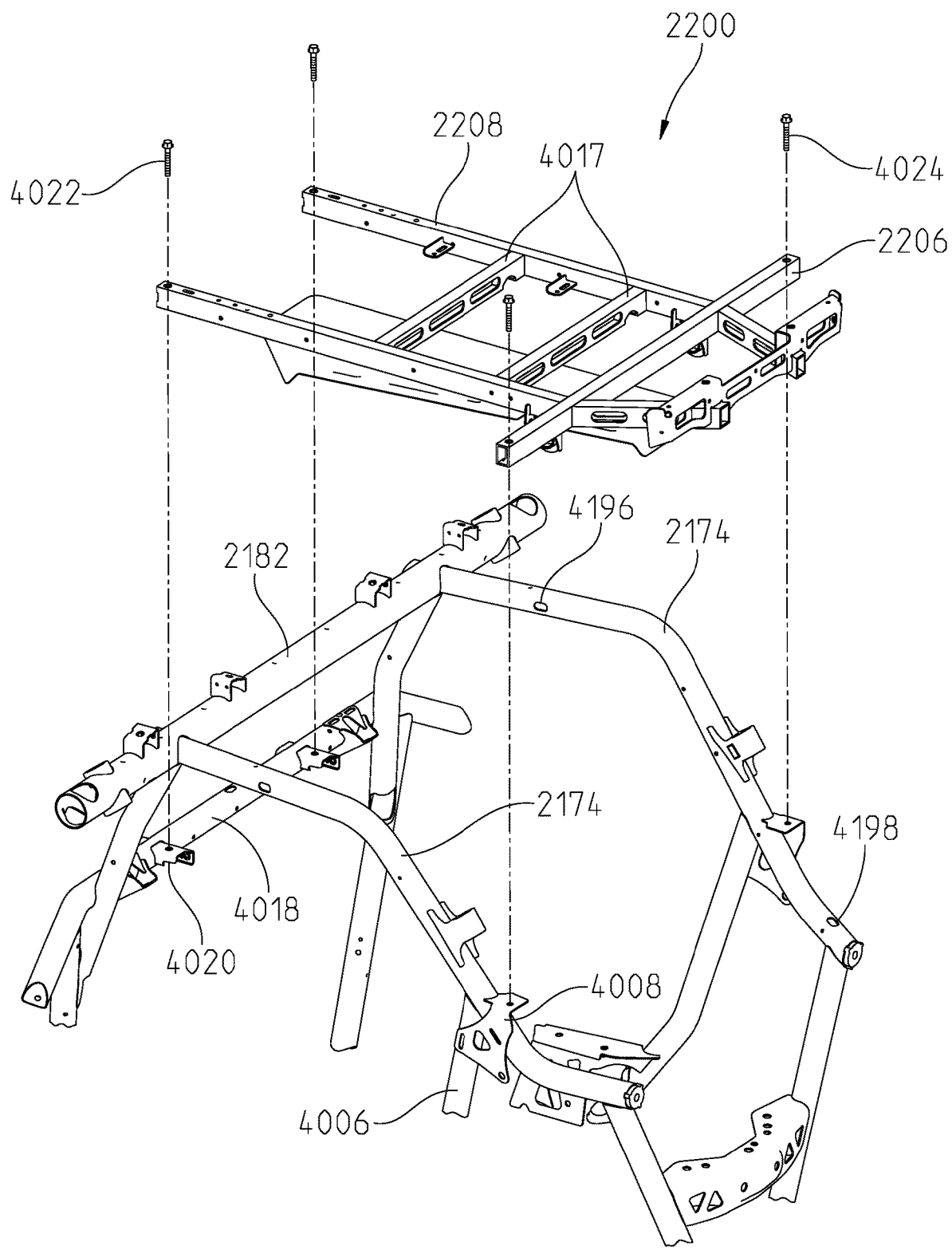
FIG. 65 is an exploded view of the support area of FIG. 64.

Referring to FIGS. 61 and 62, alternative embodiment cab frame 2028 (compared to that shown in FIGS. 1-9 and 46-50) is shown. Cab frame 2028 extends over seats 24, 26 (FIG. 1) and is coupled to frame 2020. Cab frame 2028 includes frame members or frame portions 3070, 3072, 3080, 3082, each of which is coupled to frame 2020 (FIG. 56) through complementary couplers. In one embodiment, cab frame 2028 is a single weldment such that frame members 3070, 3072, 3080, 3082, and any other frame member of cab frame 2028 are integrally formed together (e.g., define a single weldment). Various frame members or portions of cab frame 2028 may include openings or apertures 4016 configured to expose an inner volume of such frame members or portions. Openings 4016 are illustratively shown on frame portions 3072 and 3082, however, openings 4016 may be positioned on frame members or portions 3070 and/or 3080. Openings 4016 are configured as pass-through openings to allow various wires, conduits, lines, or other components of vehicle 2 to extend within cab frame 2028 rather than being exposed such that these components may extend between frame members 3072 and frame portions 3080, 3082 without being exposed to seating area 22 (FIG. 1). This may protect such components from damage or wear and also may increase the aesthetics of vehicle 2.

Referring to FIGS. 63-68, the rear portion of frame 2020 includes alternative embodiment utility bed support area 2200 (compared to support area 200 of at least FIGS. 8 and 9). Support area 2200 includes tubes 2206 and 2208, where tubes 2208 extend generally longitudinally and are coupled with tube 2206, which extends generally laterally and perpendicularly to tubes 2208. Support area 2200 further includes braces 4017 extending between tubes 2208 and generally parallel to tube 2206. Illustratively, braces 4017 are positioned longitudinally forward of tube 2206.

In one embodiment, tubes 2208 are removably coupled to brackets 4020 on a cross-member 4018 with fasteners 4022. Cross-member 4018 may be part of frame 2020 and coupled to frame tubes 2240. As shown in at least FIGS. 64 and 65, cross-member 4018 is positioned vertically lower than transverse tube 2182. Tubes 2208 extend longitudinally from cross-member 4018 and a rear end of tubes 2208 is coupled with tube 2206.

Figure 56A:
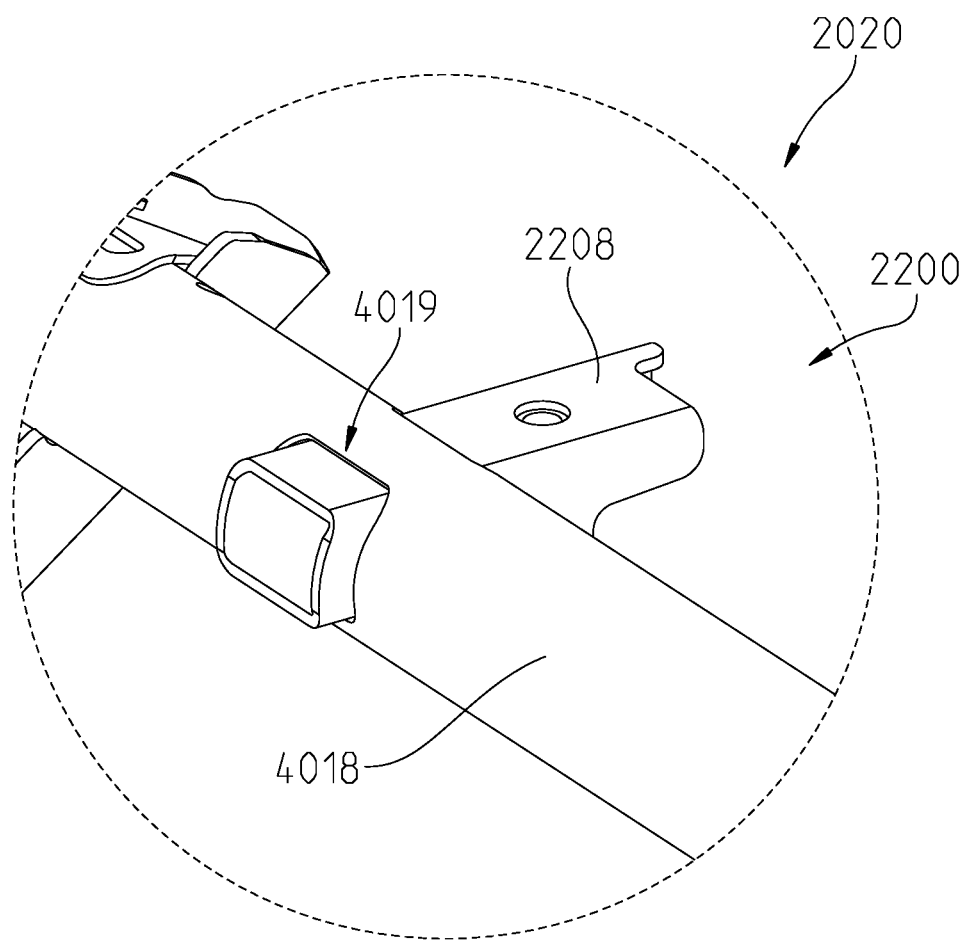
FIG. 56A is a left front perspective view of a portion of the frame of FIG. 56.
Figure 57:
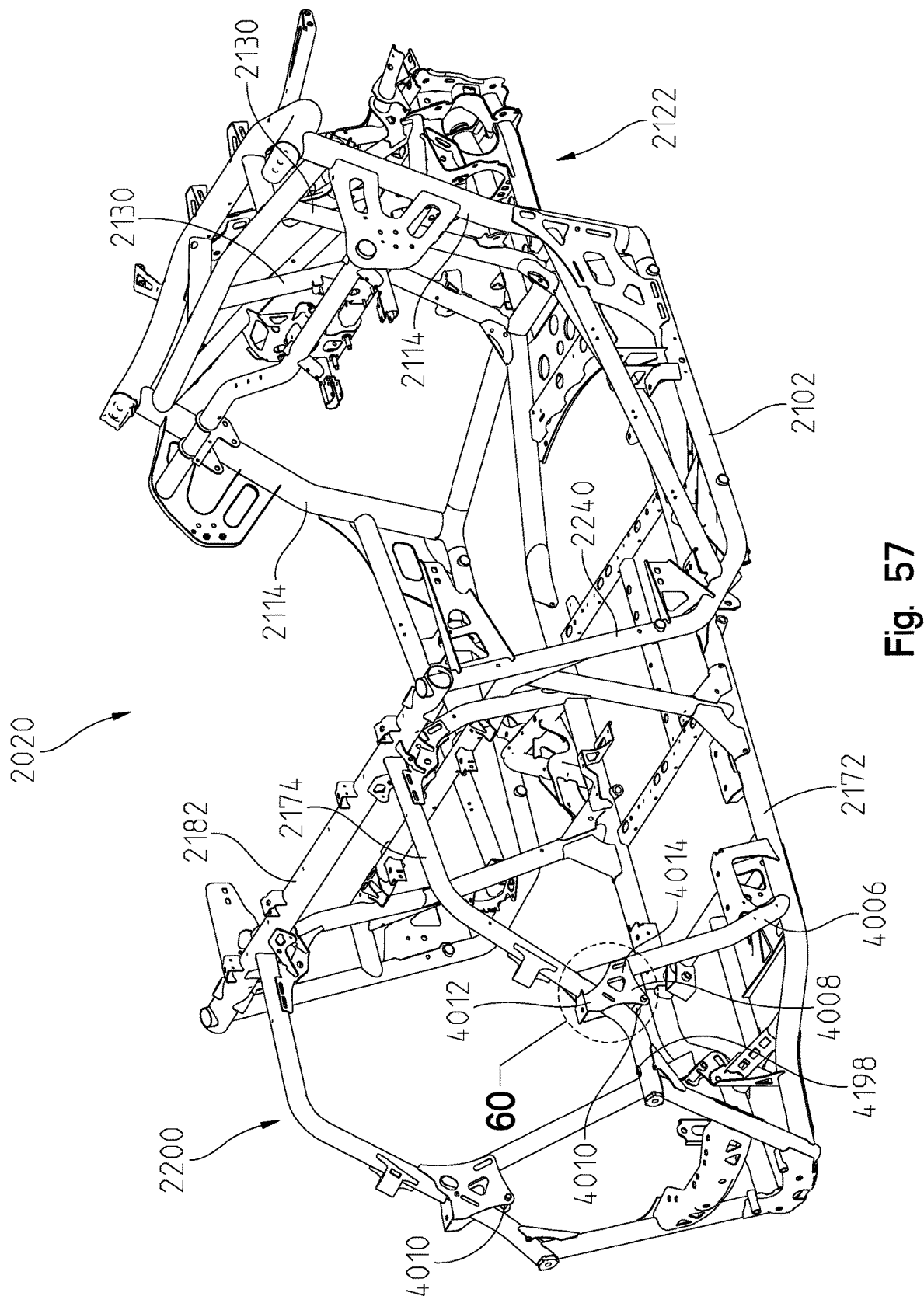
FIG. 57 is a right rear perspective view of the frame of FIG. 56.
Figure 58:
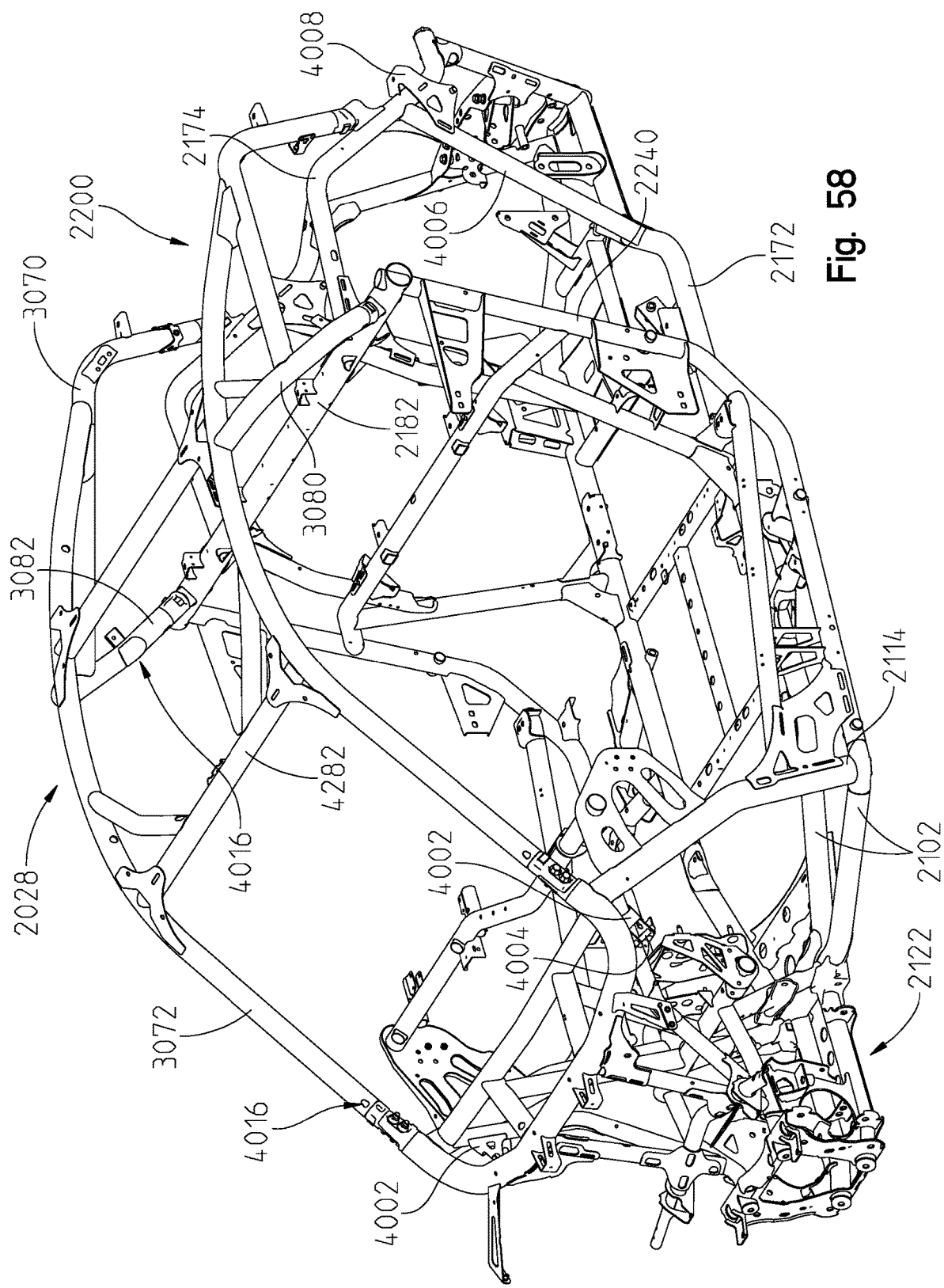
FIG. 58 is a left front perspective view of the frame of FIG. 56 coupled to an alternative cab frame.
Figure 60:
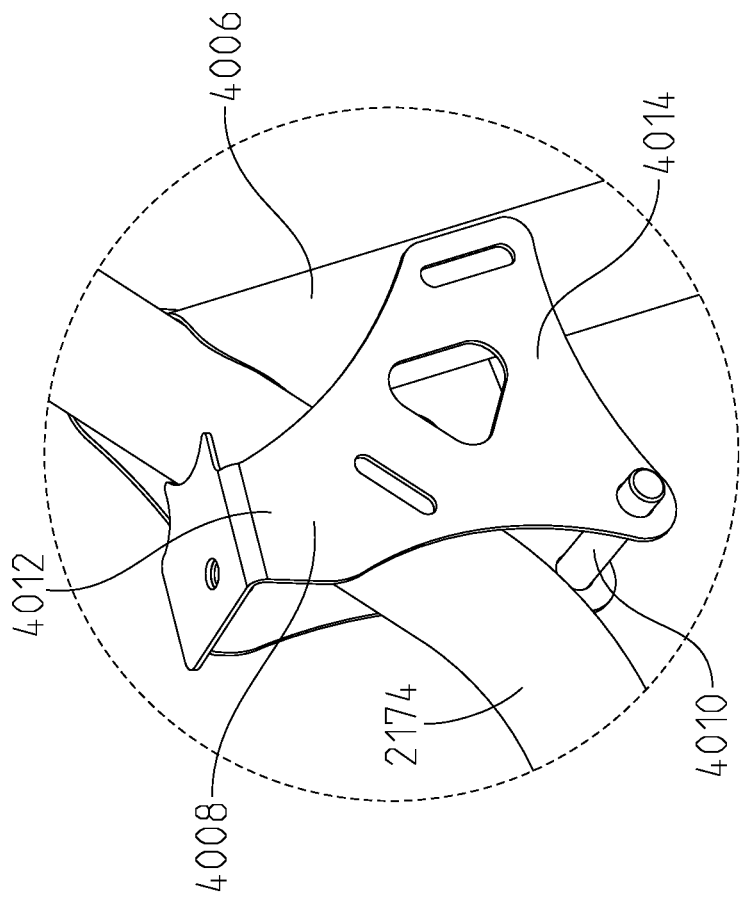
FIG. 60 is a detailed perspective view of a tie-down member of the frame of FIG. 57.
Figure 59:
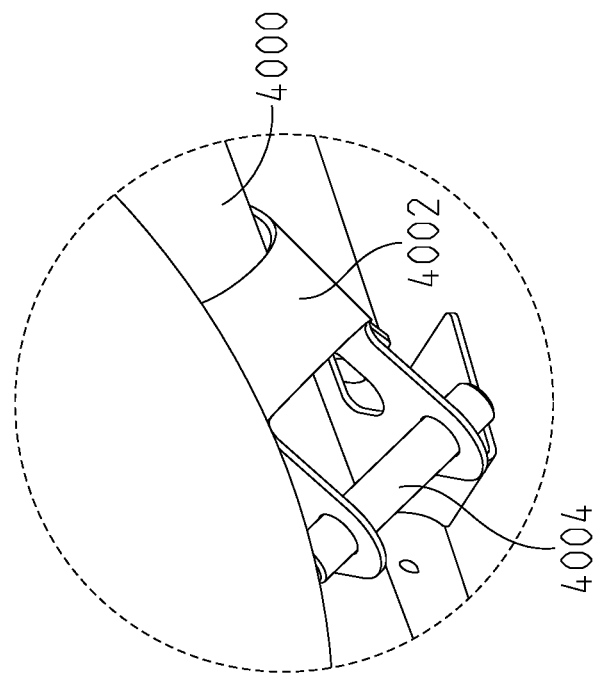
FIG. 59 is a detailed perspective view of a tie-down member of the frame of FIG. 56.

As shown best in FIG. 56A, brackets 4020 are coupled to cross-member 4018 and, more particularly, brackets 4020 extend through a recess or opening 4019 of cross-member 4018. Illustratively, opening 4019 is a pass-through opening in which a portion of bracket 4020 extends completely through opening 4019. In this way, a forward portion of bracket 4020 is positioned forward of cross-member 4018 and a rearward portion of bracket 4020 is positioned rearward of cross-member 4018. Bracket 4020 may be welded or otherwise permanently fixed to cross-member 4018 at opening 2019 such that the welded or fixed joint therebetween fully surrounds opening 4019 and increases the size of the welded or fixed joint. Alternatively, the welded or fixed joint may be positioned at a portion of opening 4019 and may not fully surround opening 2019. This configuration of brackets 4020 and cross-member 4018 allows for support area 2200 to be able to support multiple components of vehicle 2, such as coolant bottle 3000, utility bed 2088, and portions of air intake assembly 2608 and exhaust 2986, as disclosed further herein, because the load from such components may be distributed through other portions of frame 2020 (e.g., cross-member 4018) and does not need to be supported only at brackets 4020 and tubes 2208.

Tube 2206 is removably coupled to brackets 4008 with fasteners 4024. As shown best in FIGS. 63-65, upper surfaces of tubes 2206 and 2208 and braces 4017 are flush with each other such that tubes 2206, 2208 and braces 4017 define a generally planar or flat surface. In this way, support area 2200 is configured to support at least one component of vehicle 2 thereon and, more particularly, is configured to support utility bed 2088 thereon.

Figure 67:
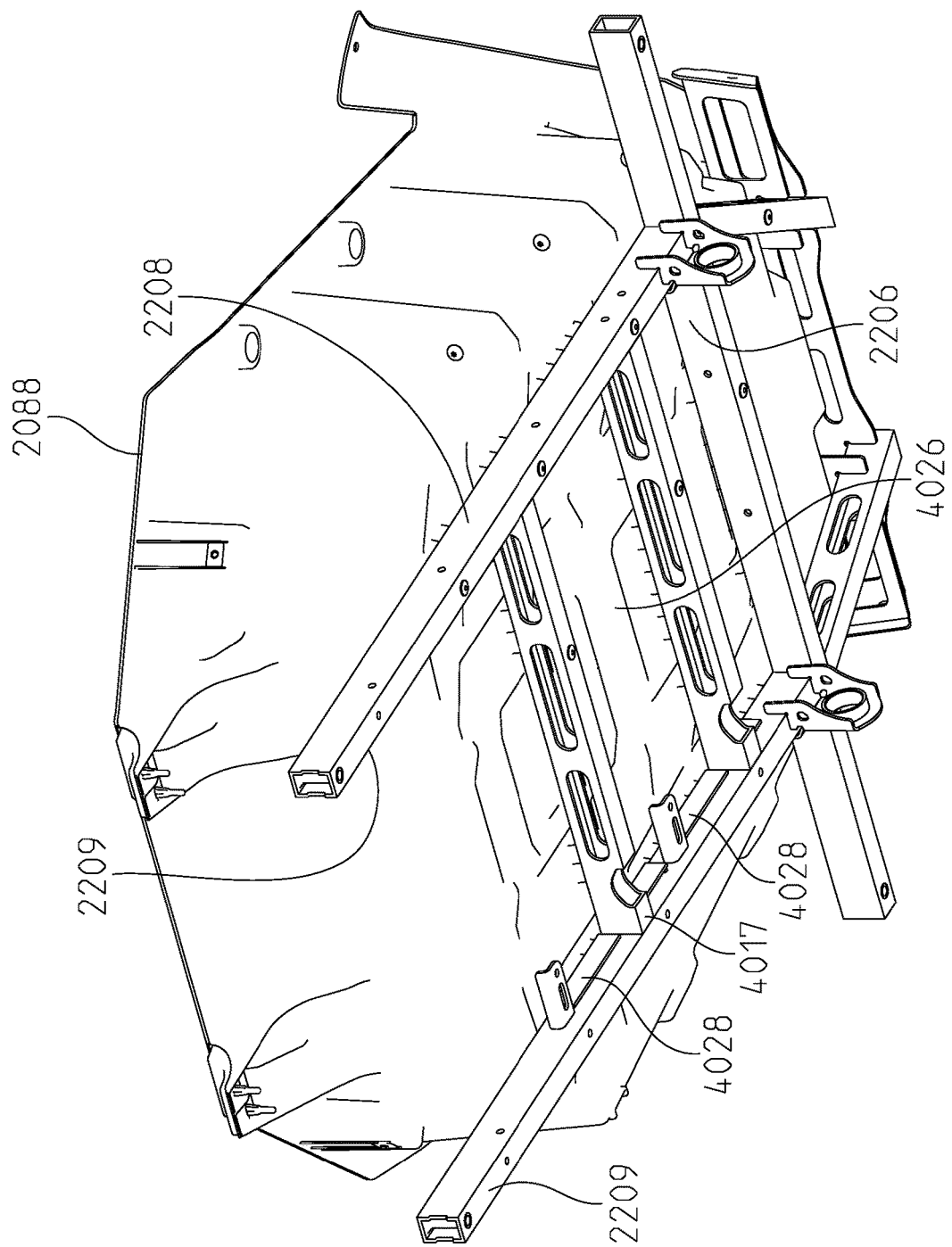
FIG. 67 is a right rear perspective view of the underside of the support area of FIG. 66.
Figure 68:
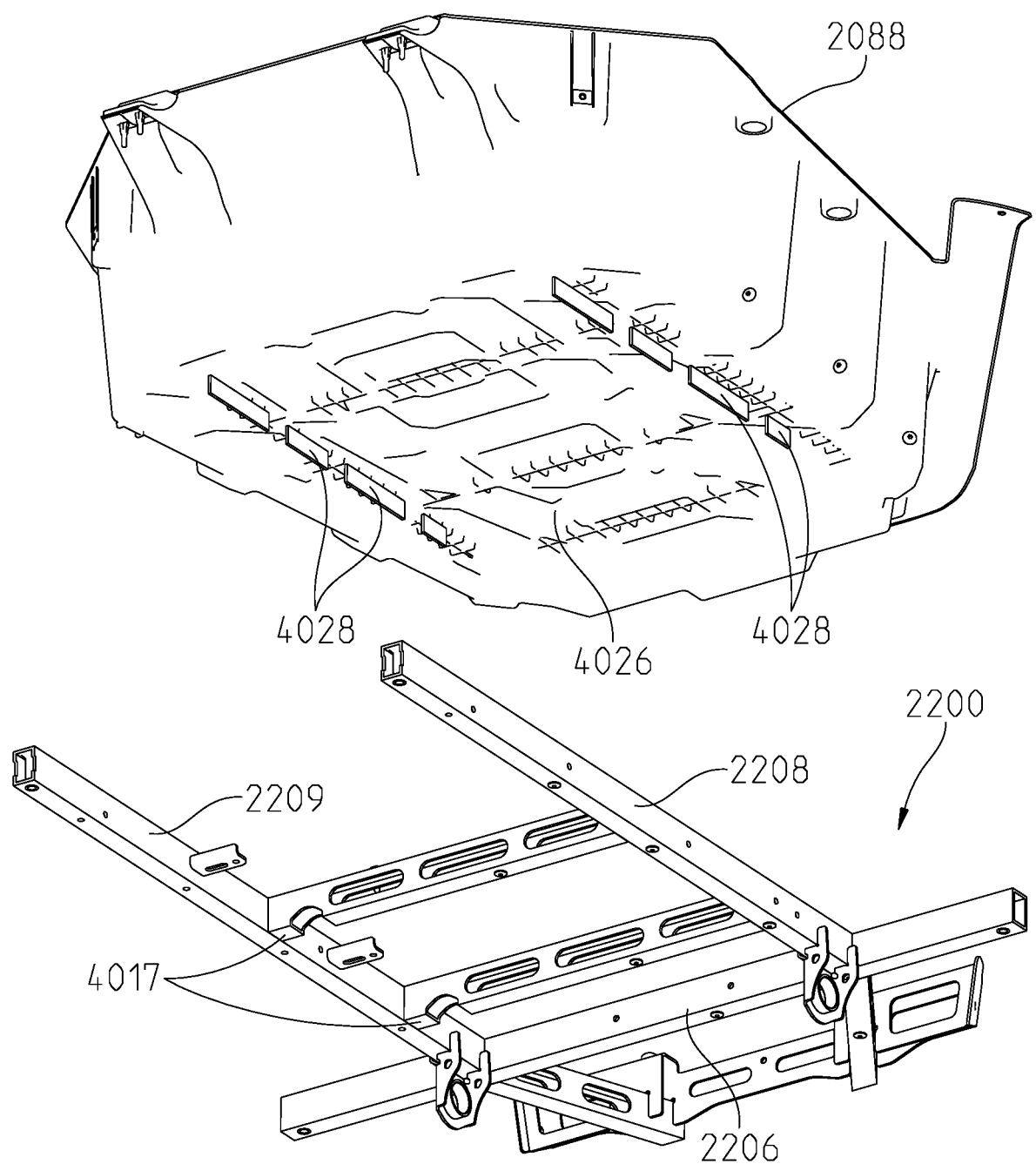
FIG. 68 is an exploded view of the support area of FIG. 67.

Referring to FIGS. 67 and 68, a bottom surface 4026 of utility bed 2088 includes guides 4028. Guides 4028 extend downwardly from bottom surface 4026 and may be removably coupled to bottom surface 4026 or may be integrally formed with bottom surface 4026. Guides 4028 are configured to extend along a laterally inner surface 2209 of tubes 2208 such that guides 4028 laterally overlap a portion of tubes 2208. In this way, when utility bed 2208 is positioned on support area 2200, guides 4028 are positioned along and in contact with inner surface 2209 of tubes 2208 such that utility bed 2088 is in the correct position for centering on and securing to support area 2200. It may be appreciated that guides 4028 are configured to be spaced apart from each other, where necessary, to receive or otherwise accommodate components of support area 2200, such as braces 4017. When correctly positioned on support area 2200, utility bed 2088 may be fastened thereto with couplers, such as bolts, screws, ties, etc.

Figure 66:
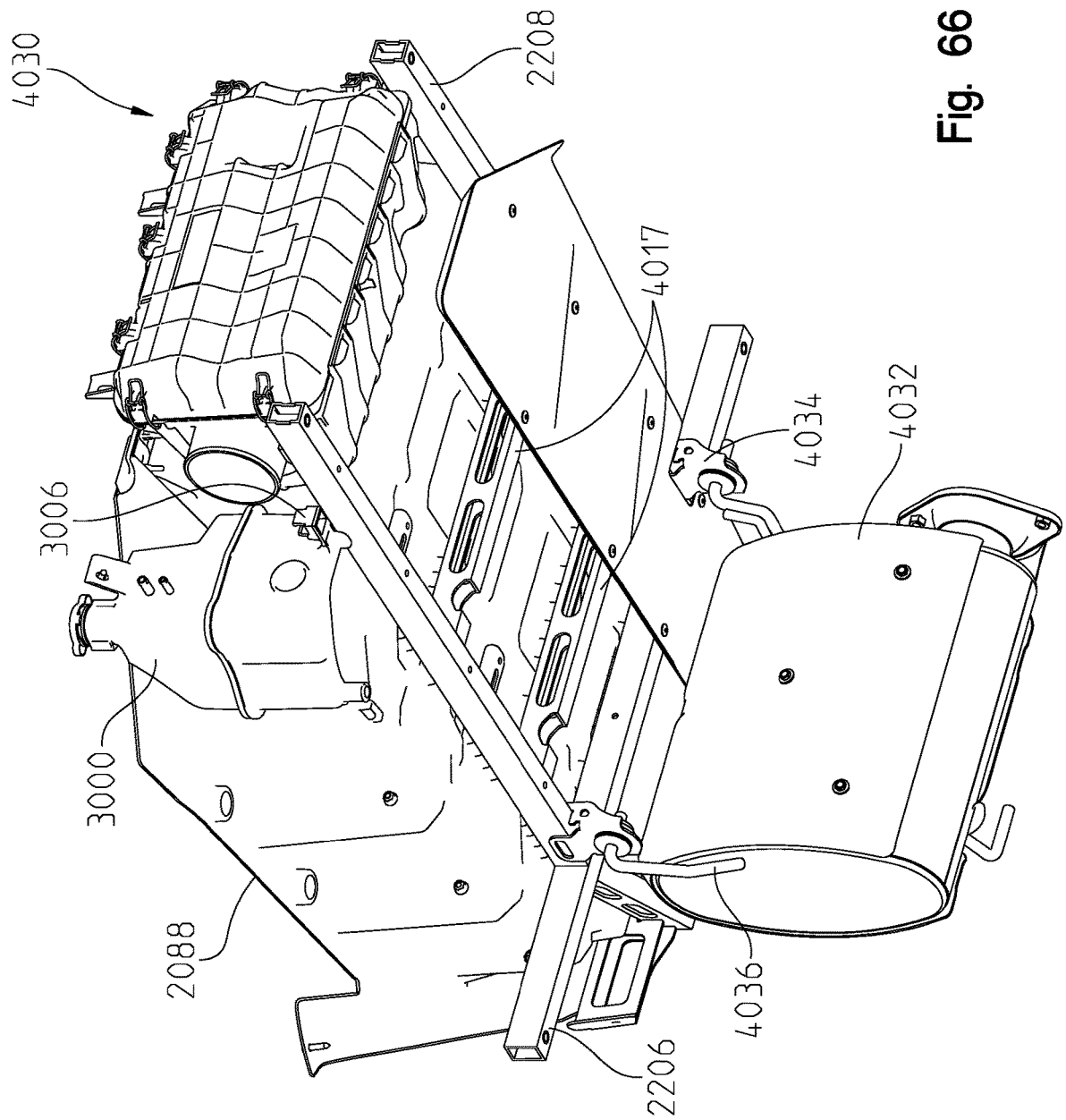
FIG. 66 is a left rear perspective view of an underside of the support area of FIG. 63.

Referring still to FIGS. 63-68, support area 2200 not only supports utility bed 2088 but also is configured to support additional components of vehicle 2. For example, as shown best in FIGS. 63 and 66, support area 2200 is configured to support a portion of air intake assembly 2608, a portion of exhaust assembly 2986, a portion of the cooling assembly of vehicle 2 (e.g., coolant bottle 3000), and various panels of outer body 80 (e.g., rear fenders, rear close-off panels, rear bumper, etc.). Illustratively, a forward portion of support area 2200 supports and may be coupled to an airbox 4030 of air intake assembly 2608 such that airbox 4030 is supported on at least tubes 2208. Additionally, a rearward portion of support area 2200 supports and may be coupled to a muffler or silencer 4032 of exhaust assembly 2986. As shown in FIG. 66, brackets 4034 extend from at least tubes 2208 and are coupled to support arms 4036 which are attached to muffler 4032.

Figure 69:
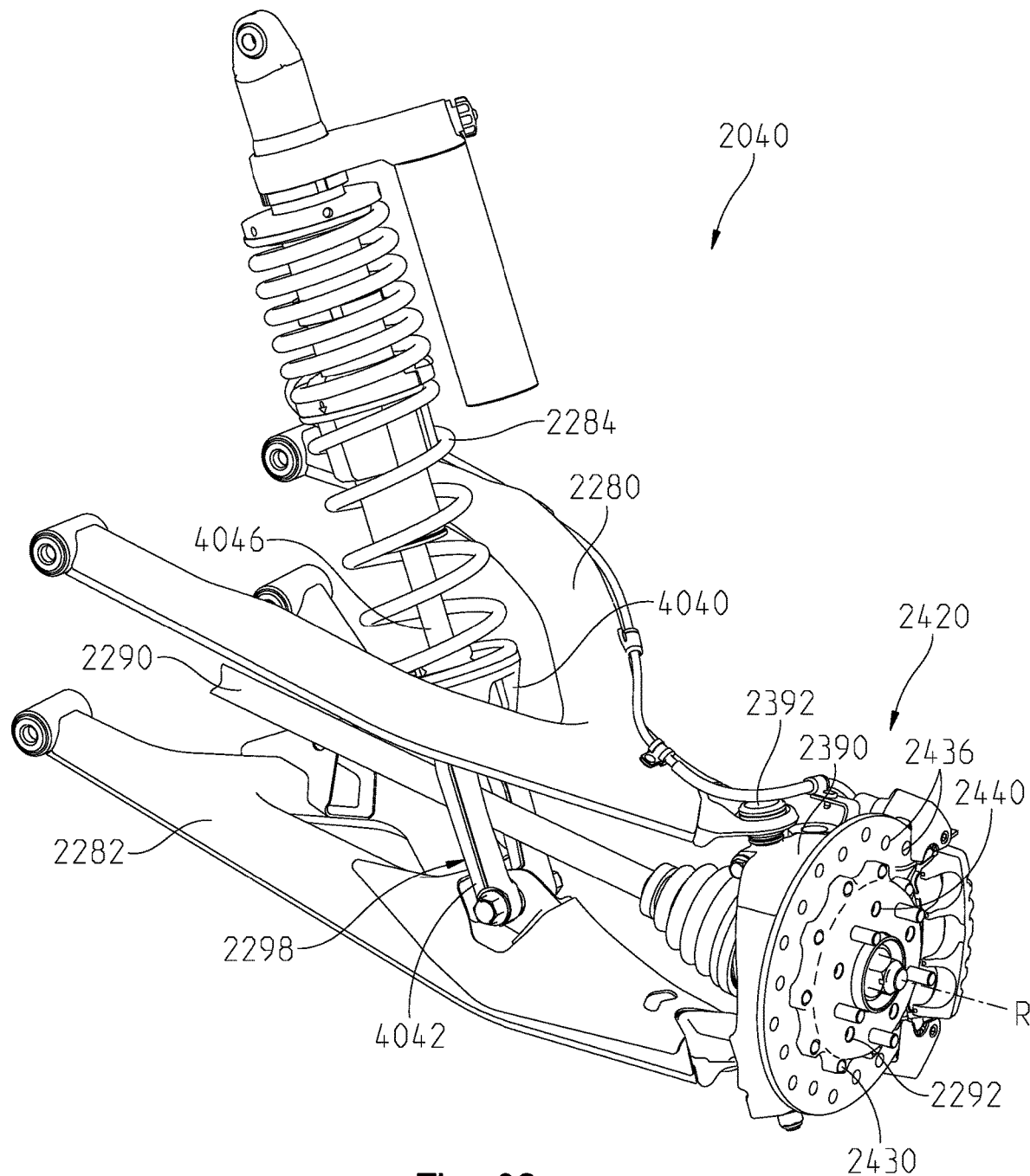
FIG. 69 is a left front perspective view of a portion of an alternative front suspension of the vehicle of FIG. 1.
Figure 70:
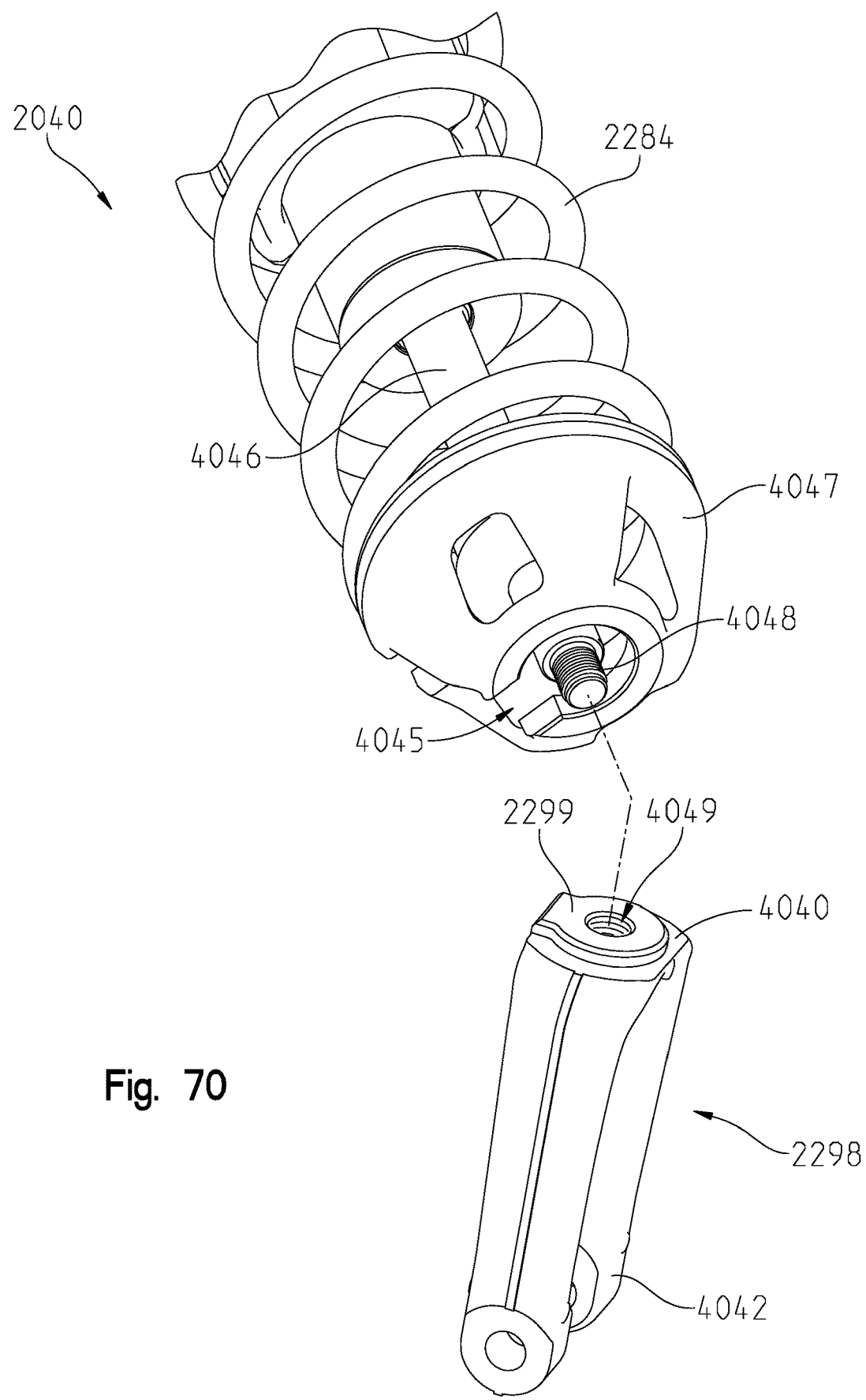
FIG. 70 is an exploded view of a lower portion of a linear force element of the front suspension of FIG. 69 and a clevis of the linear force element.
Figure 71:
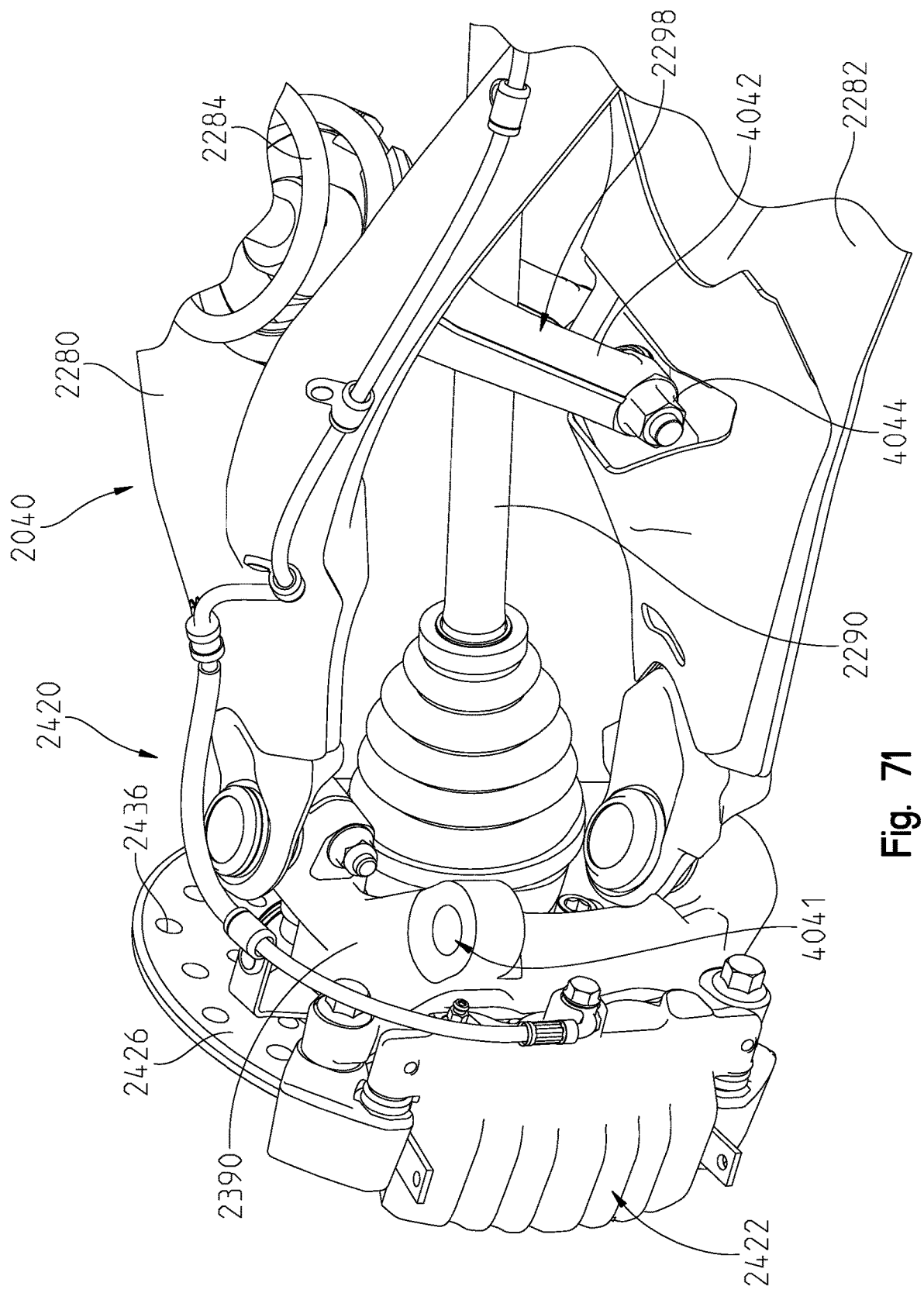
FIG. 71 is a right rear perspective view of an alternative front braking system of the vehicle of FIG. 1.
Figure 73:
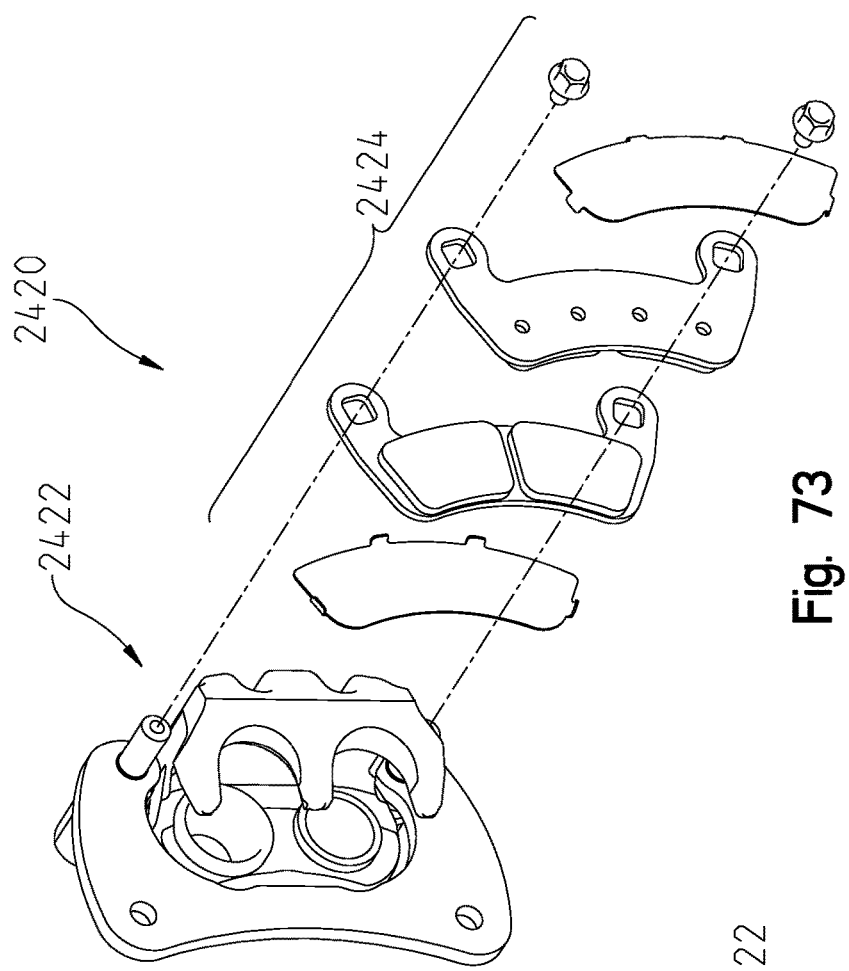
FIG. 73 is an exploded view of the brake caliper and brake pads of the front braking system of FIG. 72.
Figure 72:
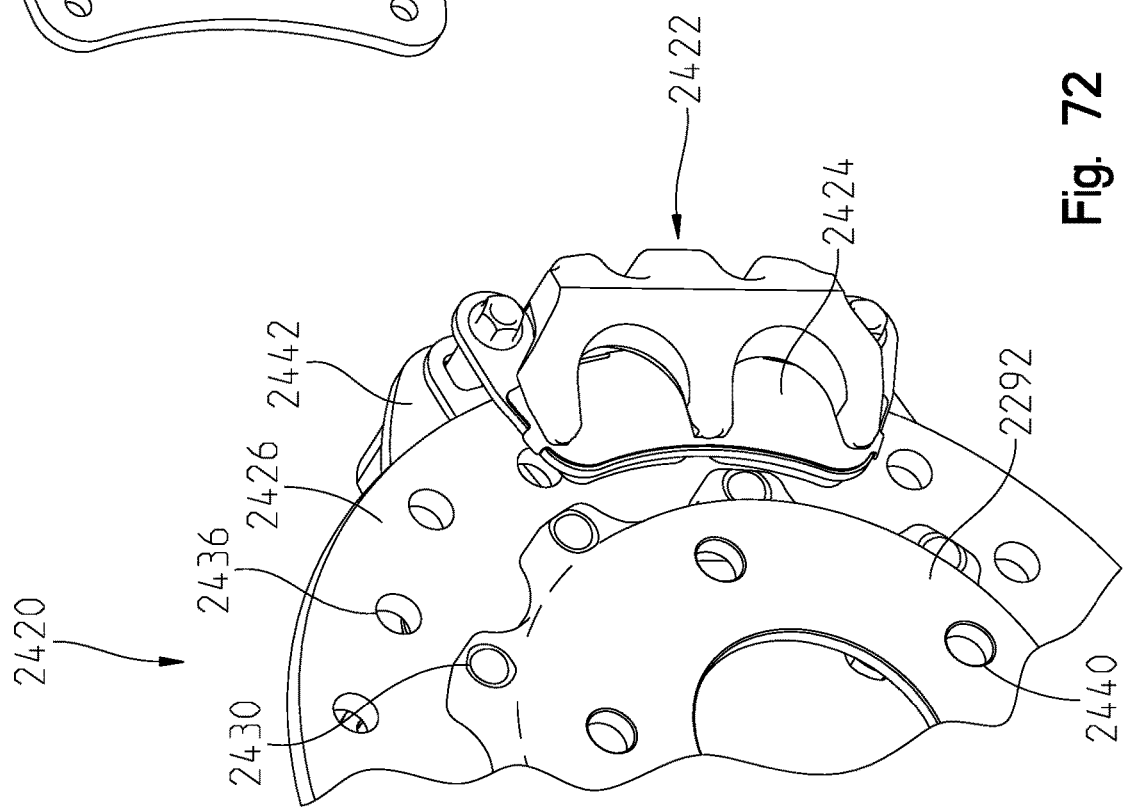
FIG. 72 is a left front perspective view of a brake disc and brake caliper of the front braking system of FIG. 71.

Referring to FIGS. 69 and 70, front suspension 2040 is shown. As noted herein with respect to FIGS. 12 and 13, front suspension 2040 includes upper alignment arm or A-arm 2280, lower alignment arm or A-arm 2282, and LFE or shock absorber 2284. LFE 2284 is operably coupled to lower A-arm 2282 through a clevis 2298. More particularly, clevis 2298 has a generally U-shaped body extending between an upper end 4040 and a lower end 4042. Lower end 4042 is removably coupled to lower A-arm 2282 with a fastener 4044, such as a bolt. Clevis 2298 is configured to receive or straddle a portion of half shaft 2290 such that clevis 2298 and LFE 2284 do not interfere with the desired location or rotational movement of half shaft 2290. In this way, half shaft 2290 is positioned vertically intermediate upper and lower ends 4040, 4042 of clevis 2298.

As shown best in FIG. 70, upper end 4040 of clevis 2298 is coupled to a lower portion of LFE 2284. More particularly, upper end 4040 of clevis 2298 includes an aperture 4049 configured to receive a threaded end 4048 of LFE 2284. Threaded end 4048 is aligned with a piston assembly 4046 of LFE 2284 and, illustratively, may be colinear with a rod portion of piston assembly 4046. Additionally, the lower portion of LFE 2284 includes a spring retainer 4047 which is rotationally oriented or clocked through an interface to clevis 2298. Illustratively, clevis 2298 includes a tab 2299 which fits within a slot 4045 on spring retainer 4047 to allow rod 4046 to pass through when installing spring retainer 4047 on LFE 2284.

By using clevis 2298, front suspension 2040 and the steering assembly of vehicle 2 may be compactly packaged and a longer LFE 2284 may be used without compromising the weight of vehicle 2.

Referring to FIGS. 69-73, front braking system 2420 is shown positioned adjacent front wheel hub 2292. As shown, braking system 2420 is coupled to steering spindle 2390 and comprises brake caliper 2422, disc pads 2424, and brake disc 2426. Hub 2292 includes a plurality of apertures 2430, 2440 which receive fasteners (not shown) therethrough and disc 2426 includes apertures 2436 such that hub 2292 and disc 2426 may be coupled together and coupled to a portion of spindle 2390. Caliper 2422 may include castellated pistons which to reduce weight, as disclosed further herein, and may facilitate thermal management of front braking system 2420.

Caliper 2422 and disc pads 2424 couple to a brake mount at 2442 (FIG. 72) such that disc pads 2424 are held on opposite sides of brake disc 2426. Alternatively, brake disc 2426 could be shown as a single component, comprising disc 426, at least a portion of hub 2292, and fasteners (not shown).

The configuration of front braking system 2420 allows for integration of caliper 2422 with spindle 2390, thereby reducing weight and size at ground-engaging members 4 and minimizing the need for additional protective measures for brake caliper 2422. More particularly, braking system 2420 and the connection of steering arms 400 (FIGS. 12-15) to spindle 2390 at ball joint connection 4041 (FIG. 71) are positioned longitudinally rearward of the wheel's rotational axis R (FIG. 69). As such, brake caliper 2422 may require less protection from debris and mud accumulation than in other positions and the weight and size of ground-engaging member 4 and/or front braking system 2420 may be reduced.

Figure 74:
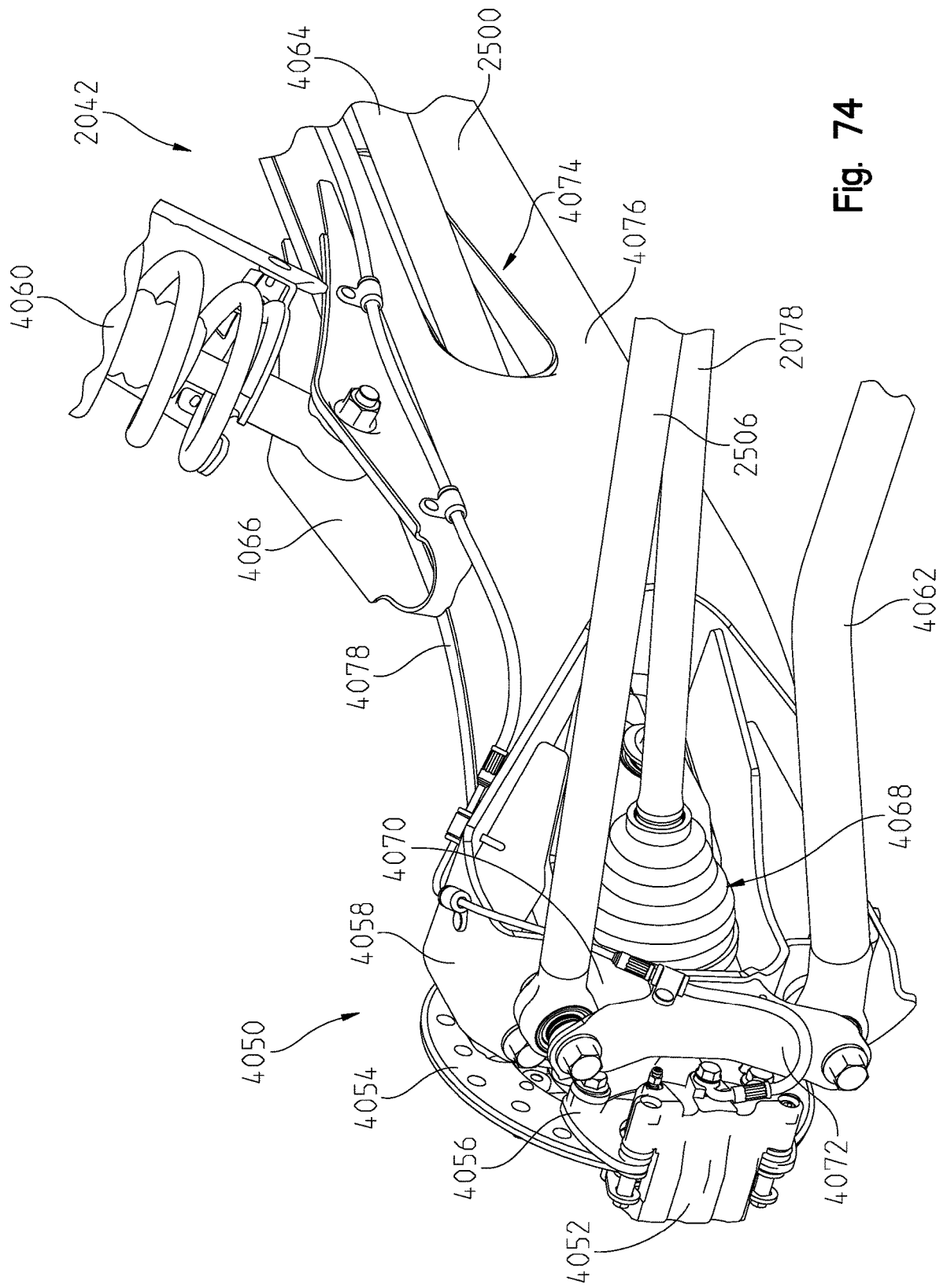
FIG. 74 is a right rear perspective view of an alternative rear braking system of the vehicle of FIG. 1.

Referring to FIG. 74, a rear braking system 4050 is shown and may be similar to front braking system 2420. Rear braking system 4050 includes brake caliper 4052, disc pads (not shown), and brake disc 4054. Caliper 4052 and the disc pads may be coupled to a brake mount at 4054 such that the disc pads are held on opposite sides of brake disc 4054.

Referring now to FIGS. 74-78, rear suspension 2042 is shown. Rear suspension 2042 includes trailing arms 2500, upper radius arms or rods 2506, lower radius arms or rods 4062, LFEs or shock absorbers 4060, and toe links or arms 4064. As shown best in FIG. 74, LFE 4060 is coupled to an upper surface of trailing arm 2500 through a shock mount 4066. Shock mount 4066 is positioned longitudinally along the length of trailing arm 2500 and is positioned longitudinally forward of a rear end portion or knuckle carrier 4058 of trailing arm 2500. Knuckle carrier 4058 may be stamped to reduce the weight of rear suspension 2042. Knuckle carrier 4058 may be cast to reduce the complexity of rear suspension 2042. The upper surface of trailing arm 2500 also may include a mount 4067 configured to receive a portion of torsion bar assembly 510 (FIG. 21).

Knuckle carrier 4058 of trailing arm 2500 includes an opening 4068 configured to receive rear half shaft 2078. Knuckle carrier 4058 further includes a rearward surface 4070 configured to support outer ends of upper and lower radius rods 2506, 4062. More particularly, rearward surface 4070 includes a mounting member 4072 configured to support radius rods 2506, 4062. In one embodiment, mounting member 4072 is integrally formed with knuckle carrier 4058 of trailing arm 2500, while in other embodiments, mounting member 4072 is removably coupled to knuckle carrier 4058. The outer ends of radius rods 2506, 4062 are positioned longitudinally intermediate mounting member 4072 and knuckle carrier 4058 such that mounting member 4072 defines the rearwardmost surface of rear suspension 2042. Illustratively, radius rods 2506, 4062 are positioned longitudinally rearward of rear half shaft 2078.

Referring still to FIGS. 74-78, trailing arm 2500 includes an opening 4074 which extends between an inner portion 4076 and an outer portion 4078 of trailing arm 2500. Inner and outer portions 4076, 4078 may define a clamshell design and are stamped components which join together to define trailing arm 2500. Portions 4076, 4078 may be symmetrical on the right and left sides of rear suspension 2042 which minimizes tooling during the manufacturing process, thereby reducing cost. Additionally, because portions 4076, 4078 are stamped, rear suspension 2042 may be made lighter.

Trailing arm 2500 extends between a forward portion 4090 and knuckle carrier 4058. Forward portion 4090 includes a coupler 4092 configured to operably coupled to frame 2020 and allow for generally vertical movement of trailing arm 2500 during operation of vehicle 2. Knuckle carrier 4058 is coupled to a rearward portion 4091 of trailing arm 2500 which, illustratively, generally defines a "V" shape at 4093. Rearward portion 4091 may be fixed to knuckle carrier 4058 through welding. The configuration of trailing arm 2500 and the connection to knuckle carrier 4058 may distribute loads at trailing arm 3500 more efficiently and increase the weld content at the interface between rearward portion 4091 and knuckle carrier 4058.

Opening 4074 extends completely through trailing arm 2500 and is configured to receive a portion of toe link 4064. More particularly, toe link 4064 extends generally longitudinally between a forward end 4080 and a rearward end 4082. Forward end 4080 includes a coupler 4084 configured to operably couple with a portion of frame 2020. Rearward end 4082 includes a coupler 4086 configured to be operably coupled to a hub assembly 4088 of rear ground-engaging member 6 (FIG. 1). Coupler 4086 may define a joint loaded in double shear. A corresponding bearing may be loaded radially and, as such, the risk of coupler 4086 and the bearing pulling apart if coupler 4086 becomes worn is minimized.

Coupler 4086 may be positioned within an opening 4087 of knuckle carrier 4058 of trailing arm 2500. As shown best in FIGS. 76A-76C, coupler 4086 may include a bolt 4400, an eccentric washer 4402, and a nut 4404 which, collectively, provide the ability to adjust alignment of toe link 4064 by rotating bolt 4400 before tightening nut 4404. Bolt 4400 may be mechanically coupled to washer 4402, through knurling, a D-profile, or other shape. The washer profile is eccentric to the bolt axis and knuckle carrier 4058 may have locating tabs that washer 4402 contacts. In this way, as bolt 4400 is turned, washer 4402 moves the bolt axis fore and aft in the opening. Once bolt 4400 is rotated to provide the desired alignment of toe link 4064, the bolt head is fixed in position and nut 4404 is tightened to the desired torque.

Figure 75:
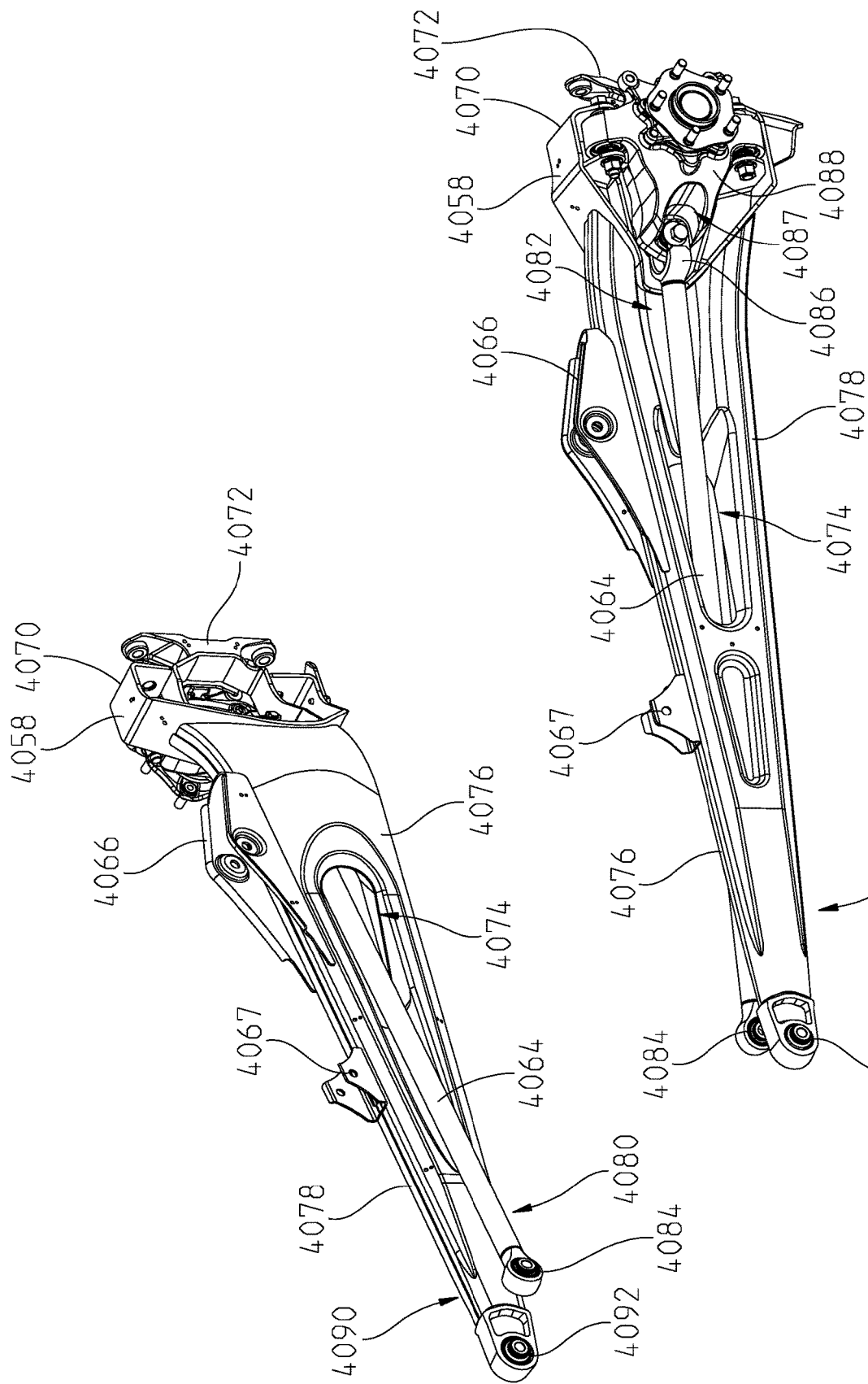
FIG. 75 is a left front perspective view of an alternative rear suspension of the vehicle of FIG. 1.
Figure 76A:
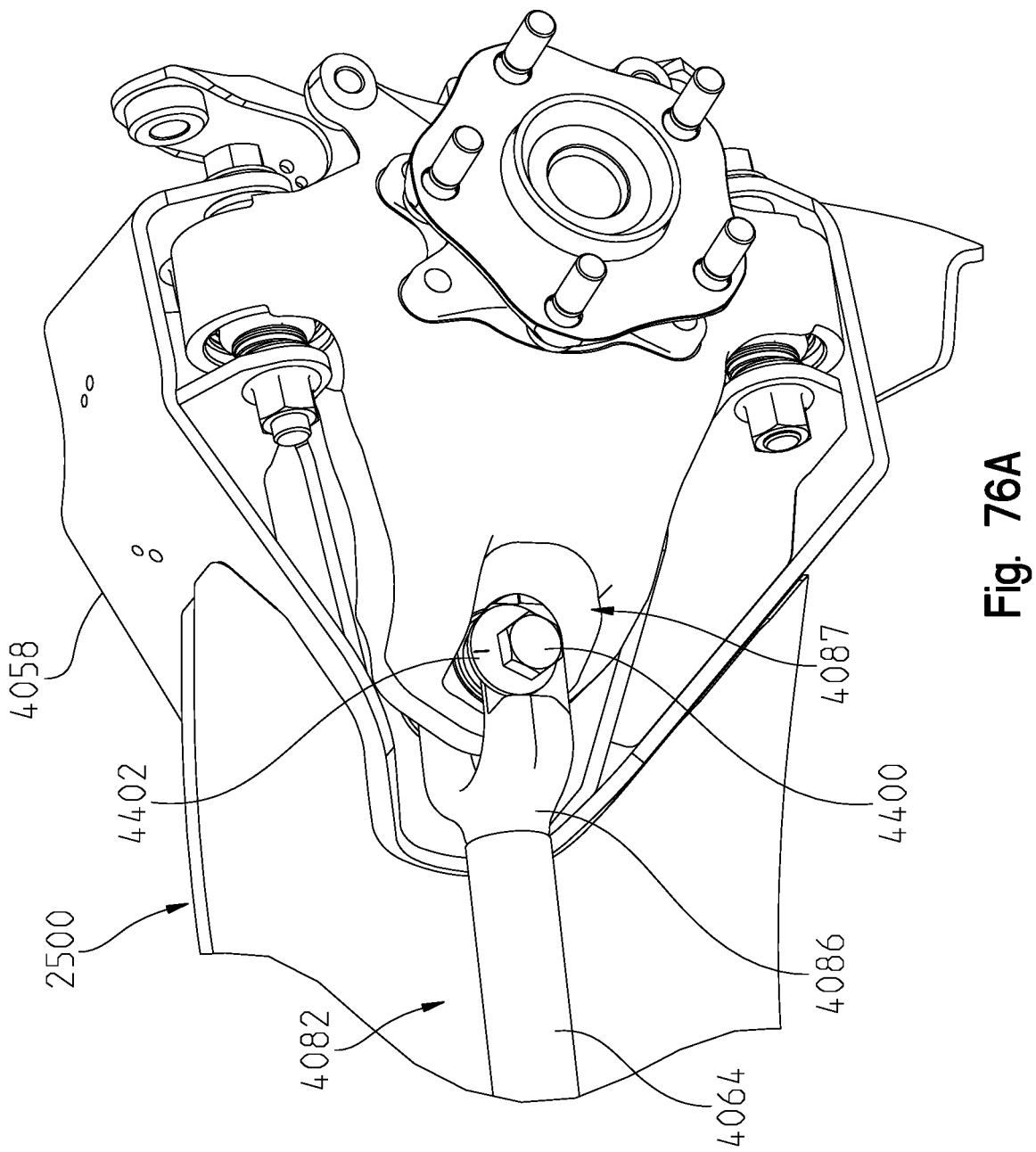
FIG. 76A is a left front perspective view of a toe link coupling of the rear suspension of FIG. 75.
Figure 76B:
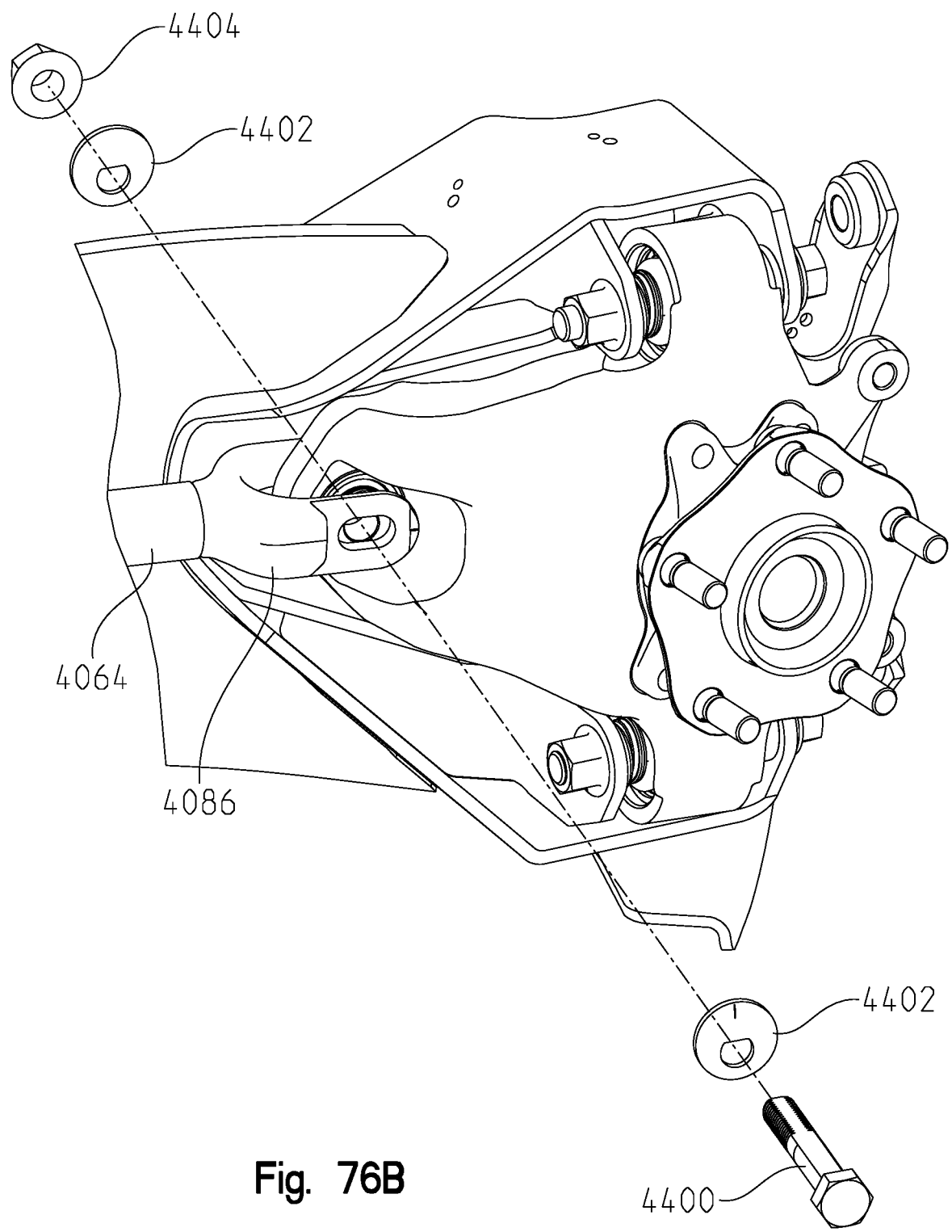
FIG. 76B is an exploded view of the toe link coupling of FIG. 76A.
Figure 76C:
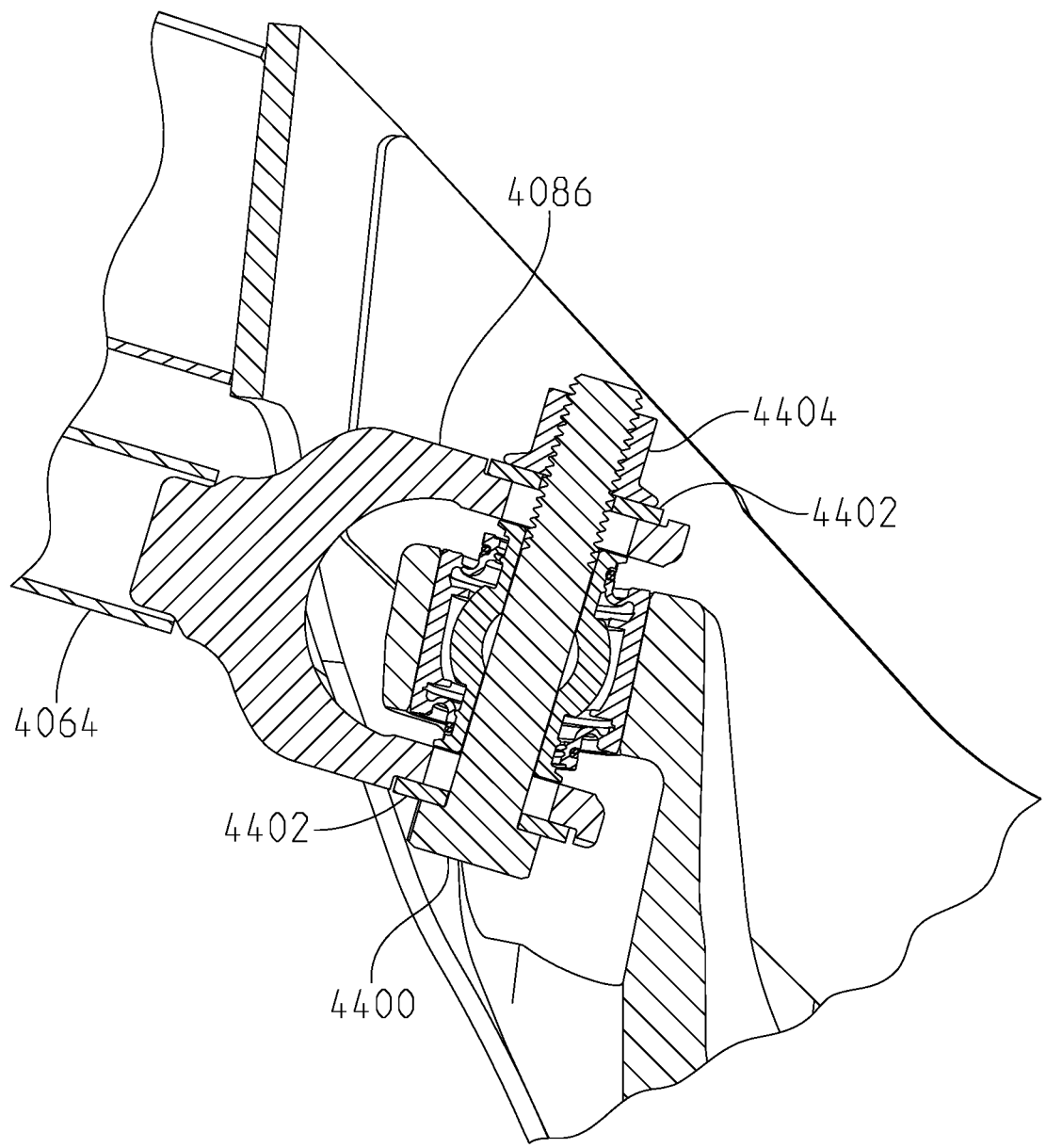
FIG. 76C is a cross-sectional view of the toe link coupling of FIG. 76A, taken along line 76C-76C of FIG. 76A.
Figure 77A:
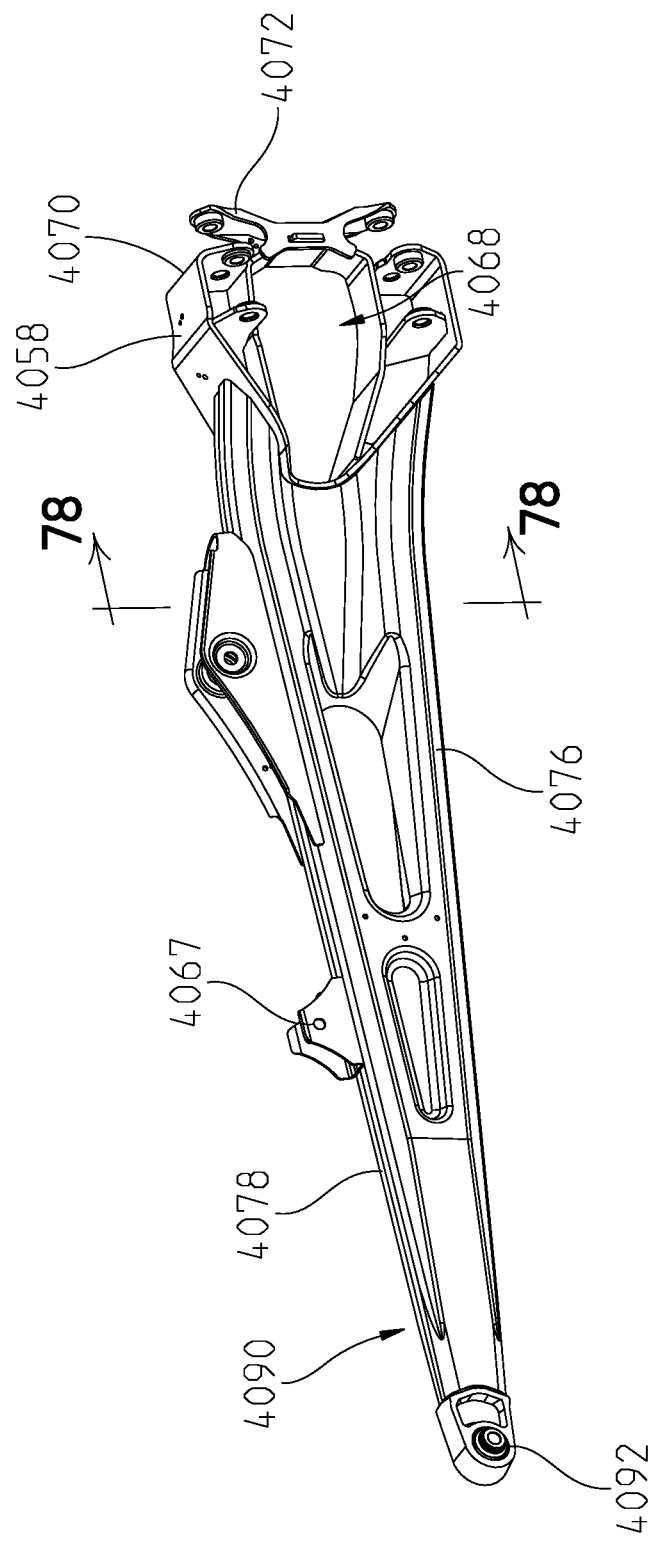
FIG. 77A is a left front perspective view of a trailing arm of the rear suspension of FIG. 75.
Figure 77B:
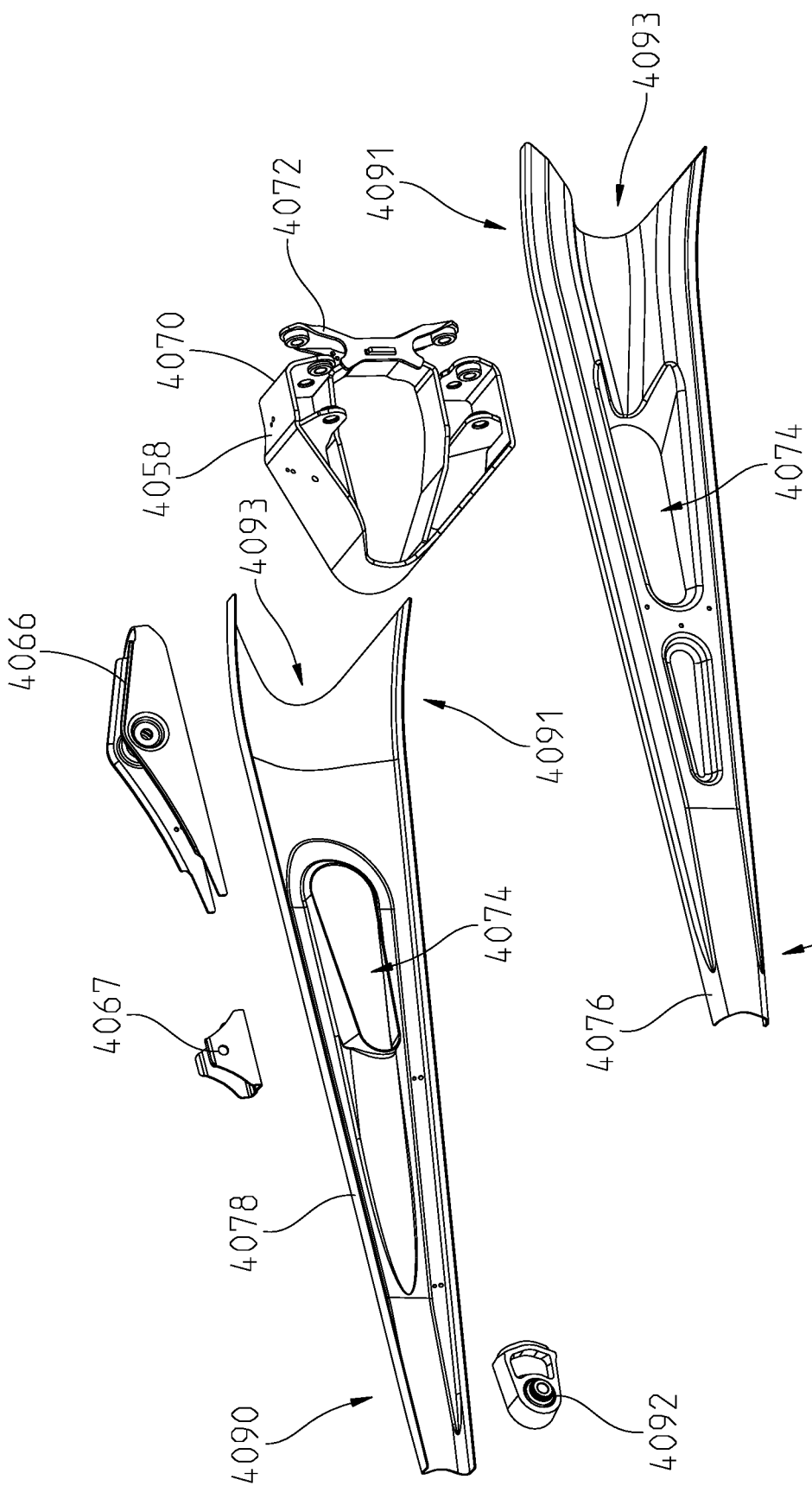
FIG. 77B is an exploded view of the trailing arm of FIG. 77A.
Figure 78:
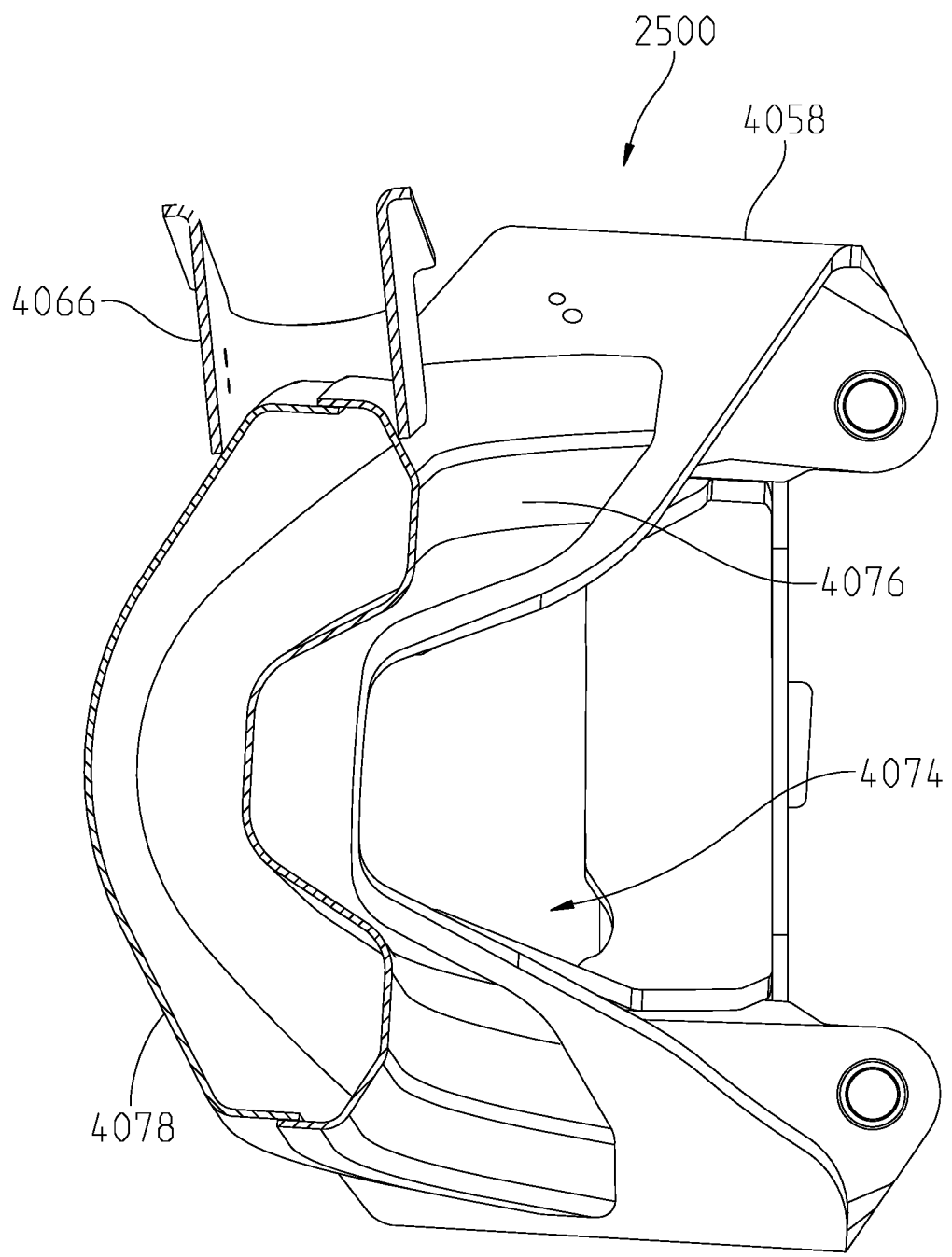
FIG. 78 is a cross-sectional view of the trailing arm of FIG. 77A taking along line 78-78 of FIG. 77A.
Figure 79:
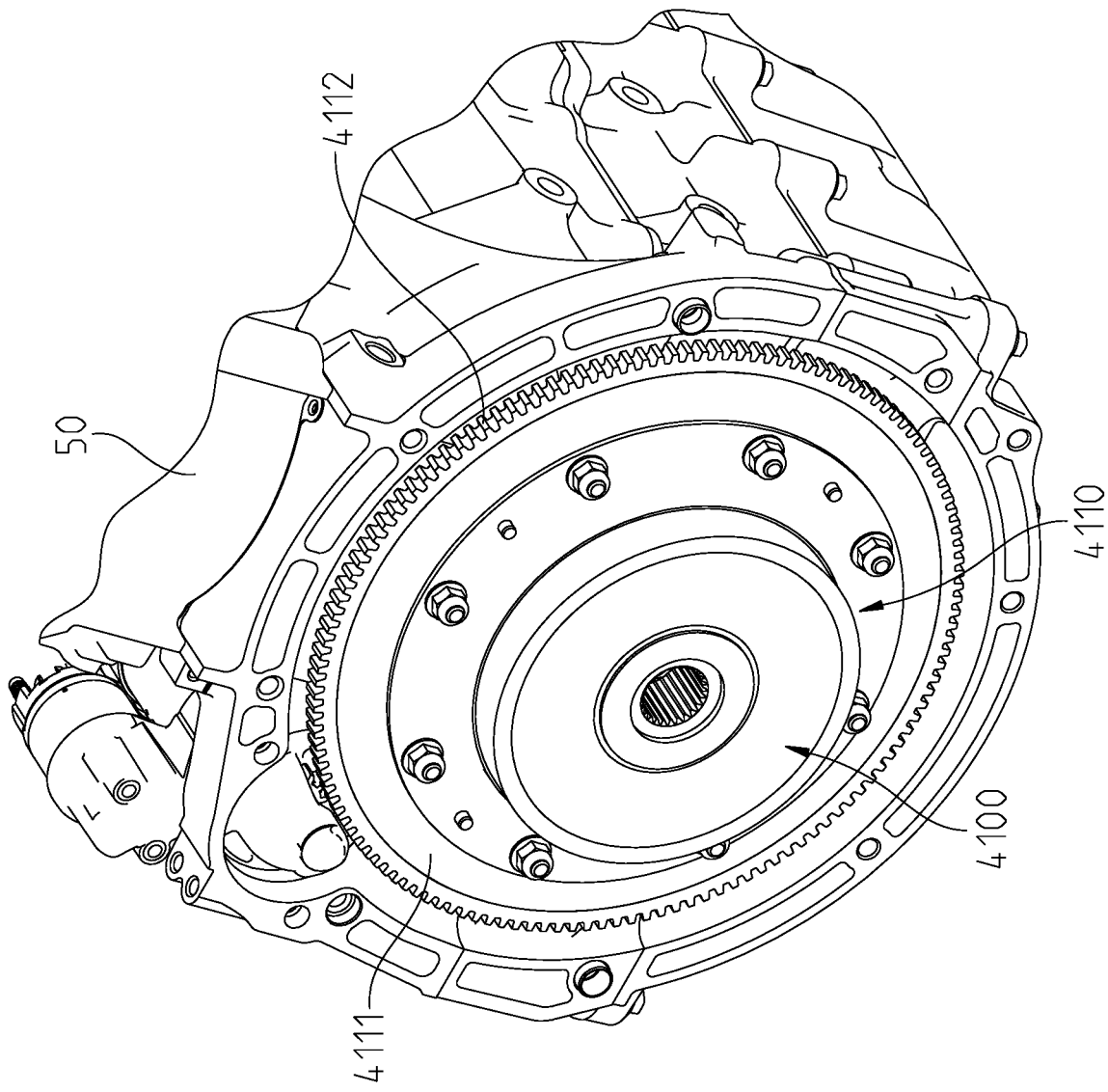
FIG. 79 is a perspective view of an arc spring assembly of the powertrain of the vehicle of FIG. 1.
Figure 80:
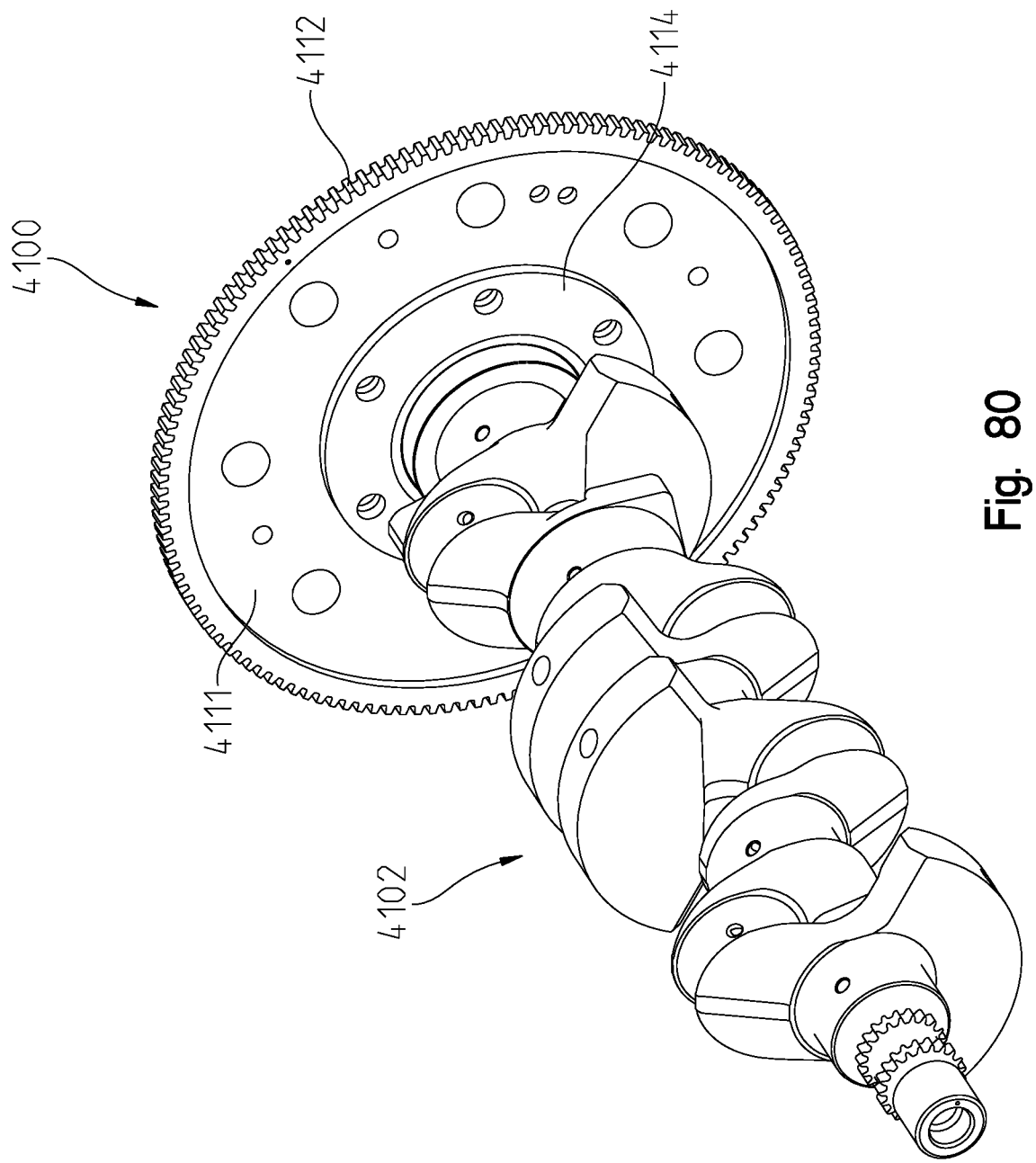
FIG. 80 is a perspective view of the arc spring assembly coupled to a crankshaft of the engine of the powertrain of FIG. 79.

As shown best in FIG. 75, toe link 4064 extends diagonally through opening 4074 such that forward end 4080 is positioned inwardly of outer portion 4078 of trailing arm 2500 while rearward end 4082 is positioned outwardly of inner portion 4076 of trailing arm 2500. In this way, the configuration of rear suspension 2042 may be compact so as to not interfere with other components or systems of vehicle 2, such as the powertrain or driveline, but opening 4074 provides sufficient space for toe link 4064 to move with or relative to trailing arm 2500 when needed.

Additional details of rear suspension 2042 may be disclosed in U.S. patent application Ser. No. 16/266,797, filed Dec. 20, 2018, and entitled "REAR SUSPENSION ASSEMBLY FOR A VEHICLE", the complete disclosure of which is expressly incorporated by reference herein.

Figure 81:
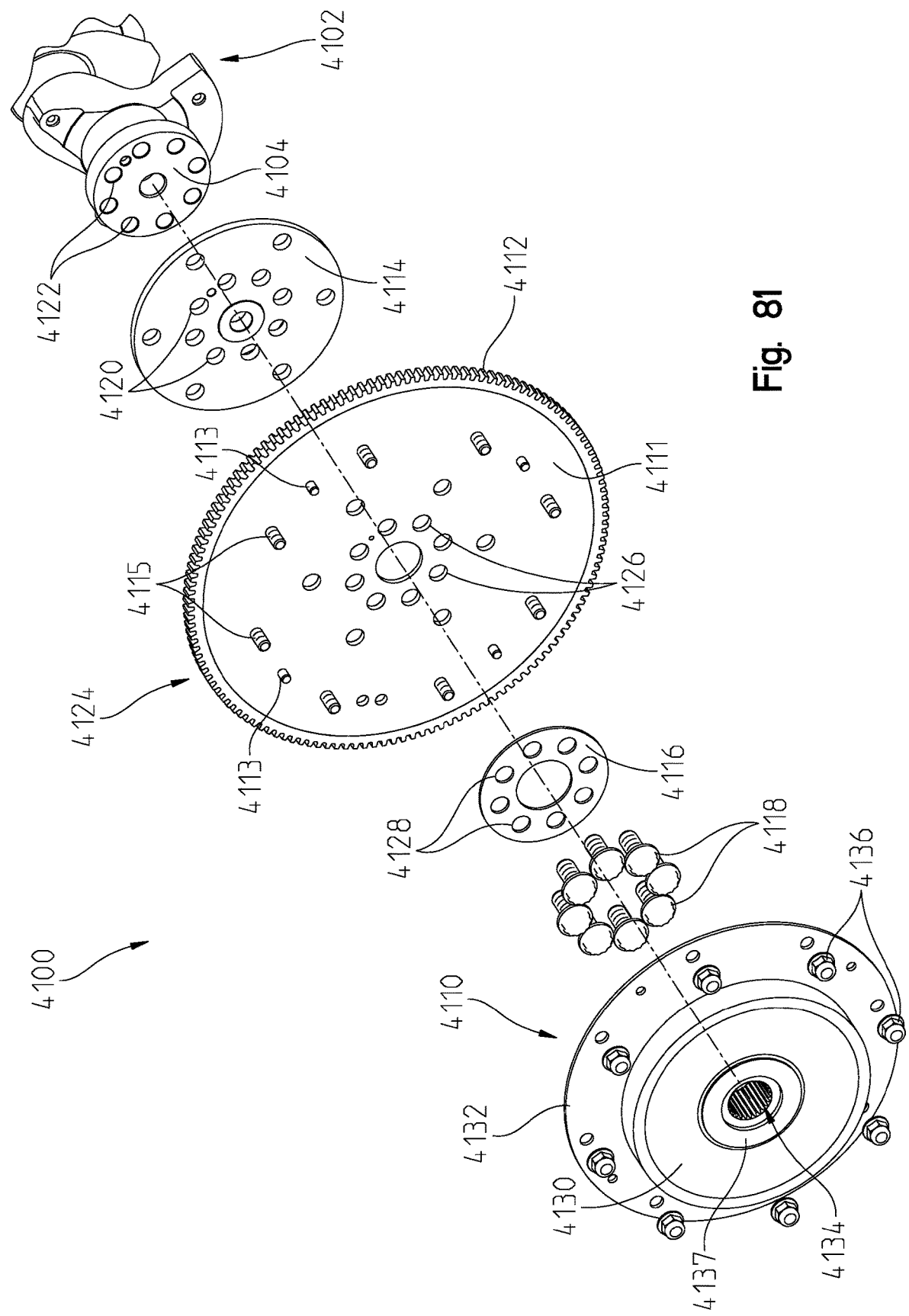
FIG. 81 is an exploded view of the arc spring assembly of FIG. 79.
Figure 82:
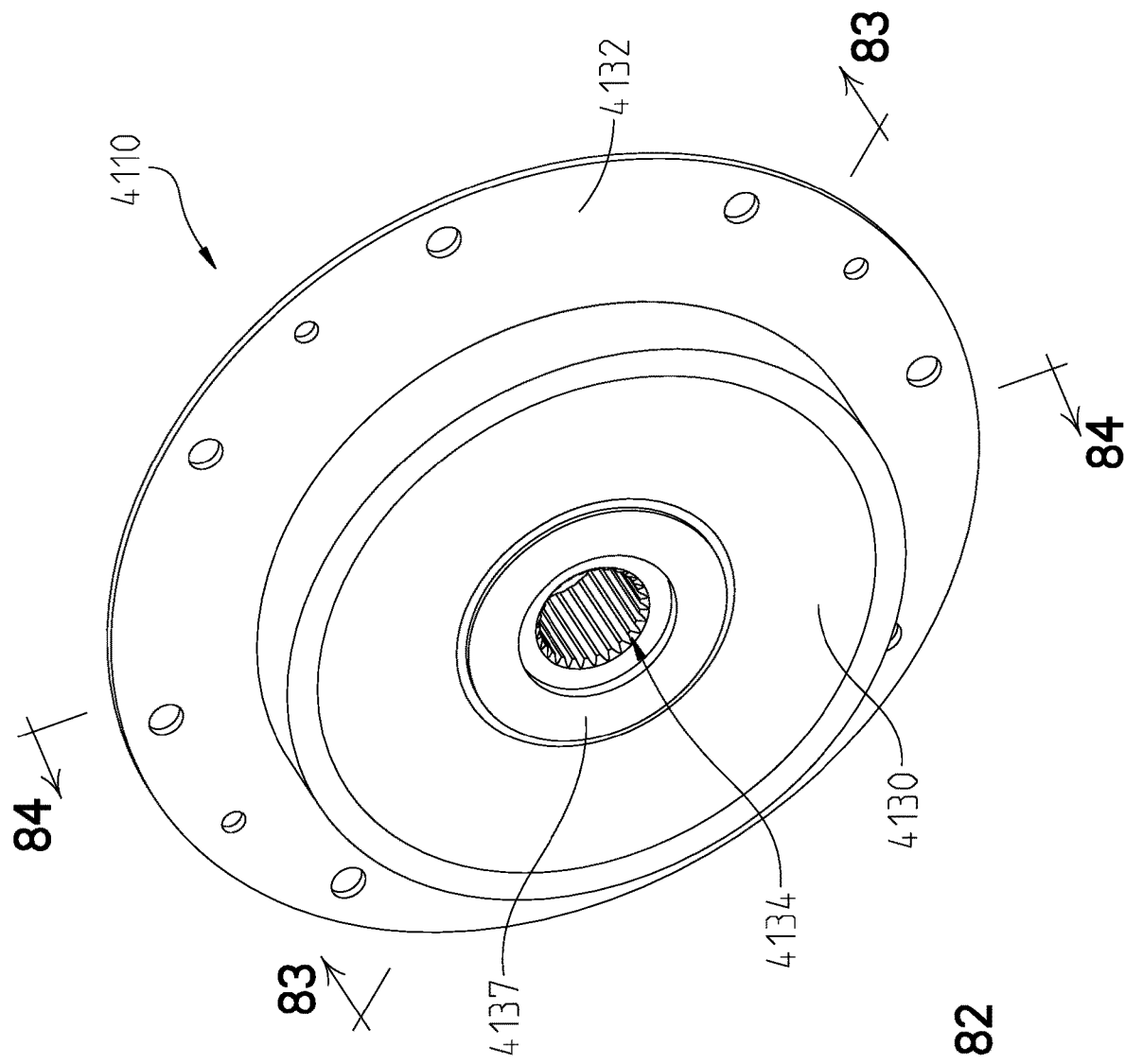
FIG. 82 is a perspective view of an arc spring damper assembly of the arc spring assembly of FIG. 79.

Referring to FIGS. 79-93, portions of the powertrain of vehicle 2 are disclosed. As disclosed herein, the powertrain of vehicle 2 includes at least engine 50 and CVT 52 (FIGS. 23 and 24). At the interface between engine 50 and CVT 52 may be an arc spring assembly 4100 (also shown in FIG. 41). More particularly, arc spring assembly 4100 may be positioned intermediate a crankcase of engine 50 and drive clutch 978 (FIGS. 39-41) of CVT 52 and, in one embodiment, directly coupled to a crankshaft 4102 of engine 50 and drive clutch 978 of CVT 52. Illustratively, as shown best in FIG. 81, arc spring assembly 4100 is directly coupled to an input end 4104 of crankshaft 4102. By positioning arc spring assembly 4100 at input end 4104 of crankshaft 4102 and adjacent drive clutch 978 of CVT 52, vibrations at engine 50 are absorbed and do not transfer to CVT 52. In other words, arc spring assembly 4100 reduces or dampens the applied shaking forces from crankshaft 4102 during the engine firing events, thereby increasing the life of CVT 52 by reducing the torsional pulsation to decrease the temperature of the CVT belt.

Arc spring assembly 4100 includes an arc spring damper assembly 4110, a ring gear 4112 positioned around a flex plate 4111, and a hub 4114. Hub 4114 is coupled to input end 4104 of crankshaft 4102. Hub 4114 includes apertures 4120, at least some of which align with apertures 4122 on input end 4104 to receive fasteners 4118 (e.g., bolts, rivets, etc.). Flex plate 4111 and ring gear 4112 are positioned adjacent hub 4114 such that hub 4114 is positioned intermediate flex plate 4111 and input end 4104 of crankshaft 4102. Ring gear 4112 has a larger diameter than hub 4114 and includes a plurality of teeth 4124 along an outer circumference thereof. Flex plate 4111 includes a plurality of locating members (e.g., dowels or pins) 4113 configured to properly locate CVT 52 relative to engine 50 (e.g., may be used for proper positioning on the flywheel of engine 50). Additionally, flex plate 4111 includes a plurality of mounting members 4115 (e.g., studs) configured to couple to arc spring damper assembly 4110. Flex plate 4111 also includes a plurality of apertures 4126 configured to align with apertures 4120 and 4122 to receive fasteners 4118 for coupling flex plate 4111 and hub 4114 to input end 4104 of crankshaft 4102.

A mounting plate 4116 may positioned on the opposite side of flex plate 4111 relative to hub 4114 such that flex plate 4111 is positioned intermediate mounting plate 4116 and hub 4114. Mounting plate 4116 includes a plurality of apertures 4128 configured to align with apertures 4120, 4122, 4126 to receive fasteners 4118 for coupling mounting plate 4116 with flex plate 4111, hub 4114, and input end 4104.

Arc spring damper assembly 4110 is positioned adjacent mounting plate 4116 such that mounting plate 4116 is intermediate flex plate 4111 and arc spring damper assembly 4110. Arc spring damper assembly 4110 includes a spring body cover 4130, a drive plate 4132, and a threaded aperture 4134. Threaded aperture 4134 is configured to receive a portion of shaft 824 and/or shaft 828 (FIG. 41) such that crankshaft 4102 drives drive clutch 978 of CVT 52 (FIG. 41) through arc spring assembly 4100. Threaded aperture 4134 may be centrally positioned on spring body cover 4130. In this way, arc spring assembly 4100 is directly coupled to crankshaft 4102 and drive clutch 978. Through this direct connection between crankshaft 4102 and drive clutch 978, arc spring assembly 4100 becomes the decoupling device between drive clutch 978 and engine 50. The use of arc spring assembly 4100 reduces side load on crankshaft 4102 to increase the life of engine 50 and the life of the belt of CVT 52, as further disclosed herein.

Drive plate 4132 includes couplers 4136 which are configured to receive mounting members 4115 on flex plate 4111 for coupling together arc spring damper assembly 4110 and flex plate 4111.

Figure 84:
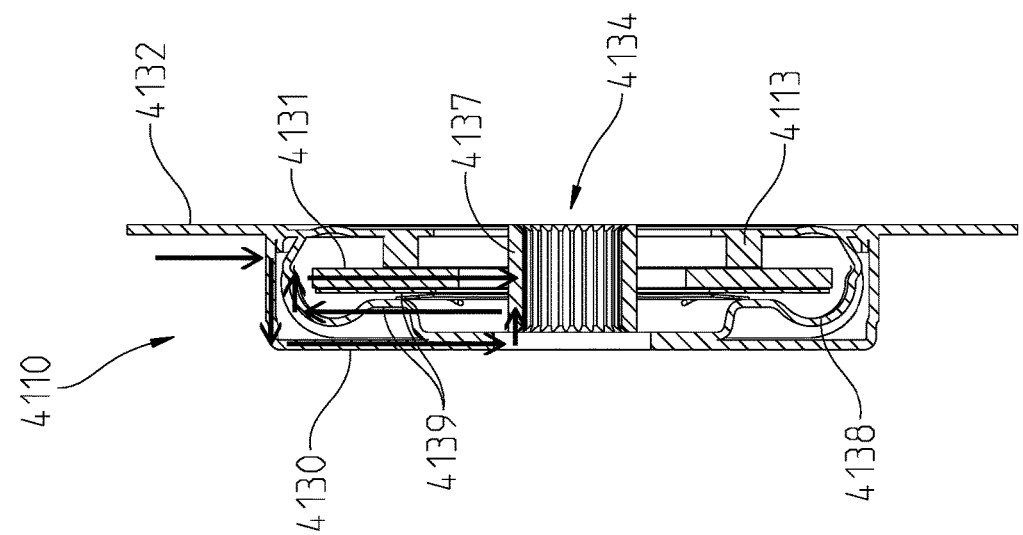
FIG. 84 is a cross-sectional view of the arc spring damper assembly of FIG. 82, taken along line 84-84 of FIG. 82.
Figure 83:
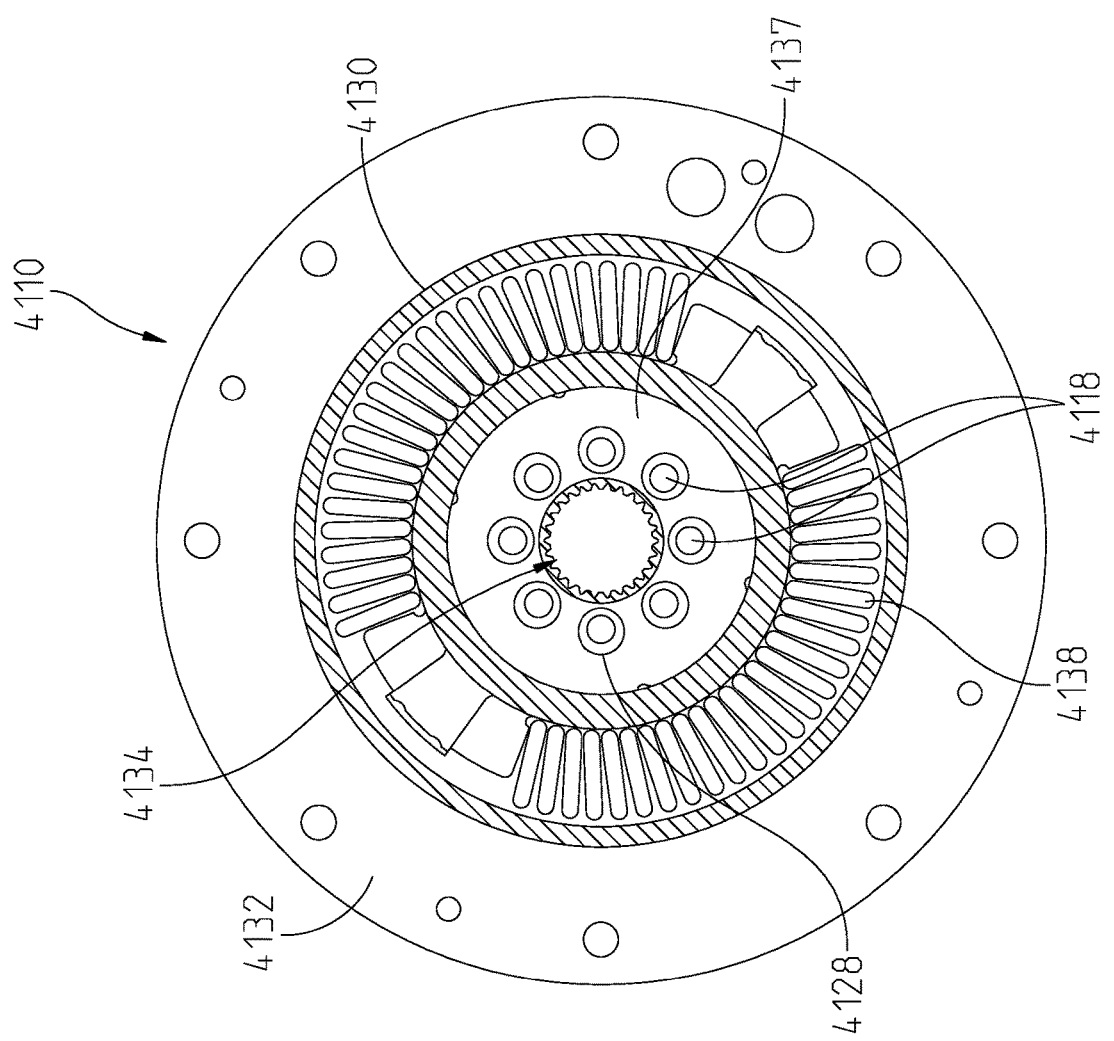
FIG. 83 is a cross-sectional view of the arc spring damper assembly of FIG. 82, taken along line 83-83 of FIG. 82.

As shown best in FIGS. 83 and 84, spring body cover 4130 includes at least one spring 4138 extending at least partially around threaded aperture 4134 and having a coiled shape. Springs 4138 may be retained by a spring retainer 4139. Springs 4138 are configured to receive and absorb vibrational forces from engine 50 to minimize transfer of such vibrational forces to CVT 52, as disclosed further herein. In this way, arc spring assembly 4100 is configured to increase the life of CVT 52 by minimizing wear thereto.

More particularly, the torque path through arc spring damper assembly 4110 is shown as the arrows in FIG. 84. Torque initially is transmitted through drive plate 4132 and then transmitted through spring body cover 4130. Torque is transmitted through spring body cover 4130 and then transmits along fasteners 4118 between spring body cover 4130 and spring retainer 4139. Torque then transmits through spring retainer 4139 before transmitting through springs 4138 and ultimately transmitting through a flange 4131 and a hub 4137 generally surrounding threaded opening 4134. Springs 4138 provide the damper capacity stop when the inner diameter coils go solid. It may be appreciated that if the torque increases to an amount greater than the spring capacity, the torque still follows the same torque path disclosed in FIG. 84.

Figure 85:
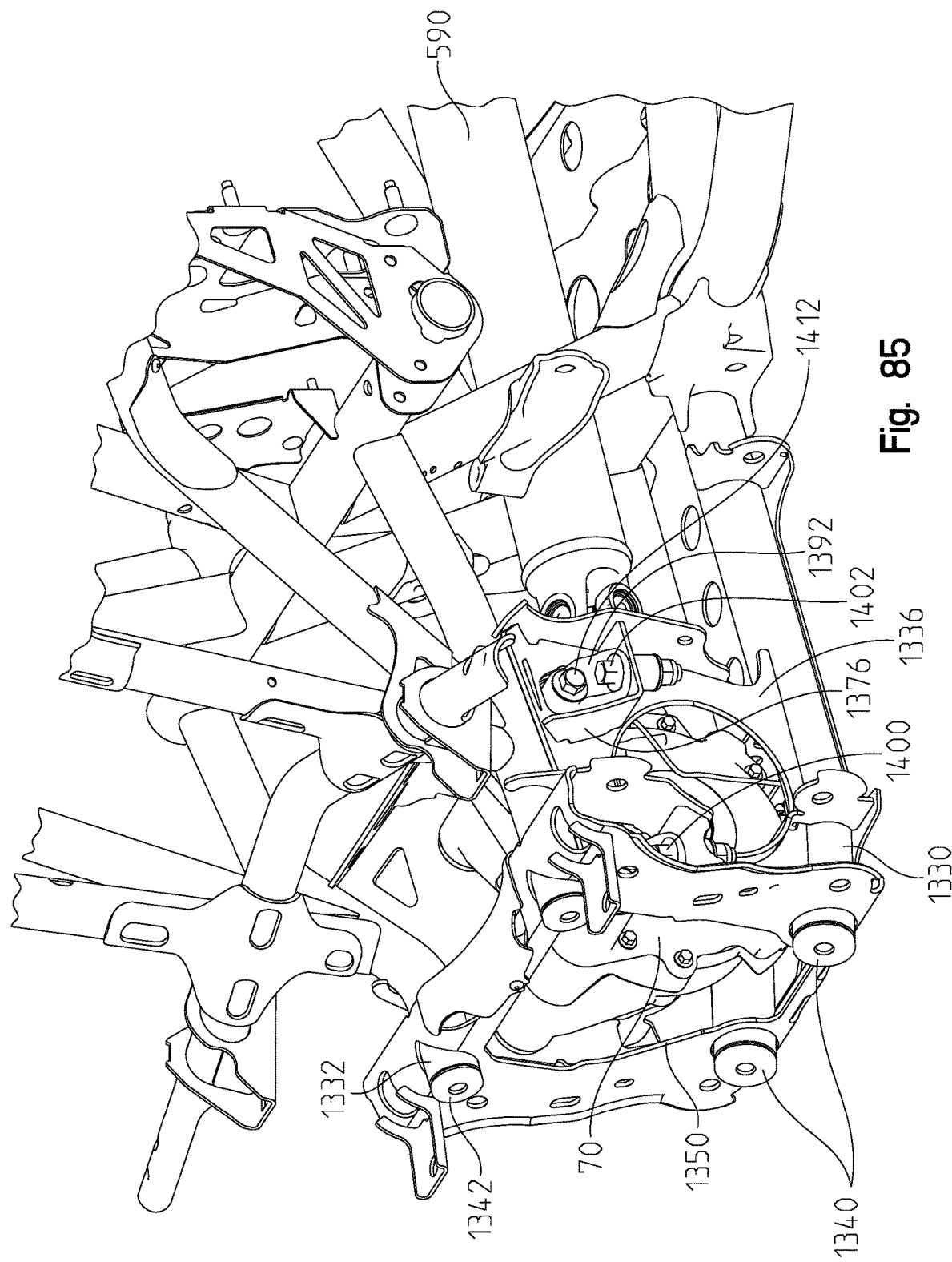
FIG. 85 is a left front perspective view of a front drive and mounting assembly of the frame of FIG. 56.
Figure 86A:
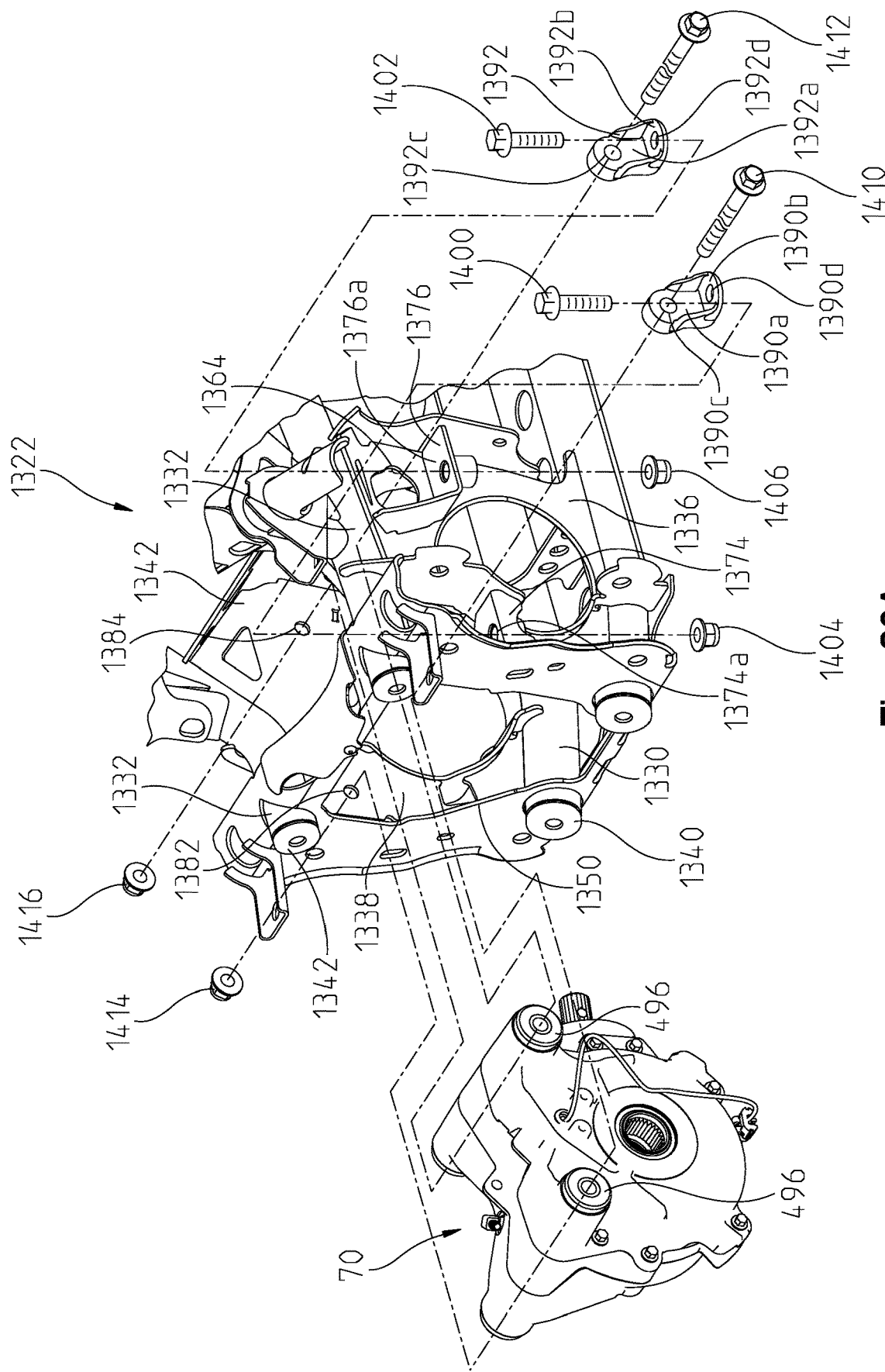
FIG. 86A is an exploded view of the front drive and mounting assembly of FIG. 85.
Figure 86B:
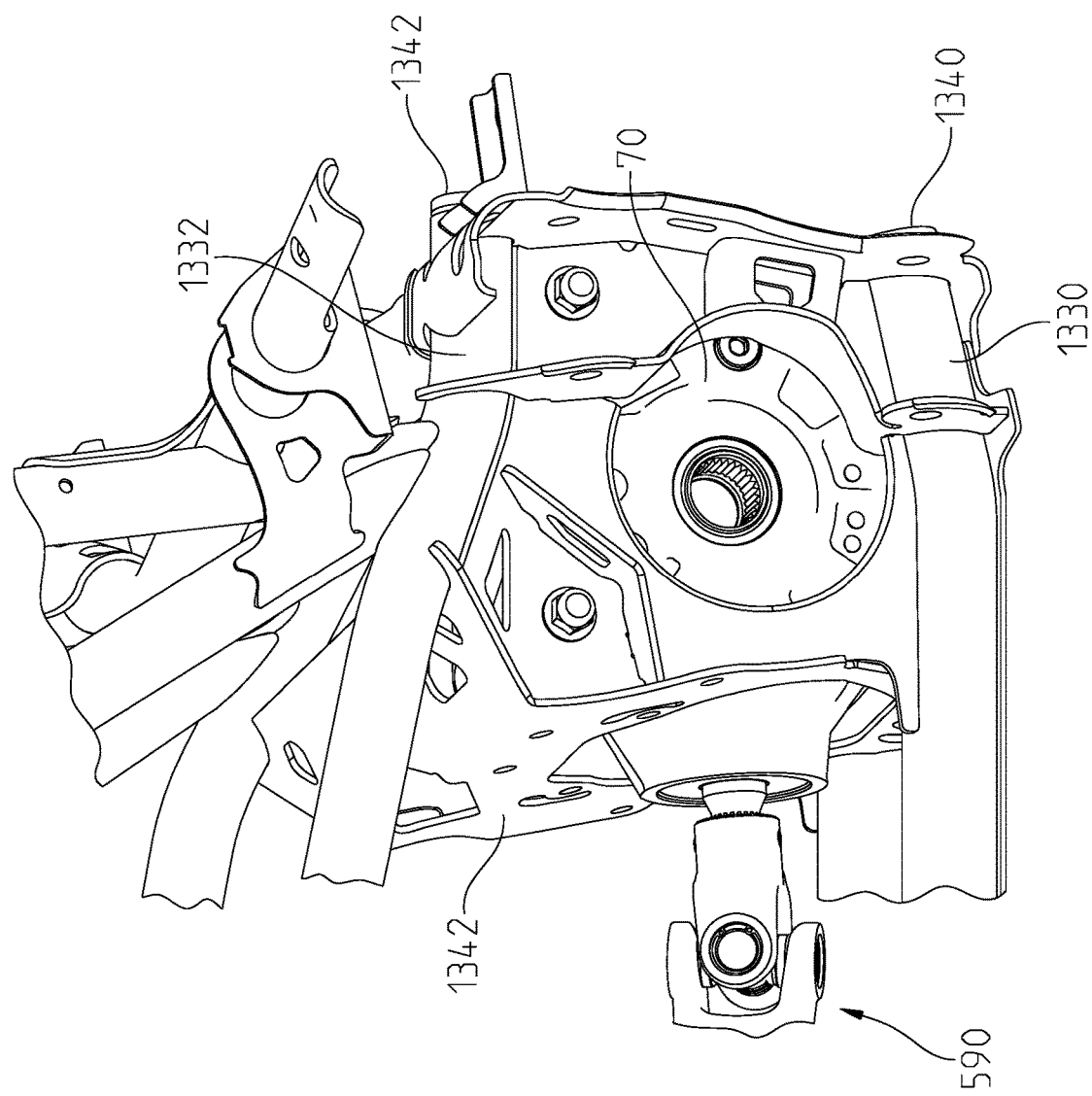
FIG. 86B is a right rear perspective view of the front drive and mounting assembly of FIG. 85.

Referring to FIGS. 85-86B, a further portion of the powertrain of vehicle 2 is disclosed. Illustratively, and similar to that disclosed in FIG. 53 with respect to supporting front drive 70 on frame 20 or 2020, lower longitudinal tube portions 1330 include threaded inserts 1340 whereas upper longitudinal tube portions 1332 include threaded inserts 1342. Front pedestal plate 1334 is coupled to the lower longitudinal tube portions 1340 and upper longitudinal tube portions 1342 and includes an opening 1350 generally conforming to allow the passage of front drive 70 therein, as described in greater detail herein. Side plate 1336 is generally coupled to the left-hand side lower longitudinal tube portion 1330 and upper longitudinal tube portion 1332. Left plate portion 1336 includes an opening at 1360 to allow access between front drive 70 and left front wheel. Left side plate 1336 further includes a front opening at 1362 and a rearward opening at 1364 which align with mounting inserts 496, as further described herein. A front pedestal 1370 is positioned below aperture 1362 and a rearward pedestal 1372 is positioned below opening 1364. Pedestal 1370 defines a mounting surface at 1374 while pedestal 1372 defines a mounting surface at 1376.

Fasteners 1410, 1412 are installed through plate portions 1336 and through front drive 70 and are tightened without any preload loss at the joint. The plate portions 1336 are castings which have smooth radii and offer complete contact. More particularly, the boss on plate portions 1336 has proper contact with an isolator to prevent the isolator from tearing and cutting. Once fasteners 1410, 1412, which are horizontal fasteners, are tightened, vertical fasteners 1400, 1402 are tightened. If the order of tightening the horizontal and vertical fasteners is reversed, then plate portions 1336 will be pre-stressed in bending and may fatigue early. In this way, front drive 70 utilizes a slip joint to remove the bolt preload and facilitate installation.

Figure 87A:
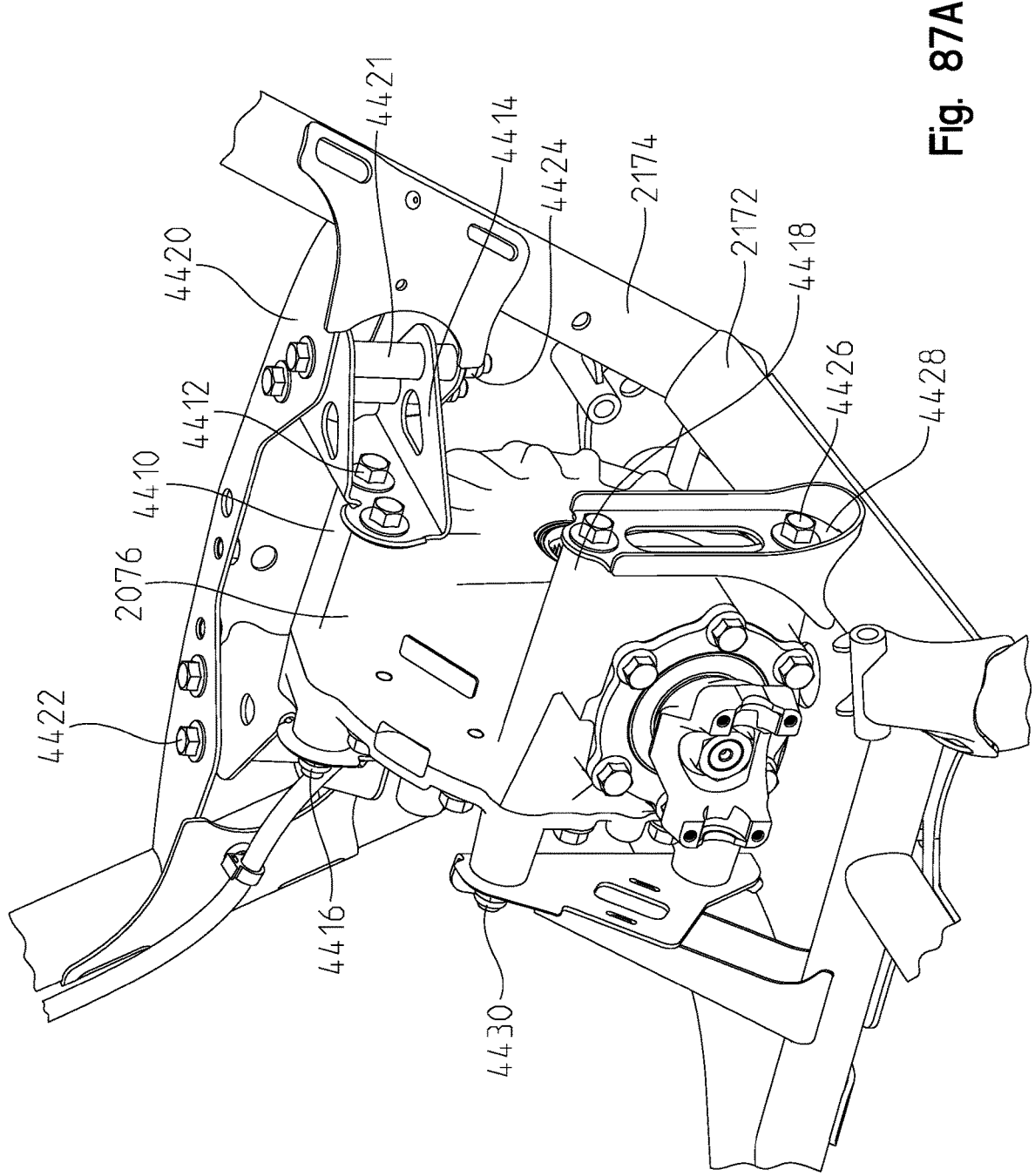
FIG. 87A is a left front perspective view of a rear drive and mounting assembly of the frame of FIG. 57.
Figure 87B:
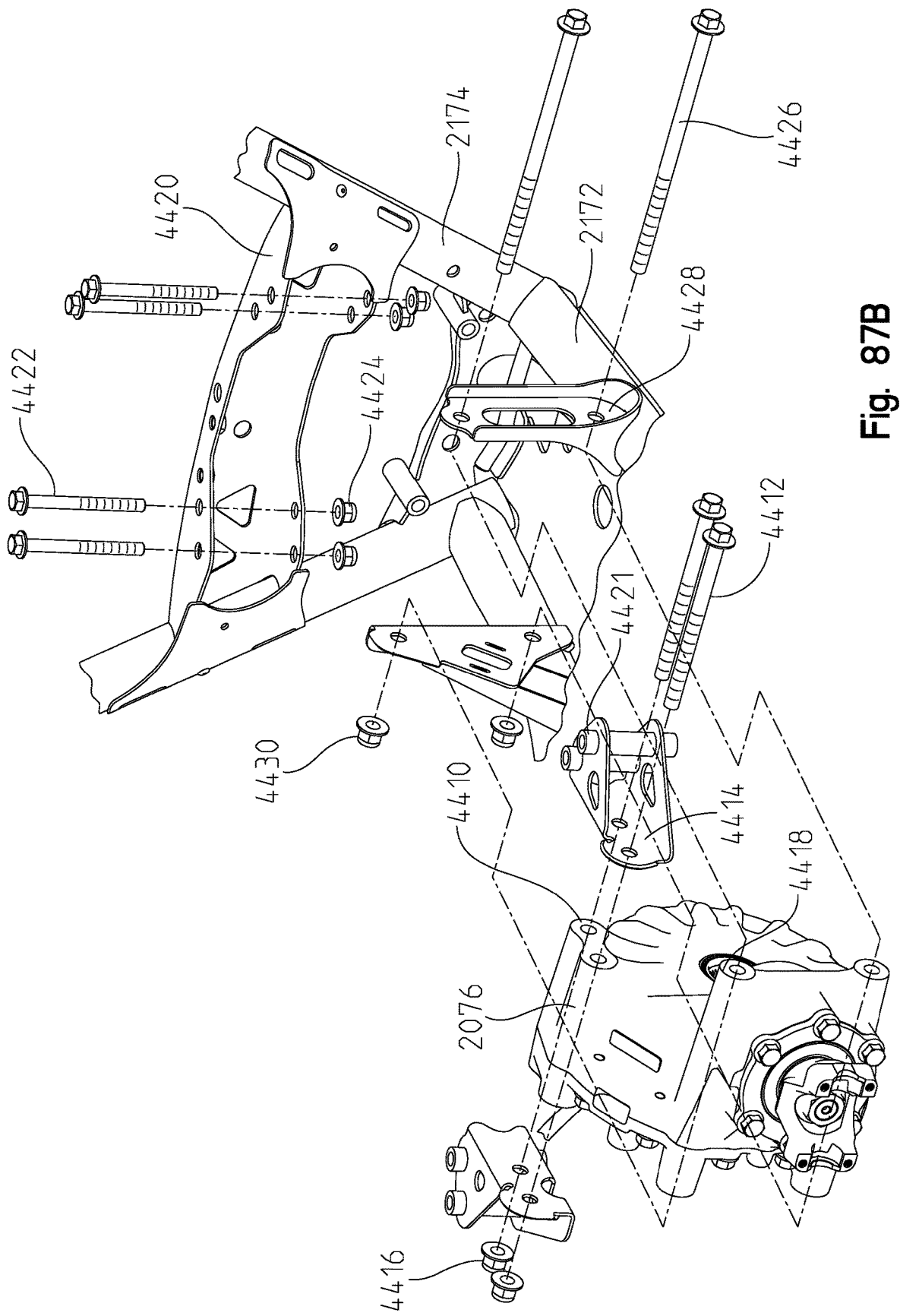
FIG. 87B is an exploded view of the rear drive and mounting assembly of FIG. 87A.
Figure 88:
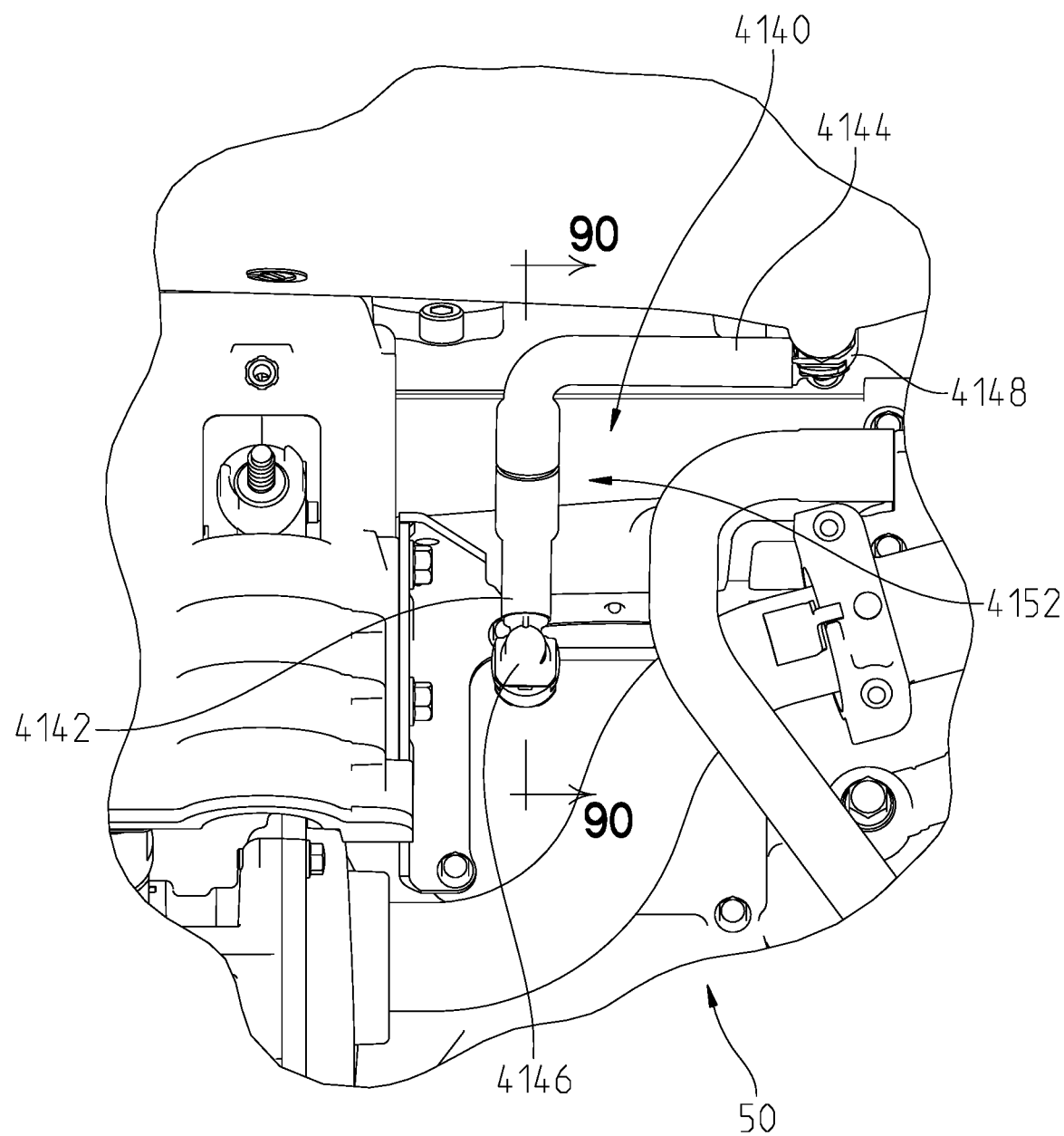
FIG. 88 is a perspective view of a breather tube of the powertrain of the vehicle of FIG. 1.
Figure 89:
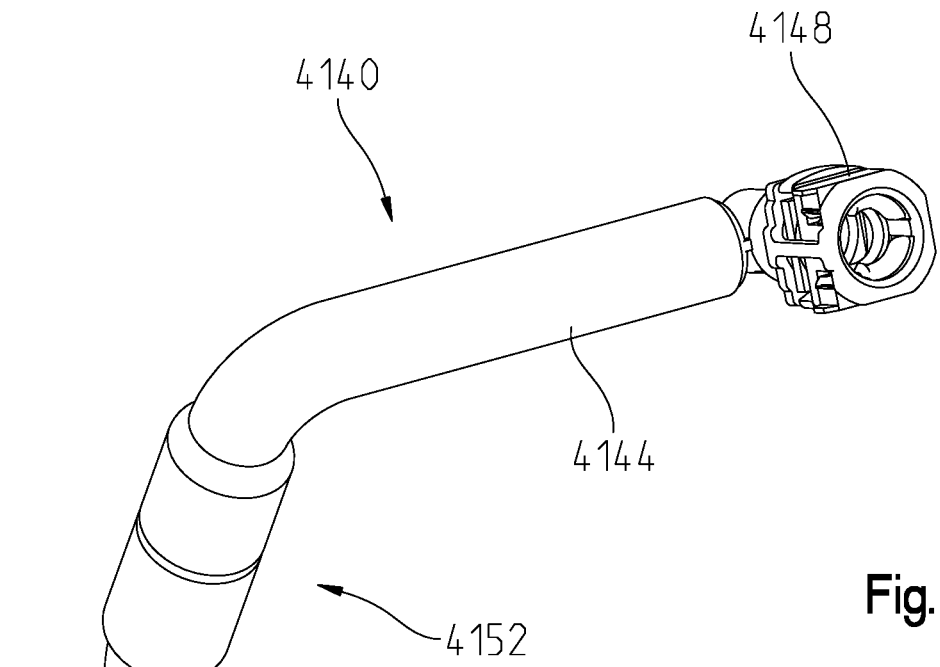
FIG. 89 is a further perspective view of the breather tube of FIG. 88.
Figure 90:
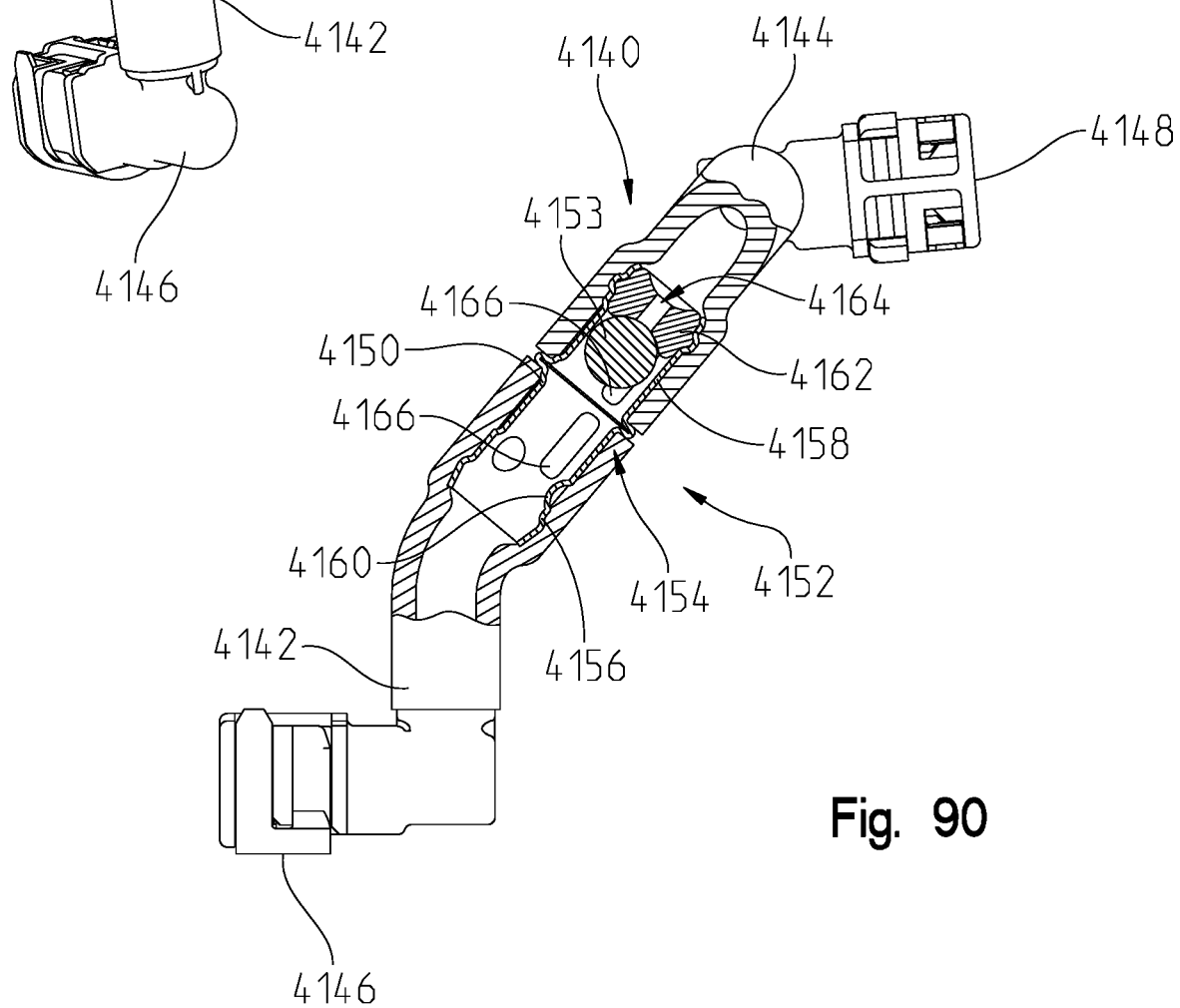
FIG. 90 is a cross-sectional view of a portion of the breather tube of FIG. 88, taken along line 90-90 of FIG. 88.
Figure 91:
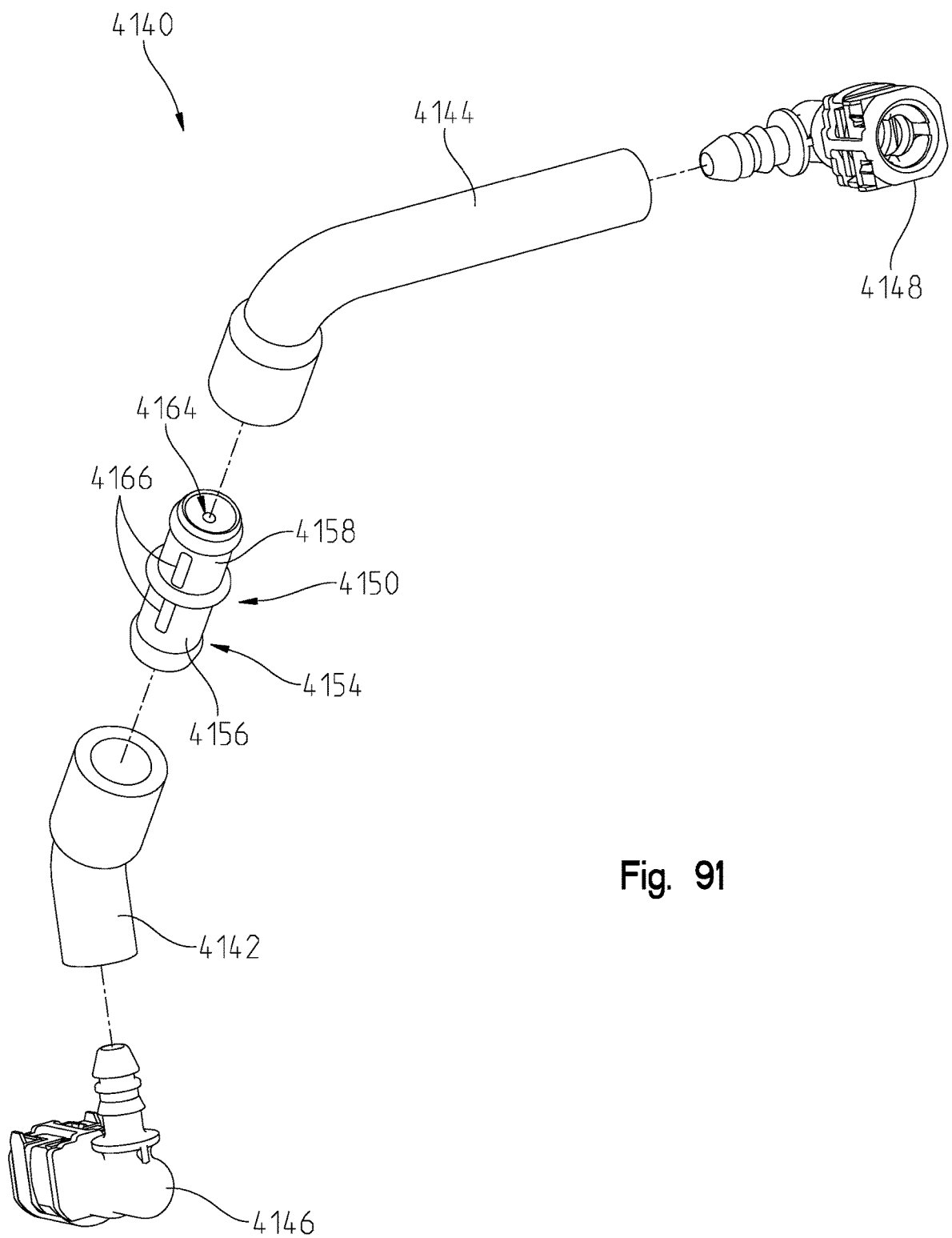
FIG. 91 is an exploded view of the breather tube of FIG. 89.

Referring to FIGS. 87A and 87B, and similar to front drive 70, rear drive 2076 may be similarly mounted to frame 2020. More particularly, rear drive 2076 may include bosses 4410 extending generally laterally and configured to receive removable fasteners 4412 therethrough. Fasteners 4412 also extend through openings in a mounting bracket 4414 and, as such, couple together mounting bracket 4414 and the housing of rear drive 2076 with couplers 4416. It may be appreciated that brackets 4414 are removable from frame 2020 to facilitate service and assembly of rear drive 2076.

Brackets 4414 are coupled to a brace 4420 extending between and coupled to frame tubes 2174. More particularly, fasteners 4422 extend generally vertically between corresponding apertures in brace 440 and brackets 4414 to couple together brackets 4414 and brace 4420. Fasteners 4422 extend through isolators 4421 on bracket 4414. Couplers 4424 are configured to receive a portion of fasteners 4422 to secure bracket 4414 to brace 4420. Because rear drive 2076 is coupled to brackets 4414, rear drive 2076 also is coupled to brace 4420 through brackets 4414.

The housing of rear drive 2076 further includes second bosses 4418 configured to receive fasteners 4426 in order to couple a forward portion of rear drive 2076 to upstanding brackets 4428. Illustratively, fasteners 4426 extend through apertures in upstanding brackets 4428 and through bosses 4418 of rear drive 2076 in order to couple with couplers 4430. Upstanding brackets 4428 extend upwardly from frame tubes 2172.

Referring still to FIGS. 87A and 87B, rear drive 2076 may be mounted in double shear and also mounted in a manner to avoid clamp load loss when the installation sequence is followed. To avoid clamp load loss, the following installation sequence may be used. First, rear drive 2076 is assembled with frame 2020 by dropping rear drive 2076 down into the rear envelope between upstanding brackets 4428. Although upstanding brackets 4428 may be welded to frame tubes 2172, upstanding brackets 2172 create a cradle to hold rear drive 2076 in place while fasteners 4426 are then assembled through bosses 4418. Next, brackets 4414 are installed in the fore-aft direction into the envelope of brace 4420 and fasteners 4422 are then installed. Then, vertical fasteners 4422, which may be double shear bolts, are added loosely. Fasteners 4426 are tightened first, then fasteners 441 are tightened. Lastly, fasteners 4422 are tightened. Accordingly, fasteners 4412 have no preload loss in the joint and allow some flexibility and tolerance stack up with this configuration.

Referring to FIGS. 88-93, the powertrain of vehicle 2 includes a breather tube or conduit 4140. Breather tube 4140 is configured to prevent engine oil from entering the combustion system of engine 50 if vehicle 2 is in a tip- or roll-over situation. For example, at approximately 80° lean relative to vertical, sump oil for engine 50 may move through breather tube 4140 and could enter the intake manifold of engine 50, which may cause damage to the cylinders and other components of engine 50. As such, there is a need for breather tube 4140 to mechanically close off this flow path to the intake manifold during a roll-over situation.

Breather tube 4140 includes a first or engine portion 4142 configured to be coupled with main oil sump 648 of engine 50 (FIG. 25) and a second or intake portion 4144 configured to be coupled with an intake manifold of engine 50. More particularly, first portion 4142 includes a coupler or connector 4146 configured as a quick-connect coupler for attaching to sump 648 or other portion of engine 50 and second portion 4144 includes a coupler or connect 4148 configured as a quick-connect coupler for attaching to the intake manifold.

Additionally, breather tube 4140 includes a check valve 4150 positioned at an interface 4152 of first and second portions 4142, 4144. Check valve 4150 includes a housing 4154 having a first end 4156 and a second end 4158 and a check ball 4153. First end 4156 is positioned generally in first portion 4142 of breather tube 4140 while second end 4158 is positioned generally in second portion 4144 of breather tube 4140. Housing 4154 may be a single component configured to house check ball 4153 such that first and second ends 4156, 4158 may be integrally formed together. In various embodiments, housing 4154 may be comprised of aluminum tubing or injection-molded plastic which is ultrasonically welded together. The materials comprising housing 4154 and check ball 4153 are configured to withstand high engine oil temperatures (e.g., approximately 150° C.) and completely seal hot oil from entering the intake manifold of engine 50.

First end 4156 includes at least one stop feature 4160, configured as an indentation or reduced diameter portion of housing 4154, which prevents movement of check ball 4153 past this portion of first end 4156. Second end 4158 includes a seat 4162 configured to receive check ball 4153 when check ball 4153 is within second end 4158. Seat 4162, which may be comprised of a rubber material, includes an orifice 4164 extending therethrough and is configured to receive a fluid depending on the operation and position of vehicle 2. In one embodiment, the flow area through housing 4154 may be approximately seven times larger than the flow area through orifice 4164. Both first and second ends 4156, 4158 include guides 4166 configured to ensure that check ball 4153 remains centered within housing 4154 for complete sealing, if needed.

Figure 92:
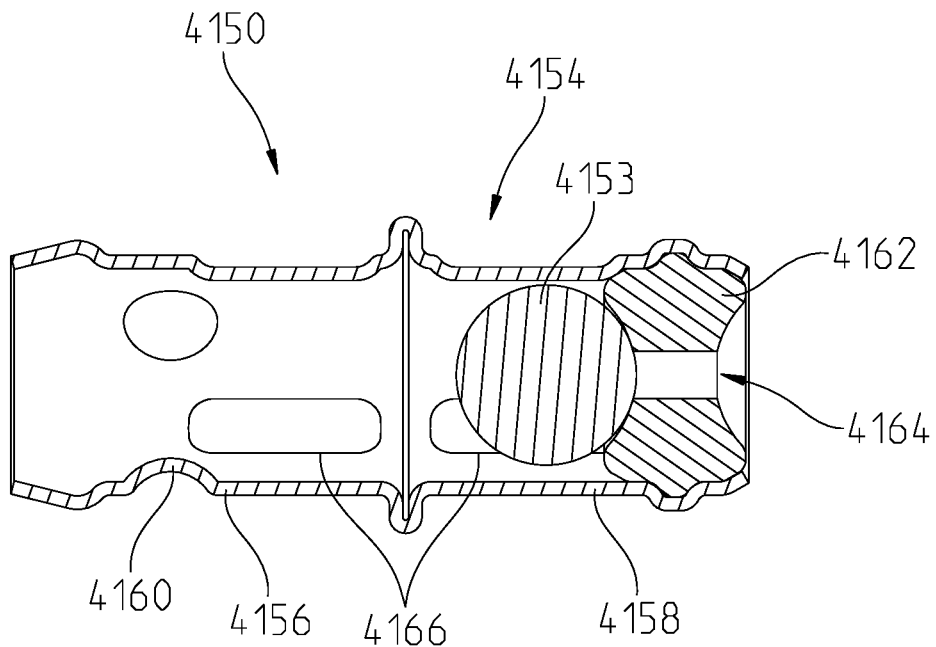
FIG. 92 is a cross-sectional view of a check valve of the breather tube of FIG. 89 when the vehicle of FIG. 1 is in a tip- or roll-over condition.
Figure 93:
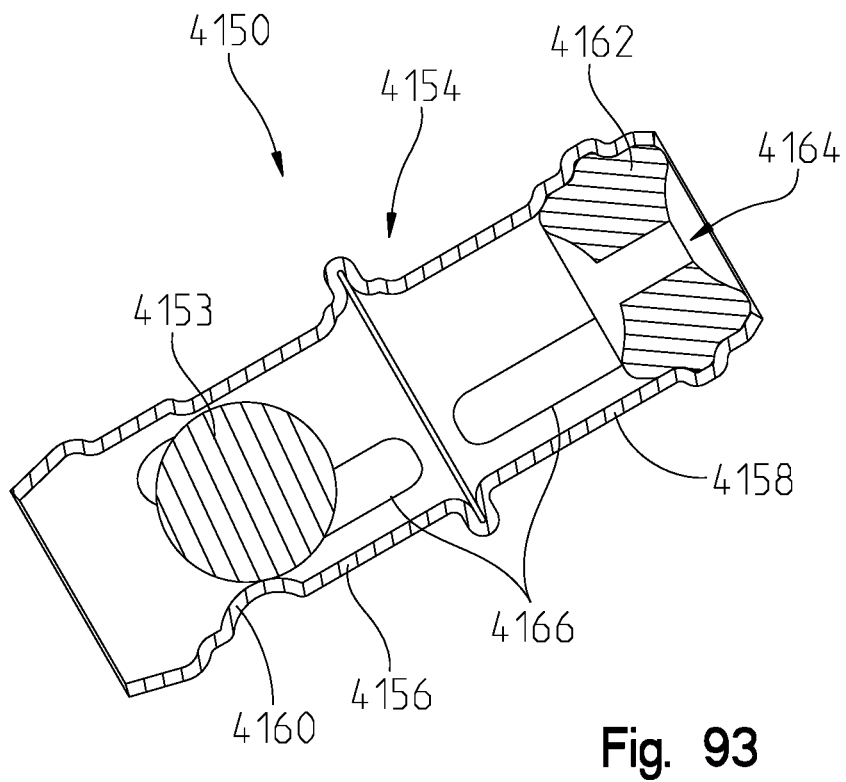
FIG. 93 is a cross-sectional view of the check valve of FIG. 92 when the vehicle of FIG. 1 is in an upright position on a ground surface.

In operation, and referring to FIGS. 92 and 93, if vehicle 2 encounters a tip- or roll-over situation, check ball 4153 moves towards seat 4162 to prevent oil from sump 648 flowing into the intake manifold of engine 50 (FIG. 92). However, when vehicle 2 is upright and operating along a ground surface, check ball 4153 may move away from seat 4162 in order to allow gas pressure from the crankcase of engine 50 or other fluids to vent during operation of the powertrain (FIG. 93).

Figure 94:
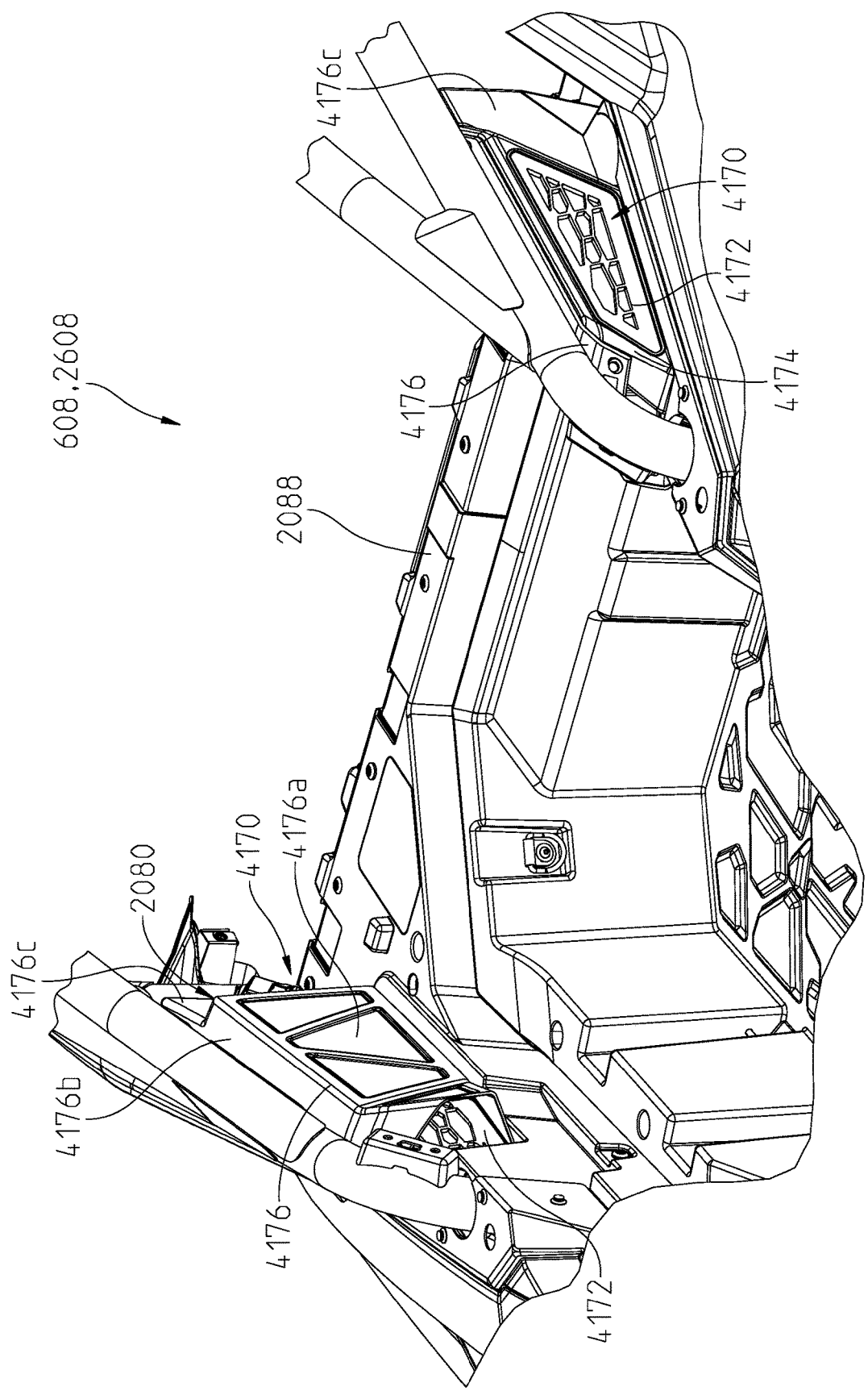
FIG. 94 is a right rear perspective view of air intake bezels of the vehicle of FIG. 1.
Figure 95:
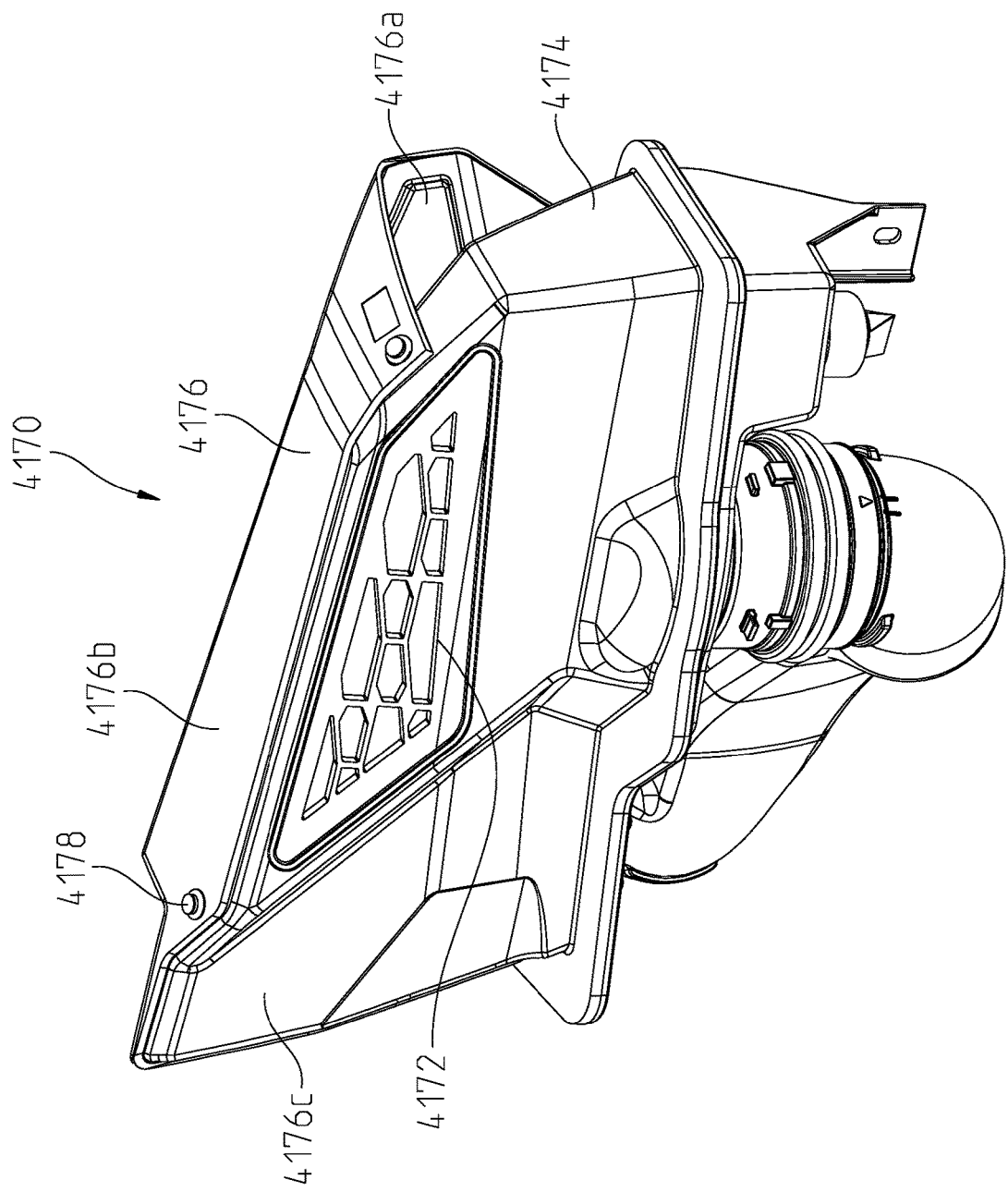
FIG. 95 is a perspective view of the air intake bezel of FIG. 94.
Figure 96:
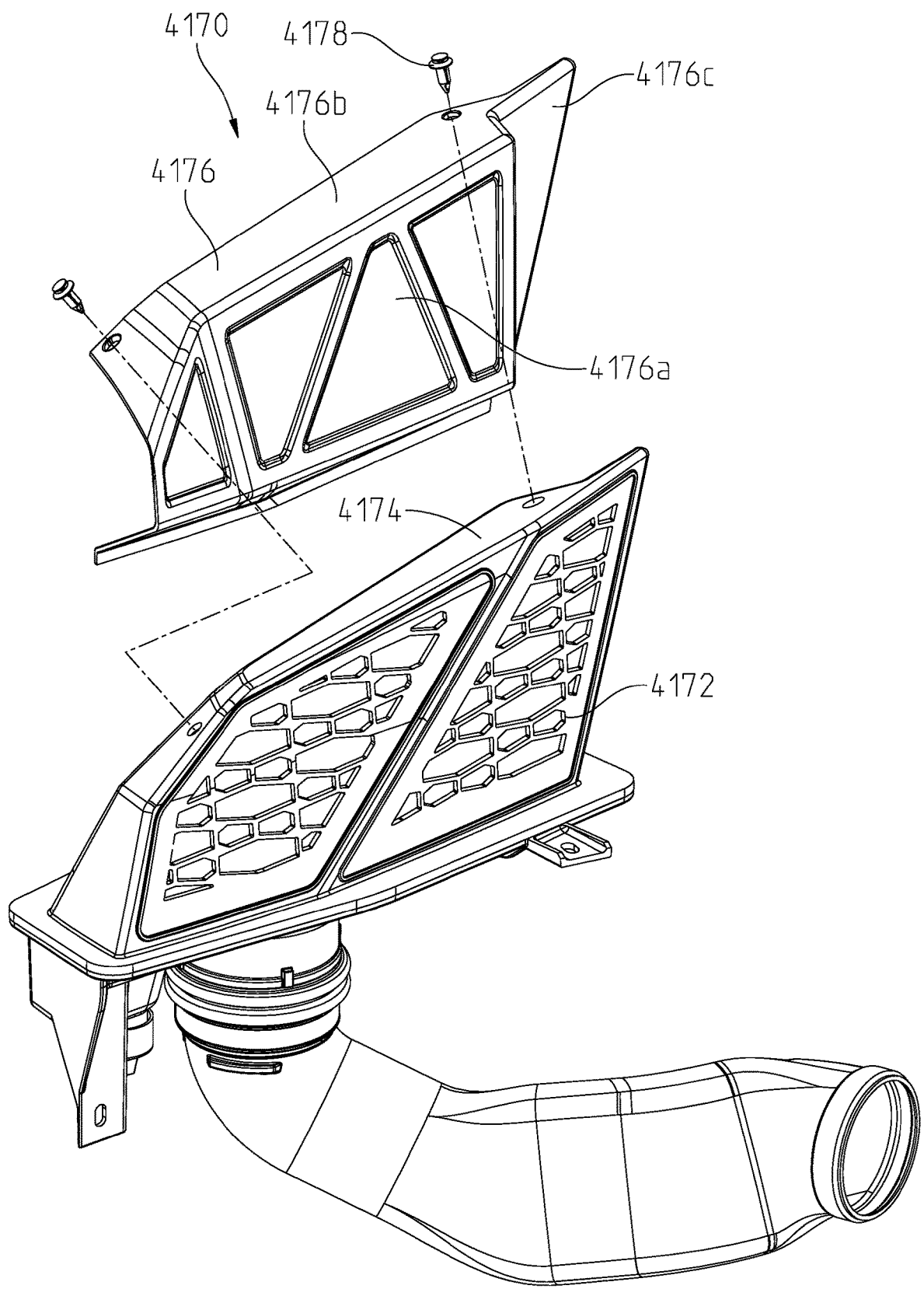
FIG. 96 is an exploded view of the air intake bezel and a bezel cover.

Referring to FIGS. 94-96, the powertrain of vehicle 2 includes air intake system 608, 2608, as disclosed herein. Air intake system 608, 2608 includes intake ports 4170 positioned generally adjacent utility bed 2088. Illustratively, intake ports 4170 are positioned on right and left sides of vehicle 2 and one intake port 4170 is configured to provide air to engine 50 and the other intake port 4170 is configured to provide air to CVT 52. The incoming air from intake port 4170 to engine 50 is provided for combustion while the incoming air from the other intake port 4170 to CVT 52 provides cooling air for cooling clutches 978, 980 and the belt.

Intake ports 4170 each include a filter or other cover 4172 coupled to a bezel 4174. Bezel 4174 may be defined as part of outer body 80, 2080 and may receive filter 4172 (e.g., be removably coupled with filter 4172) or may be integrally formed with filter 4172. Ports 4170 face outwardly from vehicle 2 such that ports 4170 face the ambient air surrounding vehicle 2 and are configured to pull ambient air therein.

To minimize noise caused by the incoming air flowing into ports 4170, bezel covers or blockers 4176 may be positioned along a portion of bezels 4174. More particularly, because ports 4170 are positioned generally at the same vertical height as a portion of the seat back in seating area 22, noise at ports 4170 may be heard by the operator and/or passenger; however, bezel covers 4176 deflect sound rearwardly and away from seating area 22.

Illustratively, bezel covers 4176 include an inwardly-facing wall 4176a, an upper surface 4176b, and a rearwardly-extending portion 4176c. In this way, bezel covers 4176 generally surround upper and inner surfaces of bezels 4174 while leaving the outer surface of bezel 4174 and filter 4172 fully exposed for receiving the ambient air. Bezel cover 4176 may be removably coupled to bezel 4174 through fasteners 4178 extending through at least upper surface 4176b. In this way, bezel covers 4176 may be removed for cleaning and removing mud or dirt accumulations thereon. It may be appreciated that bezel covers 4176 do not extend into utility bed 2088 and, therefore, do not impinge on the available cargo volume or space of utility bed 2088.

Figure 97:
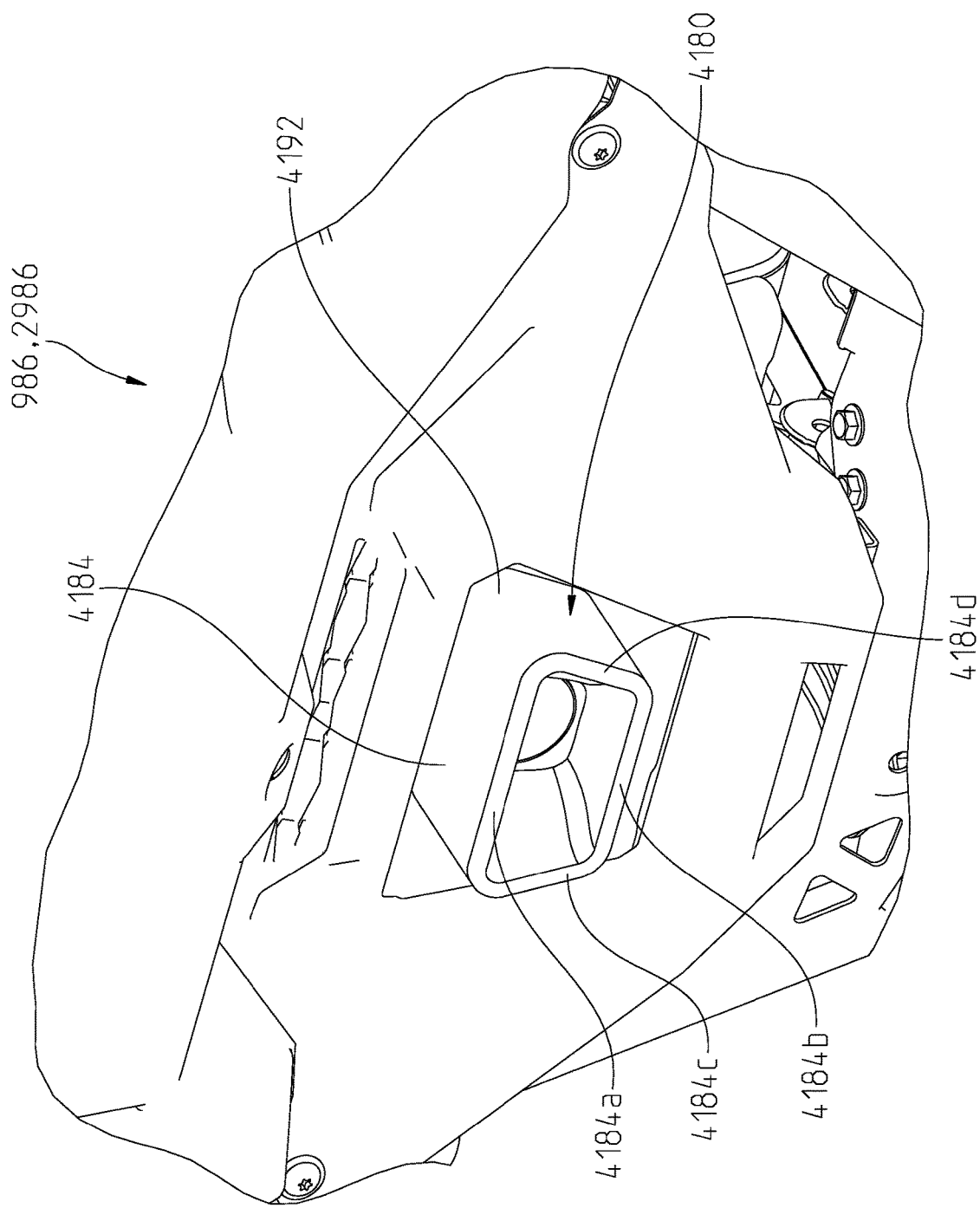
FIG. 97 is a right rear perspective view of an exhaust of the vehicle of FIG.
Figure 98:
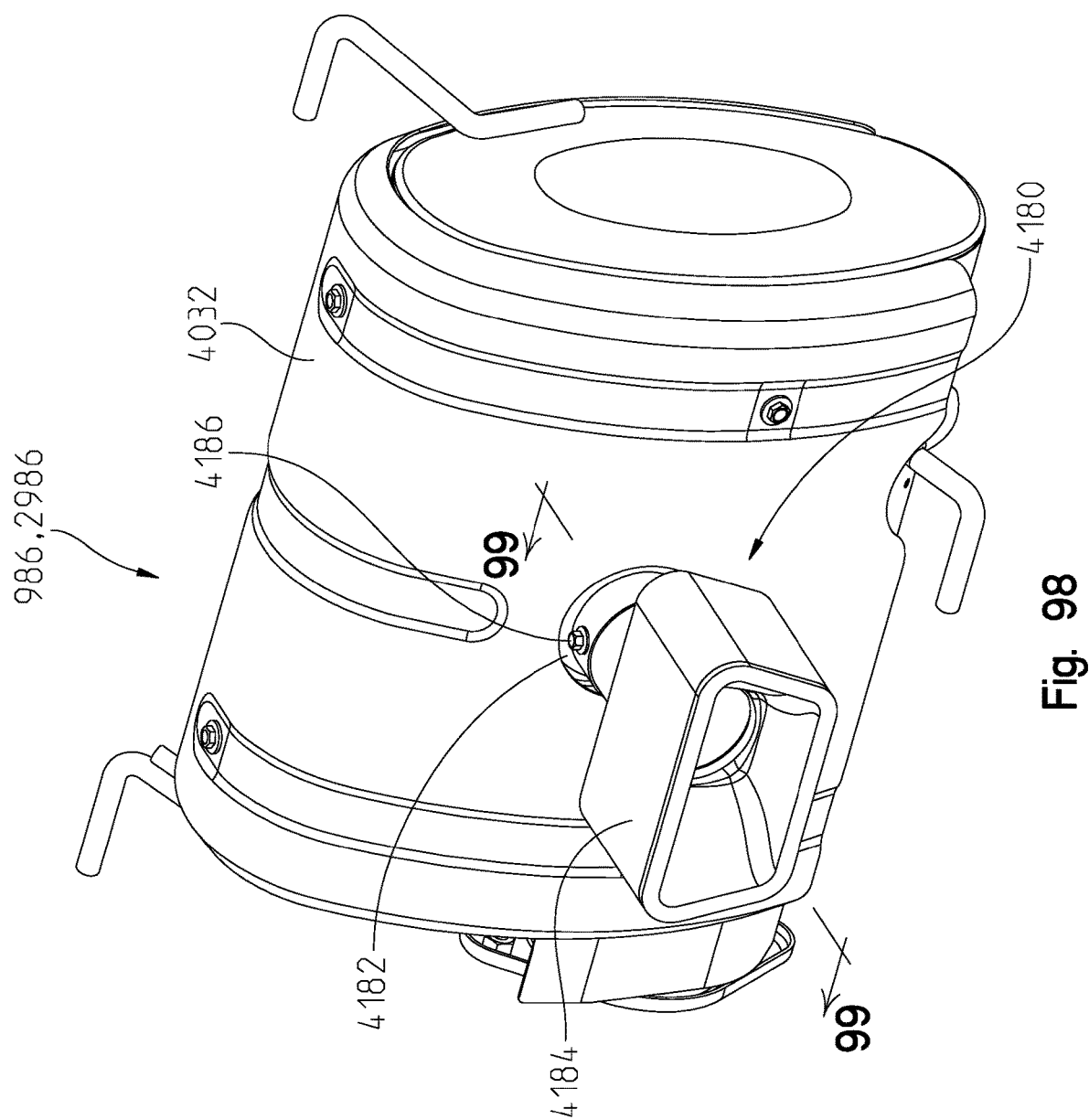
FIG. 98 is a right rear perspective view of a muffler of the exhaust of FIG. 97.
Figure 99:
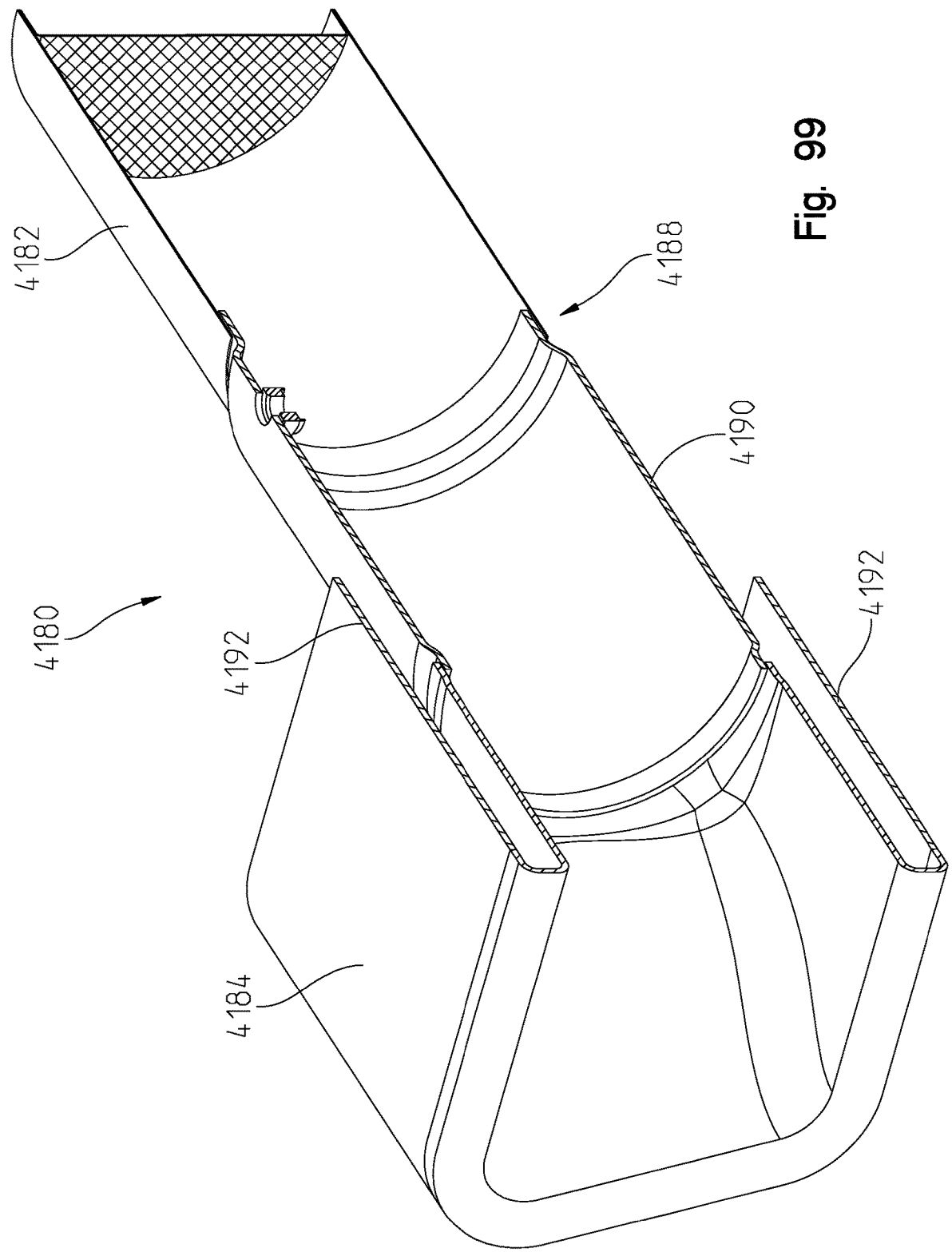
FIG. 99 is a cross-sectional view of an outlet portion of the exhaust, taken along line 99-99 of FIG. 98.

Referring to FIGS. 97-99, the powertrain of vehicle 2 includes exhaust 986, 2986, as disclosed herein. Exhaust 986, 2986 includes muffler 4032 supported at the rear end of vehicle 2 and, more particularly, supported by support area 2200. Exhaust 986, 2986 further includes an exhaust outlet or tailpipe 4180 comprised of a conduit portion 4182 and an outlet portion 4184. Conduit portion 4182 may be removably coupled or integrally formed with a portion of muffler 4032 and outlet portion 4184 is fluidly coupled to muffler 4032 through conduit portion 4182.

Illustratively, outlet portion 4184 is removably coupled to conduit portion 4182 at an intersection or coupling location 4188 and is retained on conduit portion 4182 with at least a removable fastener 4186 (FIG. 98). A collar or other coupling or retaining member also may be used to join outlet portion 4184 to conduit portion 4182 at intersection 4188.

Outlet portion 4184 may include a plurality of sides which intersect with each other. Illustratively, the shape of outlet portion 4184 is defined by four sides and generally defines a trapezoid. As shown best in FIGS. 97 and 98, a length of an upper side 4184a may be greater than that of a lower side 4184b. Left and right sides 4184c, 4184d may extend between upper and lower sides 4184a, 4184b and are coupled thereto such that left and right sides 4184c, 4184d extend diagonally inwards towards centerline L to couple with lower side 4184b.

Outlet portion 4184 is defined as a double-wall outlet which includes a first wall segment 4190 extending from and generally colinear with conduit portion 4182 and a second wall segment 4192 surrounding a portion of first wall segment 4190. In one embodiment, first and second wall segments 4190, 4192 are integrally formed with each other and, because of that, second wall segment 4192 increases the return edge of outlet portion 4184. In this way, first and second wall segments 4190, 4192 radially overlap each other to define the double-wall structure. In various embodiments, any portion of exhaust 986, 2986 may include an insulated cover or wrapping to shield adjacent components of vehicle 2 from the heat produced within exhaust 986, 2986 and/or to strategically manage the heat within exhaust 986, 2986 at various points along the system.

In one embodiment, exhaust 2986 is a center exhaust such that outlet portion 4184 is positioned along centerline L (FIG. 5). However, various panels of outer body 80 also may be positioned at this location and, therefore, it is necessary to ensure that the temperature of exhaust 2986 at the location of the body panels of outer body 80 does not exceed a threshold which is detrimental to the body panels. By configuring outlet portion 4184 as a double-wall outlet, the cumulative thermal conductivity of outlet portion 4184 decreases, thereby protecting the body panels adjacent outlet portion 4184.

Figure 100:
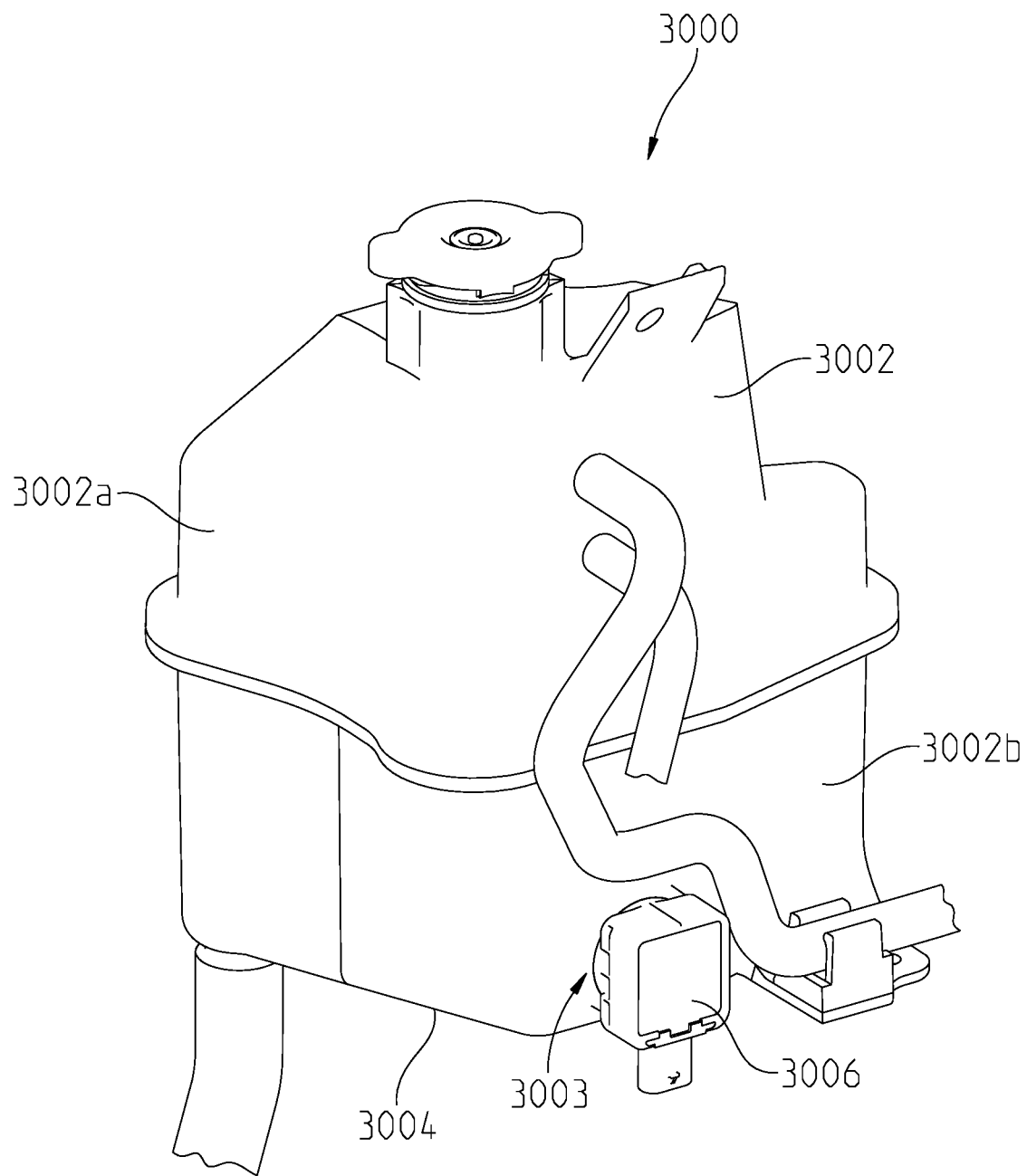
FIG. 100 is a perspective view of a coolant bottle of the vehicle of FIG. 1.

Referring to FIG. 100, a cooling assembly may be provided with the powertrain of vehicle 2 in order to provide cooling to the various components of the powertrain, such as engine 50. The cooling assembly includes coolant bottle 3000, which may be similar to coolant bottle 1000 of FIG. 42. Coolant bottle 3000 may be supported on support area 2200, as shown in FIG. 66, and, illustratively, may be supported on tubes 2208 at a position generally adjacent airbox 4030. Coolant bottle 3000 includes a housing 3002 configured to store coolant fluid and, more particularly, includes an upper housing portion 3002a and a lower housing portion 3002b. Lower housing portion 3002b includes a notched or recessed portion 3003 positioned adjacent a lower or bottom surface 3004 of housing 3002.

Recessed portion 3003 is configured to receive a sensor 3006. Sensor 3006 is configured to detect the coolant level within coolant bottle 3000. Based on the location of recessed portion 3003 and sensor 3006 (i.e., the location adjacent lower surface 3004), sensor 3006 can detect when the coolant level in housing 3002 is low. Sensor 3006 is electrically or otherwise operably coupled to a control system of vehicle 2 and, therefore, if a controller receives an input from sensor 3006 indicating that the coolant level in coolant bottle 3000 is low, the control system may provide a visual or auditory alert to the operator. If necessary, the control system may control vehicle operation and/or parameters of the powertrain based on the coolant level within coolant bottle 3000 and the output of sensor 3006.

Figure 101:
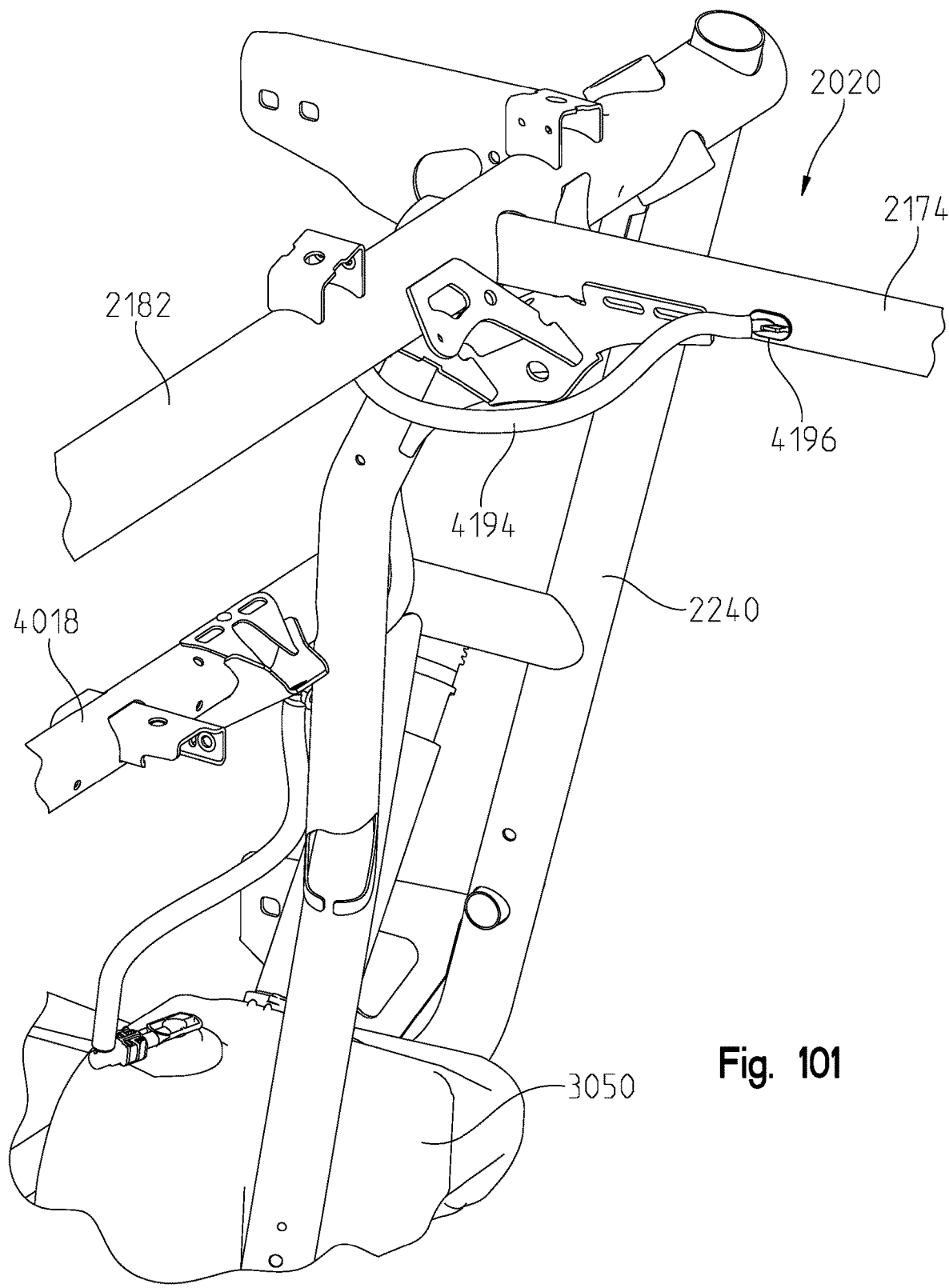
FIG. 101 is a left rear perspective of the frame of FIG. 57 and a fuel tank with a vent line.

Referring to FIG. 101, the powertrain of vehicle includes fuel tank 3050 similar to fuel tank 1050 disclosed in FIGS. 44 and 45. Fuel tank 3050 may include a vent conduit 4194 positioned along a portion of frame 2020 and directed towards the rear of vehicle 2. More particularly, vent conduit 4194 extends upwardly towards frame member 2182 and along frame tube 2174 to enter frame tube 2174 at an opening 4196 (also shown in FIGS. 56 and 63-65). Frame tube 2174 is a hollow frame tube which also includes an opening 4198 (FIGS. 57 and 63-65) at a rear end thereof. Vent conduit 4194 may extend through opening 4196 and along a length of frame tube 2174 towards opening 4198. In this way, fuel (e.g., vapor) that is vented from fuel tank 3050 flows through vent conduit 4194 and into frame tube 2174 at opening 4196. The fuel that vents from conduit 4194 into frame tube 2174 then flows rearwardly through at least a length of vent conduit 4194 and/or frame tube 2174 and exits frame tube 2174 and vehicle 2 at opening 4198. As such, vented fuel is directed towards right side of vehicle 2 at frame tube 2174 and is directed away from heat-producing components (e.g., of the powertrain), even when vehicle 2 is traversing on a hill or is leaning, for example, to the left side. In other words, the configuration of frame tube 2174, openings 4196, 4198, and vent conduit 4194 ensures that fuel does deviate from the path within frame tube 2174 and flow towards a hot area of frame 2020 when vehicle 2 is at certain orientations.

Figure 102:
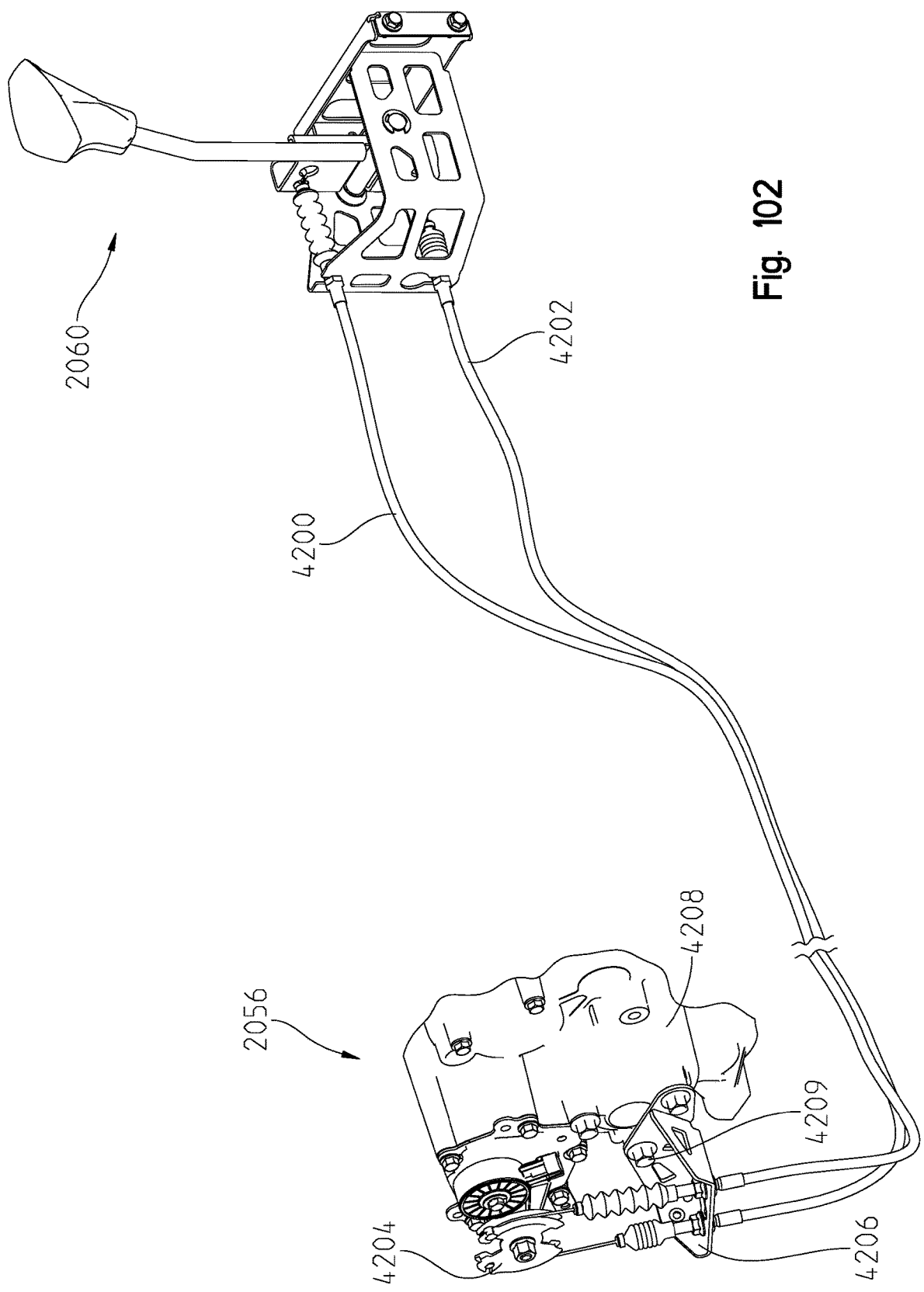
FIG. 102 is a right rear perspective view of a shifting assembly for a shiftable transmission of the vehicle of FIG. 1.
Figure 103:
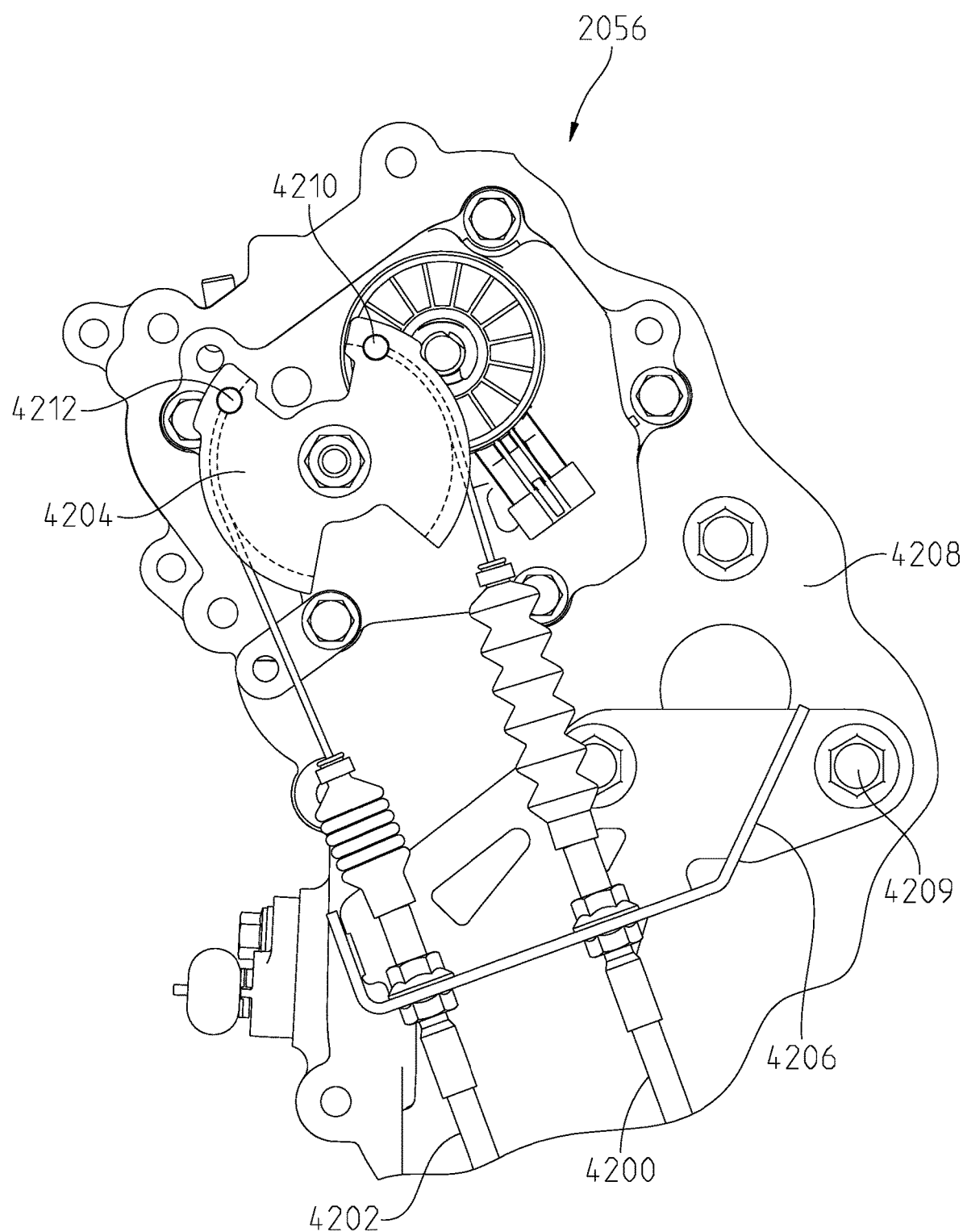
FIG. 103 is an elevational view of a portion of the shifting assembly and the shiftable transmission of FIG. 102.

Referring to FIGS. 102 and 103, in operation, the powertrain of vehicle 2 may be configured for pull-pull shifting. The powertrain of vehicle 2 further includes shiftable transmission 2056 which may be similar to shiftable transmission 56 of FIG. 3. Shiftable transmission 2056 is operable by a shifter assembly 2060 which may be similar to shifter assembly 60 of FIG. 5. Illustratively, shifter assembly 2060 is operably coupled to a first cable 4200 and a second cable 4202 both of which extend between shifter assembly 2060 and shiftable transmission 2056.

Cables 4200, 4202 are operably coupled to a pulley 4204 of shiftable transmission 2056. At least a portion of cables 4200, 4202 is supported on a bracket 4206 extending from a housing 4208 of shiftable transmission 2056. Bracket 4206 is removably coupled to housing 4208 with fasteners 4209. Each cable 4200, 4202 is coupled to pulley 4204 at a connection location and, as shown best in FIG. 103, cable 4200 is coupled to pulley 4204 at connection location 4210 and cable 4202 is coupled to pulley 4204 at connection location 4212. Connection locations 4210, 4212 are fixed points on pulley 4204 such that movement of cables 4200, 4202 pulls pulley 4204 at the corresponding connection location 4210, 4212 to cause a shift change in shiftable transmission 2056. Pulley 4204 keeps the effective radius of cables 4200, 4202 constant and, therefore, the shift force also stays constant. By using pulley 4204 and the two pull cables 4200, 4202, the force required to shift remains constant.

Cables 4200, 4202 are configured as pull cables such that movement in cable 4200, 4202 pulls on pulley 4204 based on movement of shifter assembly 2060, compared to known designs which require a combination of pulling and pushing movements on the transmission bell crank to shift the transmission. By configuring cables 4200, 4202 as pull cables, the bell crank of traditional shiftable transmissions may be eliminated.

In one embodiment, cables 4200, 4202 are different sizes to ensure proper installation on vehicle 2. More particularly, connection locations 4210, 4212 of pulley 4204 are defined as openings with different diameters to corresponding to the different diameters of cables 4200, 4202 such that only cable 4200 may be coupled to pulley 4204 at connection location 4210 and cable 4202 may be coupled to pulley 4204 at connection location 4212. Similarly, shifter assembly 2060 also includes differently-sized openings corresponding to each of cables 4200, 4202. Further, bracket 4206 also may include openings having different diameters such that bracket 4206 receives cable 4200 through a first opening for coupling with connection location 4210 and bracket 4206 receives cable 4202 through a second opening (having a different diameter than that of the first opening) for coupling with connection location 4212.

In operation, when shifter assembly 2060 is moved to a particular position by the operator to indicate the desired gear, either cable 4200 or cable 4202 moves in response to the movement of shifter assembly 2060. The movement of cable 4200 or cable 4202 pulls on pulley 4204. The movement of pulley 4204 causes a shift change in shiftable transmission 2056. It may be appreciated that because cables 4200, 4202 are not connected to each other (e.g., because each cable 4200, 4202 has a separate connection location 4210, 4212 on pulley 4204), when one cable moves, there is no corresponding and opposite movement of the other cable. Instead, both cables 4200, 4202 are configured for a pulling motion on pulley 4204 based on the movement of shifter assembly 2060.

Figure 104:
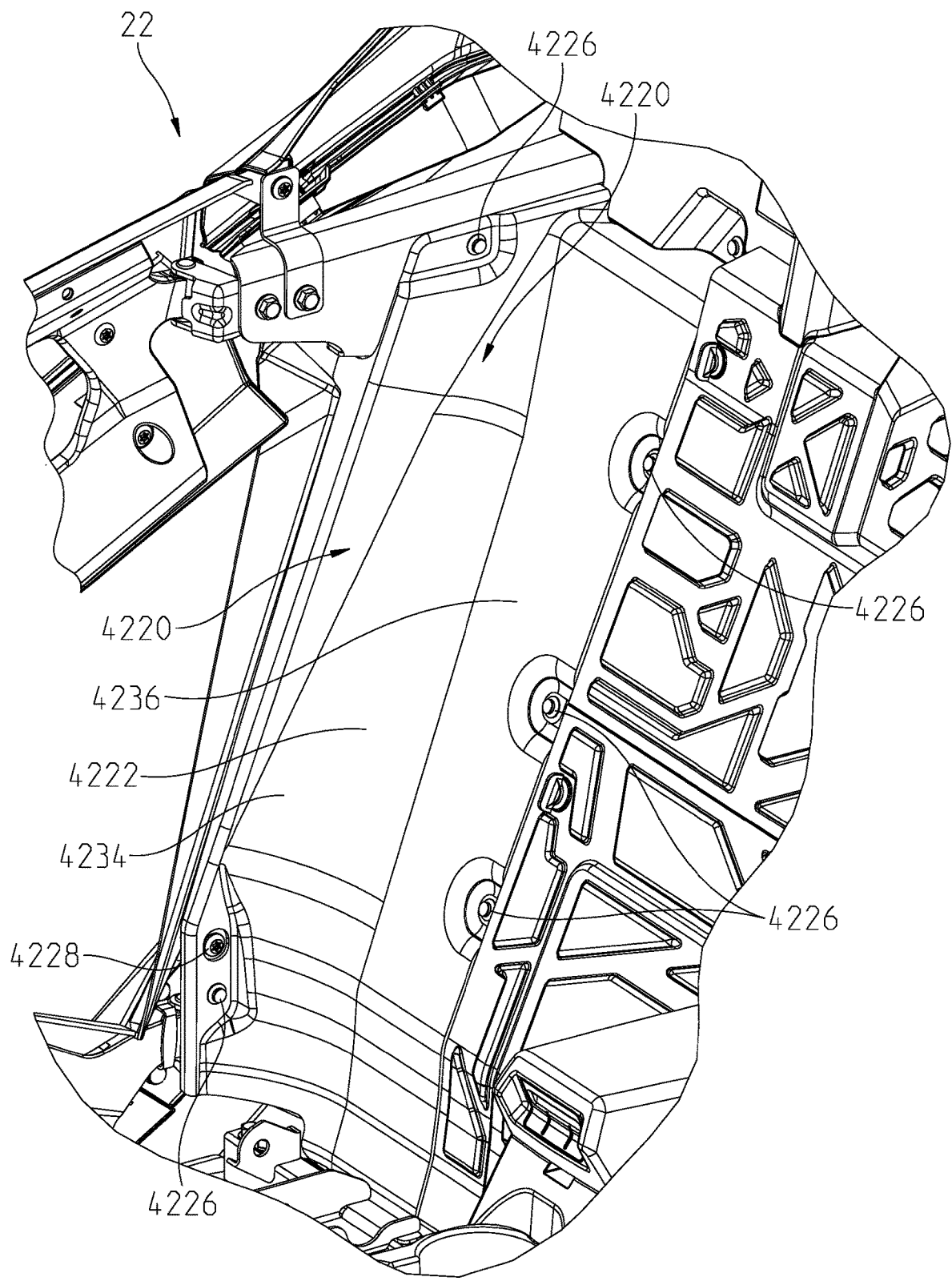
FIG. 104 is a left front perspective view of a panel within a seating area of the vehicle of FIG. 1.
Figure 105:
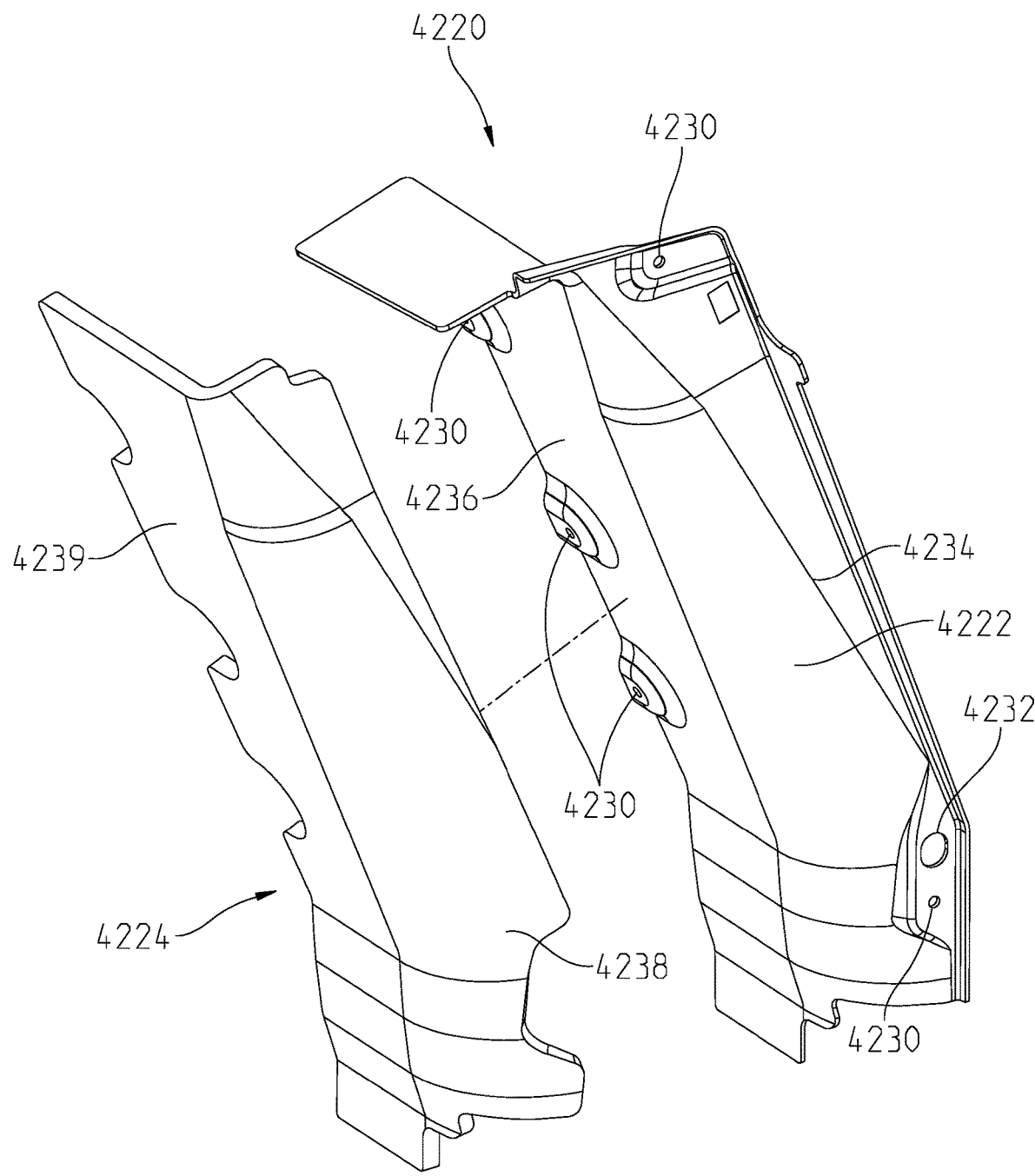
FIG. 105 is an exploded view of the panel of FIG. 104.
Figure 106:
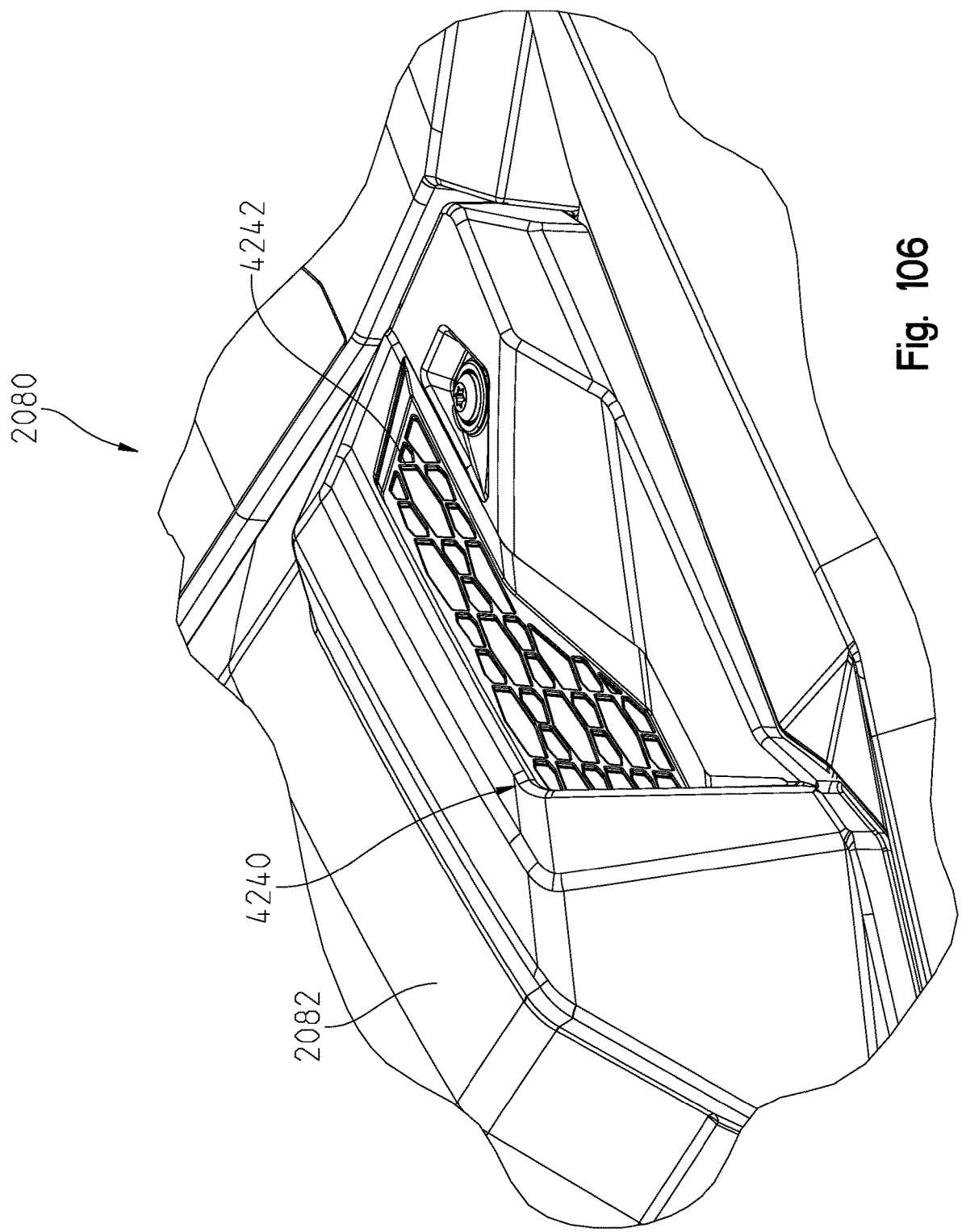
FIG. 106 is a perspective view of an air intake grille and a portion of a hood of the vehicle of FIG. 1.
Figure 107:
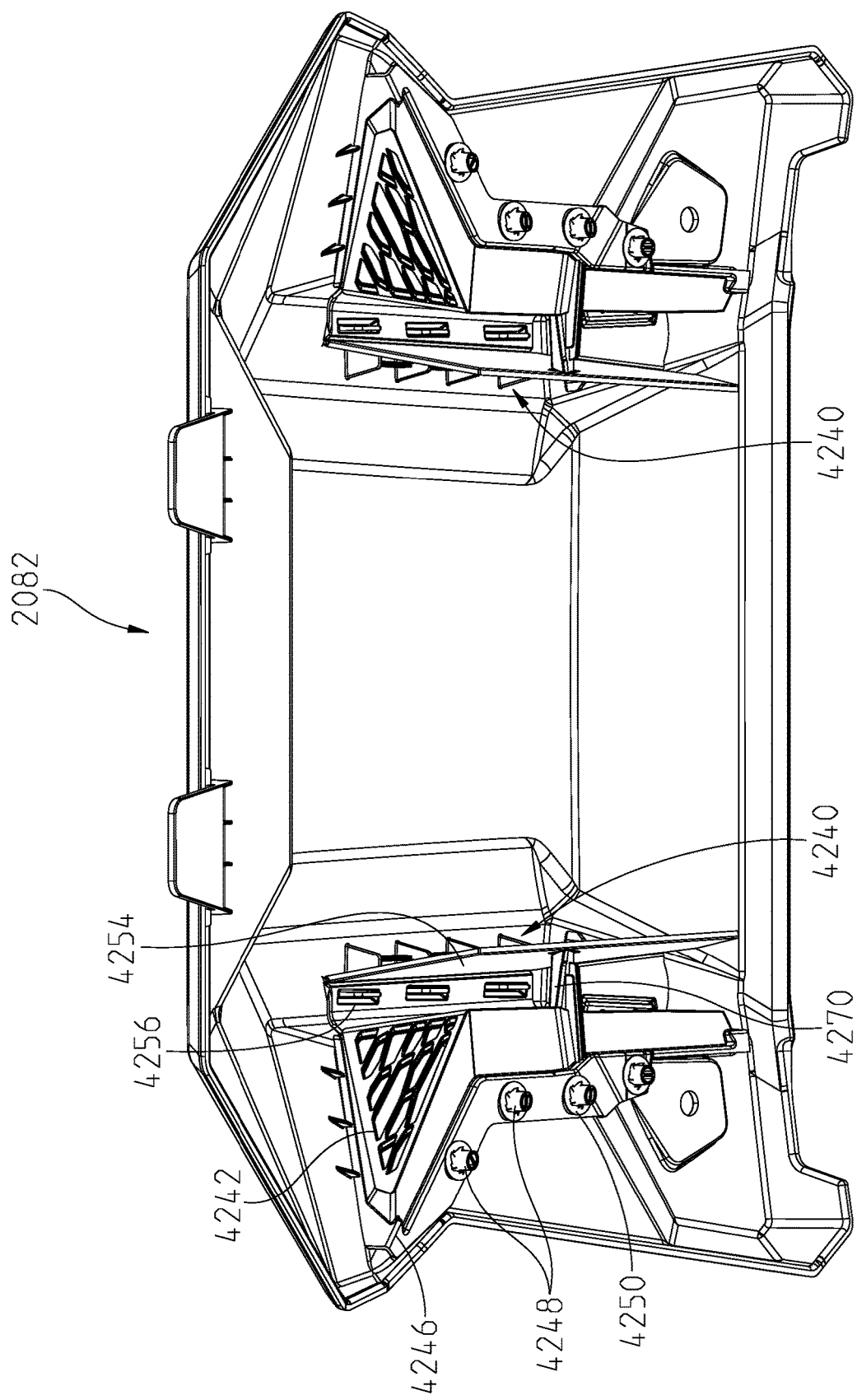
FIG. 107 is an underside view of the hood and the air intake grille of FIG. 106.
Figure 108:
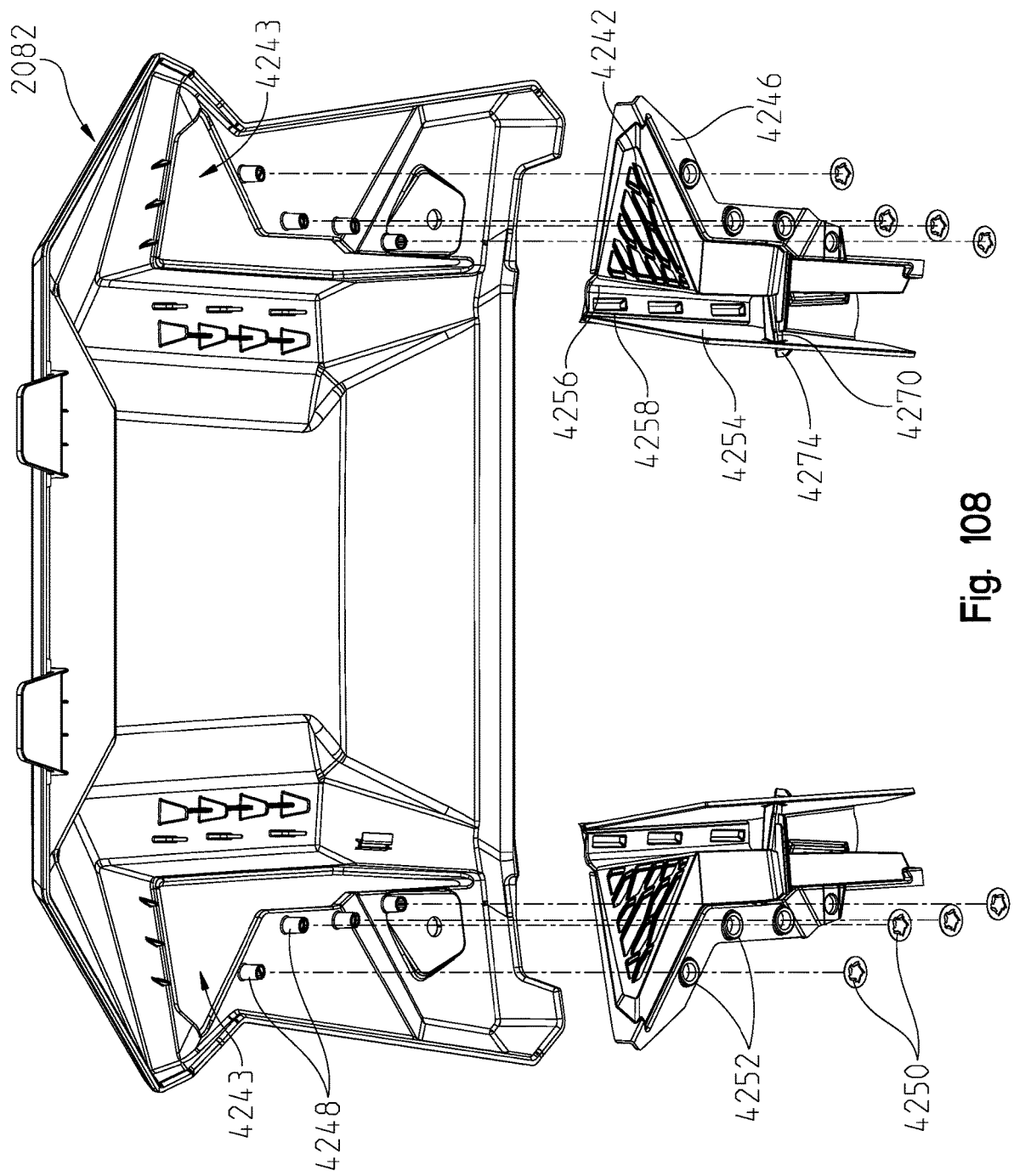
FIG. 108 is an exploded view of the hood and the air intake grille of FIG. 107.
Figure 109:
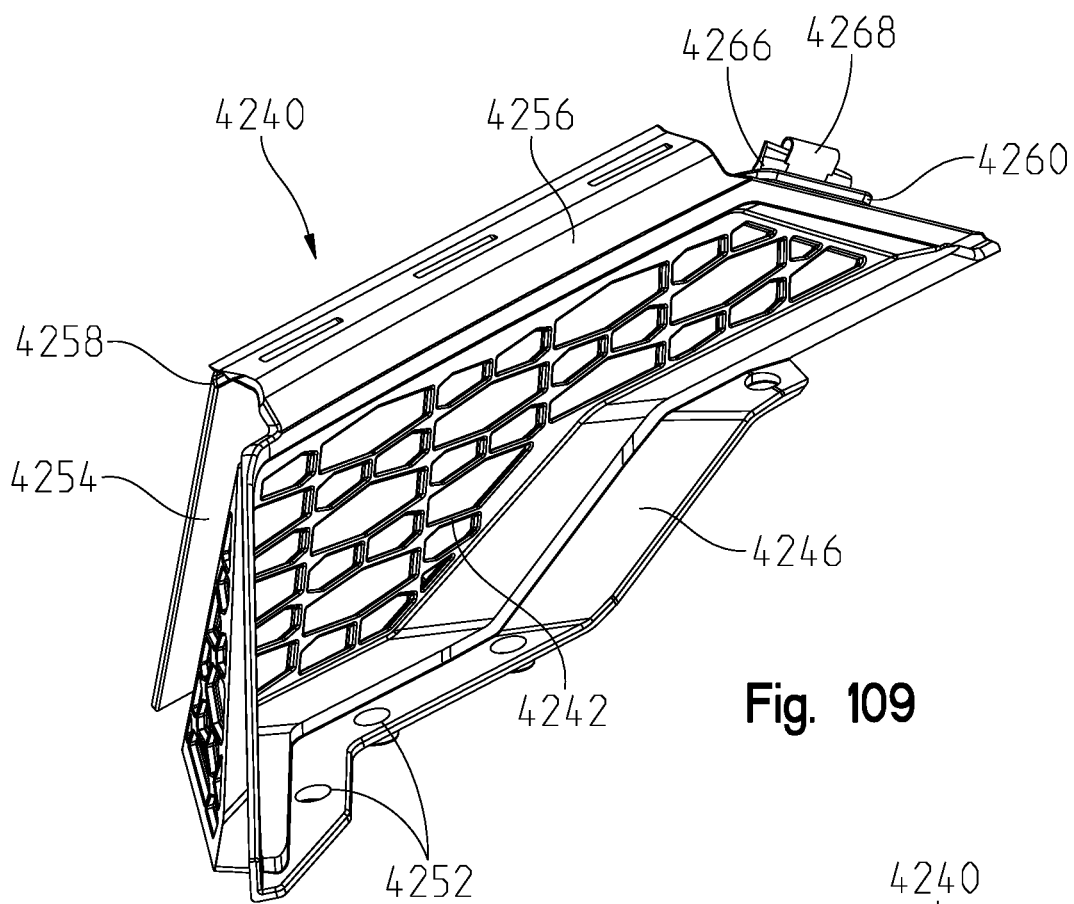
FIG. 109 is a perspective view of the air intake grille and a hinge assembly.
Figure 110:
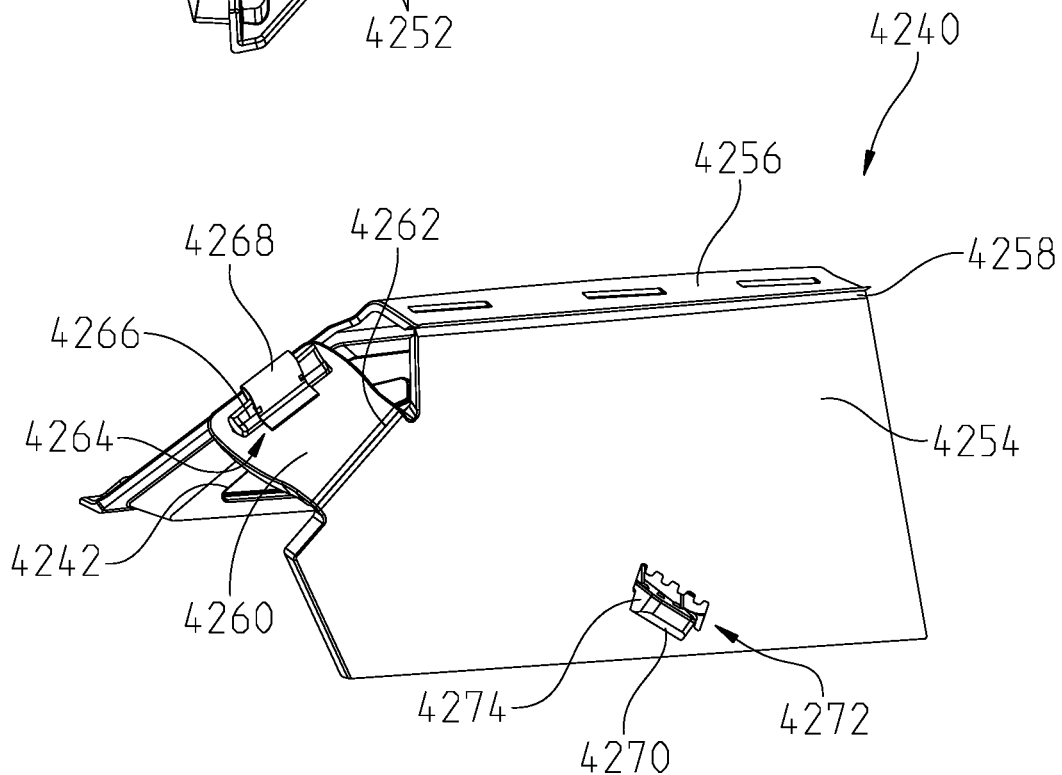
FIG. 110 is a further perspective view of the air intake grille and a hinge assembly of FIG. 109.
Figure 111:
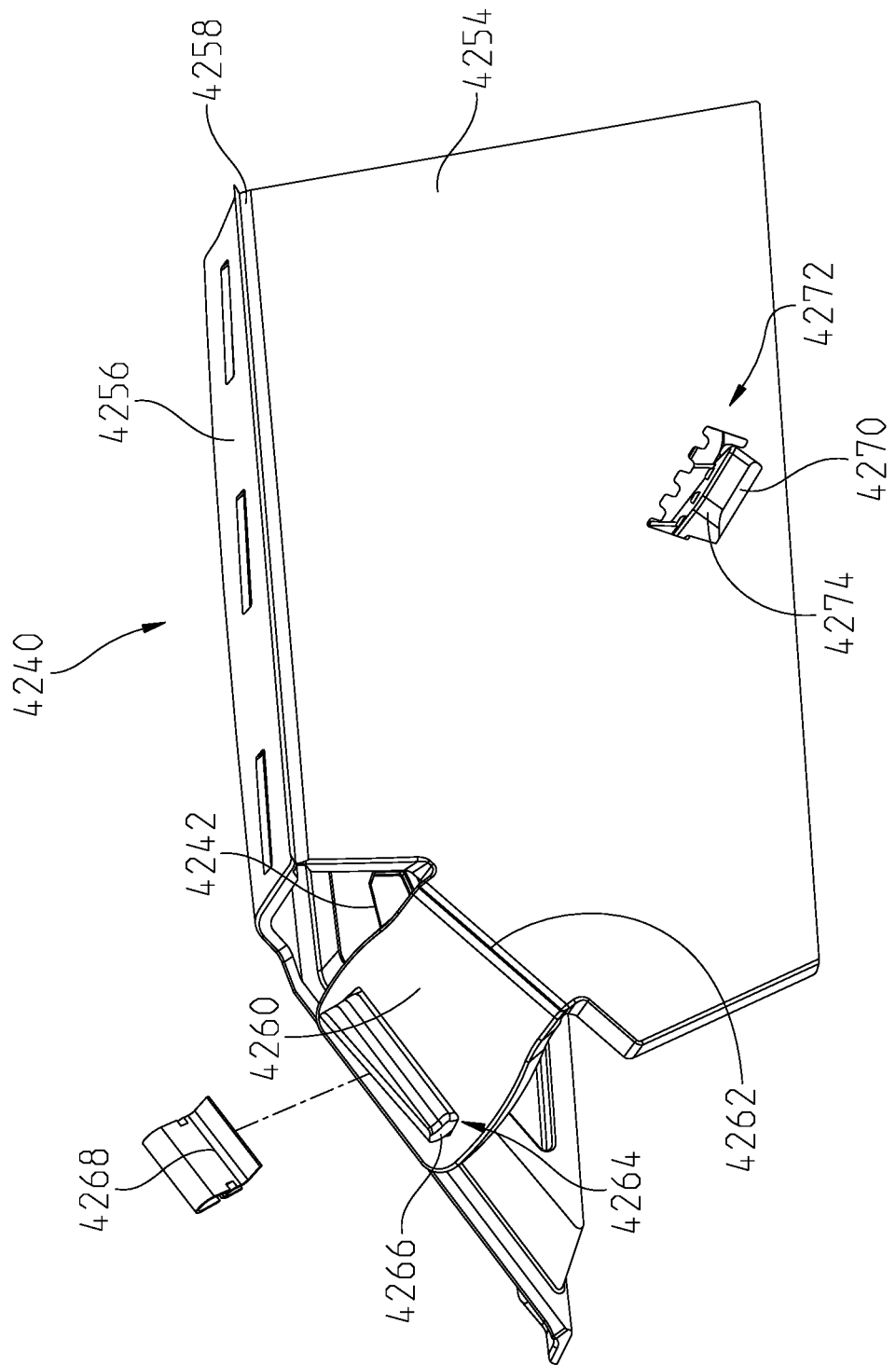
FIG. 111 is another perspective view of the air intake grille and a hinge assembly of FIG. 110.

Referring to FIGS. 104 and 105, in order to minimize noise and vibrations from the powertrain and/or other components or systems of vehicle 2 within seating area 22, vehicle 2 may include panels 4220. Panels 4220 may be configured as two-part panels which include a first portion 4222 and a second portion 4224. First and second portions 4222, 4224 may be coupled together in various ways, such as with adhesive or mechanical fasteners. First and second portions 4222, 4224 are coupled to vehicle 2 through fasteners 4226, 4228. Fasteners 4226, 4228 may be dowels, pins, bolts, screws, or other removable coupling or locating components.

Illustratively, first portion 4222 is positioned forward of second portion 4224 such that first portion 4222 is exposed to seating area 22 while second portion 4224 is not. Fasteners 4226 extend through openings 4230 in first portion 4222 and fastener 4228 extends through an opening 4232 in first portion 4222 in order to couple with frame 2020 or other portions of vehicle 2 within or defining seating area 22.

First portion 4222 includes a curved or arcuate wall 4234 and a linear or flat wall 4236. Similarly, second portion 4224 includes a curved or arcuate wall 4238 and a linear or flat wall 4239. Walls 4234, 4238 have complementary shapes and, therefore, wall 4234 is generally received within wall 4238. Walls 4236, 4239 also have complementary shapes and may be in contact with each other.

First portion 4222 may be comprised of a polypropylene and fiberglass material, such as Azdel material, available from Federal Foam Technologies, Inc. Second portion 4224 may be comprised of a sound-dampening foam material. In this way, first and second portions 4222, 4224 absorb sound and vibrations from other portions of vehicle 2 so as to minimize noise and vibrations within seating area 22. The materials of first and second portions 4222, 4224 also may be used to reduce the weight of vehicle 2 compared to other sound-dampening or vibration-absorbing materials. Additionally, because at least first portion 4222 is exposed within seating area 22 and, therefore, is exposed to water, mud, dirt, and debris that may enter seating area 22, panels 4220 may be configured as waterproof panels.

Referring to FIGS. 106-111, and as disclosed further herein with respect to outer body 80 (FIG. 1), outer body 2080 of vehicle 2 may include various features. Hood 2082 of outer body 2080 may include a hinge assembly 4240 for coupling a grille 4242 to various surfaces of hood 2082. Grille 4242 may be used to receive and direct ambient air into at least one conduit for components of the powertrain (e.g., an air intake duct of CVT 52). Grille 4242 is positioned within an opening 4243 of hood 2082 and, illustratively, hood 2082 includes openings 4243 on both the left and right sides thereof to support two grilles 4242. Grilles 4242 and the corresponding intake ports at grilles 4242 face laterally outward from centerline L (FIG. 5) to receive ambient air for a powertrain component (e.g., CVT 52).

Hinge assembly 4240 includes an enclosure 4246 extending generally around a perimeter of grille 4242. Enclosure 4246 is coupled to hood 2082 through fasteners 4248, 4250. More particularly, fasteners 4248 extend through openings 4252 within enclosure 4246 and receive fasteners 4250 for coupling enclosure 4246 (encompassing grille 4242) to hood 2082.

Hinge assembly 4240 further includes a deflector panel 4254 coupled to grille 4242 through an upper panel 4256. Upper panel 4256 extends generally inwardly and horizontally from an upper surface of grille 4242 and is positioned below a portion of hood 2082. Deflector panel 4254 extends generally vertically and inwardly relative to upper panel 4256 and grille 4242 and is coupled to upper panel 4256 at a living hinge 4258. The pattern of grille 4242 and the position of deflector panel 4254 relative to grille 4242 minimizes the likelihood that debris or water, which may inadvertently flow through grille 4242, flows into the air intake conduits coupled to the powertrain. Instead, if debris or water flows through grille 4242 and under hood 2082, the debris or water will contact an outer surface of deflector panel 4254 and will fall vertically downward and out of vehicle 2, rather than flowing inwardly under hood 2082 and into the air intake conduit in fluid communication with grilles 4242. More particularly, the pattern of grille 4242 prevents large debris from entering hood 2082 while deflector panel 4254 is inward of grille 4242 and blocks the line of sight to the conduit (e.g., CVT air intake conduit) from water spray, small debris, etc.

Hinge assembly 4240 further includes a tab 4260 extending from deflector panel 4254. Tab 4260 is coupled to deflector panel 4254 at a living hinge 4262. Tab 4260 includes a slot or opening 4264 configured to receive a strap 4266 coupled to enclosure 4246 and/or grille 4242. Strap 4266 at least partially extends through opening 4264 on tab 4260 and is secured thereto with a clip 4268. In this way, deflector panel 4254 is coupled to grille 4242 through upper panel 4256, tab 4260, and strap 4266.

Deflector panel 4254 is further coupled to grille 4242 through an arm 4270 extending from grille 4242 and/or enclosure 4246 and extending through an opening 4272 of deflector panel 4254. Arm 4270 may include a retaining feature 4274 configured to extend through opening 4272 and hook or otherwise retain arm 4270 on deflector panel 4254.

Figure 112:
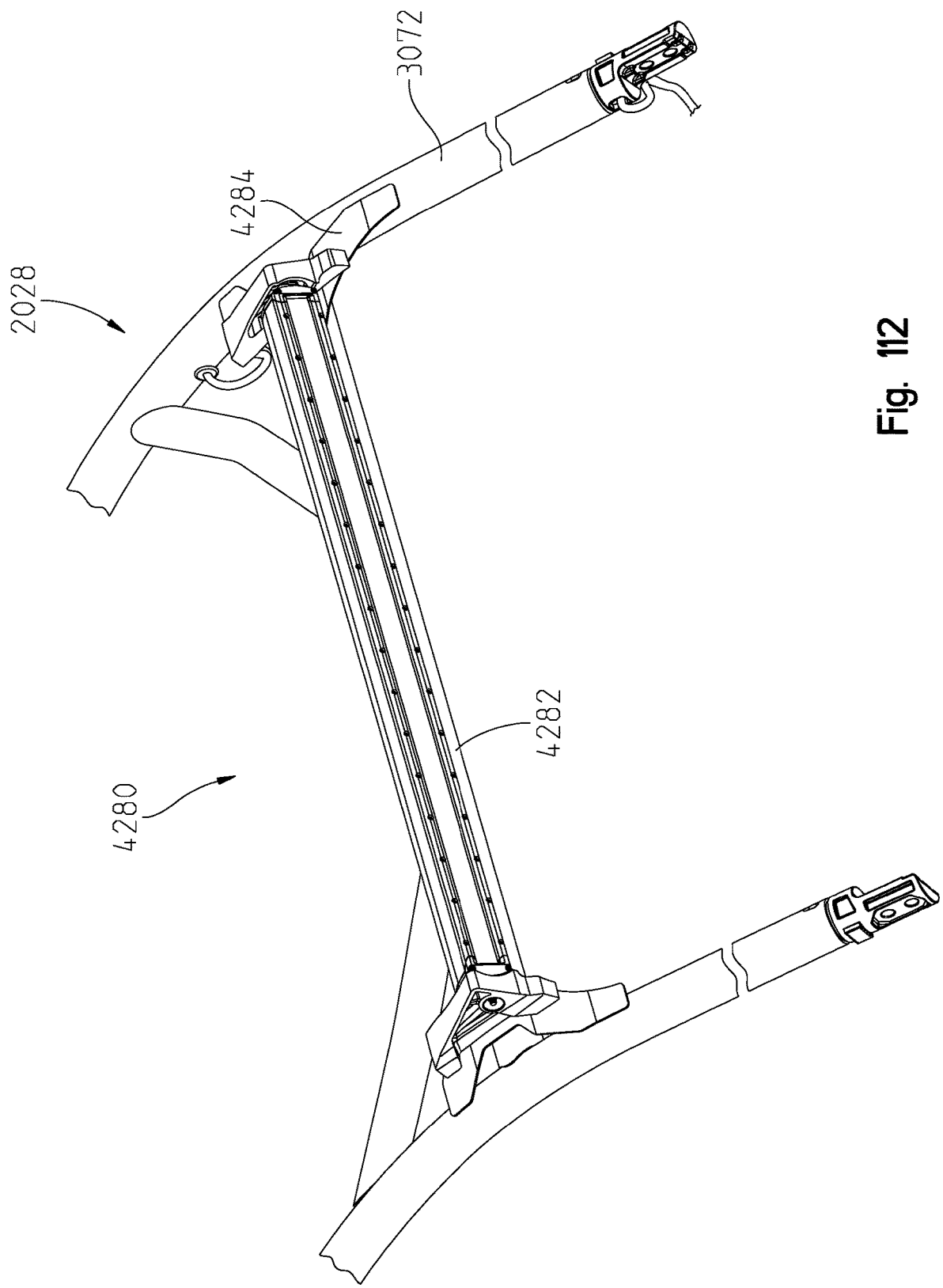
FIG. 112 is a right front perspective of a lightbar assembly coupled to a portion of the cab frame of the vehicle of FIG. 1.
Figure 113:
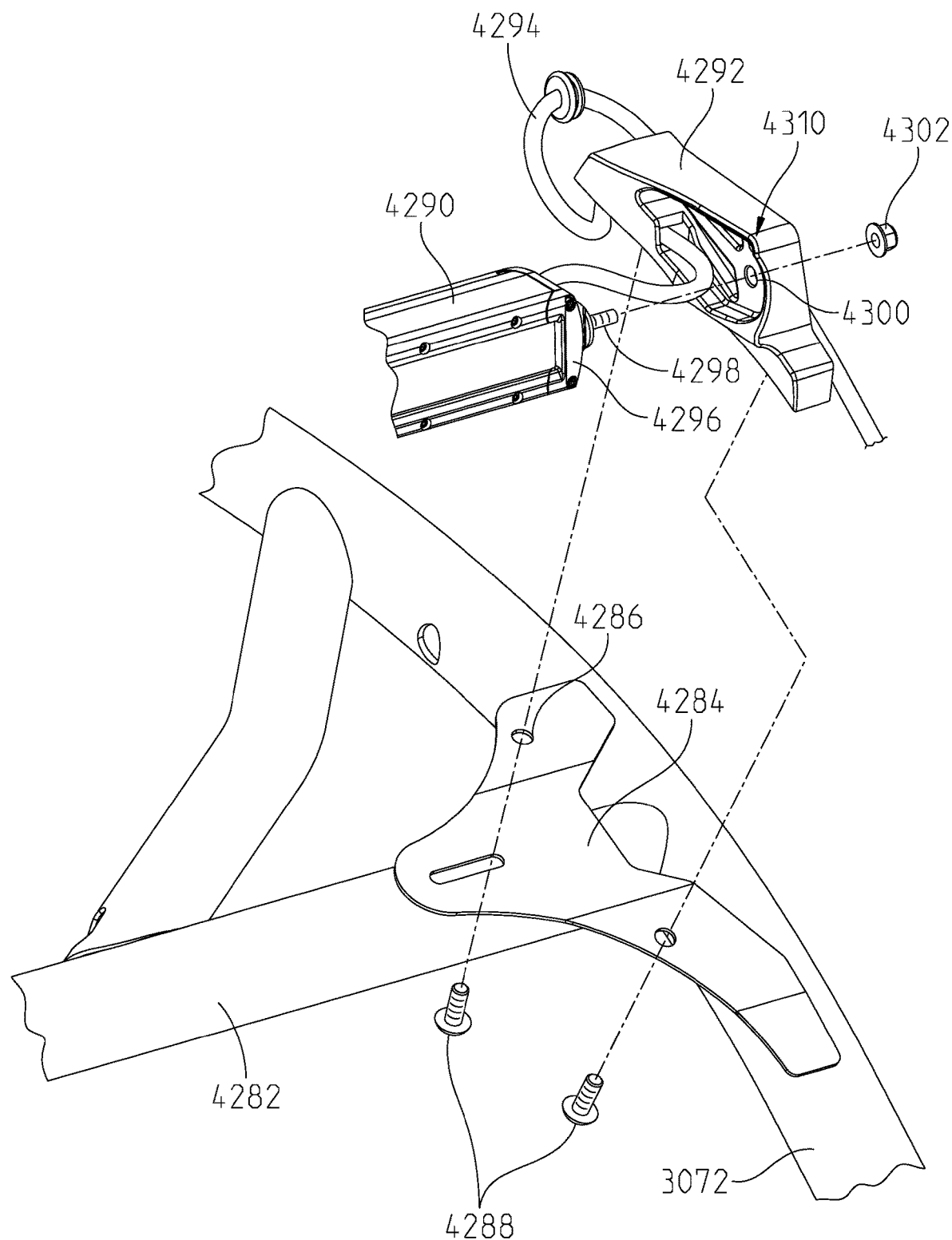
FIG. 113 is a perspective of the mounting of the lightbar assembly to the cab frame of FIG. 112.

Referring now to FIGS. 112-114, vehicle 2 may include various accessories. For example, vehicle 2 may include a lightbar assembly 4280 coupled to a portion of cab frame 2028. Lightbar assembly 4280 may be used with or without a roof for vehicle 2. In one embodiment, and where a roof is not included on vehicle 2, lightbar assembly 4280 is coupled to a frame member 4282 extending generally between frame members 3072. Illustratively, light bar assembly 4280 is coupled to gussets 4284 which are coupled to both frame members 3072 and 4282. Gusset 4284 may have a generally a triangular shape which extends between frame members 3072 and 4282. Gusset 4284 includes openings 4286 configured to receive fasteners 4288 for coupling lightbar assembly 4280 to cab frame 2028, as disclosed further herein. It may be appreciated that if a roof is included on vehicle 2, the roof also may be mounted to cab frame 2028 at openings 4286 of gussets 4284 such that the roof and lightbar assembly 4280 share common mounting locations on cab frame 2028.

Lightbar assembly 4280 is comprised of at least a lightbar 4290, mounting members 4292, and wiring 4294. Lightbar 4290 extends generally along the length of frame member 4282 and, in one embodiment, is approximately the same length as frame member 4282. In alternative embodiments, lightbar 4290 has a length that is less than that of frame member 4282. Lightbar 4290 includes end plates 4296 and a fastener 4298 extending therefrom. End plate 4296 and fastener 4298 are received within a recessed portion 4310 of mounting member 4292 and, more particularly, fastener 4298 extends through an aperture 4300 of mounting member 4292. Fastener 4298 is coupled to a second fastener 4302 to secure lightbar 4290 to mounting member 4292.

Wiring 4294 is electrically coupled to lightbar 4290 and extends through a portion of mounting member 4292 and along a portion of frame member 3072 in order to couple with a power source of vehicle 2.

Mounting members 4292 may be diecast components comprised of at least a metallic material. Mounting member 4292 includes apertures 4304 which are configured to receive fasteners 4288 in order to support mounting member 4292 and, therefore, lightbar 4290 on cab frame 2028. Apertures 4304 are positioned along a lower surface 4312 of mounting member 4292. Lower surface 4312 further includes a slot or channel 4306 which is configured to receive and conceal a portion of wiring 4294. An isolator 4308 may be positioned adjacent cab frame 2028 and mounting member 4294 to minimize vibrational transfer to lightbar 4290.

Referring now to FIGS. 115-126, front suspension assembly 40 is shown in greater detail. As noted above, suspension assembly 40 includes upper alignment or A-arm 280 (FIG. 126), lower alignment or A-arm 282 (FIGS. 115-116), and linear force element (LFE) 284 which is shown as a spring over shock (FIG. 12). Lower A-arm 282 includes a forward extension 5000 and a rearward extension 5002 which are respectively coupled to couplers 374, 376 and 384, 386 for mounting lower A-arm 282 to frame 20 (FIG. 8). Forward and rearward extensions 5000, 5002 generally extend laterally relative to the longitudinal centerline L (FIG. 5). Forward and rearward extensions 5000, 5002 are coupled together to define a laterally outer portion 5004 of lower A-arm 282. Outer portion 5004 illustratively includes a ball joint housing 5006 which is configured to receive ball joint 394 (FIG. 13). More particularly, outer portion 5004 includes a recess 5008 configured to receive a portion of ball joint housing 5006 such that ball joint housing 5006 extends outwardly from outer portion 5004 to define a laterally outermost extent of lower A-arm 282. In one embodiment, ball joint housing 5006 may be a forged component.

Referring still to FIGS. 115-120, lower A-arm 282 may be comprised of a plurality of components. Illustratively, lower A-arm 282 is comprised of an upper stamping 5010, a lower stamping 5012, and an upper plate 5014. Unlike a butted joint between stampings 5010, 5012, upper stamping 5010 is coupled to lower stamping 5012 at overlapping sides 5016 (shown best in FIG. 120) such that upper stamping 5010 and lower stamping 5012 define a clamshell arrangement. In other words, a lower extent of upper stamping 5010 extends over and is in contact with an upper extent of lower stamping 5012 at overlapping sides 5016. Overlapping sides 5016 extend generally the complete or full length of upper and lower stampings 5010, 5012 and, illustratively, extend between ball joint housing 5006 and couplers 374, 376, 384, 386. Upper and lower stampings 5010, 5012 may be permanently coupled together with welds, adhesive, or any other conventional coupling mechanisms.

Lower stamping 5012 defines the lowermost surface of lower A-arm 282 while upper stamping 5010 defines at least a portion of the uppermost surface of lower A-arm 282. More particularly, an upper surface 5018 (FIG. 115) of upper stamping 5010 defines the upper surface of lower A-arm 282 along a length of lower A-arm 282 that extends approximately from upper plate 5014 to couplers 374, 376, 384, 386. However, as described further herein, upper surface 5018 of upper stamping 5010 at outer portion 5004 of lower A-arm 282 may be positioned vertically below or underneath at least a portion of upper plate 5014 such that upper plate 5014 defines the upper surface of lower A-arm 282 at outer portion 5004.

As shown in FIGS. 115-120, upper plate 5014 is configured to be positioned over a portion of upper surface 5018 of upper stamping 5010 at outer portion 5004 and may be permanently coupled thereto with welds, adhesive, or any other conventional coupling mechanism. Upper plate 5014 extends approximately from a recess 5020 to legs 5022, 5024. Recess 5020 is configured to generally align with recess 5008 of upper stamping 5010 and also receives ball joint housing 5006. As shown best in FIG. 118, a portion of upper stamping 5010 is exposed laterally outwardly of upper plate 5014 adjacent ball joint housing 5006. As such, this tiered configuration of ball joint housing 5006, upper stamping 5010, and upper plate 5014 allows for a defined weld area which allows a weld to penetrate all three surfaces during a single welding operation.

Legs 5022, 5024 extend along an upper surface of a portion of extensions 5000, 5002, respectively. In this way, upper stamping 5010 and upper plate 5014 collectively define the uppermost surface of lower A-arm 282, where upper stamping 5010 defines the uppermost surface at extensions 5000, 5002 and upper plate 5014 defines the uppermost surface at outer portion 5004.

Upper plate 5014 also includes side walls 5026 which extend along a portion of upper stamping 5010 and downwardly towards lower stamping 5012. An upper surface 5028 of upper plate 5014 includes an opening 5030, which will be described further herein.

With continuing reference to FIGS. 115-120, lower A-arm 282 further includes a suspension mounting assembly 5032. Suspension mounting assembly 5032 is defined by a gusset plate 5034, a spherical or bearing 5036, and a retention member 5038, illustrative a C-clip tension member. It may be appreciated that component 5036 is not a bushing, as may be conventionally used in other suspension arrangements, and, instead, is bearing because a bushing would constrain the motion of the shock.

Gusset plate 5034 may be a forging or may be machined. Gusset plate 5034 has an opening 5035 (FIGS. 117A and 117B) configured to receive bearing 5036 therein. Bearing 5036 is partially retained within opening 5035 through a small tolerance or interference fit and, as such, by forming gusset plate 5034 through forging, opening 5035 is able to be sized to retain bearing 5036. Retention member 5038 also is configured to retain bearing 5036 within opening 5035 of gusset plate 5035. Bearing 5036 is configured to couple a lower end of LFE 284 to lower A-arm 282, as is disclosed further herein.

Gusset plate 5034 is configured to be received within and extend through opening 5030 of upper plate 5014. More particularly, gusset plate 5034 is configured to be positioned atop a portion of upper surface 5018 of upper stamping 5010 at outer portion 5004 and extends through opening 5030 of upper plate 5014. Because upper plate 5014 is coupled to both upper stamping 5010 and gusset plate 5034, upper plate 5014 helps to join together upper stamping 5010 and gusset plate 5034.

Opening 5035 of gusset plate 5032 is exposed and configured to receive fasteners for coupling with LFE 284. Gusset plate 5032 may be permanently coupled to upper stamping 5010 and/or upper plate 5014 with welds, adhesive, or any other conventional coupling mechanism. For example, at least a portion of a lower surface 5037 of gusset plate 5034 may be welded or otherwise permanently coupled to the upper surface of upper stamping 5010 while at least a portion of lateral surfaces 5039 of gusset plate 5034 may be welded or otherwise permanently coupled to upper plate 5014.

Figure 121:
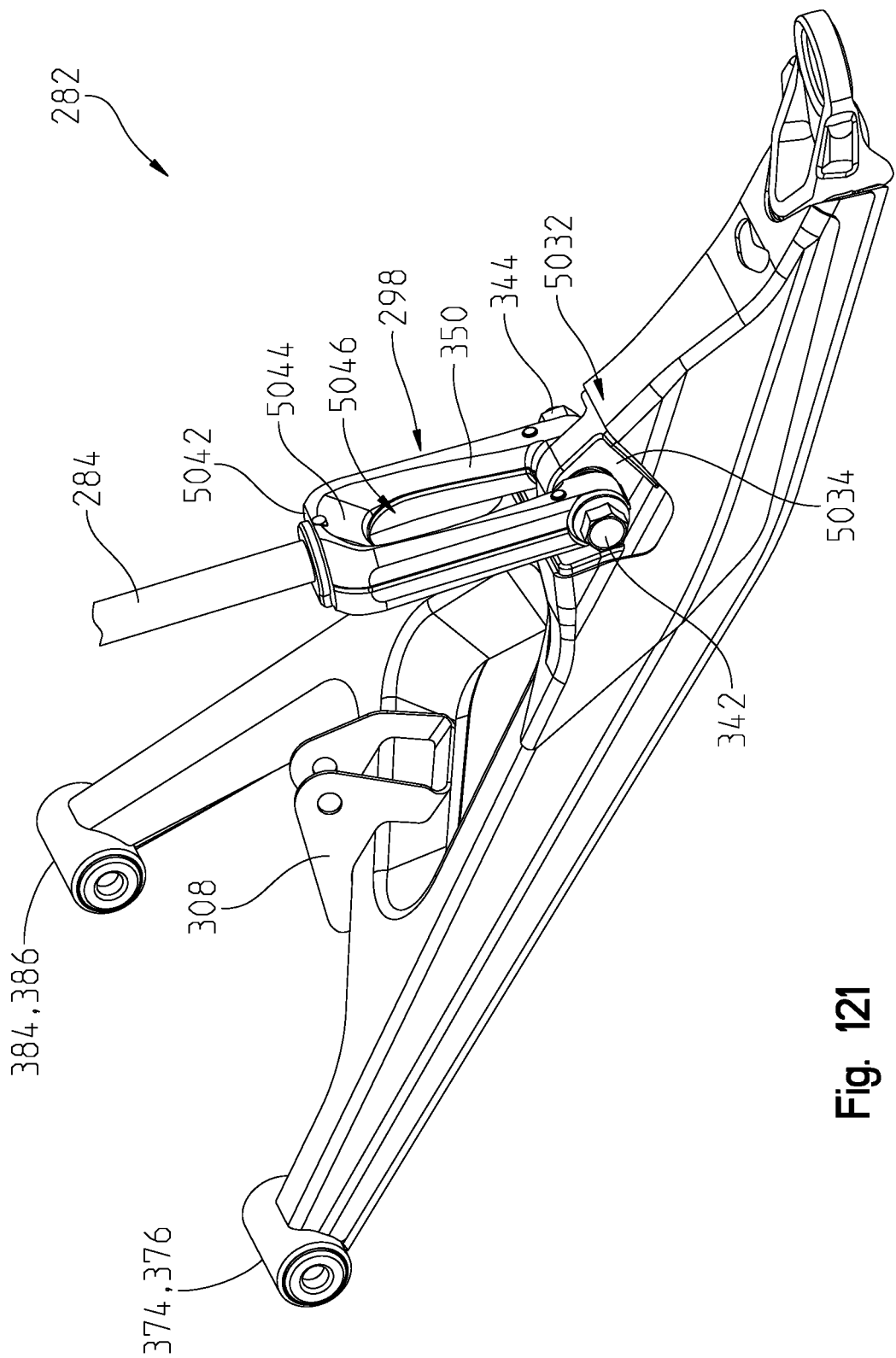
Figure 122:
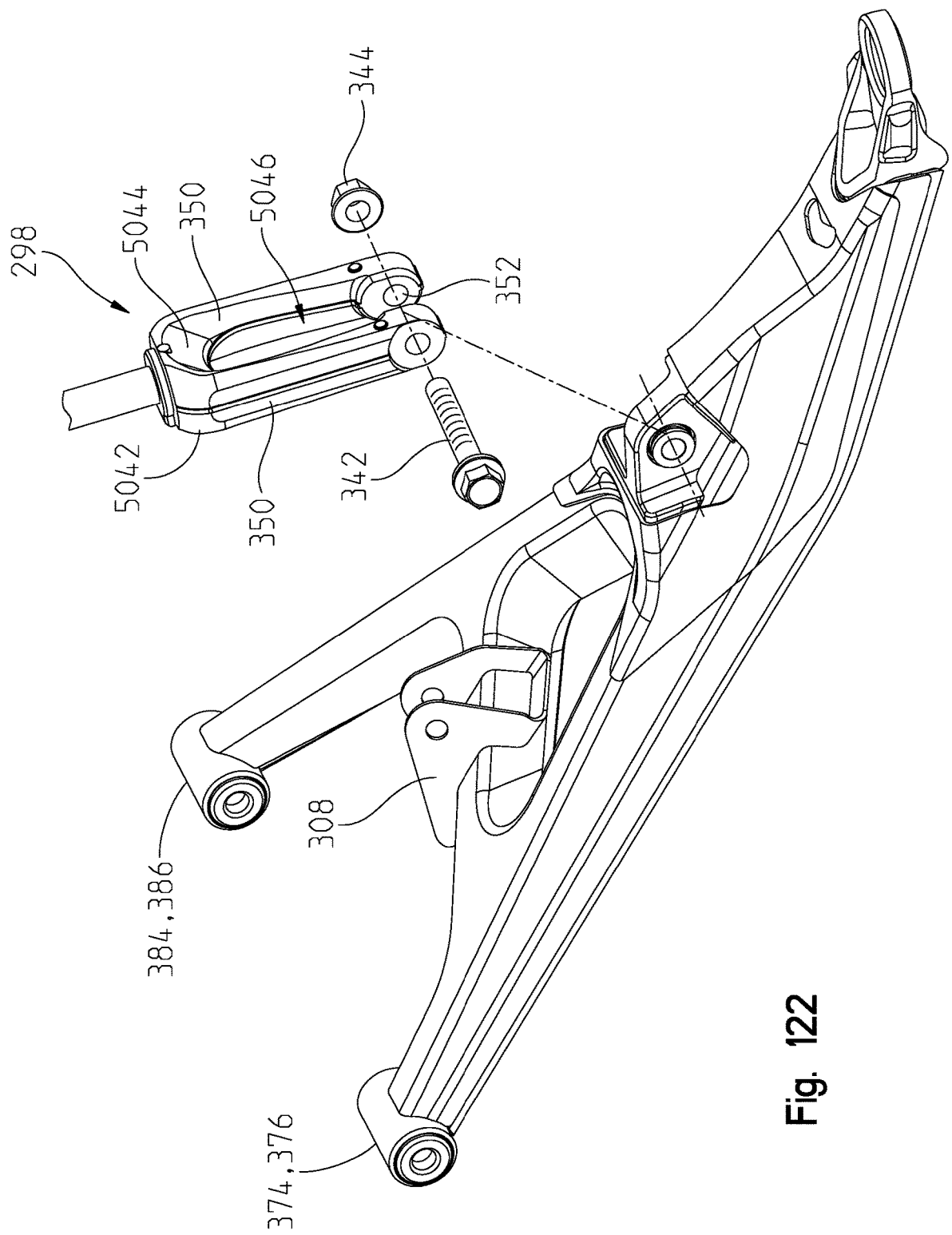

Referring now to FIGS. 121 and 122, a lower end of LFE 284 is coupled to a connector, illustratively clevis 298, and connector/clevis 298 is coupled to gusset plate 5034 to pivotably couple LFE 284 to lower A-arm 282. More particularly, clevis 298 includes two clevis legs 350 which have openings 352 that are configured to align with opening 5040 of bearing 5036 to receive a fastener 342 therethrough. A second fastener 344 is secured to fastener 342 such that fastener 342 extends through openings 352 on both clevis legs 350 and opening 5040 of bearing 5036 and is partially received within second fastener 344 to removably couple clevis 298, and therefore the lower end of LFE 284, to lower A-arm 282.

Clevis 350 also includes an upper portion 5042 which is coupled to both clevis legs 350 and positioned adjacent the lower end of LFE 284. Upper portion 5042 of clevis 350 includes a recessed portion 5044 positioned above and adjacent an opening 5046 defined between clevis legs 350. Opening 5046 is configured to receive half shafts 290 and recessed portion 5044 ensures that a predetermined minimum clearance C is maintained between half shaft 290 and upper portion 5042 of clevis 298 during full compression or rebound of suspension assembly 40.

Figure 124:
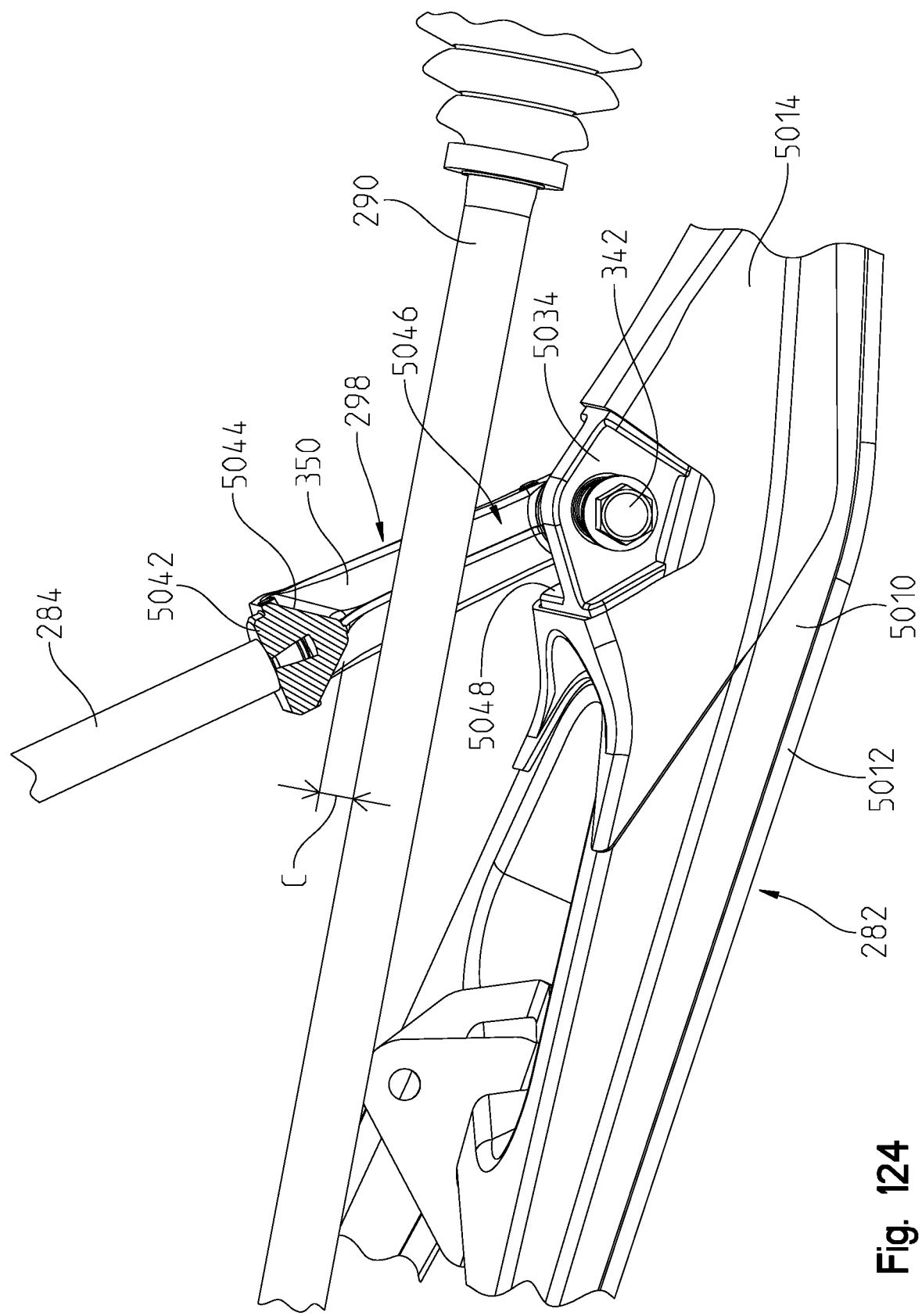

More particularly, and referring to FIGS. 124 and 125, FIG. 124 shows front suspension 40 at ride height (i.e., when stopped or during travel across generally flat terrain), where front suspension 40 is not at full rebound or full compression. In FIG. 124 it is apparent that clearance C between upper portion 5044 of clevis 298 and half shaft 290 is maintained and clevis 298 does not contact half shaft 290. However, even when front suspension 40 is at full rebound or compression, as shown in FIG. 125, clearance C, albeit smaller than the distance of clearance C of FIG. 124, is maintained between upper portion 5044 of clevis 298 and half shaft 290. In this way, clevis 298 does not make contact with half shaft 290 regardless of the position of front suspension 40.

To further maintain clearance C, gusset plate 5034 includes a stop surface 5048. Stop surface 5048 is a ramped or angled surface which is angled inwardly towards legs 5022, 5024 of upper plate 5014 is configured to allow clevis legs 350 to make contact before clevis 298 would contact half shaft 290. In this way, stop surface 5048 of gusset plate 5034 limits the pivot motion of clevis 298 to prevent contact with half shaft 290.

Because LFE 284 is coupled to lower A-arm 282, lower A-arm 282 experiences loads reacted by LFE 284. More particularly, loads from LFE 284 travel through bearing 5036 and into spindle 390 (FIG. 12) and, as such, are experienced by at least outer portion 5004 of lower A-arm 282. In this way, by including upper plate 5014 with upper stamping 5010, the stiffness of lower A-arm 282 is increased along a distance 5056 (FIGS. 115 and 119) between ball joint housing 5006 (coupled to spindle 390 (FIG. 12)) and suspension mounting assembly 5032 where the loads from LFE 284 are experienced. In other words, because upper plate 5014 spans a lateral distance adjacent ball joint housing 5006 to suspension mounting assembly 5032, the major loads experienced at front ground-engaging members 4 and LFE 284 are more evenly distributed throughout lower A-arm 282 by upper plate 5014 and upper plate 5014 increases the stiffness at these locations of the major loads.

Referring now to FIG. 126, it may be appreciated that upper A-arm 280 has a similar configuration to that of lower A-arm 282 in that upper A-arm 280 includes an upper stamping 5050 and a lower stamping 5052 which overlap each other and are permanently coupled together at 5054.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A suspension arm for a vehicle, the suspension arm comprising:
a first portion having an upper surface; and
a second portion coupled to the first portion and positioned over at least a portion of the upper surface, and the first portion and the second portion together define an upper surface of the suspension arm, wherein the first portion and the second portion together define a location for coupling with a shock absorber,
wherein the first portion includes a first lateral extension and a second lateral extension, and the second portion extends along a portion of the first and second lateral extensions of the first portion.

2. The suspension arm of claim 1, wherein the second portion is coupled to an upper surface of the first portion.

3. The suspension arm of claim 1, wherein the second portion is coupled to a laterally outer portion of the first portion.

4. The suspension arm of claim 1, further comprising a ball joint housing and both the first and second portion have a length extending to the ball joint housing.

5. The suspension arm of claim 1, further comprising a mounting assembly for linear force element, and the second portion generally surrounds the mounting assembly.

6. The suspension arm of claim 1, further comprising a third portion coupled to the first portion.

7. The suspension arm of claim 6, wherein the third portion defines a lowermost surface of the suspension arm.

8. The suspension arm of claim 7, wherein the third portion has a height that overlaps a height of the first portion.

9. A suspension assembly for a vehicle, the suspension assembly comprising:
an alignment arm including:
a mounting assembly having an upper member;
a bearing plate coupled to an upper surface of the upper member, the bearing plate including:
a ball joint recess extending through a thickness of the bearing plate; and
a bearing opening;
a bearing member, and the bearing member is removably coupled within a portion of the bearing plate through the bearing opening;
a ball joint housing on a laterally outer end of the alignment arm, wherein the ball joint recess is at the ball joint housing and reveals the ball joint housing;
wherein a portion of the upper member is exposed by the ball joint recess, and the ball joint recess is configured to permit coupling of a ball joint with the portion of the upper member and
a linear force element extending through the bearing opening, the linear force element movably coupled to the alignment arm at the bearing member, the linear force element configured to distribute a load along at least a portion the alignment arm.

10. The suspension assembly of claim 9, further comprising a connector extending between a lower end of the linear force element and the bearing member, and the connector is configured to receive a mechanical fastener, and the mechanical fastener extends through the bearing member.

11. The suspension assembly of claim 10, wherein the bearing plate includes a stop surface configured to limit rotation of the connector.

12. The suspension assembly of claim 9, wherein the alignment arm comprises a first upper portion, a second upper portion, and a lower portion coupled to at least the first upper portion, and the bearing plate is coupled to at least the first upper portion.

13. The suspension assembly of claim 12, wherein the bearing plate is coupled to the second portion.

14. The suspension assembly of claim 9, further comprising a clevis, and wherein the linear force element is removably coupled to a first end of the clevis, and the second end of the clevis is coupled to the bearing member.

15. The suspension assembly of claim 9, wherein the alignment arm defines a stamped portion including an upper stamping and an upper plate coupled to an upper surface of the upper stamping, wherein the load is distributed through at least a portion of the stamped portion.

16. The suspension assembly of claim 9, wherein the load is distributed along a lateral distance between the bearing and the ball joint housing.

17. A suspension arm for a vehicle, the suspension arm comprising:
an upper portion having a lower extent extending downward relative to a longitudinal axis of the upper portion, the upper portion includes a ball joint housing;
a lower portion having an upper extent extending upward relative to a longitudinal axis of the lower portion, the lower portion coupled to the upper portion such that the upper portion and the lower portion define a clamshell arrangement, and the upper extent of the lower portion overlaps a lower extent of the upper portion to define overlapping sides of the upper and lower portions, and the upper portion is coupled to the lower portion at the overlapping sides; and
a bearing plate coupled along the upper portion, the bearing plate extends along the longitudinal axis of the upper portion, and the bearing plate includes:
a ball joint recess configured to reveal the ball joint housing; and
a bearing opening spaced from the ball joint recess, the bearing opening configured to receive a linear force element.

18. The suspension arm of claim 17, wherein the upper and lower portions are stampings.

19. The suspension arm of claim 17, wherein the overlapping sides extend a complete length of both the upper and lower portions.

20. The suspension assembly of claim 17, further comprising a bearing plate coupled to an upper surface of the upper portion, wherein the upper portion includes a first lateral extension and a second lateral extension, and the bearing plate extends along a portion of the first and second lateral extensions of the first portion.

21. A method of assembling a suspension arm for a vehicle, the method comprising:
providing a first portion;
providing a second portion;
providing a third portion;
permanently coupling the first portion to the second portion along an upper surface of the first portion, wherein the first portion includes a first lateral extension and a second lateral extension, and the second portion extends along a portion of the first and second lateral extensions of the first portion, and wherein the first portion and the second portion define a coupling location for a shock absorber;

aligning an upper extent of the third portion with a lower extent of the first portion; and permanently coupling the first portion to the third portion along the lower extent of the first portion.

22. The method of claim 21, wherein the first and second portions define an uppermost surface of the suspension arm.

23. The method of claim 21, further comprising:

providing a suspension mount; and permanently coupling the suspension mount to the first and second portions.

24. The method of claim 23, further comprising positioning the suspension mount to extend through an opening of the second portion.

25. The method of claim 21, wherein providing a first portion includes stamping the first portion, and wherein providing a third portion includes stamping the third portion.

26. The method of claim 25, wherein permanently coupling the first portion to the second portion includes welding the first portion to the second portion, and wherein permanently coupling the first portion to the third portion includes welding the first portion to the third portion.

\* \* \* \* \*